INVENTORS.
James O. McDonough
Alfred K. Susskind
Herbert P. Grossimon
By:
Carlson, Pitzner, Hubbard & Wolfe
Attys.

June 25, 1968 J. O. McDONOUGH ET AL 3,390,315
APPARATUS FOR NUMERICAL CONTROL OF A MULTIAXES MACHINE TOOL
INCLUDING INTERPOLATION AND FEEDRATE CONTROL
Original Filed June 5, 1956 31 Sheets-Sheet 3
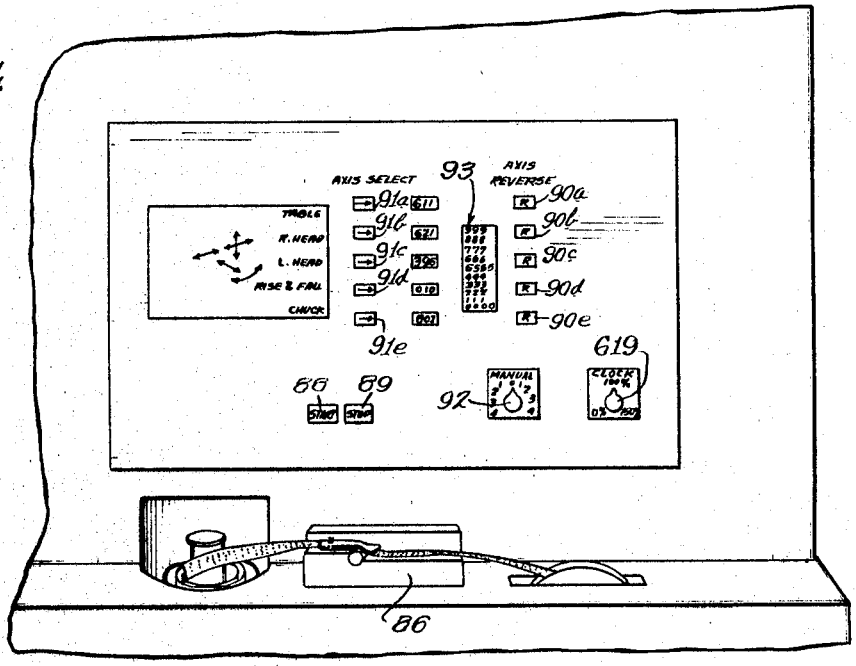
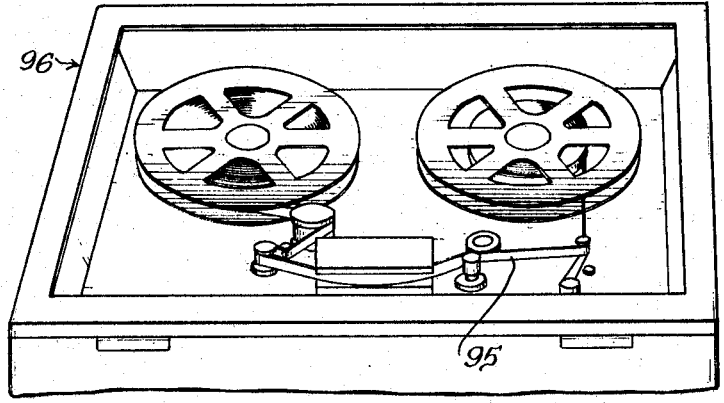
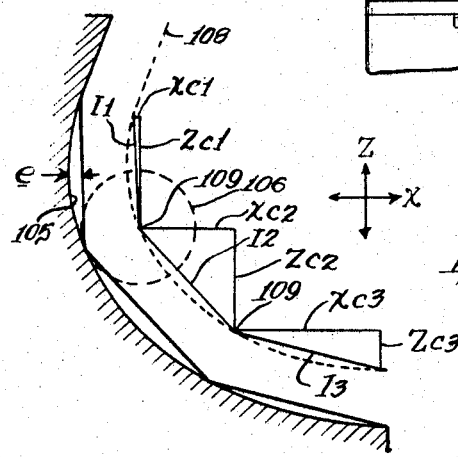
INVENTORS.
James O. McDonough
Alfred K. Susskind
Herbert P. Grossimon
By Carlson, Pitzner, Hubbard & Wolfe
Attys.

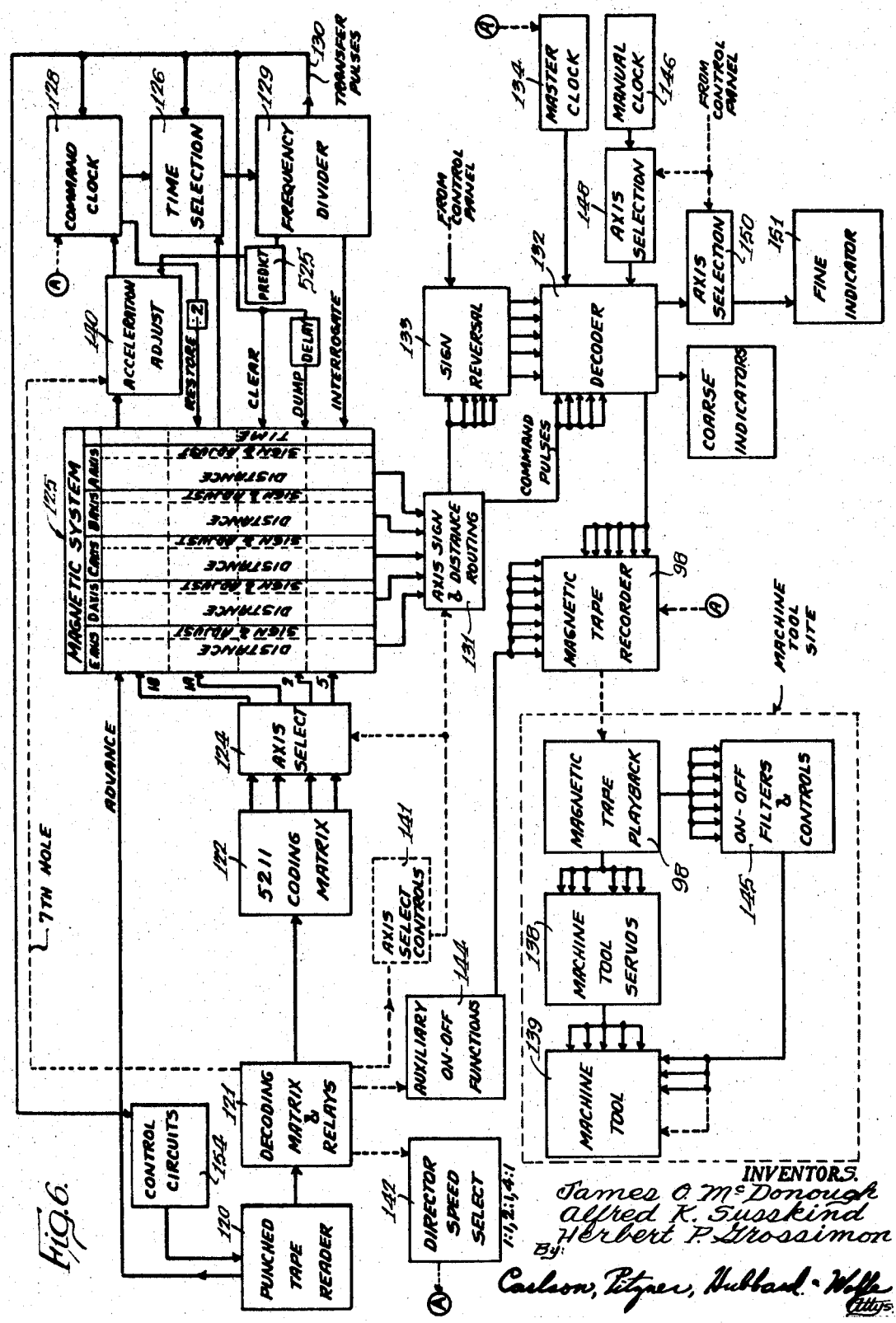

Fig. 7.

| COLUMN NUMBER | | | | | | | CODED DIGIT |
|---|---|---|---|---|---|---|---|
| 5 | 4 | 3 | 2 | 1 | 6 | 7 | |
| O | O | O | | O | O | | 0 |
| O | | | | O | | | 1 |
| | | O | | O | O | O | 2 |
| | | | | O | O | O | 3 |
| | O | | | O | O | | 4 |
| | O | | | | O | O | 5 |
| O | O | | | | O | O | 6 |
| O | | | | O | O | O | 7 |
| | | | | | O | O | 8 |
| O | O | | | O | O | | 9 |
| | | O | | | | | SP(0) |
| O | O | O | | | O | | X |
| O | | O | O | | | | P |
| O | O | O | | | | | M |
| | O | | | O | | O | + |
| | | | | O | | O | − |
| O | | | | O | | O | TAB |
| O | | O | | | | O | CR |
| O | O | | | | | O | STOP |
| O | | | O | | O | O | 7TH HOLE & TAB. |

Fig. 8.

| | A AXIS | B AXIS | C AXIS | D AXIS | E AXIS |
|---|---|---|---|---|---|
| X05 | | | | | |
| X04 | | | | | |
| 001 | +001.2345 | −000.2345 | +000.0345 | P000.0045 | m-000.0005 |
| 010 | −009.8765 | −000.8765 | −000.0765 | m-000.0065 | −000.0005 |
| X00 | | | | | |

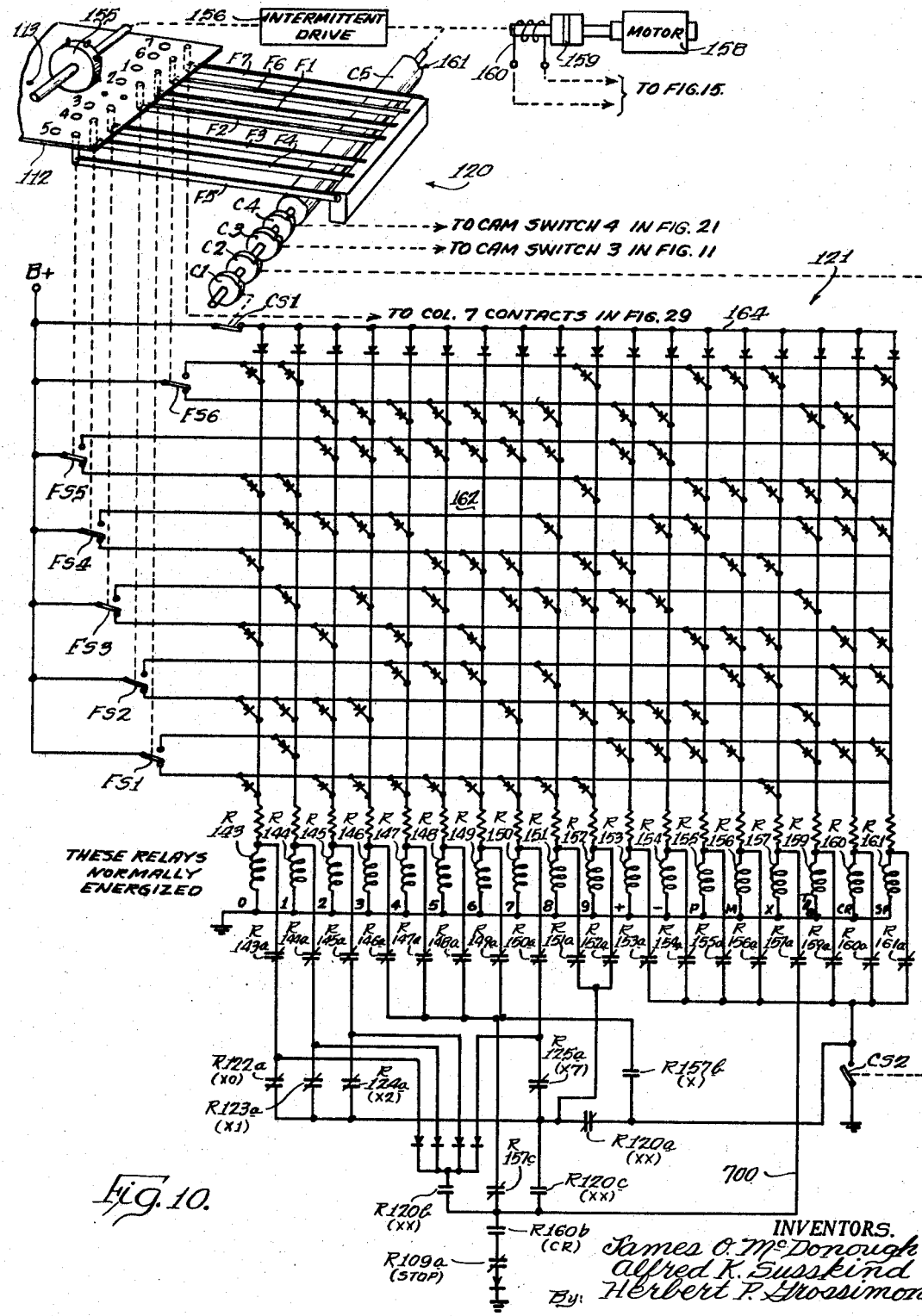

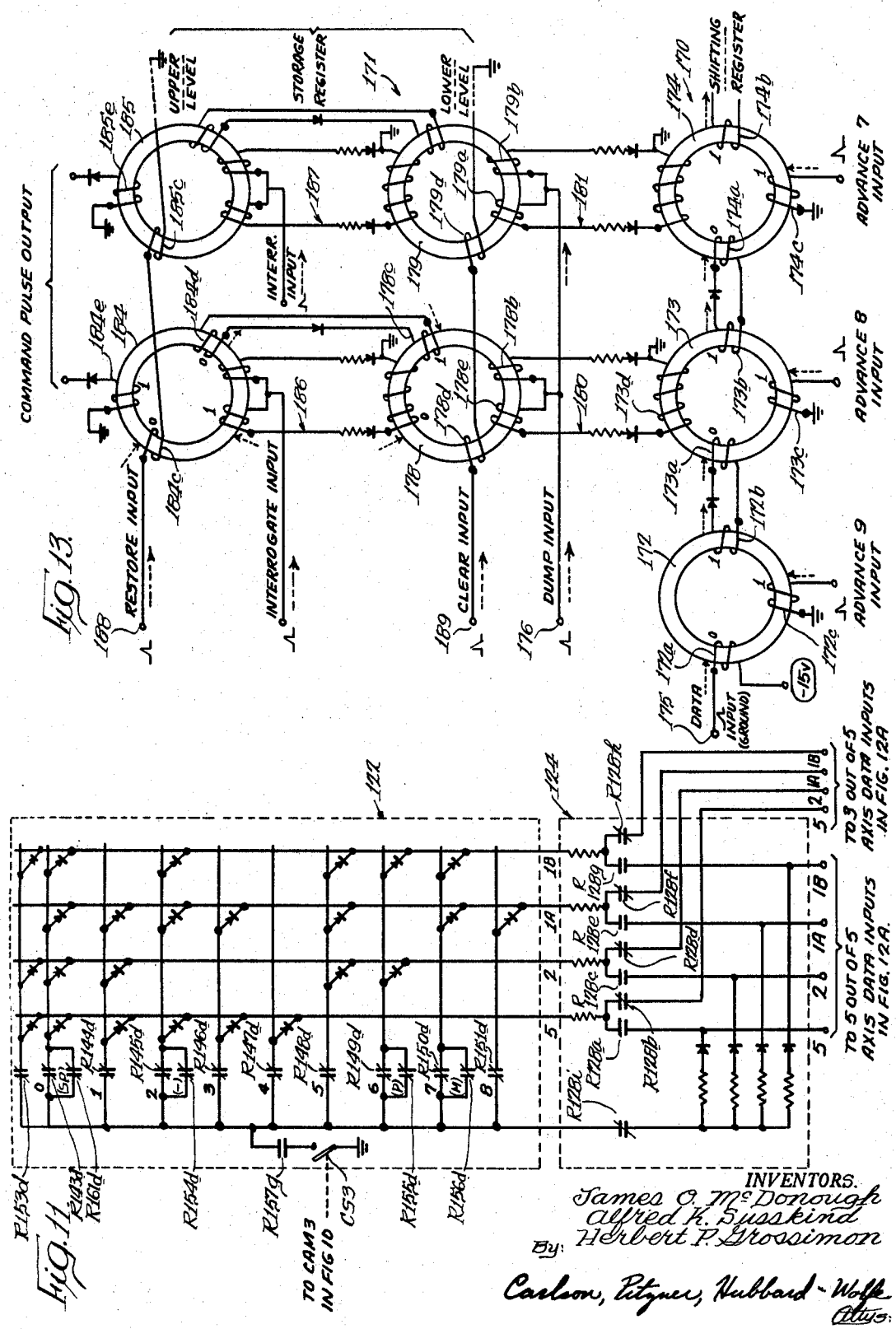

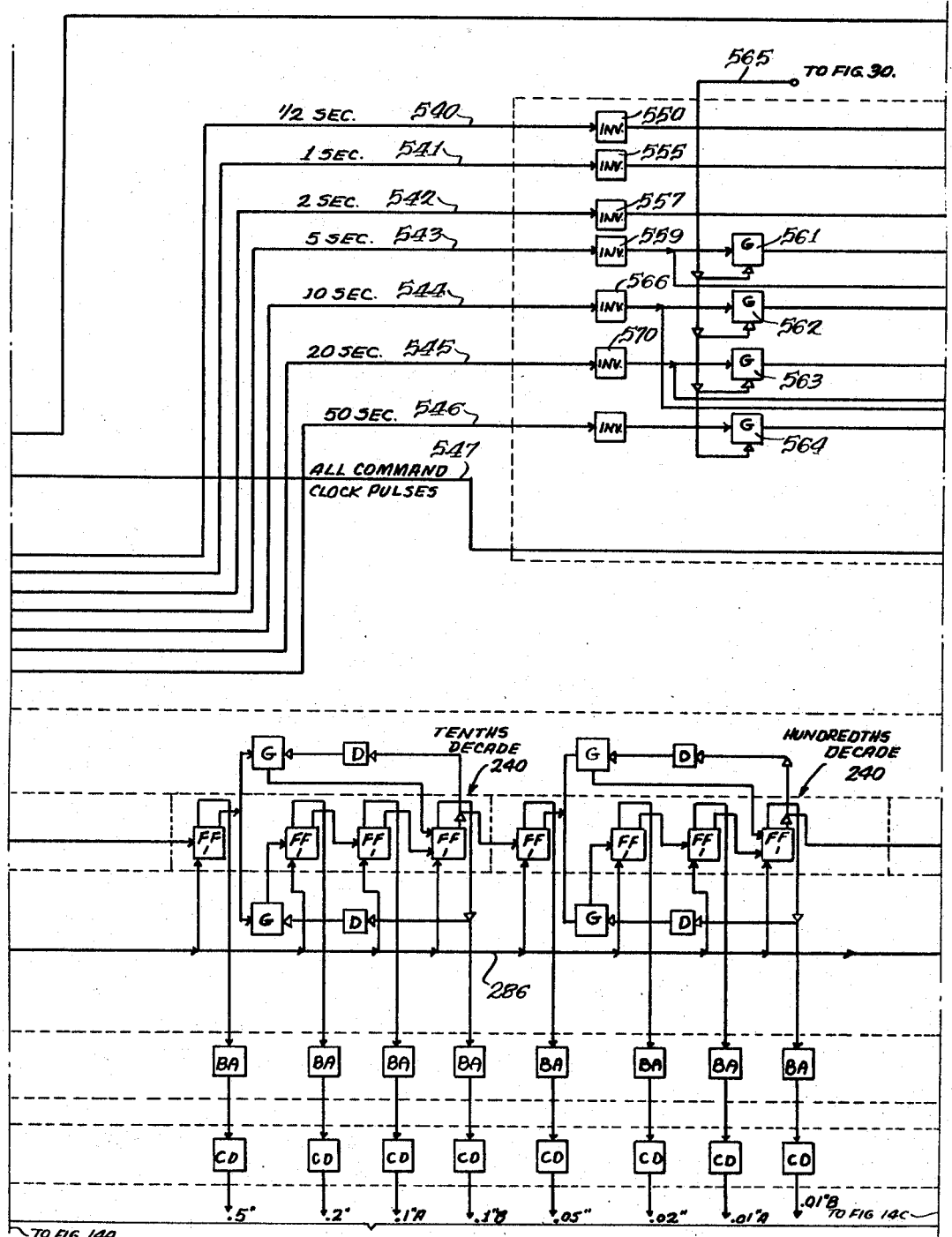

June 25, 1968  J. O. McDONOUGH ET AL  3,390,315
APPARATUS FOR NUMERICAL CONTROL OF A MULTIAXES MACHINE TOOL
INCLUDING INTERPOLATION AND FEEDRATE CONTROL
Original Filed June 5, 1956  31 Sheets-Sheet 14

INVENTORS.
James O. McDonough
Alfred K. Susskind
Herbert P. Grossimon
By:
Carlson, Pitzner, Hubbard - Wolfe
Attys.

INVENTORS.
James O. McDonough
Alfred K. Susskind
By Herbert P. Grossimon

Carlson, Pitzner, Hubbard & Wolfe
Attys.

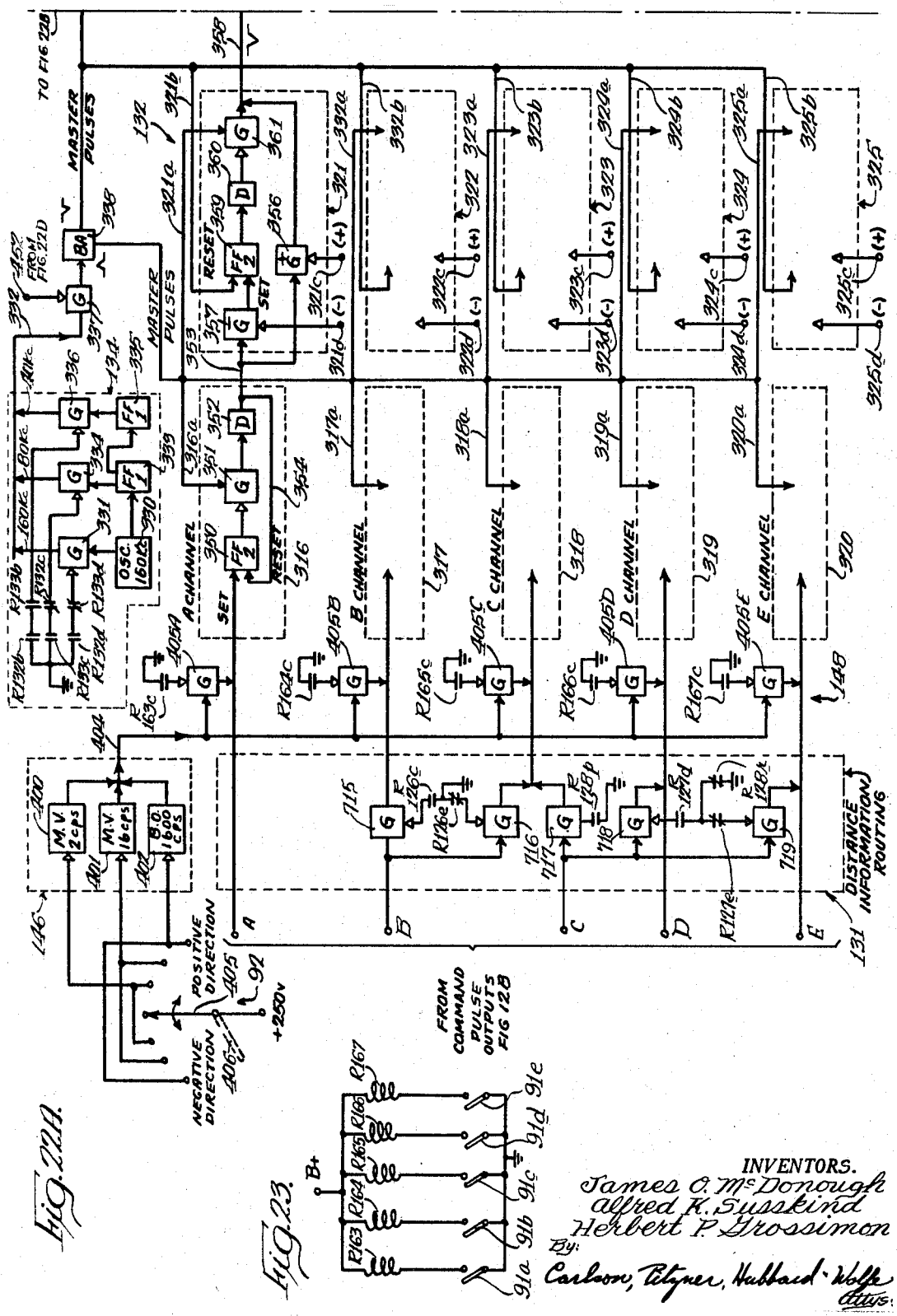

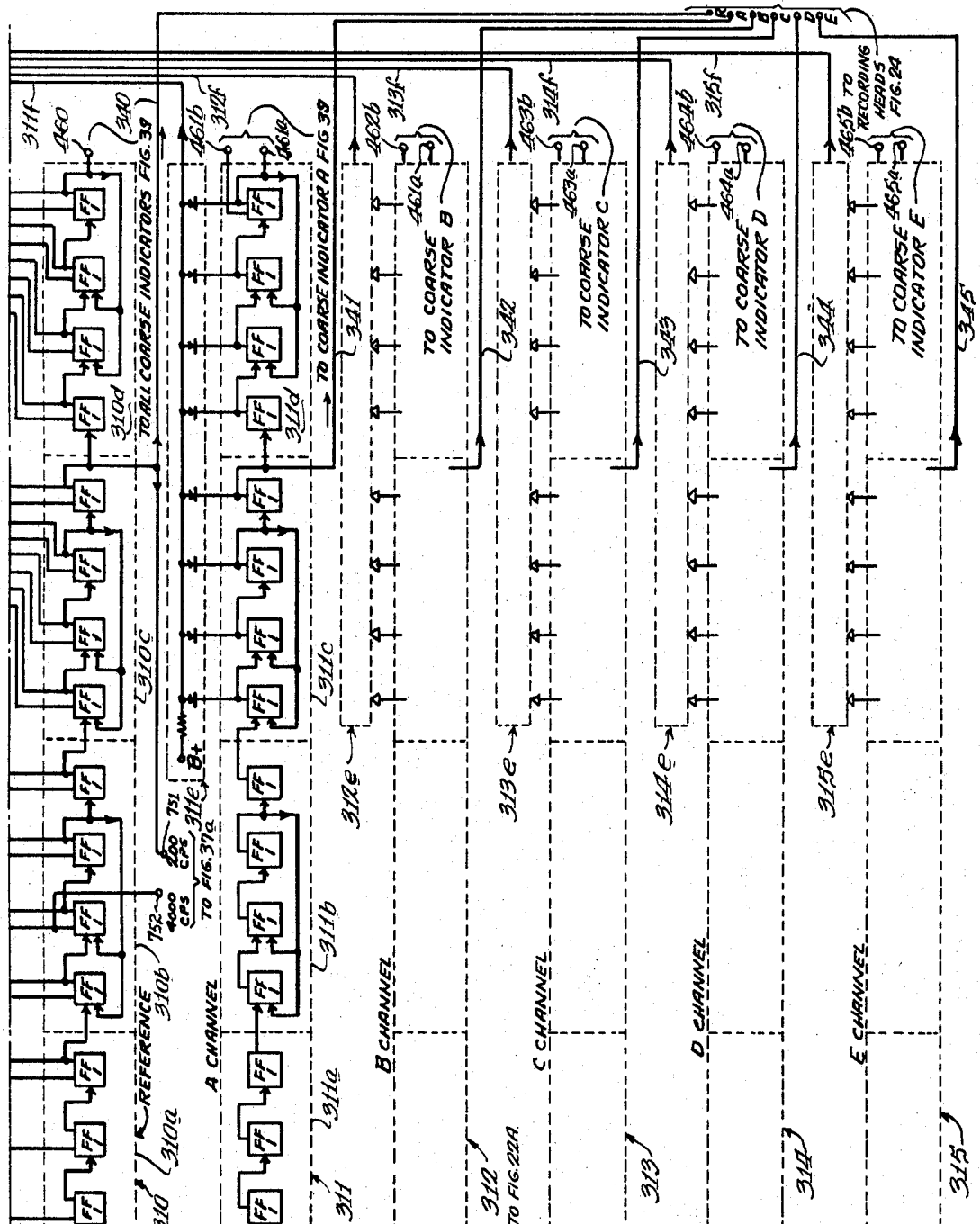

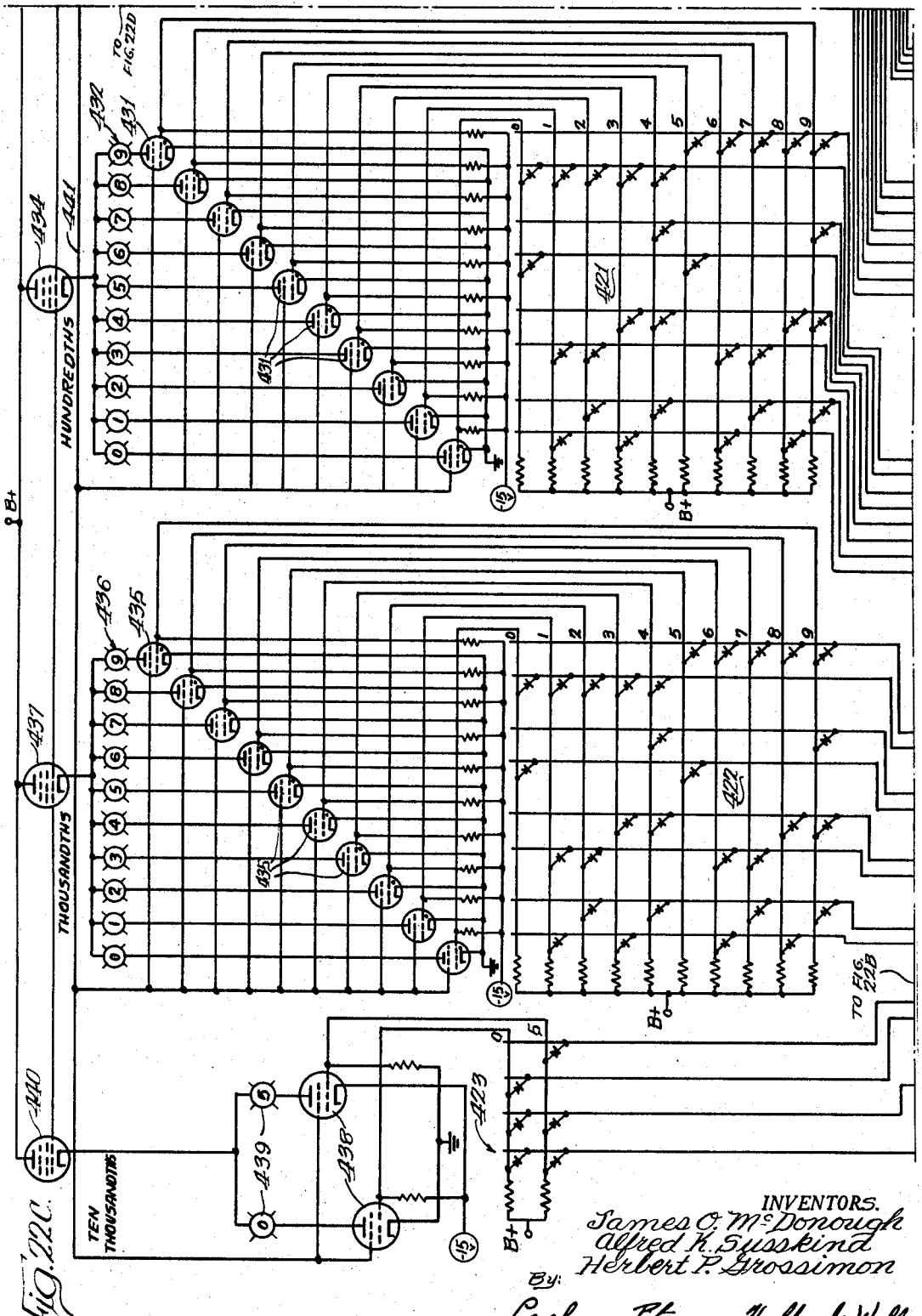

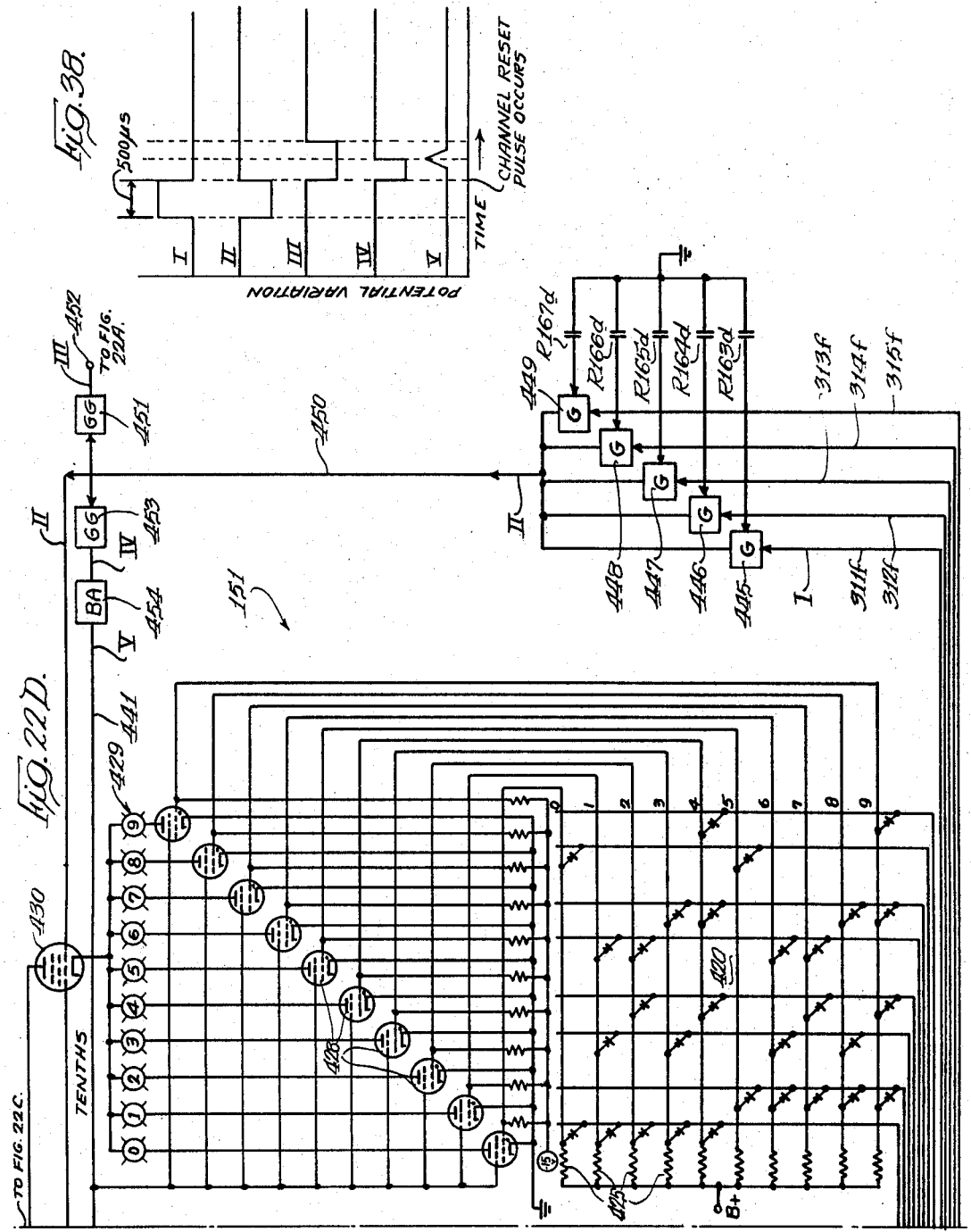

June 25, 1968 J. O. McDONOUGH ET AL 3,390,315
APPARATUS FOR NUMERICAL CONTROL OF A MULTIAXES MACHINE TOOL
INCLUDING INTERPOLATION AND FEEDRATE CONTROL
Original Filed June 5, 1956 31 Sheets-Sheet 20
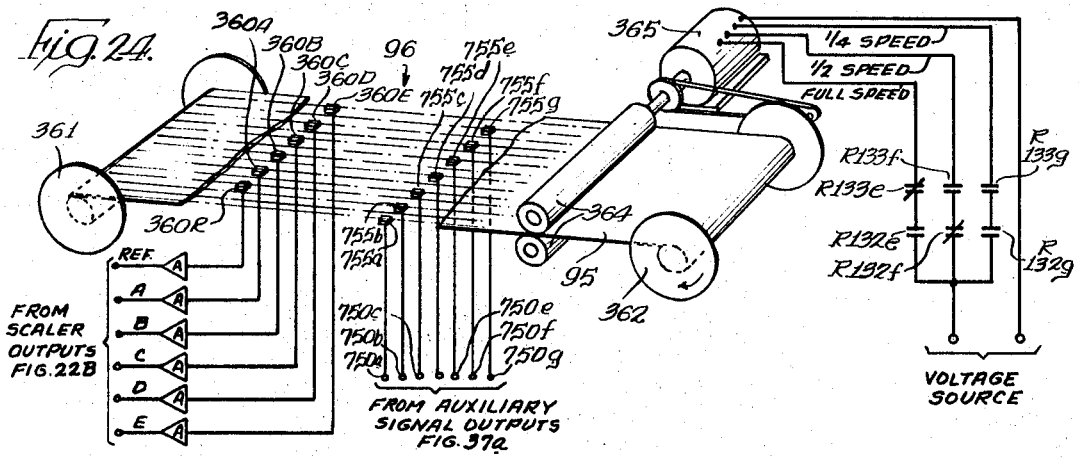
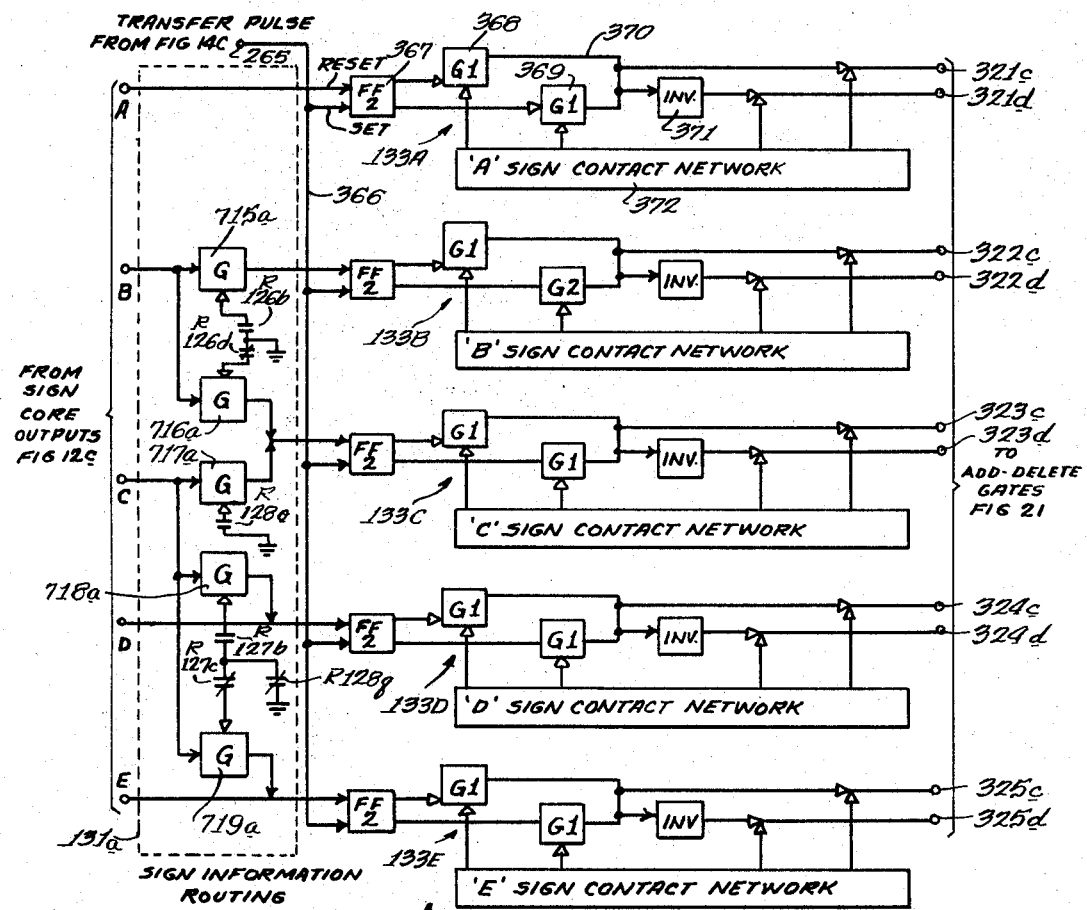

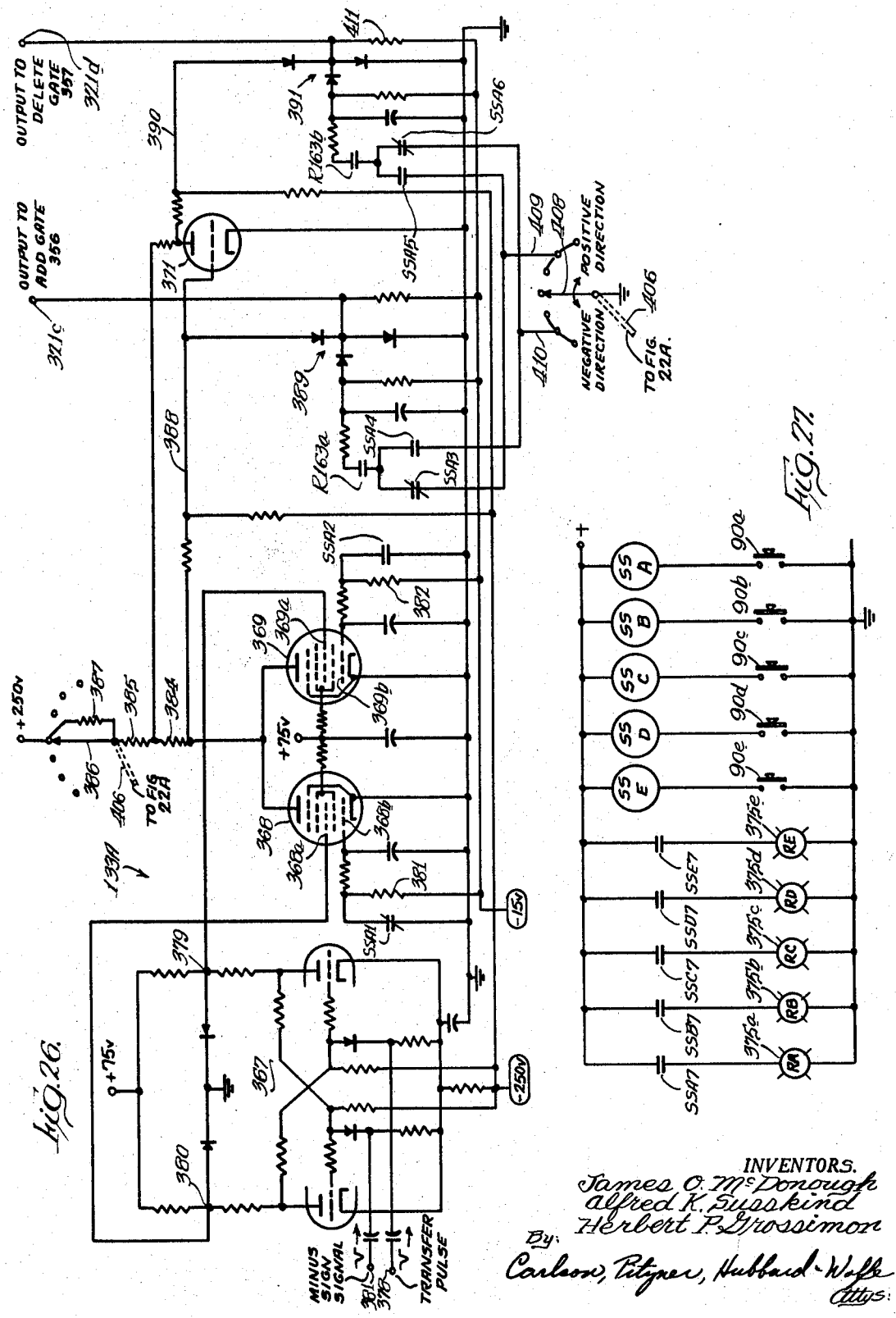

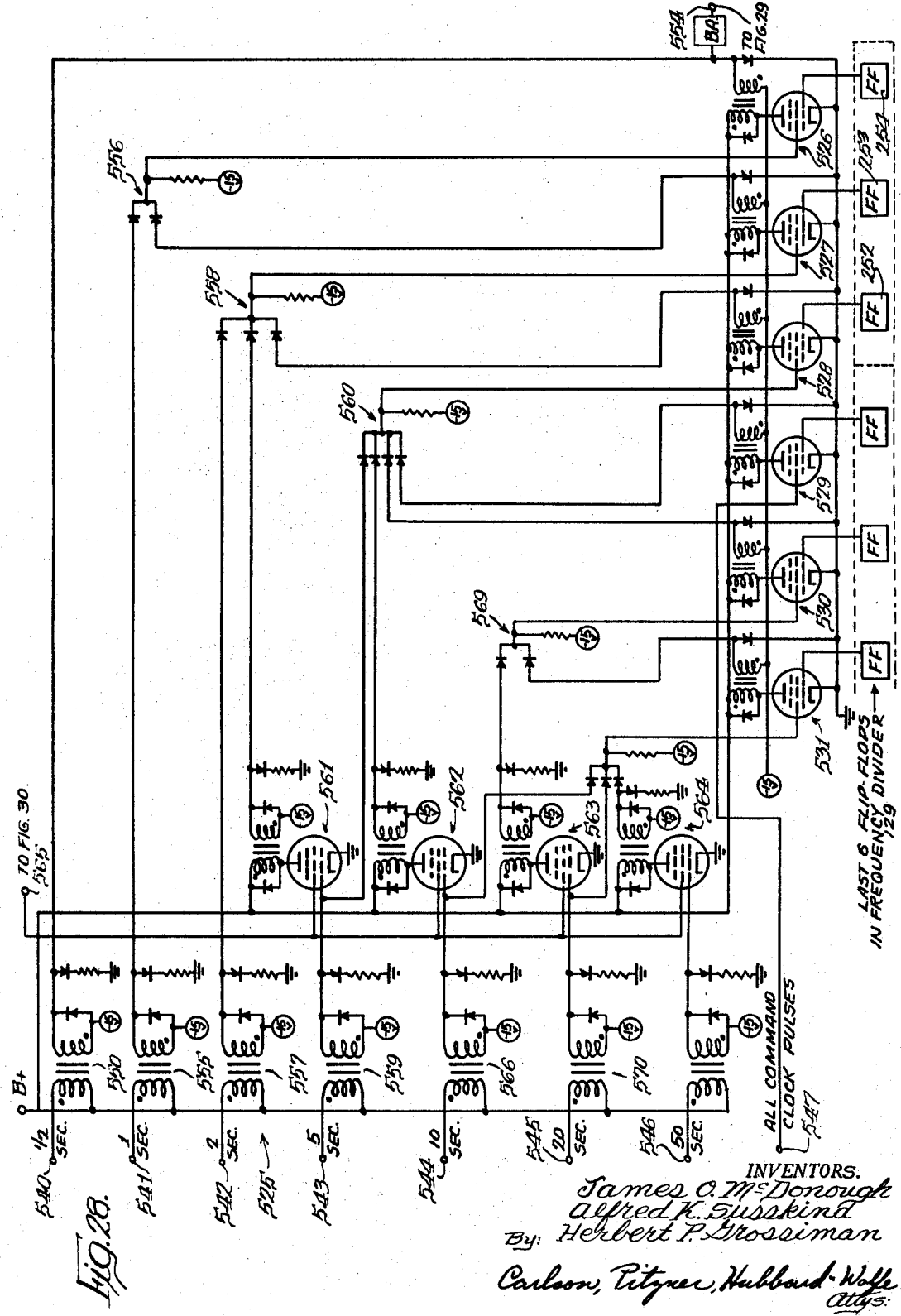

June 25, 1968  J. O. McDONOUGH ET AL  3,390,315
APPARATUS FOR NUMERICAL CONTROL OF A MULTIAXES MACHINE TOOL
INCLUDING INTERPOLATION AND FEEDRATE CONTROL
Original Filed June 5, 1956  31 Sheets-Sheet 25

INVENTORS.
James O. McDonough
Alfred K. Susskind
Herbert P. Grossimon
By: Carlson, Pitzner, Hubbard & Wolfe
Attys.

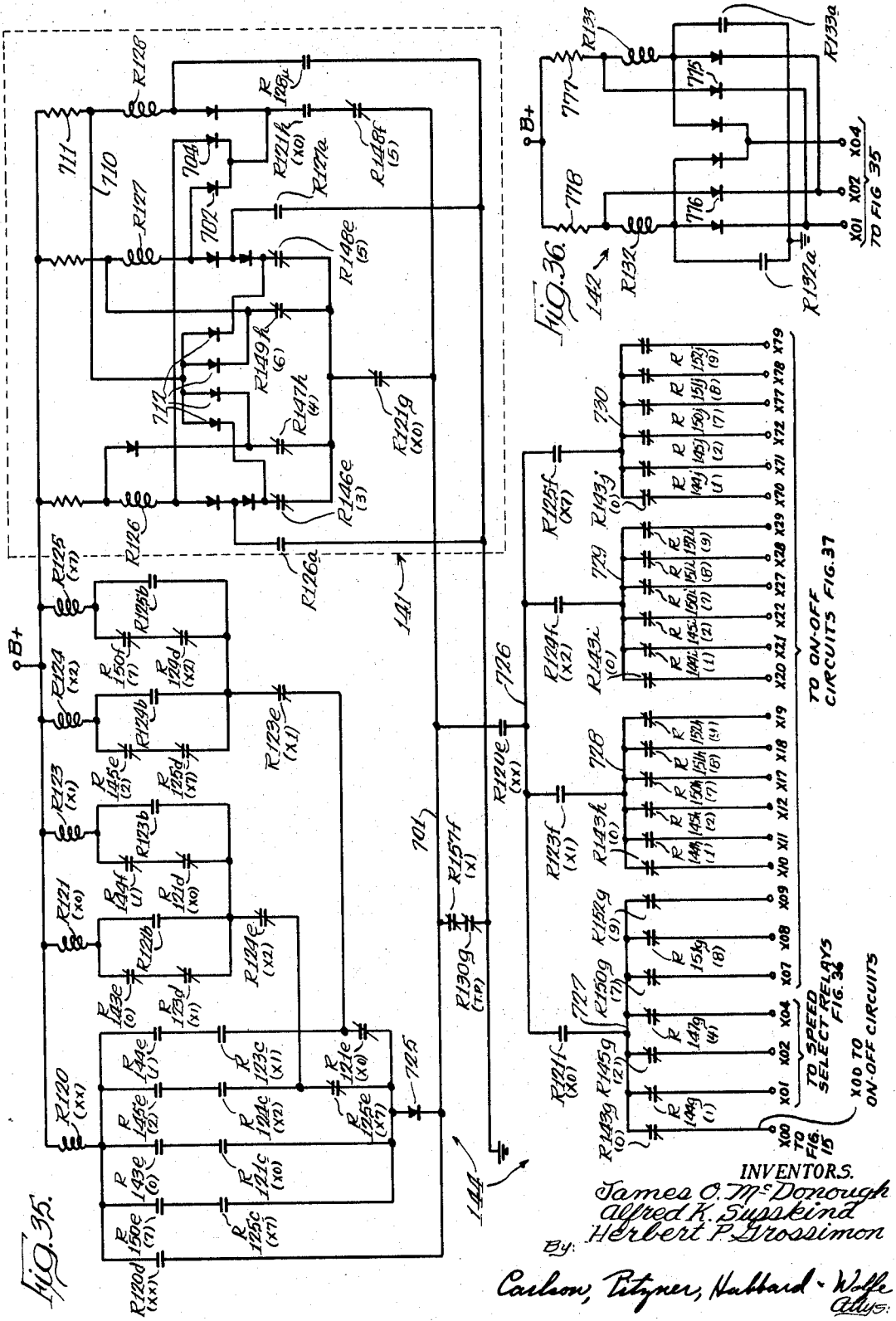

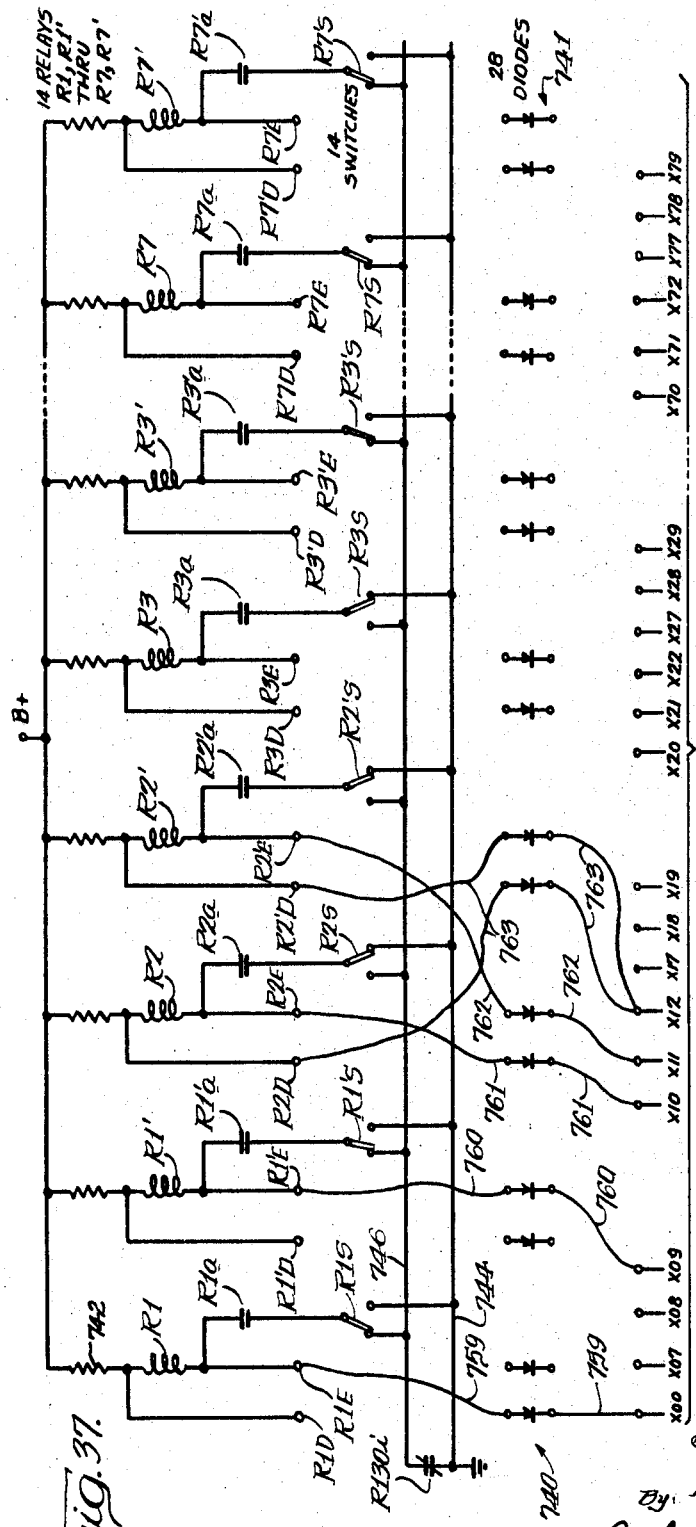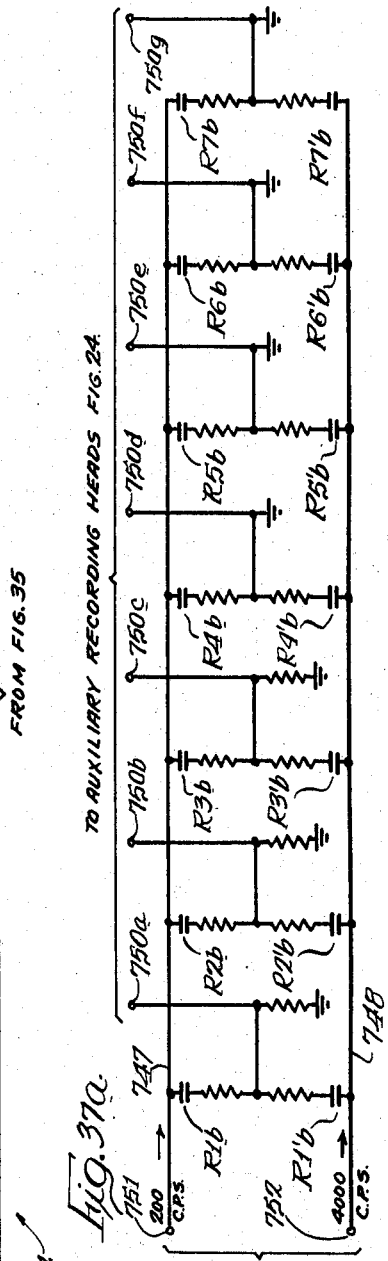

June 25, 1968     J. O. McDONOUGH ET AL     3,390,315
APPARATUS FOR NUMERICAL CONTROL OF A MULTIAXES MACHINE TOOL
INCLUDING INTERPOLATION AND FEEDRATE CONTROL INVENTORS
James O. McDonough
Alfred K. Susskind
Herbert P. Grossimon
BY:
Carlson, Pitzner, Hubbard & Wolfe
Attys.

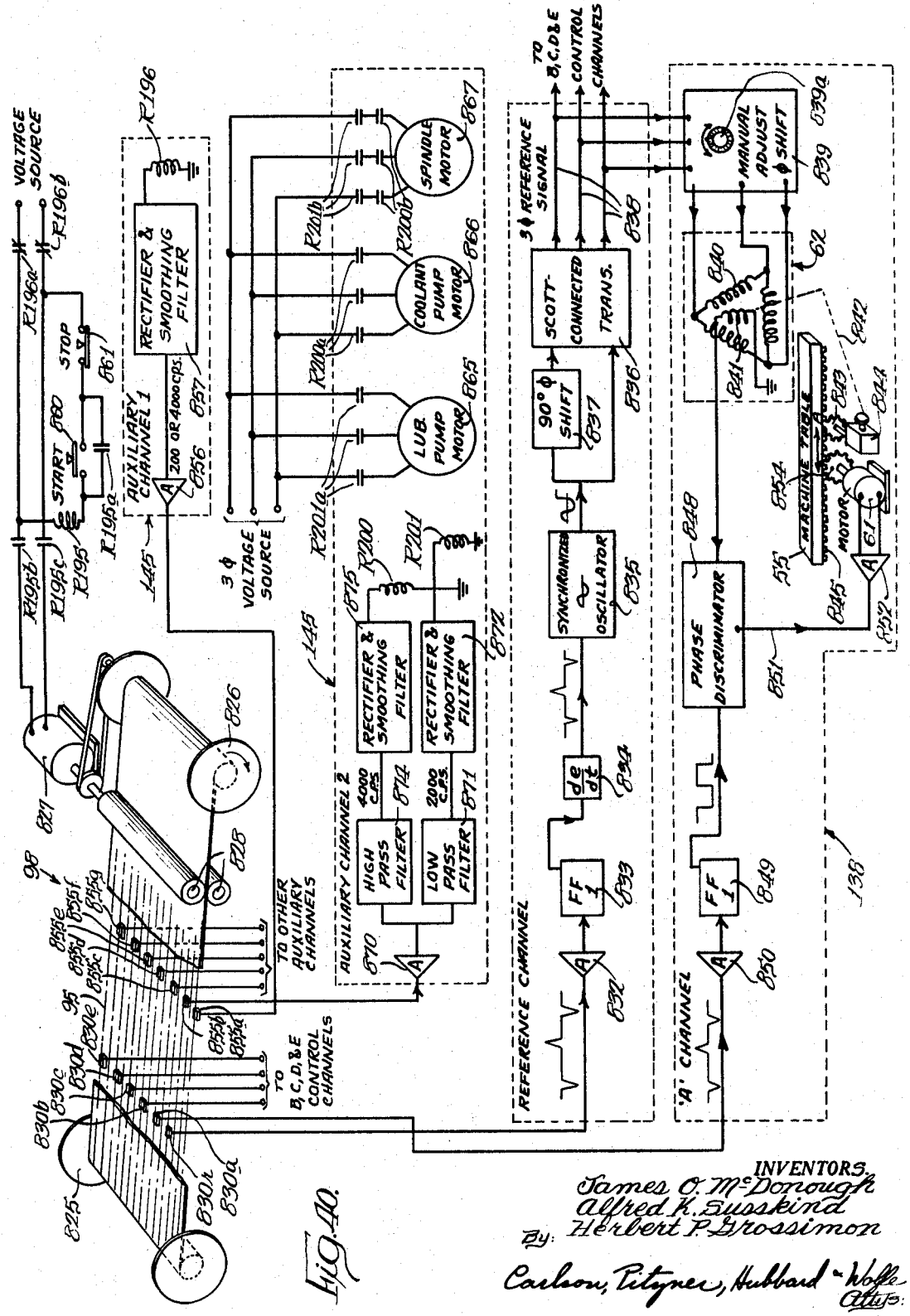

United States Patent Office 3,390,315
Patented June 25, 1968

3,390,315
APPARATUS FOR NUMERICAL CONTROL OF A MULTIAXES MACHINE TOOL INCLUDING INTERPOLATION AND FEEDRATE CONTROL
James O. McDonough and Alfred K. Susskind, Concord, and Herbert P. Grossimon, Arlington, Mass., assignors to Giddings & Lewis Inc., a corporation of Wisconsin
Continuation of application Ser. No. 589,491, June 5, 1956. This application Apr. 5, 1963, Ser. No. 271,558
146 Claims. (Cl. 318—162)

| INDEX | Column |
|---|---|
| Objects of the Invention | 1 |
| Exemplary Machine Tool | 5 |
| General Description of the Apparatus | 6 |
| Paper Tape Preparation | 8 |
| General Description of the Director | 11 |
| Punched Tape Reading and Decoding | 14 |
| Conversion to Four-Place Coded Binary Form | 15 |
| The Magnetic System | 17 |
| Principles of Operation and Example | 17 |
| Drawing Conventions | 19 |
| Magnetic System Organization | 19 |
| Pulse Distribution and Time Period Control | 21 |
| Exemplary Components | 22 |
| Decade Scaling Units | 24 |
| The Frequency Divider | 25 |
| Time Period Control | 27 |
| Summary of Frequency Divider Operation and Control | 28 |
| Interconnections and Controls | 29 |
| Decoding | 32 |
| The Master Clock | 33 |
| Reference Scaling Channel | 33 |
| The Axis Scaling Channels | 33 |
| Chronizers | 34 |
| Add-Delete Circuits | 34 |
| Summary of Operation | 35 |
| Sign Control and Reversal | 35 |
| Manual Clock and Axis Selection | 39 |
| Visual Indicators | 41 |
| Fine Indicator | 41 |
| Coarse Indicators | 46 |
| Acceleration Adjust | 48 |
| Predict Circuitry | 49 |
| Command Clock Frequency Control | 52 |
| Automatic Acceleration Adjust Means | 54 |
| P-M Operation | 54 |
| Early Predict | 58 |
| Automatic Limitation of Feed Rates (Seventh Hole Operation) | 60 |
| Simultaneous Operation in Response to Both P-M and Seventh Hole Signals | 63 |
| Special Control Functions | 65 |
| Response to an "X" in the Director | 66 |
| Machine Tool Auxiliary Functions | 67 |
| Special Functions in Director | 73 |
| (a) Director Speed Selection | 73 |
| (b) Stopping the Director | 76 |
| (c) Axis Selection | 77 |
| (c1) Information Routing | 79 |
| Utilization of Recorded Signals at the Machine Tool | 81 |
| Control of Movable Machine Tool Elements | 81 |
| Auxiliary Controls at the Machine Tool | 83 |

The present application is a continuation of applicants' copending application Ser. No. 589,491, filed June 5, 1956 (and now abandoned).

This invention relates to the control of machine tools, and more particularly to controls for machining complex shapes without the need for cams, templates, masters or the like, but directly from numerical data taken in the first instance from design drawings or specifications. In another sense, the present invention relates to improvements in machine tool control systems of the general type developed by the Servomechanisms Laboratory of Massachusetts Institute of Technology under Contract AF33 (038)-24007 with the United States Air Force Air Materiel Command and described in "Final Report on Construction and Initial Operation of a Numerically Controlled Milling Machine," Part 1 published July 30, 1952 and Part 2 published May 31, 1953, by that Laboratory.

OBJECTS OF THE INVENTION

It is the general aim of this invention to provide a method and apparatus of the foregoing type which greatly simplifies and makes more convenient the machining of complex workpieces under numerical control, and which is more flexible in its uses and applications.

As one important object, the present invention provides a simplified coding system together with apparatus for handling numerical data represented according to that coding system, permitting decimal numbers representing incremental distances of relative movement between a machine tool cutter and workpiece and corresponding assigned time periods to be typed directly into digital record preparation equipment.

Another object is to provide improved data processing equipment which accepts and stores numerical information in coded binary form and which utilizes such stored information by means of a frequency divider which scales or counts according to the same binary code rather than according to straight binary notation.

A further object is to provide in such a system for storage of numerical information in magnetic core devices arranged such that they may be repeatedly interrogated or "read" without destroying the stored information. A related object of the invention is to greatly simplify data distributing and storing means through the provision of a shifting register adapted to receive information serially and cooperating with a storage register which receives the information dumped in parallel from the shifting register, permitting the shifting register to be filled while information in the storage register is being processed.

It is still another object of the invention to digitally code numerical data and convert it into analogue signals for controlling the motion of machine tool elements in a manner that undue acceleration of those machine tool elements is automatically precluded, thus avoiding loss of control by servomechanisms and overloads on the power means for driving the machine tool elements. In another sense, it is an object of the invention to make the feed rate of a machine tool element go through a smooth, gradual transition whenever the programmed motion requires that it jump suddenly from one feed speed to another appreciably different feed speed.

Still another object is to make possible the programming of numerically controlled machining operations to take place at desired rates and within a desired time, yet to permit the programmed rates and times to be later increased or decreased. In this connection, it is another object to positively prevent an attempt to make the machine tool elements exceed their maximum rated feed speeds whenever the data processing equipment is adjusted to carry out a given program at a faster rate than that initially selected.

It is a further object to provide, in a system for converting digital numerical data into analogue signals which are subsequently used for controlling the motion of machine tool elements, the additional feature of control of auxiliary components at the machine tool, automatically turning the latter on or off or supplying momentary signals to them at selected points in the program. By way of example, it is possible through the provisions of the present invention to start or stop the different spindle motors, coolant pumps, lubricant pumps, solenoid valves or the like on the machine tool at those points in time required by the over-all programmed machining operation.

Still another object of the invention is to provide a system in which the sign or direction for each increment of movement of each machine tool element is automatically controlled from numerical indicia, but in which the sign or direction of movement for any one or any combination of the machine tool elements may be reversed so as to effect machining of a part oppositely symmetrical along one or more axes in relation to the part which was originally programmed, such selective sign reversal being accomplished by push button controls.

An important object is the provision of a visual indicator system which senses a phase shift decoder and displays numerically the position which the machine tool cutter would occupy, relative to a workpiece, if the output of the decoder were being used to directly control a machine tool. This permits random checking to make certain that the data processing is progressing accurately even though it is not possible, with the control signals being magnetically recorded, to actually observe and measure the position of the machine tool cutter.

It is still another object of the invention to provide means for artificially inserting, under manual control, distance information, either positive or negative, directly into a decoder. An ancillary object is to provide for such manual insertion of artificial distances directly into the decoder portion of the data processing equipment, without the necessity for operating the data storage and frequency divider portions of the apparatus. Also, it is an object to create an arrangement in which artificial distance information from a single source may be selectively routed to the decoder portion for any one of a plurality of axes, such selection of a particular axis also causing a single visual indicator means to display the condition of the decoder portion for the same axis into which the artificial distance information is to be inserted.

And it is still another object of the invention to provide for the simultaneous control of a large plurality of movable machine tool elements, for example, five elements all movable along what may be termed separate axes, but with means for the selection of operation along all of the axes, or along only certain ones of the axes, the length of the digital record required for data processing in the latter instance being materially reduced.

BRIEF DESCRIPTION OF THE DRAWINGS

While the invention has been illustrated in some detail according to a preferred embodiment shown in the accompanying drawings, and while the preferred illustrated embodiment will be described in some detail, there is no intention to thus limit the invention to such details. On the contrary, it is intended here to cover all modifications, alternations and equivalents falling within the spirit and scope of the appended claims.

In the drawings.

FIG. 4 is an enlarged view of the control panel for the director shown in FIG. 3;

FIG. 5 is a fragmentary perspective view of magnetic recording equipment used in conjunction with the director of FIG. 3;

FIG. 5a is a two dimensional diagram illustrating the principle employed to obtain any desired surface configuration by a plurality of successive incremental cuts;

FIG. 6 is a functional block and line diagram of the entire system of control;

FIG. 7 is a chart setting forth the seven place binary digital code upon which the record preparation equipment of FIG. 2 operates in preparing a digital record;

FIG. 8 is an exemplary tabulation of numerical data such as might be abstracted from design drawings or specifications and which numerically represents special control codes as well as the time, distance and direction of movement for two successive increments of relative motion between a cutter and a workpiece along a plurality of axes;

FIG. 9 is an illustration of a digital record which is produced from the first three lines of numerical data of FIG. 8 according to the code set forth in FIG. 7;

FIG. 10 is a diagrammatic representation of apparatus for reading the digital record and converting the information thereon into corresponding electric signals;

FIG. 11 is a circuit diagram of apparatus for converting the electric signals into a desired coded binary form;

FIG. 13 is a schematic illustration of a part of the magnetic system shown in FIGS. 12A, 12B and 12C to illustrate the operation thereof;

FIGS. 14A, 14B and 14C, when joined along the indicated junction lines, are a block and line diagram of a frequency divider, an associated time-period controlling circuit, a pulse train source, and apparatus for "predicting" the end of any given time period;

FIGS. 22A and 22B, when joined along the indicated junction line, are a block and line diagram of a multiple axis decoder and associated apparatus;

FIGS. 22C and 22D, when joined together and along the indicated lines with FIG. 22B, are a schematic diagram of a fine indicator;

FIG. 23 is a schematic diagram in part showing common control means for selecting a particular axis portion of the decoder into which artificial distance information is to be supplied, and for selecting the corresponding particular axis portion of the decoder which will have its contents displayed by the fine indicator;

FIG. 24 is a diagrammatic perspective illustration of means for recording the output signals of the director;

FIG. 25 is a block and line diagram of sign information routing circuitry and sign controlling circuitry;

FIG. 26 is a circuit diagram of the sign controlling circuitry corresponding to one axis channel shown in FIG. 25;

FIG. 27 is a circuit diagram showing part of the push button controls for effecting selective sign reversal along any combination of the several axes of control;

FIG. 28 is a schematic circuit diagram showing details of predict circuitry illustrated in block form in FIG. 12B and 12C;

FIG. 29 is a schematic diagram of control circuits for automatically preventing undue acceleration of the machine tool elements and for assuring that maximum feed speeds of the machine tool elements are not exceeded when a program is processed in a shorter time than that initially scheduled;

FIG. 30 is a schematic circuit diagram of the command clock or source of pulses supplied to the frequency divider, together with controls for smoothly varying the frequency of that source to prevent director output signals from calling for undue acceleration or excessive feed rates at the machine tool;

FIG. 35 is a schematic diagram of circuitry responsive to special codes effective to produce special functions other than the control of the transversal of machine tool elements;

FIG. 36 is a schematic diagram of director and recording speed controls;

FIGS. 37 and 37a together are a schematic circuit representation of an arrangement to produce on-off control signals for the control of auxiliary components at the machine tool;

FIG. 38 is a graphic representation of voltage wave forms appearing at correspondingly marked points in the visual indicator circuitry in FIGS. 22B and 22C.

FIG. 40 is a partially diagrammatic, partially schematic representation of means for controlling a machine tool upon playback of recorded signals.

EXEMPLARY MACHINE TOOL

Figure 1:
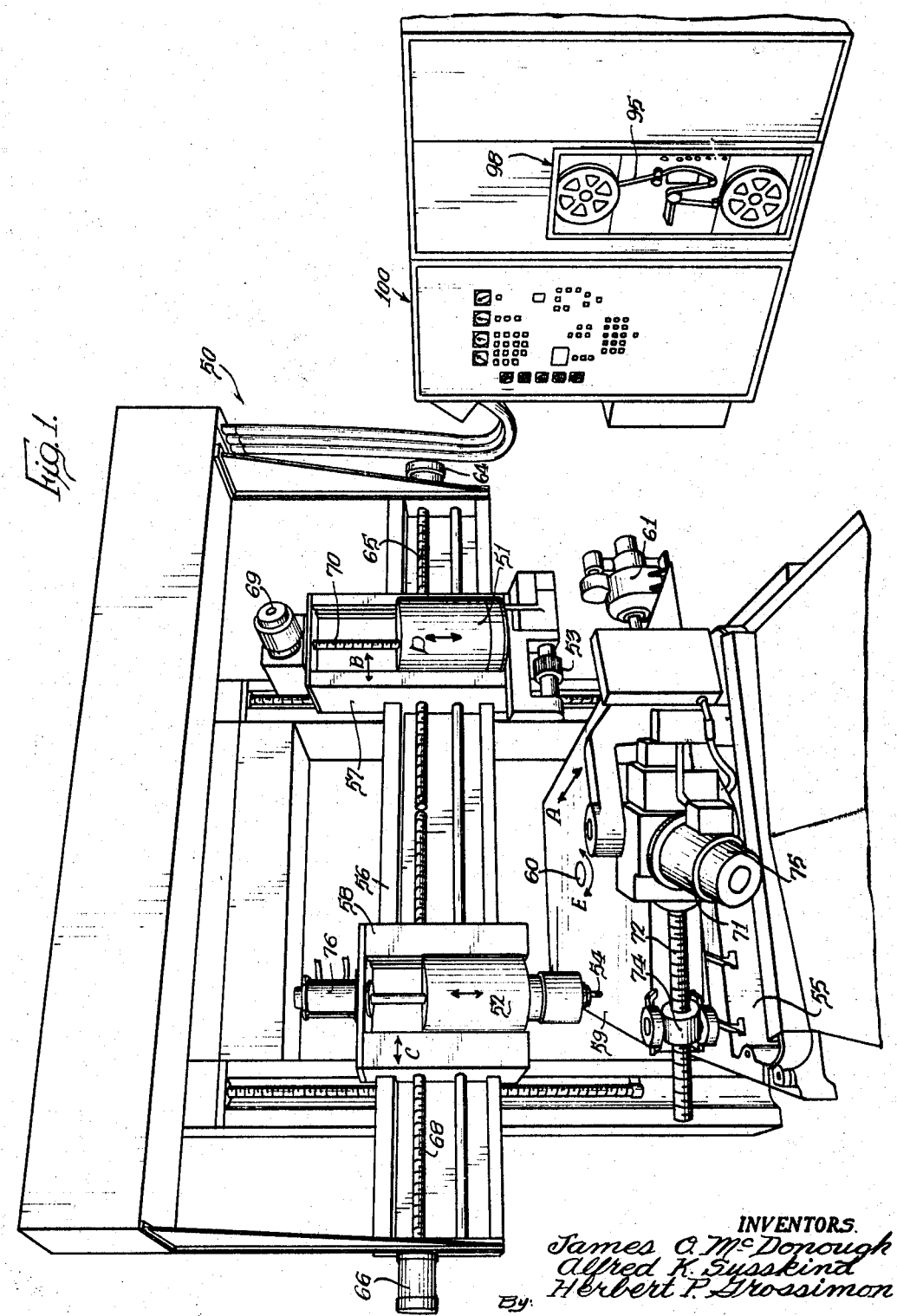
FIGURE 1 is a perspective view of an exemplary machine tool which may be controlled according to the method and apparatus of the present invention, the machine tool being illustrated adjacent to magnetic playback and control equipment.

Although the method and apparatus of the present invention may be employed with any of a variety of machine tools, that here illustrated in FIG. 1 is a planer type skin milling machine 50. The present machine has two heads 51, 52 with slef-contained motors for driving horizontal and vertical cutter tools 53 and 54, respectively. A table 55 is movable back and forth along the ways of a bed (not shown), while the heads 51 and 52 carried by saddles 57, 58 are movable horizontally along a rail 56. The head 51 is adapted for feeding movement vertically relative to saddle 57, while the head 52 may be moved vertically up and down relative to the saddle 58. A chuck 59, which may be of the vacuum type for holding a workpiece, is superimposed on the table 55 with freedom to skew relative to the latter above a pivot point 60, thereby varying the angle at which the workpiece is traversed past either cutter 53, 54 as the table 55 moves.

The machine 50 thus has five controlled motions although, in the present case, only four of those motions may be carried out simultaneously between the cutter 53 and the workpiece on the chuck 59, while three of those motions may be carried out simultaneously between the cutter 54 and the workpiece on the chuck 59.

For convenient reference, the back and forth movement of the table will be termed as motion along the A axis as labeled; this motion is effected by a suitable reversible drive motor 61 connected by gearing, which may include a rack and pinion (not shown), to the table. A gearing connection is also made from the table 55 to a feedback synchro transmitter (not shown) forming a part of a servomechanism control.

The second controlled motion may be designated as motion along the B axis and, as indicated, corresponds to the horizontal back and forth movement of the saddle 57 along the rail 56. This motion is effected by a suitable reversible drive motor 64 connected with a lead screw 65 engaged with a nut (not shown) in the saddle. A synchro transmitter (not shown) is also associated with the saddle 57.

The third controlled motion, which may be designated as along the C axis, corresponds to the horizontal back and forth movement of the saddle 58 along the rail 56. This motion is effected by a reversible drive motor 66 connected with a lead screw 68 which is in turn engaged with the nut (not shown) in the saddle 58. Here again a synchro transmitter (not shown) is associated with the saddle 58.

The fourth controlled motion may be designated as being along the D axis and corresponds to the vertical movement of the head 51 relative to the saddle 57. This latter motion is effected by a suitable reversible feed motor 69 connected with a lead screw 70 engaged with a nut (not shown) on the head 51. A synchro transmitter (not shown) is associated with the head 51.

Finally, the fifth controlled motion, which will be designated as being along the axis E, corresponds to the skewing movement of the chuck 59 about the pivot point 60. This motion is effected by a reversible drive motor 71 connected with a lead screw 72 engaged with a nut 74. The nut 74 is carried by the chuck 59, while the motor 71 is mounted on the table 55. As the screw 72 is rotated, therefore, the chuck 59 is swung about the pivot point 60. Here again, there is a feedback transmitter 75 connected by suitable gear means with the chuck 59 to indicate the angular position thereof.

All of the feed motors referred to above are preferably of the types susceptible of servo control by feedback means. They may be shunt wound D.C. motors, for example. Thus, all of the motion A through E which have been described may be controlled from instant to instant according to analogue control signals. The total movement along any given axis and the rate of movement along that axis depends simply upon the analogue signal which is applied to control the corresponding motor.

In addition to such smooth servo mechanism control of the five feed motors, the head 52 is adapted to be raised and lowered between limit positions (i.e., "plunged" into or raised clear of a workpiece) by means such as a pneumatic ram 76 mounted on the saddle 58 and having its piston rod 78 connected with the head. The ram 76 may be controlled by means such as a solenoid valve (not shown) to raise the cutter 54 clear of the work or to plunge it into the work a predetermined depth whenever it is desirable to do so. The ram 76 may thus be termed an auxiliary device which is susceptible of "on-off" control. And beyond the components which have been illustrated and described, it will be understood that the machine tool may have a variety of other auxiliary components (not shown) such as power operated clamps, lubricant pumps, coolant pumps, vacuum pumps for chip collectors, and the like. Such auxiliary components often need to be started or stopped at certain instants during the complete machining of a given workpiece. And, as will be explained below, the present invention makes possible such control of the auxiliary components automatically without any attention being required on the part of a machine tool attendant.

GENERAL DESCRIPTION OF THE APPARATUS

In carrying out numerically controlled machining operations, numerical data defining the shape of the desired workpiece is first tabulated in successive increments of relative motion between a cuttting tool and the workpiece. Each of those successive increments of movement is broken down into its components along the respective axes of control, the numerical value of each component being tabulated decimally to represent the distance or magnitude of motion and the sign of that numerical value representing the direction of motion. A time period is assigned for carrying out each incremental movement, thus determining the feed rate along each axis of control.

With such tabulated numerical data, it is possible to make a digital record which represents the successive increments of movement that are required but in a "simplified language" such as binary symbols, e.g., the presence or absence of a hole, magnetic spot, or the like. In the present instance, numerical data is placed on a digital record which takes the form of a punched paper tape 112 such as that shown in FIG. 9. To prepare this tape, it is only necessary to type the decimal numerical data on a keyboard or typewriter at a tape preparation desk 80 shown in FIG. 2. The tape preparation equipment includes a printing typewriter 81, a small auxiliary keyboard 82 which has only the keys which are used in preparing the tape, and a paper tape punching unit 84. The printing typewriter 81 and the punch unit 84 are commercially available items such for example as those sold under the trade name "Flexowriter" by the Justowriter Corporation of Rochester, N.Y. The keys on the auxiliary keyboard 82 are simply duplicates of certain ones of the keys for the typewriter 81.

As the keys on the auxiliary keyboard are successively actuated, a particular pattern of horizontal holes and blank spaces are formed in the paper tape 112 by the punch unit 84, the tape then being advanced so that another horizontal row or pattern of holes is punched in response to the actuation of the next key. The details of punched tape preparation will be treated more fully below.

Figure 3:
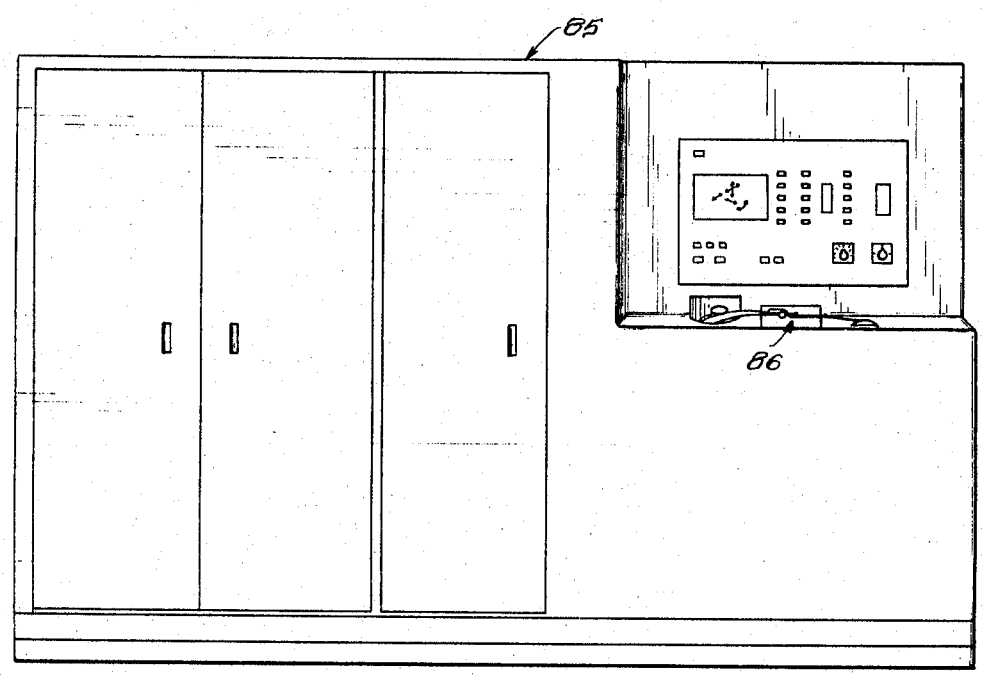
FIG. 3 is a perspective external view of data processing equipment, i.e., a "director" which accepts information from a digital record and converts it into analogue and auxiliary control signals.

With the numerical data in the form of sign, time and distance information, as well as certain auxiliary special codes which will be described, converted into a digital record such as the punched tape 112, it is in a form suitable for reading into the data processing equipment or director 85 which is pictorially shown in FIG. 3. The director reads the information contained in the punched tape and converts the information thereon into control signals modulated over time periods properly to serve as control signals for drive mechanisms such as servo-controlled motors. Since the director components contained within the cabinet and their operation will be described in some detail below, it will suffice here to note only that the director control panel (FIG. 4) includes a tape reader 86 which receives the punched tape 112 prepared at the desk 80, together with certain control instrumentalities and indicating devices. The latter include a start button 88, a stop button 89, and a plurality of push buttons $90a$–$90e$ which are selectively actuated to effect sign reversal of control along any one or any combination of the axes of control. There are also five switches $91a$–$91e$ which may be selectively actuated to cause artificial distance information to be manually inserted into a particular axis portion of the decoder as will be explained more fully below. The insertion of artificial distance information is made by rotating a selector knob 92 (for a "manual clock") in either direction from a central position, thus causing the artificial distance information to be in a positive or negative sense. In addition, the particular one of the switches $91a$–$91e$ actuated selects the particular axis of control which will have its distance indicated by fine indicator display lights 93. There are five coarse indicator dials $94a$–$94e$ which indicate to the nearest inch the distance which has been processed into the control signal for motion along the respective five axes of control.

For control of the director's "time dimension" a rotatably adjustable knob 619 is provided to adjust the "clock." By setting this knob, a machining operation programmed to take place in a certain total time and with certain feed rates, may be caused to actually take place in a shorter or longer total time and with correspondingly modified feed rates.

It will suffice at this point to state simply that the director 85 accepts information from a digital record or punched tape and converts that information into control signals modulated over time periods and special auxiliary function control signals. Those signals are in a form such that they may advantageously be recorded on a magnetic tape 95 by magnetic recording apparatus 96 such as pictorally shown in FIG. 5. This magnetic recording apparatus may be of conventional commercial form, including means for driving the tape past recording heads at any one of several possible speeds. It may, for example, include thirteen recording heads to record signals in adjacent longitudinal tracks spaced transversely across the width of the magnetic tape.

Once the modulated control signals and auxiliary function control signals have been recorded on the magnetic tape 95 the latter may be transported to the site of the machine tool 50, the recorded modulated and auxiliary signals being reproduced by magnetic playback equipment 98 associated with control apparatus 100 which takes those reproduced signals and causes them to correspondingly control the five respective drive motors and the auxiliary components so that the operation initially programmed and put in binary form on the digital record is actually carried out by the machine tool elements.

Important is the fact that curved surfaces may be approximated to the precision or tolerance which is desired by carrying out the decimal numbers in the first instance to the requisite number of places and by taking short, successive cutting increments. The director as will be described here accepts decimal information accurate to the nearest half-thousandths of an inch; and the resulting motions of the machine tool elements are correspondingly accurate.

PAPER TAPE PREPARATION

Before proceeding with a description of how a digital record such as a punched paper tape is prepared from numerical data, it will be helpful to understand one method of machining complex, curved surfaces by approximation through a series of straight-line incremental cuts. Referring to FIG. 5a, a concave curved surface 105 is to be machined by a rotating milling cutter 106 in the center of which, in the ideal case, should traverse a curved path 108 which is parallel to the desired surface 105 and spaced therefrom by a distance equal to the cutter radius. Since it would be difficult to make the cutter center exactly follow the ideal curve 108, that path may be approximated to the desired accuracy by making the center of the cutter traverse a series of small, straight-line increments which constitute chords of successive arcs of the curve. By choosing those increments to be very small, the desired precision of machining will be obtained, the error between the desired surface 105 and the surface actually machined amounting to the distance $e$ between the resulting chords of the desired arc and the arc itself.

Therefore, in numerically controlling the motion of the cutter 106 to produce the curved surface 105 to a desired degree of accuracy, a plurality of cutter center points 109 are selected along the curved path 108 and straight-line increments $I_1$, $I_2$, $I_3$, drawn to connect those points. Now, with the present system, it is possible to make the path of the cutter center accurately follow successively the increments $I_1$, $I_2$, and $I_3$. To do this, each increment is broken down into its components along a selected set of coordinates. In the illustration of FIG. 5a, X and Z axes are established, as shown, and the increment $I_1$ broken down into the orthogonal components $X_{c1}$ and $Z_{c1}$. Similarly, the incremental distance $I_2$ is broken down into its components $X_{c2}$ and $Z_{c2}$, while the increment $I_3$ is broken into the components $X_{c3}$ and $Z_{c3}$. A time period is assigned for carrying out each of the machining increments, the time period selected and the distance covered by each increment determining the feed rate of the cutter relative to the workpiece.

The information thus established is tabulated in numerical or decimal form. For the increment $I_1$, the assigned time period in seconds is tabulated; the direction or sign of the cutter motion along the X axis for the component $X_{c1}$ is tabulated followed by the numerical distance in inches to be included in the component $X_{c1}$. Also, the direction and distance for the component $Z_{c1}$ are tabulated. In a similar manner, the time for each of the additional increments $I_2$, $I_3$, as well as the signs and distances for each of the components of motion of those increments are numerically tabulated. As explained further below, this numerical information is used to make the cutter center follow along the incremental lines $I_1$, $I_2$, $I_3$, by virtue of the fact that the cutter center traverses the assigned distances for the X and Z components in the same time period and at a substantially constant rate so that the resultant motion must be along the incremental lines.

The foregoing explanation is a simplified one illustrating the manner in which a curve surface lying in one plane may be approximated and machined by abstracting numerical sign, time and distance information. However, it will be apparent to those skilled in the art that more complex three-dimensional surfaces may likewise be translated into numerical terms of successive incremental cuts by selecting the components of movement along each of a plurality of axes of control which are to be accomplished within respective assigned time periods to produce the desired resultant increment of movement. Often five controlled motions or "axes" may be used to advantage. Such calculations and tabulations of numerical data, called "programming" may be made for almost any conceivable shape of workpiece and it will not be necessary here to describe these calculations in detail. Much of this work can be done on calculating or computing machines. Some of the methods which may be employed are more fully described in Part 2 of the M.I.T. "Final Report" mentioned above in the second paragraph of this specification.

FIGURE 8 illustrates the form in which decimal numerical data may be tabulated for five axes of control, following the general principles described above in connection with FIG. 5a. As shown in FIG. 8, the first two lines reading "x05" and "x04" are for special functions which will be more fully described below. In the third line of the tabulated data, the number "001" in the first column corresponds to the time of one second assigned for a given increment. Then the numbers spaced successively to the right, and preceded by signs, designate the direction and distance of the component movements along the five respective axes A–E. As shown, there is to be a component of movement along the A axis in a positive direction for a distance of 1.2345 inches, a component of movement along the B axis in a negative direction for a distance of .2345 inch, a component of movement along the C axis in a positive direction for a distance of .0345 inch, a component of movement along the D axis in a positive direction (the letter P signifying positive direction and in addition designating special control of acceleration) for a distance of .0045 inch, and a component of movement along the E axis in a negative or minus direction (the letter M signifying a negative direction and in addition special control of acceleration) for a distance of .0005 inch. In like manner, the fourth line of the tabular data in FIG. 8 indicates that an incremental cut is to be made in 10 seconds, the directions and distances for the components along the respective axes being set forth in the succeeding spaces to the right as explained above. Finally, the last line reading "x00" represents a special code which is read by the director circuits to cause it to terminate its operation.

Figure 2:
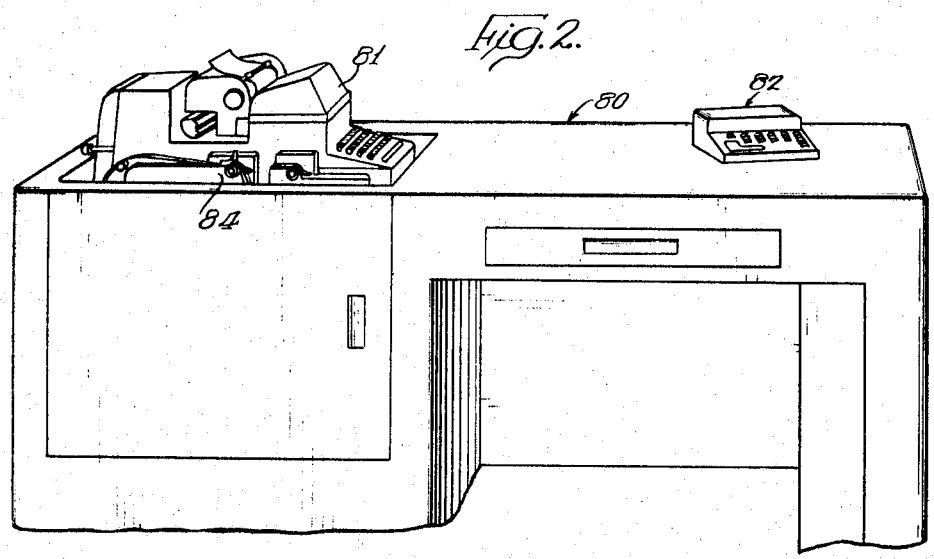
FIG. 2 is a perspective view of a desk and associated apparatus for preparing a digital record such as a punched paper tape.

In preparing the punched paper tape shown by FIG. 9, the tabulated data in FIG. 8 is typed on the keyboard 82 (FIG. 2). It is typed in the conventional way. For example, a typist begins by typing "x05," then pushing a carriage return key, then typing "x04," then pushing a carriage return key, then typing "_ _ 1" for time information, then depressing the "tab" key to tabulate over to the A axis column where the symbols +_ _ 12345 are typed. This is followed by depression of the "tab" key after which the symbols and numbers appearing in the B axis column are typed, and so forth. At the end of the line for the one second increment, the carriage return key is depressed and the next line is typed in the same fashion. Zeroes may be typed as spaces since they are read in substantially the same manner by the tape reading apparatus although the space symbol and the "0" have a different code in the punched tape. The foregoing example of how the numerical data is typed on the keyboard 82 in FIG. 2 will become clear by reading down the indicia appearing at the right side of the punched tape in FIG. 9. Those indicia represent the keys that are successively pressed on the keyboard in order to type in the first three lines appearing in FIG. 8.

The tape preparation equipment shown in FIG. 2 operates on a predetermined, arbitrary code to punch differently patterned transverse rows of holes and spaces in succession along the length of the paper tape. The code is shown in FIG. 7 where it will be seen that paper tape is divided into seven longitudinal columns numbered in the manner shown. If a "0" is typed on the keyboard, then holes are automatically punched in columns 1 through 5, leaving blank spaces in columns 6 and 7. Similarly, if a "9" is typed on the keyboard, holes are punched in columns 1, 2, 4 and 5 of the paper tape, leaving blank spaces in columns 3, 6 and 7. Some special characters and codes are employed, as shown by FIG. 7. A space is designated by a hole only in column 3 although, as will appear, this is read as far as numerical data is concerned, in the same manner as a "0." There is also an "x" key which will produce the coded pattern of holes shown by FIG. 7; this code is used to designate that the following digits until the next carriage return signal appears are a special code intended to effect some special function. It will also be seen that the sign or direction symbols + and − may be directly typed by depressing keys on the keyboard and that these have their own special code of holes. The symbols P and M may also be typed directly on the keyboard, these corresponding to + and −, respectively, but additionally designating that some special provision must be made within the director to prevent excessive acceleration of machine tool components. In practice, when the combination of time and distance along one axis for successive increments will require a change of more than about 20% in the feed rate along that axis, the symbols P or M are used. Finally, the tabulate (tab) and carriage return (CR) keys also produce a special code of punched holes in the paper tape. And, as indicated at the bottom of FIG. 7, a hole in the seventh column of the paper tape will be punched whenever a certain condition occurs, namely, whenever the programmed time period is less than five seconds or whenever the feed rate along one axis of control exceeds a predetermined value. The purpose of this seventh hole signal in the punched tape will become apparent as the following description progresses.

With the understanding of the digital code for the punched tape preparation equipment, it will be apparent that when the data represented by the first three lines in FIG. 8 is typed on the keyboard, a length of paper tape 112 will be produced which is perforated as shown in FIG. 9. As each transverse row of coded holes is punched, a sprocket hole is punched between columns 2 and 3, so that there is a longitudinal column of sprocket holes 113 for feeding the tape upon reading. The numerical information is typed from the tabulation of FIG. 8 as it would be typed on an ordinary typewriter, and the successive digits appear as serially spaced transverse rows of hole patterns along the tape 112. It will be seen that the first three lines at the top of the tape 112 correspond to the special code "x05". These are followed by the code for "CR," which is then followed in the next three lines by holes representing the special code "x04." This is followed by a carriage return code. The remainder of the tape corresponds to the horizontal line in FIG. 8 for the increment which is to be machined in one second. This much of the tape, i.e., for one increment of movement, is termed "one block." The first three lines of the block represent the time, in this illustration one second, being symbolized by codes reading "001." The next line is a "tab" code followed by a line representing the + code which includes the seventh hole (the latter resulting from the fact that the time period assigned is less than five seconds). Then follow successively lines representing the component of distance to be traversed along the A axis. These are serially spaced digits in coded binary form and may be termed the "A axis distance group." This group is followed by a "tab" code, which is followed by B axis group including a "−" code and seven lines constituting decimal digit codes for the distance. The remaining axis signs and distances appearing in the tape correspond to the signs and distances for the C, D and E axes as they appear numerically in the third line of FIG. 3.

In summary, therefore, numerical data which is abstracted directly from design drawings or specifications is translated into a digital record such as the punched tape 112, that digital record being in the form of serially spaced coded binary digits with each line of the record corresponding to one decimal digit or one symbol and certain groups of those serially spaced digits constituting distance information while others constitute sign and time information. A plurality of the serially spaced groups represent the time, sign and distance information for one incremental cut, corresponding to "one block" in the digital record. It will be understood that for a lengthy machining operation, there will be a relatively great number of successive incremental cuts each represented by a block which serially follows the preceding block lengthwise on the digital record.

GENERAL DESCRIPTION OF THE DIRECTOR

The method of information handling and the components for such information handling may best be summarized by functional reference to the "flow chart" type of block diagram in FIG. 6.

Initially, the punched paper tape or digital record 112 is put through a reader 120 associated with a decoding matrix 121. The reader senses the successive lines in each block of the tape sequentially and causes a corresponding one of different electrical components, such as relays, to be sequentially actuated. Each relay corresponds to one of the possible codes on the punched record.

The responses of the decoding matrix 121 which represent time, sign and distance information are supplied to a binary coding matrix 122 which converts them into a four-place binary code, specifically a 5211 code which will be more fully explained below. The four output lines carrying electrical signals from the coding matrix 122 pass through axis-select means 124 (to route information flow differently according to whether the programmed operation is in 3 out of 5 or 5 out of 5 axes) to a magnetic system 125.

As generally indicated in FIG. 6, the magnetic system has four levels corresponding to the four places in the 5211 code. It includes a four-place shifting register which serially receives information corresponding to one block of the punched tape, and a four-place storage register into which information is dumped in parallel from the shifting register. Also indicated in FIG. 6, the magnetic system 125 is divided into time and axis portions, each axis portion receiving sign and distance information for a corresponding one of the five axes of control.

The magnetic system is organized to permit repeated non-destructive interrogation of the stored information, and it stores the information corresponding to one block of the punched tape 112 until all that information has been processed. Then, the storage register is cleared. During the interval or time period that interrogation of the magnetically stored information is taking place, information corresponding to the succeeding block of the punched paper tape may be shifted into the four-place shifting register.

Time information placed in the magnetic system is read out to a time selection means 126 which controls the input of a pulse train from a pulse oscillator or command clock 128 to a frequency divider 129. The frequency divider has two main functions. First, it operates as a counter supplying a transfer pulse on the line 130 whenever a predetermined number of pulses, depending upon the setting of the time selection means 126, have been received. With the command clock 128 operating at a given frequency, therefore, the transfer pulse occurs after a predetermined time period from the instant that the pulse train begins. In this manner, the programmed time periods are created in absolute time within the director.

Secondly, the frequency divider generates a plurality of chains of pulses each of which is of different frequency and in which each pulse for all the chains is spaced in time from the others. These chains of pulses are supplied as interrogation pulses to the magnetic system 125 which thus yields a string of "command" output pulses for each axis which are numerically related in predetermined fashion to the stored distance information for that axis and which are spaced substantially uniformly over the assigned time period.

The command pulse strings for the five respective axes pass through sign and distance routing circuitry 131 to a decoder 132, the sign information in the form of electrical signals being routed through a sign reversal means 133 optionally set from the control panel to permit the reversal from programmed directions of movement along any of the five axes.

The decoder 132 is essentially a device for converting the command pulses for each axis, which as previously mentioned, are simply strings of pulses spaced over assigned time intervals but related in number to the programmed distance information for that axis, into "quantized analogue" signals having modulated variations with time so as to be capable of controlling drive systems. The command pulses are digital representations of distance in that they are repetitive signals susceptible of being counted. The control signals produced by the decoder are "quantized analogue" representations in that they are susceptible of being measured. The term "quantized analogue signals," hereafter referred to simply as analogue signals, denotes that there is not an infinite number of possible values, but that variations or modulations are in such small, frequent steps or quanta that the signals are substantially smooth variations with time. In the present arrangement, the analogue signals are measurable (and controls may follow them) to the nearest quantum within one of a number of repeating cyclical variations, the sum of which may constitute any desired total variation.

The decoder 132 receives master pulses from a master clock or oscillator 134, splitting those master pulses into six substantially identical streams of pulses. One of these is a reference stream, and the others are for the five respective axes of control. Means within the decoder act to add or delete a pulse from each of the axis streams for each command pulse that appears from the magnetic system. The six pulse streams thus modified are frequency divided so that they become cyclically recurring control signals phase modulated relative to the reference signal. These cyclically recurring, phase-modulated analogue control signals are supplied to the magnetic tape recorder 96 which permanently impresses them on a record device such as magnetic tape. This magnetic tape may be stored, shipped, and reproduced in quantity and it is ultimately used for the direct control of the machine tool.

At the machine tool, the magnetic tape is placed in the magnetic playback apparatus 98 which reproduces the cyclically recurring reference and phase signals. These are supplied to a corresponding plurality of machine tool servo controls 138 controlling the movable elements of the machine tool 139 so that they move the distances originally programmed, in the directions originally programmed and within the time periods originally assigned and programmed for each increment of movement.

The above is a brief summary of the manner in which data is processed to control the motions of machine tool elements. However, certain ancillary controls are also simultaneously accomplished. For instance, there is provided acceleration adjust means 140 which receive an actuating signal whenever a P or M code is read out from the magnetic system 125. The acceleration adjust circuitry 140 operates to cause the director to take more time than originally programmed, and to modify the output signals so that the feed rates are less than dictated by the original program.

In addition, whenever a seventh hole is sensed by the tape reader 120, the decoding matrix supplies a special seventh hole signal to the acceleration adjust means 140 which so controls the command clock 128 that the feed speed which will ultimately be produced at the machine tool cannot exceed the values for which the machine tool is rated.

Whenever an "x" code is read from the punched tape by the reader 120 the decoding matrix 121 operates to isolate the "x" signal and the following numerical digits accompanying the "x" signal from the coding matrix 122, and to supply them to special control components. If an "x" code for axis selection is read, certain signals will be supplied to axis-select controls 141 which will in turn modify the conditions of the axis-select means 124 and the axis sign and distance routing means 131 so that subsequent signals are fed to the proper points in the magnetic system 125 and in the decoder 132. This operation of axis-select means will be more fully described below.

Also, it is possible by coding a special signal into the paper tape to control the speed at which the director operates. This permits the time required for processing a given program in the director to be made different from the time required for carrying out the program machine operation at the machine tool. It makes certain that the punched tape reader 120 will have adequate time to sense an entire block of information even though program time intervals for each increment are relatively short, e.g., in the order of ½, 1 or 2 seconds. When such special codes for changing the director speed are received, signals are supplied from the decoding matrix 121 to the director speed-select means 142 which supplies signals to the points marked Ⓐ, changing the frequency of the command clock 128, frequency of the master clock 134, and the speed of the magnetic tape drive in the magnetic recorder 95.

Special codes from the digital record or punched tape 112 which are for on-off controls of auxiliary components at the machine tool are supplied from the decoding matrix 121 to an auxiliary on-off functions network 144 which converts them into appropriate control signals supplied directly to the recorder 95 where they are impressed on the magnetic tape. On play-back, these reproduced on-off control signals are passed through filters and controls 145 to the corresponding devices at the machine tool 139 to energize and de-energize those devices at appropriate points in a given programmed operation.

Finally, the system diagrammatically illustrated in FIG. 6 includes means for manually or artificially inserting distance information into the decoder 132. For this purpose, a source of artificial command pulses, i.e., a manual clock 146 is provided which feeds pulses into the decoder 132. An axis selection network 148, selectively conditioned from the control panel, routes these artificial command pulses to the desired axis portion of the decoder. A similar axis selection means 150, also conditioned from the control panel connects a fine indicator 151 with the same axis portion of the decoder as that into which the manual clock 146 works. Thus, whenever the manual clock is used, the artificial distances inserted into the decoder may be observed on the fine indicator. The decoder also feeds signals to coarse indicators 152, there being one for each axis of control, which indicate higher order distances which have been processed by the decoder axis portions and which will be produced upon play-back of the analogue control signals produced by the decoder.

To coordinate the operation of the punched tape reader 120, the operation of the magnetic system 125, and the operation of the frequency divider 129, numerous control circuits are employed. These are diagrammatically indicated at 154 in FIG. 6 and also by the "restore," "clear," and "dump" lines leading to the magnetic system. The details and functions of the various control circuits will become clear as the following description proceeds.

PUNCHED TAPE READING AND DECODING

The punched tape reader 120 and decoding matrix 121 are diagrammatically illustrated in detail by FIG. 10. The reading mechanism includes drive means such as a sprocket 155 engaged with the sprocket holes 113 for advancing the paper tape 112 one step at a time past a plurality of feeler pins F1–F7 aligned with the seven corresponding columns in the tape. The sprocket 155 is intermittently driven or stepped by a suitable intermittent drive 156 powered from a continuously running motor 158 working through an electromagnetic clutch 159 engaged when a coil 160 is energized. The motor 158 also drives, through the clutch 159, a cam bank 161 having a main cam C5 adapted to briefly lift the feeler pins after the sprocket 155 has advanced the tape 112 a distance corresponding to one transverse line. If a hole is present in the corresponding column of the paper tape, the pin for that column will thus be deflected upwardly and will close the corresponding one of seven mechanically associated feeler switches FS1–FS7. The first six of these switches are of the single-pole, double-throw type, as shown. With the clutch coil 160 energized in a manner to be explained below, the punched tape 112 will be advanced successively to read the lines in one block. At the end of each block when a carriage return code CR is read, the clutch 60 will be temporarily de-energized, as will be more fully explained.

The switches FS1–FS6 work into a diode matrix 162 which has twelve input lines for the six feeler switches and eighteen output lines at the bottom. As shown, these output lines lead through current limiting resistors and thence through coils of eighteen respective relays R153–R161 to a ground point. All of these relays are normally energized from a line 164 connected to the positive voltage source through a normally closed cam switch CS1 controlled by a cam C1 in the cam bank 161. The timed operation of the tape reader 120 is such that immediately after the cam C5 has lifted those ones of the feeler pins F1 through F6 which are disposed opposite holes in the punched tapes 112, the cam switch CS1 is momentarily opened. When this happens, the one particular relay R143–R161 which corresponds to the symbol or digit represented by the coded transverse row of holes will be de-energized. It is not believed necessary to discuss in detail the operation of the diode matrix, but will be apparent from the arrangement of the diodes as illustrated that this will be the result of the feeler pins sensing any one of the eighteen possible codes. As indicated adjacent the relay coils, the relays R143–R152 correspond to the decimal digits 0 through 9, while the relays R153–R161 correspond to the codes for +, −, P, M, x Tab, CR and SP.

A cam switch CS2, controlled by the cam C2, is momentarily closed along with the cam switch CS1, but remains closed for a longer time interval. Thus, whenever one of the relays R143–R161 is momentarily de-energized, its coil is shunted by the cam switch CS2 and its own normally closed contacts R143a–R161a. That relay is thus held de-energized until the cam switch CS2 is again opened. In this manner, the duration of de-energization of one of the relays is made to exceed the interval during which the feeler pins F1–F7 are lifted, so that the functions of the relays will be carried out with reliability.

It will be seen that the contacts R153a–R161a lead directly from the bottom of the associated current limiting resistors through the cam switch CS2 to ground. It will also be apparent that the other normally closed relay contacts R143a–R152a also will under most circumstances create a conduction path through other relay contacts and the cam switch CS2 to ground. For example, the contacts R151a and R152a lead through normally closed relay contacts R120a to the cam switch CS2; while the contacts R146a–R150a lead through normally open contacts R157b (which are actually normally closed since the relay R157 is normally energized) to the cam switch CS2. Likewise, the contacts R143a–R145a connect respectively through normally closed contacts R122a, R123a and R124a, as well as the normally closed contacts 120a to the cam switch CS2.

From the foregoing, it will be apparent that the tape reader 120 steps the punched tape one line at a time past the feeler pins F1–F7, each of the latter being deflected by the cam C5 upwardly if there is a hole in the corresponding column of the tape. This momentary actuation of the double-throw feeler switches FS1–FS6 in a combination depending upon the pattern in a given transverse row of holes will result in the de-energization of one of the relays R143a–R161a which cooresponds to the code read. The de-energization occurs the instant that the cam switch CS1 opens and is maintained until the cam switch CS2 opens. The sprocket 155 then advances the tape 112 a distance corresponding to one transverse line and the process repeats. The clutch coil 160, as will be explained below, is de-energized to temporarily stop the tape reader 120 whenever a carriage return code CR is read and the corresponding relay R160 momentarily de-energized.

The several relay contacts shown at the very bottom of FIG. 10 are for the purpose of creating a "time stretch" or seal-out of certain relays whenever special codes beginning with "x" are read. The operation and organization of these relay contacts will be described in more detail at a later point.

In summary, the tape reader 120 and decoding matrix 121 simply convert the coded binary indicia of the successive lines of a punched digital record into a strictly decimal or absolute form. In other words, if the decimal digit "5" appeared in the manuscript shown by FIG. 8 and was punched on the keyboard in FIG. 2 to produce a line of coded holes and spaces representing the number "5," then upon reading the tape the relay R148 which is assigned to the decimal number "5" will be momentarily de-energized. The same applies to the remaining relays which are assigned the decimal digits and special symbols shown adjacent the relay coils in FIG. 10.

CONVERSION TO FOUR-PLACE CODED BINARY FORM

The numerical information which abstractly defines the magnitudes of distances and the time periods is represented in multiple-place binary code form within the director. Each digit (0 through 9) for succeeding orders of a multiple digit decimal number may be thus represented by the presence or absence of a binary symbol (e.g. by "1" or "0") in four places. By providing a four-place binary code digit for each order of a plural digit decimal number, any of a great range of decimal numbers may be represented by bi-state devices.

The use of a binary code makes representation of decimal numbers (as well as symbols such as +, −, P, or M), by bi-state devices and signals having one value or another possible, the necessary electrical components being relatively simple and reliable. But more important, it simplifies the arrangement of infomation on the digital record device, for one transverse line can be made to represent one decimal digit value, and a group of successive lines made to represent a multiple digit decimal number. Direct "typing in" of decimal numbers at the tape preparation desk thus is possible because all decimal digits, in a suitable digital code, appear serially spaced on the record. And with that, serial read-in to one end of a shifting register becomes a most convenient way of putting information into the director.

At the outset, it will be helpful here to tabulate the particular binary code which is used in the present apparatus. The code used in the present instance is shown in the table below:

| Decimal Digit or Symbol | 5 | 2 | 1A | 1B |
|---|---|---|---|---|
| 0 and SP | 0 | 0 | 0 | 0 |
| 1 | 0 | 0 | 0 | 1 |
| 2 and − | 0 | 1 | 0 | 0 |
| 3 | 0 | 1 | 0 | 1 |
| 4 | 0 | 1 | 1 | 1 |
| 5 | 1 | 0 | 0 | 0 |
| 6 and P | 1 | 0 | 1 | 0 |
| 7 and M | 1 | 0 | 1 | 1 |
| 8 | 1 | 1 | 0 | 1 |
| 9 | 1 | 1 | 1 | 1 |
| + and ½ sec | 0 | 0 | 1 | 0 |

This is a four-place binary code in which the presence or absence of the given signal or symbol in each of the four places may be used to designate one decimal digit or symbol. For example, with the assigned values for the four places being 5, 2, 1 and 1, it is possible to represent the decimal number "6" by the presence of a binary "1" in the "5" column and in one of the "1" columns.

This code is matched to the code upon which decade scaling units in the frequency divider operate, so that a decimal number stored in coded binary form may be converted easily into a string of pulses proportional in quantity to such decimal number, as will be explained.

To convert response of the decoding matrix 121 (FIG. 10) into corresponding electric signals in binary code form according to the table above, a coding matrix 122 such as that shown in FIG. 11 may be employed. This matrix has four output lines which are assigned the binary code values 5, 2, 1A and 1B (the A and B characters distinguishing the two "1" places) and which are connected by unidirectionally conductive devices or diodes as shown with normally closed contacts R143d–R151d, R153d–R156d controlled by the relays appearing in FIG. 10. These contacts lead from a ground point through a cam switch CS3 controlled by a cam C3 in the cam bank 16 (FIG. 10), and through normally open contacts R157g (which are usually closed) controlled by the "x" code relay R157.

Now it will be assumed that ground potential on one of the output lines of the coding matrix 122 corresponds to the binary symbol "0" and that whenever one of those lines is isolated from ground, the binary symbol "1" is electrically represented. With the foregoing in mind, it will be seen that if the relay R143 is momentarily de-energized so that its contacts R143d are momentarily closed in FIG. 11, all four of the output lines will have a conductive path from ground (to a negative voltage source) and thus will electrically represent the binary code 0000. Similarly, if the "3" relay R146 is momentarily de-energized so that its contacts R146d in FIG. 11 are momentarily closed (the other relay contacts being open due to energization of their corresponding coils) then a conduction path from ground will be established when the cam switch CS3 is momentarily closed to the "5" and "1A" output lines, leaving the "2" and "1B" output lines ungrounded. The ungrounded condition of these latter two lines symbolizes that they are in the binary "1" state and thus the binary code for the decimal number "3" is electrically represented according to the above table.

In a similar manner, it will be apparent how the momentary de-energization of the relays R143–R156 in FIG. 10 will result in a corresponding electrical representation of the four-place binary code corresponding thereto to FIG. 11. The cam switch CS3 is phased to close shortly after the cam switch CS1 closes but before the cam switch CS2 opens to restore all of the relays in FIG. 10 to their normally energized condition. Contacts for the relay R152, corresponding to the decimal digit "9," need not appear in the coding matrix of FIG. 11 since when that relay is momentarily de-energized, all of the contacts in the coding matrix 122 will be open, resulting in a lack of conduction from ground to any of the four output lines. This represents the binary code 1111 which, as noted above, corresponds to the decimal digit "9."

It may be observed at this point, that whenever a special code preceded by the symbol "x" is read, the relay R157 will be de-energized, causing the contacts R157g to open and thus preventing any operation of the relay contacts in the coding matrix 122 from creating any output signals on the four output lines. In this manner, special "x" code information is diverted from the coding matrix and the subsequent time, sign and distance handling components.

As shown immediately below the coding matrix 122, axis-select circuitry 124 includes a plurality of contacts for a relay R128. It will suffice at this point to mention only that in 5 out of 5 axis operation, the relay R128 is energized, while it is de-energized in 3 out of 5 axis operation. Accordingly, ground potentials appearing on the output lines of the coding matrix 122 will be passed through normally open contacts R128a, c, e and g in the select circuitry 124 to the 5 out of 5 output lines if the relay R128 is energized, while they will be passed through normally closed relay contacts R128b, d, f and h to an alternative set of output terminals whenever operation is to be in 3 out of 5 axis control. The normally closed relay contacts R128i will supply ground potential momentarily to all four of the 5 out of 5 output terminals whenever the binary coded information is being passed over the 3 out of 5 axis terminals.

Figure 12A:
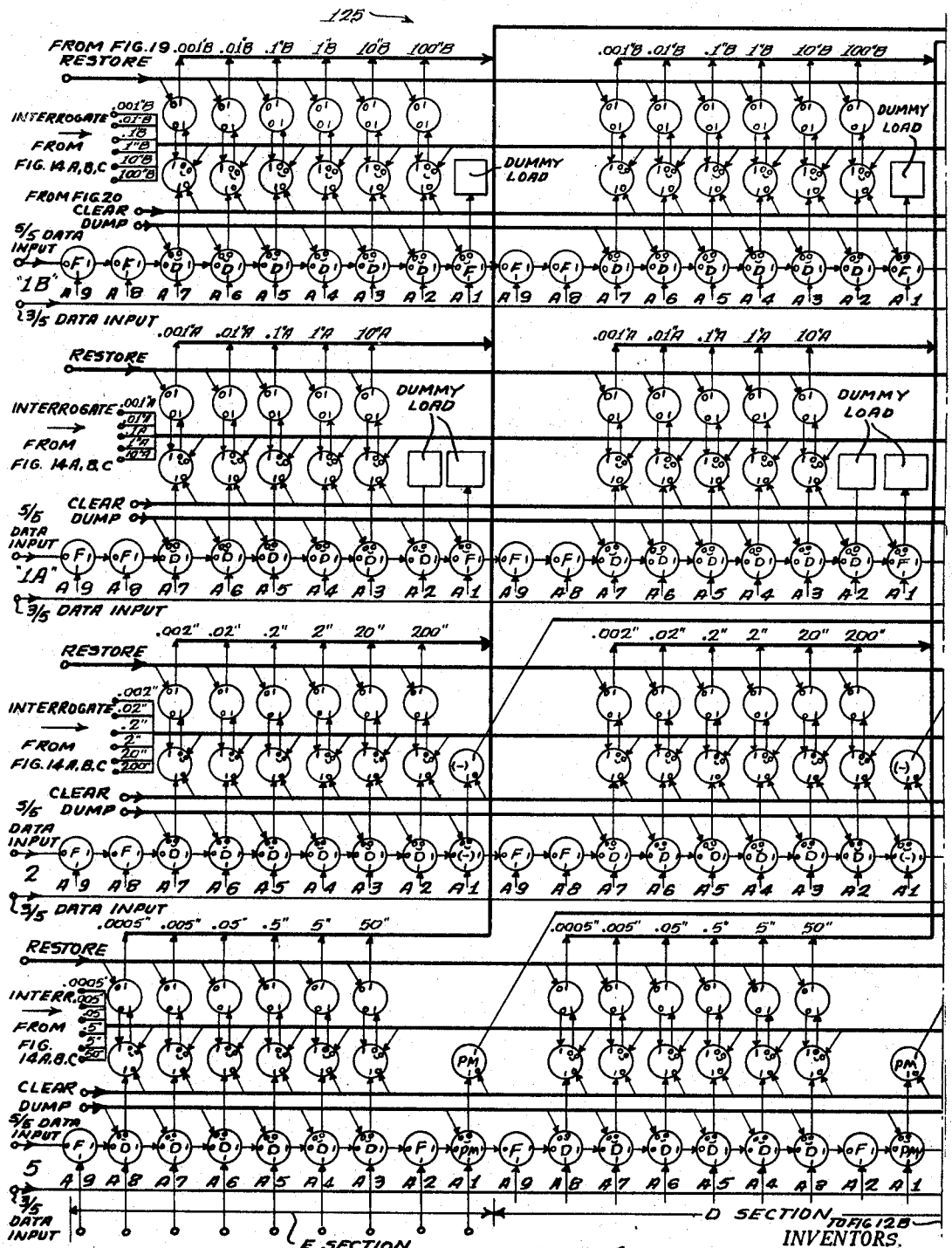
FIGS. 12A, 12B and 12C, when joined along the indicated junction lines, are a diagrammatic representation of a magnetic core system for receiving and storing time, sign and distance information in coded binary form.

The two sets of output terminals for the axis-select circuitry 124 connect to correspondingly labeled data input terminals for the magnetic system which appear at the left of FIG. 12A.

THE MAGNETIC SYSTEM

Principles of operation and example

It is well known to those skilled in the art that magnetic cores made of a material having a substantially rectangular D.C. hysteresis loop and relatively high retentivity may be utilized as bi-state devices to handle binary information. That is, when residual flux is in a first direction, such a magnetic core may be considered as storing or holding a binary "1" and when the residual flux is in the opposite direction it may be considered as holding or storing a binary "0." The core may be set to one state or the other by supplying a current pulse to a winding thereon so as to create a magnetomotive force in the proper sense; and an output signal indicative of the previous state of the core may be induced in an output winding thereon when the residual flux is switched from one direction to the other.

FIG. 13 illustrates in detail a part of a magnetic shifting register 170 associated with a storage register 171. The shifting register includes three magnetic cores or toroids 172, 173 and 174, each of which has an input winding 172a–174a, an output winding 172b–174b and an advance winding 172c–174c. The output windings of each core are connected in series through a diode with the input windings of the next succeeding cores. In addition to the windings shown, there is an initial "clear" winding (not shown) associated with each core in both the shifting register and storage register. When operation is first begun, the initial "clear" winding is pulsed to set all the cores in the shifting register to the "1" state and all the cores in the storage register to the "0" state. The input winding for the first core 172 has one terminal connected to a negative voltage source and a data input terminal 175 which may, for example, be connected to one of the output terminals leading from the axis-select network 124. The input terminal 175 will, therefore, be grounded so that a current pulse flows when a "0" is to be read into the shifting register and will be left floating when a "1" is to be read in.

After the initial re-set, there will be a read-in time interval during which the terminal 175 will either be grounded or left floating. In the latter case, the core 172 will remain in the "1" state, while if the input terminal is grounded, it will be switched to the "0" state. No output current pulse may flow as the result of a voltage induced in the output winding 172b, however, since the associated diode will block current of one polarity.

Following the first read-in interval, the advance windings 174c, 173c, and 172c are pulsed sequentially in the order named. If a core for one of those advance windings is in the "0" state, it will be switched to the "1" state, and only if such switching occurs a current pulse of proper polarity will be induced in the corresponding output winding which supplies current to the input winding of the next succeeding core. The next succeeding core will, as a result, be switched to the "0" state. If the input terminal 175 was previously grounded, after the three advance pulses have arrived, the core 174 will be left in its original "1" state, the core 173 will be in the "0" state, and the core 172 will again be in the "1" state. In the succeeding read-in time interval, the data input terminal 175 will again be left floating or momentarily connected to ground, depending upon whether the next digit to be read-in is a binary "1" or "0." The advance windings 174c–172c are again sequentially pulsed causing binary "0" states to be shifted one step to the left as previously explained. In this manner, a whole string of binary "1"'s or "0"'s may be sequentially shifted to the right through a plurality of cores in a shifting register.

Once the shifting register cores have received a full line of binary information, the information may be transferred or "dumped" up to the lower row of magnetic cores in the storage register. As here shown, such dumping is accomplished by a pulse supplied to a dump terminal 176. Magnetic cores 178, 179 will be switched to agree in state with the respective shifting register cores 173, 174 by virtue of split winding transfer loops 180, 181. It will be recalled that the storage register cores 178, 179 are initially in the "0" state. The dump input terminal 176 is connected to the center of two series-connected windings 178a, 178b, and 179a, 179b on the shifting register cores 178 and 179. If current flowing from the terminal 176 to ground divides equally between the dump input winding 178a, 178b then no change of state for the associated storage core will occur. The split winding transfer loop 180 is so balanced that the current will divide evenly between the dump input windings 178a, 178b if the associated shifting register core 173 is in the "0" state. However, if the core 173 is in the "1" state, then a dump output winding 173d on that core connected in the transfer loop 180 will offer an appreciably different impedance due to the fact that current flow therein causes a flux reversal within the core. When this occurs, the current flow in the two windings 178a and 178b is unbalanced so that the storage core 178 is switched from the "0" state to the "1" state. With the foregoing basic operational principle in mind, it will be apparent that a dump pulse supplied to all of the dump transfer loops will simply cause those cores in the storage register which are immediately above shifting register cores containing binary "1"'s to be switched to the binary "1" state. This is a straightforward parallel transfer of binary information from the shifting register 170 to the lower row of cores in the storage register 171.

There are magnetic cores 184, 185 in the upper row of the storage register which are associated with the cores 178, 179 in the lower row. In order that binary information contained in the storage register may be repeatedly read out without being destroyed, the binary information is switched back and forth or "ping-ponged" between the lower and upper level cores.

To effect this, there are split winding transfer loops 186, 187 similar to the loops 180, 181 interconnecting the upper and lower cores 184, 178 and 185, 179. When interrogate pulses are supplied to the loop 186, for example, the core 184 will be switched to the "1" state if the core 178 at that time is in the "1" state. The latter core will, as an incident to the transfer, be switched to the "0" state. Similary, the core 184 will be left in the "0" state if the core 178 is in the "0" state. When the core 184 is switched to the "1" state, an output current pulse is induced in an output winding 184e. But assuming that the core 179 was in the "0" state, interrogation of that core produces no response in an output winding 185c on the core 185. Then, if a restore pulse is supplied to a restore input terminal 188 so that current flows through restore windings 184c and 185c on the cores 184, 185, the core 184 will be returned to and the core 185 remain in the "0" state. This induces current flow in a transfer winding 184c connected in circuit with a transfer input winding 178d on the core 178. As a result, the restore pulse returns those cores in the upper row which were in the "1" state to the "0" state and returns the associated lower level cores to the "1" state. If interrogate and restore pulses appear alternately therefore, the binary "1"'s will be switched back and forth between the lower and upper rows of cores in the storage register, an output pulse being induced in the associate output winding 184e or 185e each time this occurs. The storage register is thus aptly termed a "ping-pong" register. When it is desired to "clear" the storage register in order that it may receive a new set of information, a "clear" pulse is applied to a terminal 189 following a restore pulse so that current is passed through "clear" windings 178d, 179d. This returns the cores in the lower row of the storage register which were in the "1" state to the "0" state, but does not affect the shifting register cores or the upper row of storage register cores.

It is believed that the basic operation of the shifting and storage register 170 and 171 will be clear from the foregoing. Reversals in the states of the several cores other than those mentioned are prevented by uni-directionally conductive diodes appropriately located in the transfer loops as shown in FIG. 13, and by proper selection of turns ratios for interconnected windings.

*Drawing conventions*

In FIGS. 12A, B and C the magnetic core and winding organization illustrated by way of example in FIG. 13 is diagrammatically repeated many times in order to illustrate the entire magnetic system. For clarity and simplicity, certain drawing conventions have been employed which may be defined as follows:

(a) A magnetic core is represented by a circle.

(b) The winding or windings around a magnetic core belonging to the same transfer loop are represented by a straight line touching the circle.

(c) An input winding is indicated by an arrow on the line touching the circle, and the binary digit opposite the arrow within the circle indicates the state to which the magnetic core is switched by an input signal to that winding.

(d) An output winding is represented by a line without an arrow at the circle. The binary digit opposite that line and within the circle indicates the state to which the magnetic core must be switched (from the other state) to produce an output signal in the winding.

(e) If an output signal may be produced in a given output winding by only one of several inputs, a curved line or "eyebrow" is shown as connecting that output winding with the particular input winding which will produce the output signal.

A brief inspection of the drawing conventions employed for the first three cores at the left of the shifting register portion at the bottom of FIG. 12A, and the associated storage register cores therefor, will immediately reveal how the symbolic conventions used in FIGS. 12A, B and C correspond to the winding arrangement in FIG. 13.

*Magnetic system organization*

In the magnetic system illustrated diagrammatically by FIGS. 12A, B and C, there is a four-place shifting register and a four place storage register associated therewith. These four places appear as horizontal divisions in the system and are labeled "5," "2," "1A" and "1B" (from bottom to top) to designate that they correspond to the four places in the 5211 binary code employed. Further, there are six vertical divisions in the magnetic system, the one at the extreme right being assigned to receive time information and the successive ones progressing to the left being labeled as the A, B, C, D and E sections which are assigned to receive sign, P or M, and distance information for the corresponding axes of control.

It will be assumed at this point for purposes of illustration that a programmed operation is to be in 5 out of 5 axes. The relay contacts R128*j–m* in the shifting register places will be closed. With this, it will be understood that the four "5 out of 5" axis output lines of the axis-select circuit 124 (FIG. 11), and which are connected to its corresponding data input terminals in FIG. 12A, are successively left floating or grounded as information is transferred through the coding matrix of FIG. 11. After each closure of the cam switch CS3, which will result in grounding of certain of the output lines for the matrix 122 as previously explained, a series of advance pulses are supplied sequentially to the advance windings A1–A9 in all four places and in all respective sections of the shifting register. By this process, digital information abstracted from the punched tape may be sequentially shifted to the right through the four places of the shifting register, the four places thus being set to represent in 5211 binary code the programmed time, sign and distance information.

Those shifting register cores which upon completion of the read-in operation contain distance information (here a binary "1" or "0") are labeled with the letter D in FIGS. 12A, B and C. Certain of the shifting register cores are simply "fillers" to make the four levels of the shifting register of uniform length; these latter cores are labeled F. Time information is placed in one of the shifting register cores labeled T. The sign information for each respective axis of control is shifted into those cores marked "—" in the "2" level for the five respective axis sections. If the direction of movement along any particular axis of control is to be in a positive direction, the "—" shifting register core corresponding to that axis will be left in the "0" state, while if the direction of movement is to be in a negative direction, the "—" core will be set to the "1" state.

P or M information, in addition to setting the "—" cores in the proper state as described above, will cause the cores labeled P-M in the "5" level of the shifting register to be set to the "1" state in the corresponding axis section. If no P or M symbol is programmed into a given block of information, all of the P-N cores will be left in the "0" state.

After a given block of information has been shifted into the four place shifting register, a dump pulse is simultaneously applied to the four "dump" terminals shown at the left in FIG. 12A. This transfers the binary information to the storage register level immediately above. Immediately upon dumping, any "—" core in the "2" level of the storage register which is switched to the "1" state will cause an output pulse to appear on a corresponding one of the five output lines marked "To sign *f—f*'s in FIG. 25." Also immediately upon dumping of the particular one of the nine time holding cores which is in the "1" state the associated lower level storage core is switched to the "1" state and provides an output pulse on a corresponding one of the nine output lines which are labeled at the right in FIG. 12C. "To time period *f—f*'s, FIG. 14A." Finally, immediately upon dumping, if any one of the five P-M cores in the "5" level storage register is switched to the "1" state, an output pulse will appear on the line labeled "To PM *f—f* in FIG. 29". The output windings on the P-M storage cores are all connected in parallel so an output pulse will be supplied to the common output line if any one of these is switched to the "1" state. Because read-out occurs from the sign, time, and PM storage cores to utilization storage flip-flops immediately upon dumping, it is not necessary to preserve this information by "ping-ponging" and for this reason there are no corresponding cores in the upper level of the storage register sections.

Figure 12B:
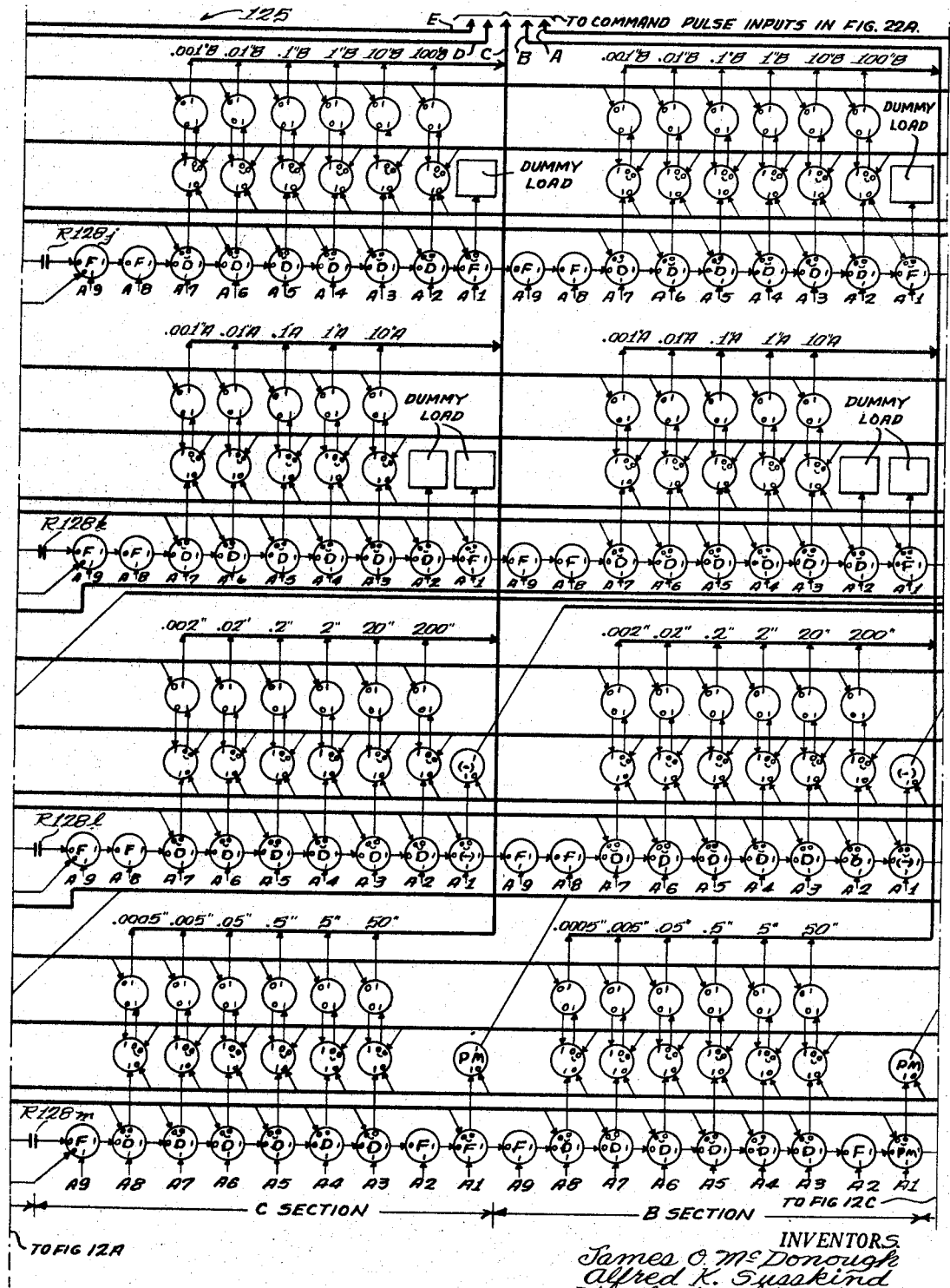

After dumping has occurred, the several interrogate terminals shown at the left in FIG. 12A are supplied with interrogate pulses, and at least one restore pulse is supplied to the four "restore" terminals between the appearance of successive interrogating pulses supplied to any one of the interrogate terminals. Therefore, binary information dumped into the lower row of cores in each storage register level will be "ping-ponged" back and forth a number of times depending upon the number of interrogate pulses supplied to any particular storage core. Where a given core in the lower row of the storage register is initially in the "1" state, an output pulse will be produced on the associated output line of the corresponding upper row core in response to each interrogating pulse. As shown in FIGS. 12A, B and C, all of the output lines from the upper rows of storage cores in any of the axis sections A–E are connected in parallel to supply pulses to a common output line. These output pulses are termed "command pulses" and there are five command pulse output lines as shown at the top of FIG. 12B and labeled as being connected "to the command pulse inputs in FIG. 22A."

There are six interrogate input terminals for the "1B" storage register place and these input terminals are connected in parallel with all cores of the same location in each of the five axis sections. In other words, an interrogate pulse supplied to the .001" B input terminal for the "1B" storage register level will be supplied in parallel to the five cores labeled .001" B in the five respective sections A–E. In a similar manner, the five interrogate input terminals for the "1A" storage register place each connect in parallel to the corresponding cores in each of the five respective sections A–E. Similarly, the six interrogate input terminals for the "2" storage register place connect in parallel to the corresponding cores in each of the respective sections A through E. And finally, the six interrogate input terminals for the "5" storage register level are each connected in parallel to corresponding cores in the five sections A through E.

After the interrogation of a given block of information which has been put into the magnetic system is complete, and the last restore pulse has occurred leaving the upper row of storage cores in the "0" state, the information in the four-place storage register is destroyed by the application of pulses to the four "clear" terminals shown at the left in FIG. 12A. Such "clear" pulses simply switch all of the lower level storage cores which may be in the "1" state back to the "0" state, leaving the storage register in a "cleared" condition ready to receive the next block of information upon dumping from the shifting register. It is possible, therefore, for the shifting register to be receiving the next block of information after a first block has been dumped to the storage register and is being interrogated. Then as soon as the storage register is cleared, the second block of information which has been placed in the shifting register may be dumped immediately and interrogation started.

It has been made clear how the 5 out of 5 data input terminals at the left of FIG. 12A receive binary information from the coding matrix 122 in FIG. 11. The sources of the advance, dump, interrogating, restore, and clear pulses applied to the respective terminals at the left of FIG. 12A will become apparent as the description proceeds.

PULSE DISTRIBUTION AND TIME PERIOD CONTROL

Figure 14A:
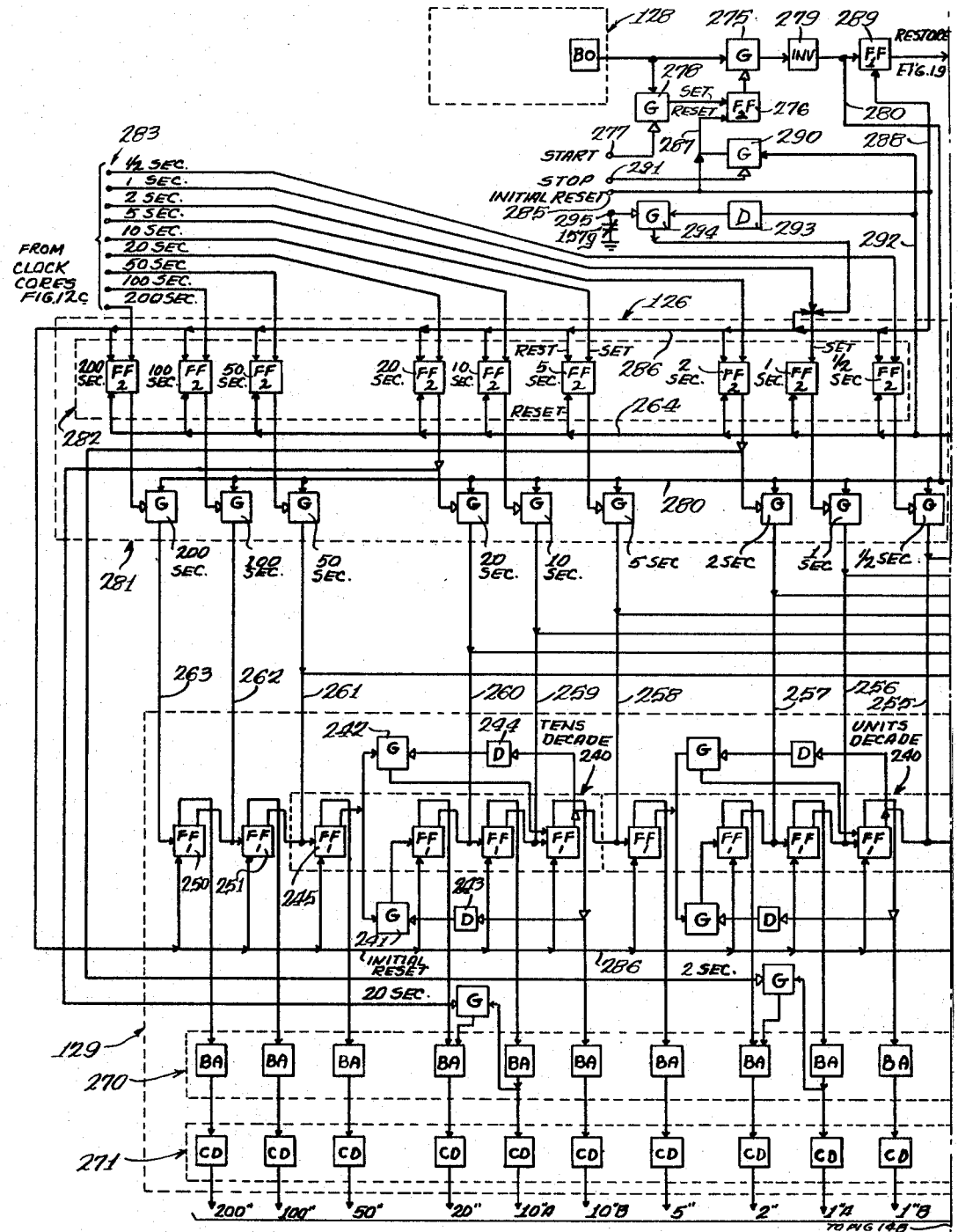

As its principal components the pulse distribution and time period control apparatus shown diagrammatically in FIGS. 14A, B and C, includes the command clock 128 which is a source for generating a train of recurring pulses; the time selection circuitry 126 which routes the pulse train over a elected one of a plurality of paths according to time information received from the magnetic system 125; and the frequency divider 129 which (a) converts time information, according to the conditioning of the circuitry 126, into absolute time, and (b) generates from the command clock pulse train a plurality of pulse chains each containing pulses numerically related according to the 5211 binary code and multiplied by 10 for each decimal order. Those pulse chains are used as interrogation inputs to the magneitc system 125.

The command clock may be simply a blocking oscillator (shown in detail by FIG. 30) which supplies a recurring train of sharp pulses as its output. The frequency of the clock or oscillator may be adjusted and varied for purposes and in manners to be detailed below. For the present, however, it will be assumed that the frequency of the command clock output pulse train is 16 kc.

Exemplary components

Before proceeding with a detailed description of FIGS. 14A, B and C, it will be helpful to consider the nature of certain elementary components which are used at numerous places in the present aparatus.

For representing and handling binary information, a convenient bi-state device is the so-called "flip-flop" circuit. This circuit is simply a bi-stable multivibrator or Eccles-Jordan circuit. A first example or "Type 1" flip-flop is detailed in FIG. 16, while a second example or "Type 2" flip-flop is detailed in FIG. 17.

Figure 16:
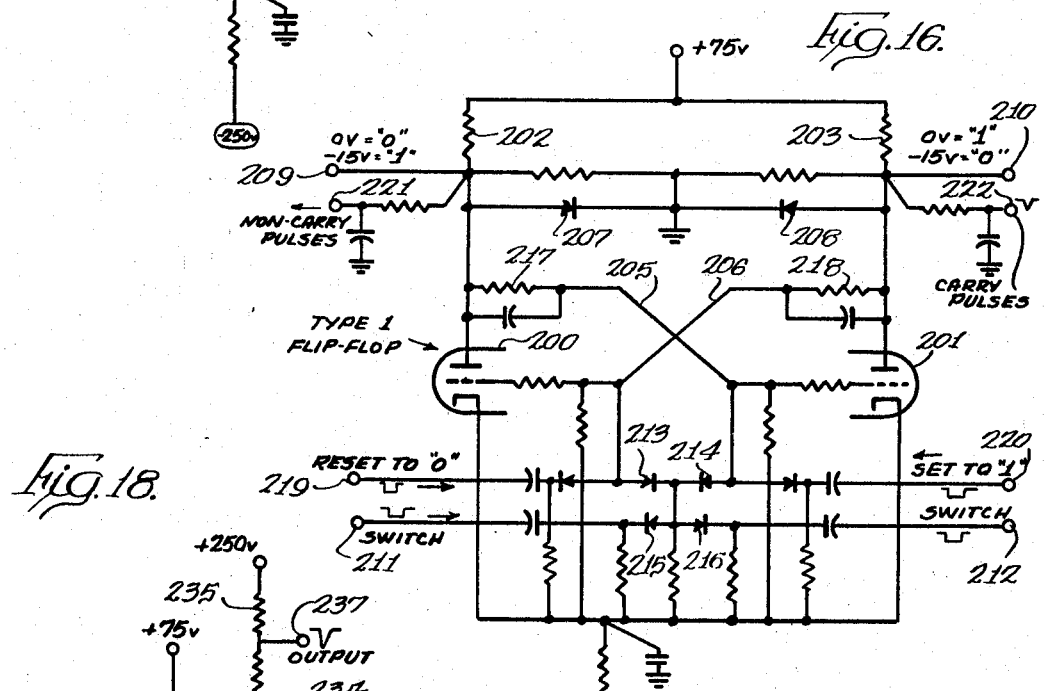

As shown in FIG. 16, the "Type 1" flip-flop includes two electron discharge devices 200, 201 (which may be the separate halves of a duo-triode) connected between suitable supply voltages, here +75 volts and −250 volts. The two discharge devices have respective plate load resistors 202, 203 and a common cathode impedance 204. In order to assure that one of the devices 200, 201 will be cut off when the other is conducting, cross connections 205, 206 are made from the plate of each device to the grid of the other device. Thus, when the device 200 is conducting and its plate is at a relatively low potential on the order of −15 volts, the device 201 will be cut off, and vice versa. Whenever a negative voltage pulse is applied to the grid of the device which is conducting at that instant, that particular device will be driven to cut-off and since the potential at its plate immediately rises to increase the potential on the grid of the other device, the other device will be rendered conductive.

The diodes 207, 208 are effective to limit the maximum potential at the plates of the devices 200, 201 to 0 volts; and the other circuit component values and supply voltages are selected so that the lower potential at the plates of the discharge devices will be on the order of −15 volts when those devices are conducting.

With the foregoing understood, it may be assumed that when the device 200 is conducting and the device 201 cut off, the "Type 1" flip-flop is in the "1" state. This is tantamount to saying that an output terminal 209 will be at a relatively low or −15 volt potential, and an output terminal 210 will be at a relatively high or 0 volt potential, whenever the flip-flop is in the "1" state. Conversely, when the device 200 is cut off and the device 201 conducting, it may be assumed that the flip-flop is in the "0" state. This "0" state will thus be evidenced by the fact that the output terminal 209 will be at a relatively high or 0 volt potential, while the output terminal 210 will be at a relatively low or −15 volt potential.

The "Type 1" flip-flop shown in FIG. 16 has a number of input terminals. The two input terminals 211 and 212 may be designated as "switch" terminals, since a negative pulse applied to either of these will cause the devices 200, 201 to switch their relative conduction and cut-off conditions. It will be apparent that diodes 213–216 will create a current flow path (whenever a negative potential pulse is applied to the terminals 211 or 212) from the plate of the discharge device which at that instant is cut off. The resulting potential drop across the corresponding one of the cross-conecting resistors 217 or 218 will thus drive the grid of the other discharge device below cut-off and increase the potential at its plate so that the potential of the grid of the originally cut-off device is raised to the conduction point. Thus, negative potential pulses supplied sequentially to either of the terminals 211, 212, will successively switch the flip-flop from one state to the other.

In a similar manner, it will be understood that a negative potential pulse applied to the input terminal 219 will cause cut-off of the device 200 if it was not already cut off. This thus "resets" the flip-flop to the "0" state. Likewise, a negative potential pulse supplied to the input terminal 220 will make certain that the device 201 is cut off and thus positively "set" the flip-flop to the "1" state.

Two auxiliary output terminals 221, 222 are termed "the non-carry" and "carry" terminals. The former will switch from a positive to a negative potential whenever the flip-flop changes from the "0" to the "1" state; while the terminal 222 will switch from a higher to a lower potential when the flip-flop changes from the "1" state to the "0" state. It will be apparent, therefore, that with switching pulses consecutively supplied to one of the terminals 211, 212 half that number of negative going potential changes or pulses will appear on the output terminal 222, and the other half will appear on the non-carry output terminal 221. The flip-flop is thus a device which divides by two, the switching pulses supplied thereto creating alternate output pulses on the non-carry and carry output terminals 221, 222.

Figure 17:
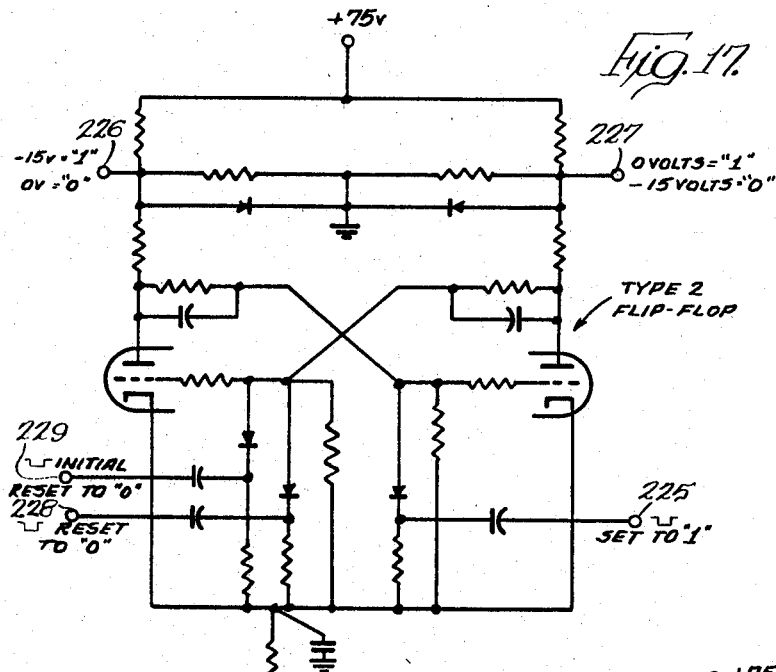
FIGS. 16 and 17 are schematic circuit diagrams illustrating details of exemplary flip-flop circuits which are employed at various points throughout the data processing apparatus.

The "Type 2" flip-flop shown by FIG. 17 is similar to the "Type 1" flip-flop except that it is simplified somewhat since it does not receive switching pulses. In other words, a negative going potential change on the input terminal 225, will "set" the "Type 2" flip-flop to the "1" state, assuming that the output terminal 226 is at the lower of two potentials (−15 volts), while the output terminal 227 is at the higher of two potentials (0 volts). Conversely, a negative potential change appearing on the input terminal 228 will "reset" the "Type 2" flip-flop to the "0" state, making the output terminal 226 relatively high in potential and the output terminal 227 relatively low in potential. An input pulse applied to the "initial reset" terminal 229 will have the same effect. This "Type 2" flip-flop is used in those instances where sequential switching from one state to another in response to successive input pulses is not required, but where changes in the condition of the flip-flop are to be made only in response to pulses appearing on separate lines.

Throughout the drawings, flip-flop circuits of the type described above are represented by block symbols with the letters "FF" therein. Type 1 flip-flops are labeled with the numeral "1," and Type 2 flip-flops are labeled with the numeral "2."

Figure 18:
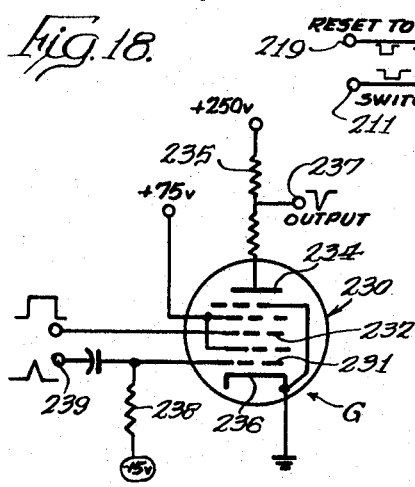
FIG. 18 is a schematic circuit diagram of an exemplary gate circuit.

FIG. 18 illustrates in detail an exemplary gate circuit G. Basically, a gate is equivalent to a relay since it is operative to pass input pulses supplied thereto whenever another controlling electrical signal is present. Gates are most often formed by multi-grid vacuum tubes where speed of operation is desired, input signals being supplied to one control grid, and the control signals being supplied to another control grid. The gate shown by FIG. 18 is formed by a pentode 230 having a first control grid 231 and a second control grid 232. With the plate 234 connected to a suitable positive voltage source through a load resistor 235, and the cathode 236 connected to the opposite side of that voltage source, current will flow through the pentode 230 only when both the grids 231, 232 are higher than predetermined cut-off potentials. Therefore, recurring positive going pulses applied to the grid 232 will be reflected as negative going pulses on the output terminal 237 only if at that instant a positive potential is applied to the other control grid 231. As here illustrated, the control grid 231 is normally biased below cut-off by a resistor 238 connected to a negative bias voltage source, so that the pentode 230 is always cut off unless the input terminal 239 receives a higher potential, e.g., ground potential. It will thus be clear that the gate G is simply a coincidence circuit or switching circuit in which input pulse signals supplied to one grid of a vacuum tube are passed to an output terminal connected with the plate of the tube only when another grid is at a potential above cut-off. Such gates may, of course, be made "normally open" or "normally closed," that is, the control signal may normally hold one of the control grids above its cut-off potential, or may normally hold it below cut-off potential. Throughout the drawings in the present case, gates of the general type such as that shown in FIG. 18 are illustrated by a block containing the corresponding identifying letter "G."

*Decade scaling units*

Before proceeding with a full description of the organization and operation of the circuitry illustrated by FIGS. 14A, B and C, it will be helpful to consider the organization and operation of one of the several decade scaling units which are employed in the present frequency divider 129. As shown, five such decade units 240 appear in FIGS. 14A, B and C, each handling information which in a decimal sense is in the 10's, units, 10ths, 100ths, and 1000ths orders, respectively. It will be seen that each decade unit 240 comprises four flip-flops tandemly connected in a special manner. Ordinarily, four tandem flip-flops will create a scaler or divider having a total ratio of 16 operating on the straight binary scale of division. However, division by 10 is obtained in each of the present decade units 240 through the use of a normally open gate 241 (refer to the tens decade) connected between the first and second flip-flops and the use of a normally closed gate 242 connected between the first and fourth flip-flops. The normally open gate is controlled by a potential from one of the output terminals of the fourth flip-flop so that it is closed whenever the fourth flip-flop is in the "1" state, a delay means 243 being interposed in the control line to give adequate switching time between the flip-flop circuits themselves. The normally closed gate 242 is controlled through a delay means 244, by a potential supplied from the fourth flip-flop, so that it is open whenever the fourth flip-flop is in the "1" state. As input pulses are supplied sequentially to the switching terminal 245 of the first flip-flop, the four tandemly connected flip-flops behave as an ordinary binary scaling chain for the first eight pulses which are received. However, after the eighth pulse has been received and the fourth flip-flop is switched to the "1" state, the normally open gate 241 is closed and the normally closed gate 242 is opened. The ninth input pulse then switches the first flip-flop to the "1" state, but the tenth input pulse which returns the first flip-flop to the "0" pulse and creates a carry output pulse therefrom results in the fourth flip-flop being restored to the "0" state since the carry output pulse of the first flip-flop goes through the gate 242 to the input terminal of the fourth flip-flop. This provides a carry output pulse from the fourth flip-flop which is fed to the next decade unit. At the same time, the gates 241, 242 are restored to their normal conditions. The counting or scaling action of the decade units which is explained above, may be illustrated by the following table:

| Input Pulses | Flip-Flop States | | | | |
|---|---|---|---|---|---|
| 0 | 0 | 0 | 0 | 0 | |
| 1 | *1 | 0 | 0 | 0 | |
| 2 | 0 | *1 | 0 | 0 | |
| 3 | *1 | 1 | 0 | 0 | |
| 4 | 0 | 0 | *1 | 0 | |
| 5 | *1 | 0 | 1 | 0 | |
| 6 | 0 | *1 | 1 | 0 | |
| 7 | *1 | 1 | 1 | 0 | |
| 8 | 0 | 0 | 0 | *1 | —gates switch |
| 9 | *1 | 0 | 0 | 1 | |
| 10 | 0 | 0 | 0 | 0 | —gates restore |
| Non-Carry Outputs* | 5 | 2 | 1 | 1 | |

The block representation of the frequency divider 129, which is made up of a plurality of tandemly connected flip-flops, indicates that the carry output terminals of the flip-flops are connected to supply carry output pulses to the input terminals of succeeding stages. The non-carry output terminal of each of the flip-flops supply pulses which occur alternately with the carry output pulses and which are in the form of chains of pulses subsequently used to interrogate the magnetic system 125. It is important here to note the relation of the non-carry output pulses from the four flip-flops in a decade unit as the decade unit counts through one cycle of ten input pulses. Referring to the table above, the transition of each of the four flip-flops in a decade unit from the "0" to the "1" state which causes a non-carry output pulse from that flip-flop are indicated by asterisks. The summation at the bottom of the table indicates that the first flip-flop will have five non-carry output pulses, the second flip-flop two non-carry output pulses, the third flip-flop one non-carry output pulse, and the fourth flip-flop one non-carry output pulse for each ten input pulses. Thus, the non-carry output pulse chains of each decade scaling unit are proportioned in number to the value assigned to the four respective places in the 5211 binary code which is employed in the storage of coded binary information within the magnetic system.

The original input pulses need not always be applied to the first flip-flop in a decade unit 240. As shown for the tens decade in FIG. 14A, input pulses may be supplied to the third flip-flop in the decade unit, causing the last two flip-flops to divide by four so that they provide two and one non-carry output pulses, respectively, for each four input pulses. Similarly, if input pulses are originally applied directly to the switching terminal of the fourth flip-flop in a decade unit, that flip-flop will divide by two, alternately supplying carry and non-carry output pulses.

*The frequency divider*

The frequency divider 129 is a coded binary scaler which is made up of two initial flip-flops 250, 251 which are connected in tandem with the five tandemly connected decade units 240, and with a final flip-flop 252. At the very end of the frequency divider scaler are two additional tandemly connected flip-flops 253, 254 which add a dividing ratio of four to the scaler. These additional flip-flops 253, 254 are not used to generate non-carry pulses for interrogation of the magnetic system; rather, they increase the number of pulses required to produce a transfer pulse (i.e., a carry output pulse from the last flip-flop 254) by a ratio of four, so that to produce a given time interval the frequency of the command pulse clock must be four times as great. Therefore, the non-carry output pulses from the various flip-flops are multiplied by four for each counting cycle of the frequency divider, and as a result they are more smoothly spaced in time. Each non-carry output pulse represents .000125", rather than the .0005" it would represent if the extra flip-flops 253, 254 were not used.

By selecting the point at which an input train of pulses is supplied to the tandemly connected flip-flops or the frequency divider, the over-all dividing ratio may be changed. For example, if input pulses are supplied over the line 255 to the first flip-flop in the 10ths decade unit 240, the over-all dividing ratio will be 10×10×10×8, or 8,000. In like manner, it will be seen that if input pulses are supplied over the line 256, the dividing ratio will be 16,000; if input pulses are supplied over the line 257 the dividing ratio will be 32,000; if input pulses are supplied over the line 258 the dividing ratio will be 80,000. In like manner, the effective over-all dividing ratio will be 160,000; 320,000; 800,000; 1,600,000; or 3,200,000 if input pulses are supplied over the lines 259, 260, 261, 262, or 263, respectively.

If those input pulses are arriving with a given frequency, say 16 kc., then the time required for the last flip-flop 254 in the frequency divider to produce a carry output pulse will depend directly upon which of the input lines transmits the original input pulses. The time period is simply the effective dividing ratio divided by the frequency of the input pulses. In other words, if input pulses arrive on the input line 255, a total of 8,000 must be received before the last flip-flop 254 generates a carry output pulse. Similarly, if input pulses are applied to the lines 256 or 257, then 16,000 or 32,000 pulses, respectively, must be received before a non-carry output pulse is generated from the last flip-flop 254. With the input pulses arriving at a frequency of 16 kc., therefore, a time period ½ second, 1 second, or 2 seconds will be required before the appearance of the carry output pulse from the flip-flop 254 after the initiation of operation. The carry output pulse from the last flip-flop 254 appears on the line 264 and at the terminal 265. This pulse is termed, for convenience, the "transfer pulse" since it signifies the end of processing for one block of information and causes transfer of processing to the next block of information. From the foregoing, it will be seen that if input pulses are supplied at 16 kc. over the line 255, 256, 257, 258, 259, 260, 261, 262, or 263, then time periods of ½ second, 1 second, 2 seconds, 5 seconds, 10 seconds, 20 seconds, 50 seconds, 100 seconds, or 200 seconds, will be required from the instant of initiation until the transfer pulse appears on the line 264.

During the time intervals that pulses are progressing through the frequency divider flip-flops, those flip-flops will be supplying non-carry output pulses alternately with their carry output pulses. All but the last two flip-flops 253 and 254 in the frequency divider have their non-carry output terminals connected with corresponding buffer amplifiers 270 which work into core driver circuits 271 leading to twenty-three interrogate output terminals at the bottom of FIGS. 14A, B and C. If it is assumed that the input pulses are being supplied over the line 263, then the number of non-carry output pulses, or interrogate pulses appearing at the output terminals at the bottom of FIGS. 14A, B and C will be as follows, reading from right to left: 1,600,000, 800,000, 400,000, 160,000, 80,000, 80,000, 40,000, 16,000, 8,000, 8,000, 4,000, 1,600, 800, 800, 400, 160, 80, 80, 40, 16, 8, 8 and 4. Now if it is assumed that each interrogate output pulse from the frequency divider 129 represents .000125", then it will be apparent that the interrogate pulses appearing on each of the output terminals at the bottom of the frequency divider represents the distance in inches which appears adjacent that terminal. Of course, when the input pulses to the frequency divider are supplied to one of the lines other than the input line 263 in order to measure off a time interval less than 200 seconds, certain ones of the flip-flops at the left of the frequency divider will be by-passed and these will, therefore, not supply interrogate output pulses during a given time period. However, this is not disadvantageous since when time periods of less than 200 seconds are employed, the non-carry output pulses from the by-passed flip-flops will not be required.

The twenty-three interrogate output lines at the bottom of FIGS. 14A, B and C connect to the corresponding twenty-three interrogate input terminals which appear at the left of FIG. 12A. Thus, during a given time interval of operation for processing one block of information, the several storage cores in the magnetic system will be interrogated once for each interrogate input pulse supplied from the corresponding interrogate output terminal of the frequency divider. For example, if the 2″ storage core in the E axis section of the magnetic system contains a binary "1" dumped from the shifting register, then upon interrogation it will receive 16,000 interrogate pulses and supply 16,000 command pulses over the E section output line to the command pulse terminal at the top of FIG. 12B.

As shown beneath the tens and units decades in the frequency divider, two gates are controlled to be opened when the 20 second or 2 second time controlling flip-flops respectively are set to the "1" state. Thus in 20 seconds or 2 second time periods, non-carry output pulses from the third flip-flop in the units or tens decade are passed by these gates to the buffer amplifiers for the second flip-flops which have been by-passed. This assures that in 20 second or 2 second operation, the 20″ or 2″ storage cores in the magnetic system are interrogated. There is no difficulty of coincidence of command pulses because the 10″ A and 1″ A storage cores, according to the 5211 code, will not under these circumstances be in the "1" state.

*Time period control*

As illustrated in FIG. 12A, the command clock 128 supplies pulses to a gate 275 which is open or closed according to the state of an associated flip-flop 276. When the director is first put into operation, and with the blocking oscillator 128 already in operation, a start signal appears on the terminal 277, opening a gate 278 which supplies one of the blocking oscillator pulses to the flip-flop 276. This "sets" the latter in the proper state to open the gate 275 so that output pulses of the blocking oscillator or command clock 128 are thereafter supplied through an inverter 279 and over a line 280 to the input terminals of nine time controlling gates 281.

One of these gates will be opened at the beginning of a cycle of operation and will thus route the train of command clock pulses over one of the input lines 255–263 to the frequency divider 129. The nine gates correspond to the respective available time periods of ½ second, 1 second, 2 seconds, 5 seconds, 10 seconds, 20 seconds, 50 seconds, 100 seconds or 200 seconds as labeled. Those gates are opened or closed according to the states of nine corresponding "Type 2" flip-flops 282 which may be selectively "set" to the state opening the corresponding gate by a pulse applied to one of the corresponding time information input terminals 283 which connect with the time period output terminals in FIG. 12C.

It will, therefore, be apparent that whenever dumping in the magnetic system takes place, a pulse will appear on one of the nine input terminals 283 (corresponding to programmed time period) which will set one of the nine flip-flops 282 to that condition which opens the corresponding one of the gates 281 so that the train of pulses from the blocking oscillator or command clock 128 are thereafter routed to the proper input line leading to the frequency divider 129.

When the director is first put into operation, a potential signal will appear on an "initial reset" terminal 285, that signal being supplied over an initial reset line 286 to all of the time controlling flip-flops and all of the flip-flops in the frequency divider. Thus, at the very beginning of operation, all of the flip-flops in FIG. 14A, B and C are set to the "0" state so that the apparatus is "cleared" and ready to receive the first block of information for processing. The initial reset signal performs additional functions. It is supplied over the line 287 to the flip-flop 276, resetting the latter so as to close the gate 275 and prevent pulses from the command clock 128 from passing to the time controlling gates 281. It is also supplied over a line 288 to a flip-flop 289 which receives the command clock pulses from the gate 275 and thus divides them by 2 for application to "restore" circuitry in FIG. 19. Finally, it must be noted that one of the time controlling flip-flops 282 is positively set to the "1" state so that the associated time controlling gate 281 is opened. The initial reset pulse is not supplied to a reset terminal of the "one second" time period flip-flop but instead is supplied directly to the "set" terminal so that it causes the one second time controlling gate to be opened. Therefore, as soon as the start signal is received on the terminal 277, the train of command clock pulses will pass through the one second gate to the frequency divider and will cause a transfer pulse to appear on the line 264 one second later. The line 264 leads back to the reset terminals for all of the time controlling flip-flops 282. Therefore, as soon as a transfer pulse occurs, all of these flip-flops are reset to prevent further passage of command clock pulses through the associated gates 281 to the frequency divider. In the present instance, the first transfer pulse will reset the one second flip-flop and close the associated one second gate so that the apparatus is ready after the initial one second interval to receive time period information from the magnetic system which will set a particular one of the time flip-flops 282 and open the corresponding one of the time period gates 281.

Transfer pulses appearing on the line 264 are also supplied to a normally closed gate 290 which is controlled by the potential on a "stop" input terminal 291. Therefore, whenever the gate 290 is open, the next transfer pulse that occurs will pass therethrough to reset the flip-flop 276, thus closing the gate 275 and preventing further command clock pulses from reaching the frequency divider. In like manner, transfer pulses appearing on the line 264 pass over the line 292 and through a delay circuit 293 to a normally closed gate 294 controlled according to the potential applied to a "rest cycle" input terminal 295. Whenever a potential appears on the terminal 295 which opens the gate 294, the next transfer pulse will therefore pass directly, after a short delay, to the "set" terminal of the one second time period flip-flop, causing the latter to open the one second gate. This causes a one second "rest cycle" or "rest period" to occur in the frequency divider as will be more fully explained below.

*Summary of frequency divider operation and control*

When the director is first put into operation, an initial reset pulse supplied by control circuits to be described, appears on the initial reset terminal 285. This assures that all of the frequency divided flip-flops are initially in the "0" or empty state ready to accurately scale or divide pulses from the command clock 128. The initial reset pulse also resets all of the time period flip-flops 282 and thus causes all of the time period gates 281 to be closed, with the exception of the "one second" flip-flop and gate which are respectively "set" and opened by the initial reset pulse.

Then, when a "start" signal is received on the terminal 277, the gate 278 is opened so that the next pulse of the blocking oscillator 128 passes to the flip-flop 276 and triggers the latter to the state which opens the gate 275. Command clock pulses are then fed through the inverter 279 and passed over the line 280 through the now open one second gate to the input line 256 of the frequency divider 129. Accordingly, the frequency divider begins operation and at the end of one second, a transfer pulse appears on the line 264. During this initial one second interval, some interrogate output pulses will supplied to the magnetic system 125. However, this will produce no command pulse outputs from the magnetic system because the storage cores were previously all returned to the "0" state by the initial "clear" pulse.

The transfer pulse at the end of the second time period is fed back to all of the time controlling flip-flops 282 and operates to re-set the one second flip-flop, thereby closing the associated one second gate. Then, in a manner to be described, a pulse from the time storage portion of the magnetic system is applied to one of the nine time information input terminals 283 so that one of the time period flip-flops 282 is set and the associated time period gate 281 is opened. Command clock pulses are thus applied over one of the nine input lines to the frequency divider 129 and the operation described repeats until the next transfer pulse appears. This repeats over and over, the appearance of successive transfer pulses causing transfer from one block of information processing to the next.

*Interconnections and controls*

Figure 21:
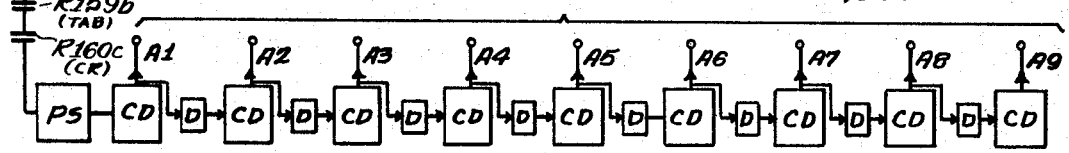

The various parts of the director are interconnected by control instrumentalities so that they they will automatically function in the correct sequence. First, to cause the magnetic shifting register to shift information one core to the right (FIGS. 12A, B and C) after each line in the punched tape has been read and the resulting coded binary signals supplied to the data input terminals of the magnetic system, nine core drivers CD are tandemly connected through delay means as shown in FIG. 21. These core drivers are simply amplifying circuits which produce sharp current pulses of predetermined duration in response to an input signal. The first core driver receives a ground signal in response to closure of the cam switch CS4 (controlled by the cam C4 of the reader 120, FIG. 10) through relay contacts 159b and 168c. The cam C4 is fashioned to close the switch CS4 momentarily after the cam switch CS3 (FIG. 11) has closed and opened. Thus, each time a line (not a part of a special code) in the punched tape is read, appropriate signals in the 5211 code are supplied to the data input terminals of the magnetic system 125. Then the switch CS4 closes momentarily. If the line read was not a tab code or CR code, which would cause de-energization of the relay R159 or the relay R160, then a ground signal will be supplied through a pulse shaping circuit PS to the first advance core driver in FIG. 21. As a result, that core driver supplies an output pulse on its terminal which connects to all of the A1 advance terminals in the magnetic system. After a short time delay, the second advance core driver CD is energized from the first and it supplies an output pulse to all of the A2 advance inputs in the magnetic system. In a similar manner, advance signals propagate through the nine advance core drivers in FIG. 21, sequentially supplying advance pulses to all of the terminals A1 through A9 in the magnetic system. This, as previously explained, makes all of the shifting register cores transfer the information which they hold one step to the right. In this manner, a series of advance pulses are supplied to the shifting register alternately with each set of signals applied to the data input terminals.

Figure 20:
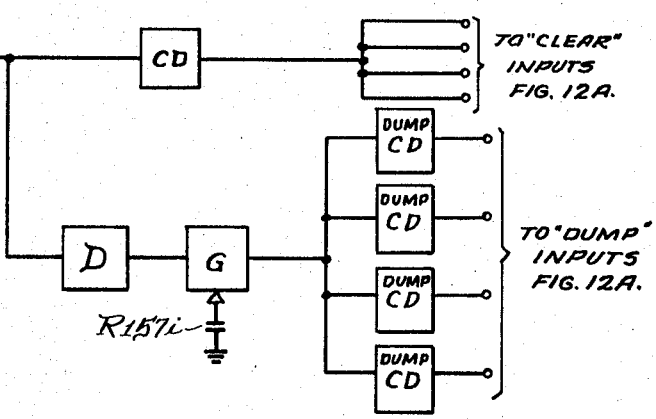

Just after interrogation of information representing one block and stored in the storage register is completed, it is necessary to clear the storage register. The interrogation of one block of information is completed when a transfer pulse is generated by the frequency divider. Accordingly, in order to properly energize the "clear" windings of the magnetic storage register, transfer pulses from the frequency divider appearing on the terminal 265 are fed, as shown in FIG. 20, through a core driver CD to four clear pulse output terminals which connect to the four clear input terminals shown at the left of the magnetic system in FIG. 12A.

Immediately after clearing, the storage register is ready to receive the next block of information from the shifting register, the latter having been filled while the previous block of information in the storage register was being utilized or interrogated. To cause this dumping, therefore, the transfer pulses which appear on the terminal 265 are supplied, as shown in FIG. 20 through a delay circuit and a normally open gate G to four dump core drivers CD. The output terminals of these four dump core drivers connect to the four respective "dump" input terminals shown at the left in FIG. 12A. Since the gate G passes a pulse signal which is delayed from the instant that a transfer pulse occurs, dump output pulses are supplied from the dump core drivers to the dump terminals of the magnetic system after clear pulses have been supplied to the latter. Therefore, clearing occurs almost immediately after the appearance of a transfer pulse, while dumping occurs a short time after the appearance of a transfer pulse and after the clearing action is completed.

It will be recalled that the dumping operation also causes read-out of pulses from the sign, P-M, and time storage cores in the magnetic system. Thus, when dumping does occur, one of the time period flip-flops 282 in FIG. 14A will be set to open the corresponding one of the time period gates 281 so that command clock pulses begin immediately to pass to the frequency divider and the latter begins its scaling and interrogation operation.

Figure 19:
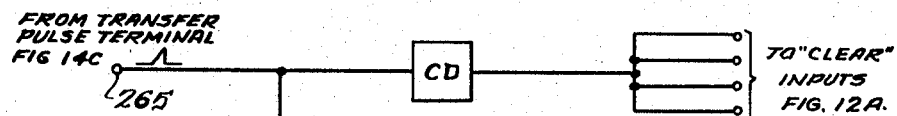
FIGS. 19, 20 and 21 are block and line diagrams of apparatus for supplying properly timed "restore," "clear and dump," and "advance" pulses, respectively, to the magnetic system in FIGS. 12A, 12B and 12C.

It will be recalled that in order to effect repeated interrogation of information in the storage register without destroying that information, a restore pulse is supplied to the upper row of storage cores after each interrogation pulse. It does not matter if more than one restore pulse occurs after each interrogation pulse. In order to make certain that at least one restore pulse is supplied to the restore input terminals shown at the left in FIG. 12A, the flip-flop 289 (FIG. 14A) which receives command clock pulses has its carry output terminal connected to supply pulses at half the command clock frequency through a delay circuit and core driver to restore output terminals as shown in FIG. 19. The four terminals in FIG. 19 connect, respectively, to the four restore input terminals in FIG. 12A. Since the non-carry output pulses from the first flip-flop 250 in the frequency divider (FIG. 14A) are at half the command clock frequency it will be apparent that the restore pulses occur alternately spaced between those non-carry output pulses. It will also be evident that several, but in any event at least one, restore pulses will occur in-between successive interrogate output pulses from the other flip-flops in the frequency divider.

Figure 15:
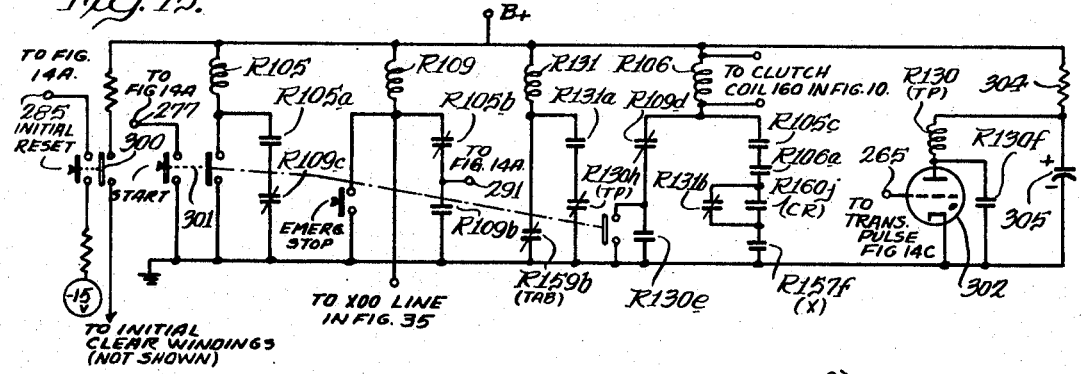
FIG. 15 is a schematic circuit diagram of certain control components which are used to start and stop the operation of the data processing equipment, and to control the operation of the device which reads the digital record.

While the initial "reset" signal which is to be applied to the terminal 285 in FIG. 14A at the beginning of the director's operation may be generated automatically in response to the application of power to the director or the reading of blank tape in the punched tape reader, it is possible to apply the proper initial reset signal by connecting a manual push button switch 300 to a negative voltage source as shown at left in FIG. 15. When this push button switch is momentarily closed a negative potential appears on the terminal 285 to cause the initial resetting operation previously described. A second set of contacts for the push button switch 300 leading from a positive voltage source may be connected in series with "initial clear" windings on all of the cores in the magnetic system 125. These initial "clear" windings are not illustrated in FIGS. 12A, B and C for the sake of simplicity. However, as previously mentioned, those "initial clear" windings are threaded through all of the cores so that upon the application of current thereto, all of the storage register cores are set to the "0" state and all of the shifting register cores set to the "1" state.

After initial clearing a triple-contact "start" push button switch 301 may be actuated. This will supply a ground signal to the "start" terminal 277 in FIG. 14A which as previously explained will momentarily open the gate 278. Depression of the push button switch 301 will also energize a relay R105 which then seals in through its own normally open contacts 105a and the normally closed contacts R109c. Finally, a third set of contacts for the switch 301 will be closed to pick up a relay 106, which will seal in through its own contacts. The clutch coil 160 for the tape reader 120 (FIG. 10) is in parallel with the relay coil R106, so that the tape reader will be started to read the first portion of information into the director.

Figure 14C:
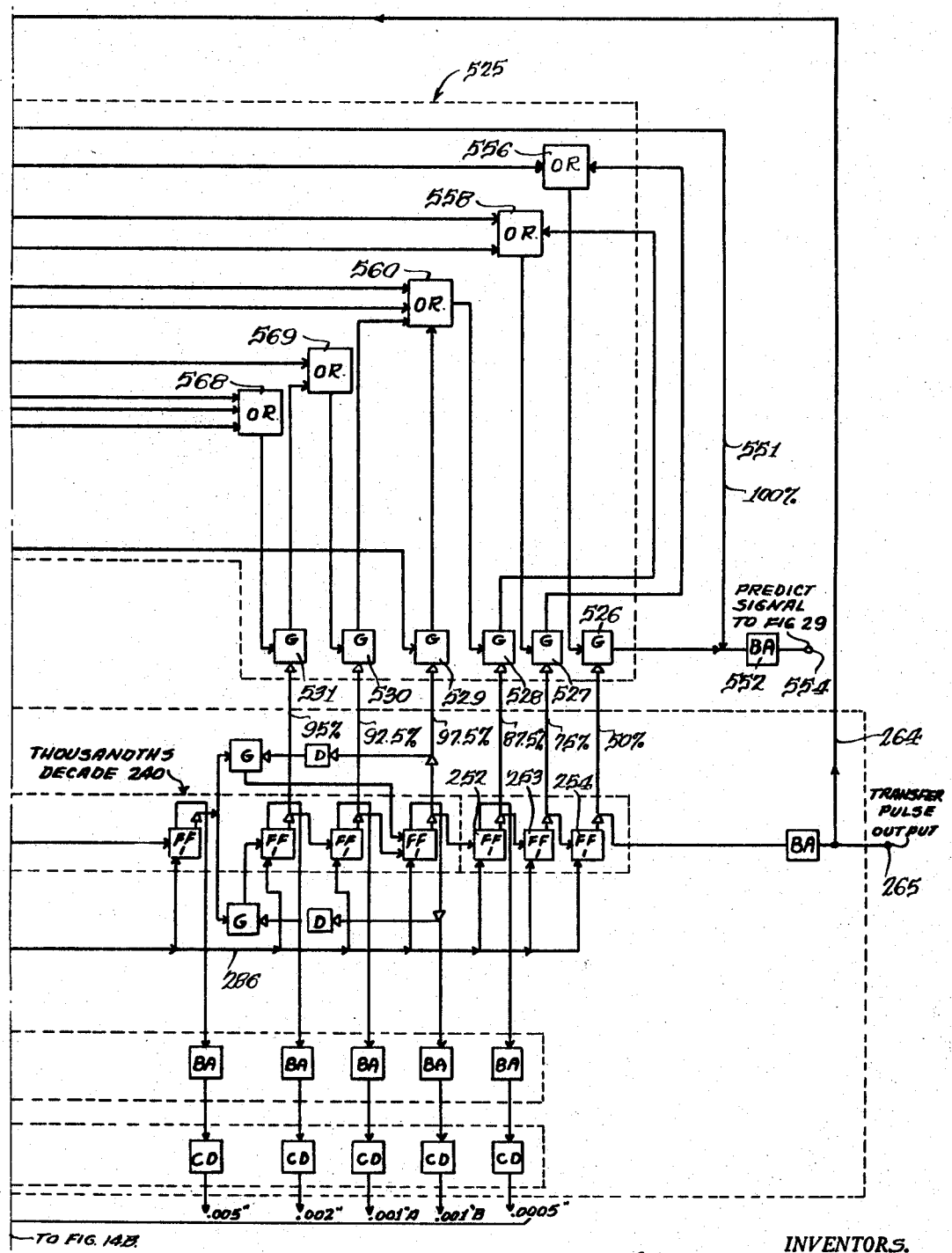

A number of additional control functions must take place upon the occurrence of each transfer pulse. For this purpose, the transfer pulses appearing on the terminal 265 at the right end of the frequency divider in FIG. 14C are also supplied to the grid of a thyratron 302 shown in FIG. 15. The thyratron has its plate connected in series through the coil of a transfer pulse relay R130 to the junction of a resistor 304 and a capacitor 305 connected across a voltage source. Normally open contacts R130f are connected in parallel across the thyratron 302. When a transfer pulse occurs, therefore, the thyratron fires and energizes the relay R130 which seals-in through its contacts R130f. These contacts, however, short the thyratron 302 to immediately extinguish it, and the charged capacitor 305 then discharges through the coil R130 and the now closed contacts R130f until the voltage across the capacitor becomes so low that the relay automatically drops out. This, therefore, is a timing circuit which causes the relay R130 to be energized for predetermined interval of, say, about 40 milliseconds each time that a transfer pulse occurs.

The various contacts of the transfer pulse relay R130 appear at different points throughout the apparatus and their functions will be made clear at appropriate points in the following description.

For a first control function by the transfer pulse relay R130, it has normally open contacts R130e connected in series with normally closed contacts R109d and the coil of a relay R106 across a suitable voltage source as shown in FIG. 15. Thus, whenever a transfer pulse occurs, the contacts R130e will momentarily close energizing the relay R106. That relay will seal-in through the contacts R105c (closed for as long as the start relay R105 is sealed in), its own contacts R106a, a parallel combination of contacts R131b and R160 (which will usually be closed), and contacts R157f (which are usually closed except when an "x" code has been read from the punched tape). Therefore, when a transfer pulse occurs, the relay R106 will be energized and sealed in, and since as indicated in FIG. 15, the clutch coil 160 of the punched tape reader shown in FIG. 10 is connected in parallel with the relay R106, the reader will advance the punched tape and read successive lines in it. However, when the tape is advanced to the point that it reads a CR code which signifies the end of one block, then the relay R160 will be momentarily de-energized and the relay contacts R160j in FIG. 15 opened to de-energize both the relay R106 and the reader clutch coil 160. At the end of one block, therefore, the punched tape reader 120 stops until the block of information then in the storage register has been interrogated completely and the next transfer pulse occurs.

The punched tape 112 shown in FIG. 9 indicates that a CR code appears in the punched tape after a special code such as "x05." It is not desirable to stop the punched tape reader 120 upon the reading of a CR code following a special "x" code, but only for a CR code following a block of numerical time and distance information. To bring this about, an auxiliary relay R131 (FIG. 15) is connected across a voltage source through normally closed contacts R159b of the tab relay R159. The relay R131 will, therefore, be energized whenever a tab code is read from the punched tape, and it will seal-in through its own contacts R131a and the normally closed contacts R130h of the transfer pulse relay R130. The relay R131 has normally closed contacts R131b in parallel with the contacts R160j in the sealing circuit for the relay R106. Therefore, in order for the occurrence of a CR code to cause de-energization of the relay R106 and the reader clutch coil 160, the tape reader must sense a tab code to energize the relay R131 and then sense a carriage return code to de-energize the relay R160. Thus, it may be said that once the tape reader has been started, it is necessary for it to read a tab code followed by a CR code before it will stop. However, whenever the tape reader reads an "x" code, which will result in de-energization of the relay R157, then the contacts R157f in the sealing circuit for the relay R106 will cause the tape reader to immediately stop.

The relay R109 shown in FIG. 15 has for its purpose to effect proper stopping of the director operation in response to a special stop signal which is placed on the punched paper tape. The functioning of the relay R109 will be described later in connection with special signals.

DECODING

After numerical information read from the punched tape is shifted into the magnetic system and stored in coded binary 5211 form, and interrogated for the programmed periods of time by the frequency divider, it appears on the five command output lines at the top of FIG. 12B as strings of command pulses for the five respective axes of control. The command pulse string for each axis is related numerically in a predetermined fashion to the distance programmed. Specifically, there is one command pulse for each .000125 inch of distance to be traversed. For example, if 2.5 inches were to be traversed along the A axis in two seconds, then the 2" and the 0.5" cores in the A section of FIG. 12C would store binary "1's" and these cores would be interrogated 16,000 and 4,000 times, respectively, by pulses from the 2" and 0.5" output terminals of the frequency divider 129. This would yield 20,000 command pulses on the A axis output line from the magnetic system, representing 2.5" of movement. It is important to observe that none of the interrogate pulses from the frequency divider 129 coincide in time, so that none of the command pulses coincide in time; and the command pulses are spaced substantially uniformly over the assigned time period. In this form, the command pulses correspond absolutely to the desired distance, but beyond that they now have a frequency which gives them a time dimension.

Decoding is the process of converting these command pulse strings into analogue form, i.e., into smoothly modulated variables which can be measured and used as control signals.

FIGS. 22A and B together are a block diagram of the five-axis decoder 132 which will accomplish the function indicated. The decoder is supplied with a plurality of streams of pulses from a suitable source such as the master clock 134. The decoder comprises a reference scaling channel 310, and five substantially identical scaling channels 311–315 for the respective control axes. Associated with each axis scaling channel 311–315 are chronizing circuits 316–320, and add-delete circuits 321–325. The command pulse streams appearing on the five output lines at the top of FIG. 12B are supplied to five corresponding input terminals for the respective axes of control A–E which appear at the left in FIG. 22A. For the moment, the distance routing circuitry 131 will be disregarded, and it may be assumed that command pulses are supplied directly to the five chronizers 316–320 for the five respective axes.

In its basic operation, the decoder takes a constant frequency stream of pulses from the master clock 134, the latter being supplied directly to the reference scaling channel 310 and supplied to the five axis scaling chains after having one pulse added or deleted for each command pulse which is received from the magnetic system. For each command pulse, the phase of the input signal to an axis channel is increased or decreased by 360°, i.e., relative to the input signal to the reference channel. At this point there is thus a form of "frequency modulation." Then, as the reference and axis channel input signals are time-divided by the scalers, they are converted into a form in which the axis scaling channel output signal is shifted in phase (relative to the reference channel output) a predetermined small amount for each command pulse received from the magnetic system. There is thus a conversion from absolute representation in digital form of command pulses to a substantially smoothly varying phase modulated form of intelligence, the total variation or phase change depending upon the number of command pulses received, and the rate of phase change depending upon the frequency of arrival of the command pulses.

*The master clock*

The master clock 134 comprises a fixed frequency signal source which in this case is a crystal oscillator 330. That oscillator works directly through a first gate 331 to a common output line 332; alternatively, it may work through a first flip-flop 333 and a second gate 334 to the output line 332, the flip-flop 333 dividing by 2 to make the resulting signal half the original frequency. Finally, the output of the oscillator 330 may be passed through the flip-flop 333 and a second flip-flop 335, thence through a third gate 336 to the line 332, the resultant signals being one-quarter the frequency of the oscillator frequency. The gates 331, 334 and 336 may be selectively opened to determine the frequency of the master pulses supplied by the master clock 134. The purpose of this and how it is accomplished will be made clear at a later point. For the present, it may be assumed that there is a constant stream of master pulses at a frequency of 160 kc. passed through a normally open gate 337 to a buffer amplifier 338.

At this point, the master pulses generated by the master clock are divided into a plurality of streams having identical frequency and constant phase relation. This is done in the present instance by so constructing the buffer amplifier 338 that is supplies negative going pulses directly to the reference scaling chain 310 and to the add-delete circuits 321–325 over the lines 321b–325b, respectively. The buffer amplifier also supplies the same or synchronized positive going pulses over the lines 316a–320a connecting with the respective chronizers 316–320, and the positive going master pulses are also simultaneously applied to lines 321a–325a to the respective add-delete circuits 321–325.

*Reference scaling channel*

The reference scaling channel is essentially a device which receives a stream of recurring pulses and divides by 800. For this purpose it includes three tandemly connected flip-flops forming an octal unit 310a connected in tandem with two decade scaling units 310b, 310c. If the stream of master pulses supplied to the input have a frequency of 160 kc., carry output pulses appearing on an output line 340 are thus divided in frequency by 800 and appear as a square wave with a frequency of 200 c.p.s. Thus, under normal circumstances, the reference output terminal marked R at the lower right of FIG. 22B will have a 200 cycle square wave signal thereon. In addition to taking an output signal over the line 340 from the decade unit 310c, an additional decade scaling unit 310d is connected in tandem with the others. The output of pulses from this last decade unit thus normally have a frequency of 20 cycles per second. This latter signal is used to actuate a coarse indicator as will be described below. Moreover, the reference scaling channel 310 cooperates with a visual indicator circuitry illustrated by FIGS. 22C and 22D. The specific manner in which the octal unit 310a and the decade units 310b, 310c, and 310d count and cooperate with this visual indicator will be taken up at a later point.

*The axis scaling channels*

Because the chronizers, add-delete circuits and scaling dividers may be identical for each of the five control channels in the decoder 132, only the A channel has been fully illustrated in FIG. 22A and it will suffice to describe that one channel in detail. The remaining channels have been shown in outline form only and it will be understood that they correspond to the A channel which is more fully illustrated.

The axis scaling channels 311–315 are identical in every respect with the reference scaling channel 310. As shown for the A axis channel, each comprises an octal unit 311a of three flip-flops, which divides by eight, connected in tandem with two decade units 311b, 311c. If input signals of 160 kc. are supplied to these axis scaling channels, 200 cycle signals will appear on the respective A, B, C, D and E axis output lines 341, 342, 343, 344, and 345. However, the master clock pulse stream is modified by the chronizers and add-delete circuits in accordance with the arrival of command pulses from the magnetic system as will be described below. Each of the axis scaling channels also has a third decade unit 311d connected in tandem with the others to provide a further division by ten. Outputs from the third decade would be at 20 cycles per second if the original input pulses supplied to the channel have the frequency of 160 kc.

*Chronizers*

Referring to the chronizer 316, it will be seen that command pulses from the A output line of the magnetic storage system are supplied to "set" a flip-flop 350 which, in turn, will open a gate 351. Master pulses from the master clock 134 are fed to the gate 351 over the line 316a so that when the gate is open it will transmit one of these pulses through delay means 352, to an output line 353. Pulses appearing on the output line 353 are also fed back over a line 354 to "re-set" the flip-flop 350, thereby reclosing the gate 351.

As a result a command pulse is made to select one and only one of the master pulses by the operation of the flip-flop 350 so that the gate 351 is immediately opened and remains open until the next master pulse arrives. With that arrival, the master pulse is delayed by the delay means 352 for a predetermined time interval so that it becomes a "chronized" pulse, spaced in time between two other master pulses. Only one master pulse can be so "chronized" for each command pulse since a master pulse which has been selected and spaced apart from the others is returned to reset the flip-flop 350 and close the gate 351. The chronizer 316 thus makes certain that there is one output pulse therefrom for each command pulse received from the magnetic system, that output pulse being positively spaced apart in time from other master pulses.

*Add-delete circuits*

The function of the add-delete circuits 321–325 is to take the chronized pulses from the associated chronizer and to cause the addition or subtraction of one pulse from the corresponding stream of master pulses for each such chronized pulse received.

Referring to the add-delete circuit 321, master pulses appearing on the line 321a are normally transmitted through a normally open gate 361 to an output line 358 leading to the A axis scaling channel 311. Chronized pulses appearing on the line 353 are fed as input signals to an "add" gate 356 and a subtract or "delete" gate 357. These gates are oppositely controlled, i.e., one is open and the other is closed according to control potentials applied to terminals 321c, 321d. If the gate 356 is open, and the gate 357 closed, then chronized pulses will pass directly through the gate 357 to the output line 358 and the scaling channel 311. It will thus be apparent that the input to the scaling channel 311 will be a stream of pulses similar to the input of master pulses supplied to the channel 310, except that the stream of pulses to the channel 311 will contain one additional pulse for each command pulse that has been received from the magnetic system.

On the other hand, if the gate 356 is closed and the gate 357 is open, chronized pulses appearing on the line 353 will pass through the gate 357 to "set" a flip-flop 359. The flip-flop will, after a short time interval occasioned by a delay means 360, close the normally open gate 361 so that the next master pulse arriving on the line 321a cannot pass through to the output line 359. However, that same master pulse appearing on the line 321b is routed to the flip-flop 359 to "re-set" the latter. Then, after a short delay occasioned by the delay means 360, the gate 361 will be re-opened so that command pulses appearing on the line 321a then continue to pass to the output line 358. It will, therefore, be seen that when the gate 357 is open (and the gate 356 closed), the add-delete circuit 321 causes one master pulse to be deleted from the stream of pulses supplied to the scaling channel 311 for each chronized pulse which occurs in response to a command pulse.

The derivation of potentials applied to the terminals 321d and 321c for thus determining whether the circuit 321 adds or deletes, will be made clear below. It will be understood that similar control potentials are applied to the terminals 322c–325c and 322d–325d to control the add-delete circuits 322–325 for the other four axis channels. When the add-delete circuits cause chronized pulses to be added to command pulses, the distance information being processed is in a positive direction, and when the add-delete circuits cause deletion of pulses from the master stream, the information being processed is in a negative direction.

*Summary of operation*

From the foregoing, it will be clear that the reference scaling channel 310 and the five axis scaling channels 311–315 receive streams of master pulses from the clock 134. The streams applied to the respective axis scaling channels, however, have one pulse added to or deleted therefrom for each of the uniformly spaced command pulses which are received from the corresponding axis portion of the magnetic system. The inputs to the respective axis scaling channels are, in effect, "frequency modulated" by the frequency of arrival of the command pulses.

Since each of the scaling channels time-divides by 800, the cyclically recurring signals appearing on the decoder output lines 341–345 are phase-modulated with respect to the reference signal appearing on the output line 340. If the master pulse stream has a frequency of 160 kc. the output reference signal will be a square wave at 200 c.p.s., and the output of an axis scaling channel will be substantially 200 c.p.s. but shifted in phase a predetermined amount for each command pulse received. In the present instance, where the channel scalers divide by 800, the output of an axis scaler will shift 360° in phase for each 800 command pulses received, or 0.45° for each command pulse. This is such a rapid, small change that the axis scaling channel output signals appearing on the output lines 341–345 are in the form of substantially smoothly phase-modulated analogue signals when taken relative to the reference signal appearing on the line 340. Yet, because they contain step changes in phase of 0.45°, they may be aptly termed "quantized analogue" signals.

The six output lines carrying the reference and phase-modulated analogue axis signals connect to the magnetic recorder 96. As shown in FIG. 24, the six output lines from the decoder 132 connect respectively, through suitable amplifiers, to six recording heads 360r and 360a–360e disposed opposite parallel tracks on the magnetic tape 95. The tape 95 is traversed between a supply reel 361 and a take-up reel 362 by means of drive capstans 364 rotated by a suitable three-speed motor 365. The motor is energized at full-speed, one-half speed or one-quarter speed from a suitable voltage source by means of an array of relay contacts which will be described at a later point. As the magnetic tape 95 travels past the recording heads 360r and 360a–e, therefore, the reference signal and the five phase-modulate analogue axis signals are permanently recorded thereon in the form of residual flux patterns along separate tracks.

The manner in which those recorded analogue signals are subsequently utilized will be explained at a later point.

SIGN CONTROL AND REVERSAL

As mentioned above, the add-delete circuits 321–325 add or delete one master pulse, for each command pulse, supplied to the corresponding axis portion of the decoder 132. If addition takes place, the phase of the output signal for the corresponding axis portion shifts in a positive direction, and vice versa.

To control the potentials of the terminals 321c–325c and 321d–325d which, as previously explained, determine whether adding or deletion of master pulses occurs, means responsive to the read-out of sign information from the magnetic system 125 are provided. But beyond that, provision is made to enable the signs to be "reversed" for any axis of control so that motion oppositely symmetrical to that originally programmed may be produced at the machine tool.

The sign information handling circuitry 133 (FIG. 6) is diagrammatically shown in block form by FIG. 25. The five input terminals A–E at the left of FIG. 25 are connected to corresponding ones of the sign information output terminals A–E of the magnetic system shown at the left of FIG. 12C. Since all of the axis channels 133A–E in the sign control circuitry 133 are identical, a description of the A axis channel will suffice for all. And, for the moment, the routing circuitry 131 (for axis selection) will be disregarded, it being assumed that sign information appearing at the five input terminals passes directly to the corresponding sign controlling channels.

Figure 12C:
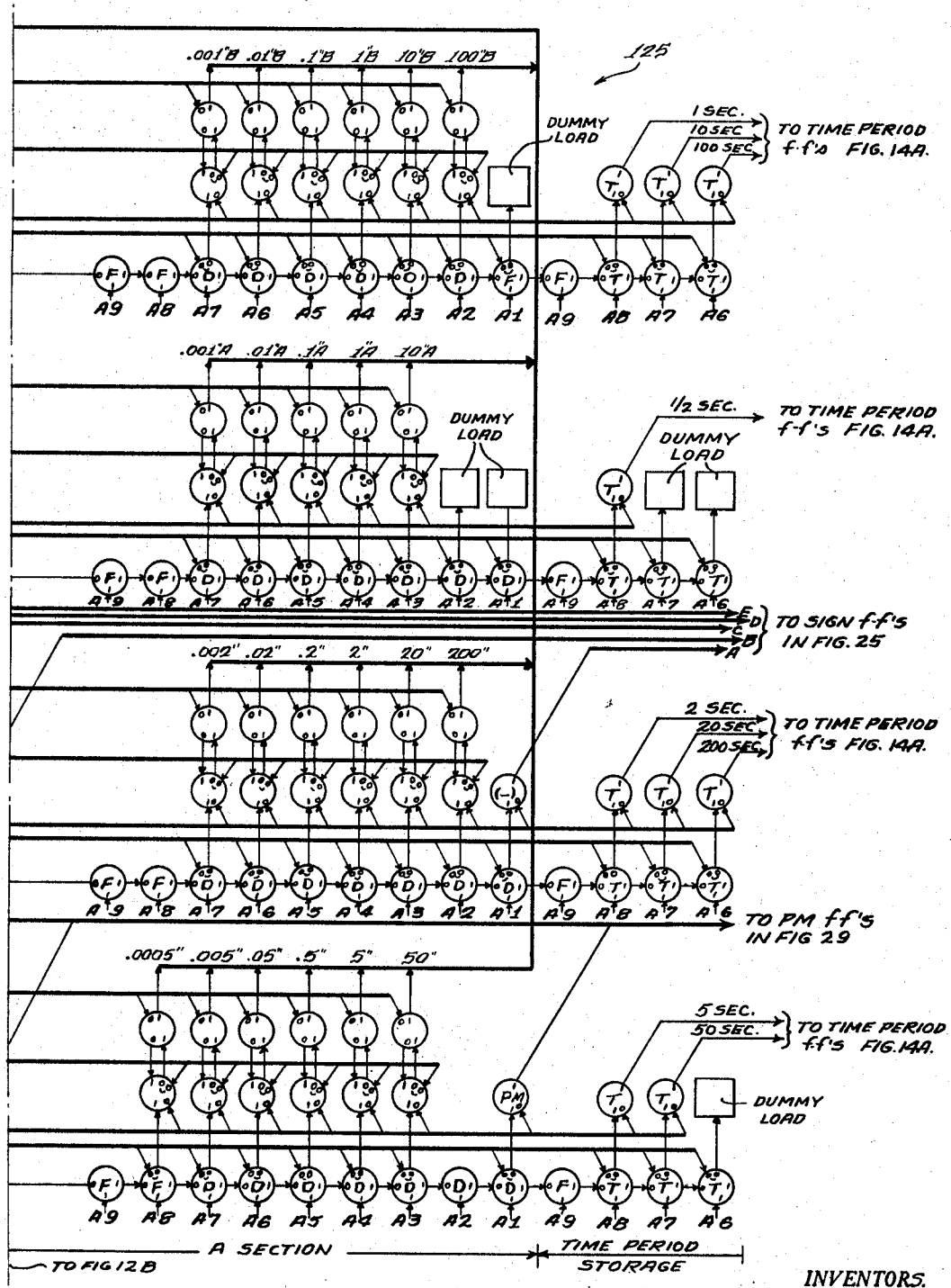

As shown in FIG. 25, the A axis sign channel includes a flip-flop 367 which receives a pulse on its "reset" terminal each time that negative or M sign information is dumped from the shifting register into the associated storage cores (FIGS. 12A–C). Also, a "set" line 366 (common to all of the flip-flops in the several sign channels) connects to the terminal 265 (FIG. 14C) so that each transfer pulse from the frequency divider 129 is effective to set the flip-flop 367 to the "1" state. Thus, as the processing of each block of information is completed by the frequency divider 129, the flip-flop 367 is set to the "1" state. When the next block of information is dumped from the shifting register to the storage register in the magnetic system, a pulse will be supplied to re-set the flip-flop 367 to the "0" state if the sign information for the corresponding axis then in the magnetic system is a binary "1," indicating that distance of movement is to be in a negative direction. On the other hand, if the sign information contained in the corresponding axis portion of the magnetic system is a binary "0," no output pulse to the flip-flop 365 will occur upon dumping, and the latter will be left in the "1" state to which it was set by the preceding transfer pulse. Summarized, when the flip-flop 367 is in the "1" state, it indicates that sign information is positive; and when it is in the "0" state, it indicates that sign information is negative.

The two output terminals of the flip-flop 367 connect as input terminals to two respective gates 368 and 369. Since the outputs of these gates are connected in parallel, it would be helpful for the moment to assume that the gate 369 is permanently cut off by a control signal applied thereto while the gate 368 is conductive or non-conductive according to whether it receives a relatively high or low potential from the flip-flop 367.

This being the case, when the flip-flop is in the "1" state, indicating that sign information is to be in a positive direction, a relatively high potential will appear on the gate output line 370. Accordingly, the terminal 321c will be at a relatively high potential, and the terminal 321d will be at a relatively low potential owing to the effect of an inverter 371.

Under these conditions, recalling previous description of the add-delete circuit 321 (FIG. 22A), the gate 356 will be open, and the gate 357 closed so that pulses are added to the master pulse stream supplied to the A axis scaling channel 311.

Conversely, when the flip-flop 367 (FIG. 25) is in the "0" state, indicating that direction of movement is to be negative, the gate 368 will supply a relatively low output potential to the line 370. Therefore, the terminal 321c will be a relatively low potential, and the terminal 321d at a relatively high potential, causing the gate 357 to be open, and the gate 356 to be closed in FIG. 22A, so that pulses are deleted from the master pulse stream applied to the A axis scaling channel 311.

Associated with the A axis sign control channel 133A is a sign contact network 372 which, as shown in FIG. 25, supplies controlling potentials to the gates 368, 369 and, under certain circumstances, supplies potentials directly to the output terminals 321c, 321d.

The sign contact network 372 makes possible the selective reversal of the sign potentials appearing at the terminals 321c, 321d from the potentials which they would have if the sign information from the magnetic system were employed in the usual sense. This permits "reversal" of the motion along the A axis of control. Moreover, the sign contact network 372 cooperates with the manual clock 146 so that artificial pulses from the latter insert artificial distance information into the decoder with a desired sense.

The sign controlling channel 133A shown in FIG. 25 is illustrated in more detail by FIG. 26; and controls for selective reversal are schematically illustrated in FIG. 27. Referring for the present to FIG. 27, it will be seen that the five push button switches 90a–90e which are physically located on the director panel (FIG. 4), are respectively connected in series with the coils of two-station stepping switches SSA–SSE, respectively. These stepping switches are of a well-known type, having a plurality of contacts which are set to one condition each time that the associated push button switch is momentarily closed, and then being set to the opposite condition the next time that the associated push button switch is momentarily closed. For convenience, these two conditions of the respective stepping switches SSA–SSE may be referred to as the "normal" and the "reverse" conditions and the contacts controlled thereby are illustrated in the "normal" condition.

As shown in FIG. 27, a plurality of pilot lamps 375a–375e are connected across a suitable voltage source through the respective stepping switch contacts SSA–SSE. Each of these contacts is closed when the corresponding stepping switch is in the "reversed" condition so that the associated pilot lamp, which may be mounted on the director panel, is lighted to show an attendant which of the axes are set for oppositely symmetrical machining in relation to the programmed information.

Referring to FIG. 26, the organization of the sign-controlling channel 133A and its cooperation with sign reversal means may now be described in more detail. It will be seen that a transfer pulse appearing on the input terminal 378 of the flip-flop 367 will set the latter to the "1" state so that the output terminal 379 will be at a relatively high potential (0 volts) while the output terminals 380 will be at a relatively low potential (−15 volts). Conversely, when a negative pulse read-out from the sign storage cores of the magnetic system is applied to the input terminal 381, the flip-flop 367 will be reset to the "0" state, making the output terminal 379 relatively low in potential (−15 volts) and the output terminal 380 relatively high in potential (0 volts). The two output terminals 379, 380 connect respectively to the control grids 369a and 368a of the gates 368, 369. Second control grids 368b and 369b of the two gates 368, 369 are connected to ground through normally closed stepping switch contacts SSA1 and normally open contacts SSA2, respectively. These second control grids are likewise connected to a −15 volt bias source through resistors 381, 382, respectively.

Thus, when the stepping switch SSA is in the "normal" condition, the contacts SSA1 will hold the control grid 368b at a relatively high potential (0 volts), making the gate 368 conductive or cut-off according to whether a high or low potential is received from the flip-flop output terminal 380. However, since the contacts SSA2 will be open, the control grid 369b will be biased below cut-off by virtue of its connection to the −15 volt bias potential, so that potential changes at the flip-flop output terminal 379 appearing on the second control grid 369a will have no effect upon the conduction of the gate 369. It remains permanently cut off as long as the stepping switch SSA is in the "normal" state.

Since the output terminal 380 is at high and low potentials when the flip-flop 365 is in the "0" and "1" states (indicative of positive and negative directions), the gate 368 under these conditions will be conductive when the flip-flop is in the "0" state, and non-conductive when it is in the "1" state.

The plates of the two gates 368, 369 are connected through common load resistors 384, 385 and a switch contact 386 to a positive 250 volt source. The switch 386 is positioned according to the rotational position of the manual clock control knob: for the present it will be assumed that the switch 386 occupies the position shown, shorting out an additional load resistor 387.

Since the gate 368 is cut off when the flip-flop is in that state indicating positive direction, its output line 368 will at that time have a relatively high potential. Similarly, when the gate 368 is conducting due to the flip-flop 368 being in the state indicating a negative direction of movement, the line 388 will be at a relatively low potential. The potential appearing on the line 388 is transferred directly through an isolating diode network 389 to the output terminal 321c, while it is also supplied to the grid of the inverter tube 371 having an output line 390 leading through an isolating diode network 391 to the sign terminal 321d. Whenever the flip-flop 367 is set to the "1" state indicating a positive direction of motion, the terminal 321c is at a relatively high potential and the terminal 321d at a relatively low potential; conversely, when the flip-flop 365 is in the "0" state indicating that direction of traversal is to be negative, the terminal 321c is at a relatively low potential and the terminal 321d is at a relatively high potential. This thus properly controls the gates 356 and 357 in the add-delete circuit 321 shown in FIG. 22A according to sign information supplied from the magnetic system.

Now, when sign reversal along the A axis is desired, the push button 90a is momentarily depressed to set the stepping switch SSA to the "reversed" state. The SSA7 contacts will be closed to energize the pilot lamp 375a, the contacts SSA2 will close to hold the control grid 369b at a relatively high potential (0 volts), and the contacts SSA1 will be opened thus permitting the resistor 381 to bias the control grid 368b below cut-off. Because the other control grid 369a of the gate 369 is connected to the output terminal 379 of the flip-flop 367, the gate 369 will not be conductive when the flip-flop 365 is in the "1" state, and will be cut off when the flip-flop is in the "0" state. Accordingly, the potential appearing on the gate output line 388 will be relatively high when the flip-flop is in the "0" state and will be relatively low when the flip-flop is in the "1" state. Since the potential appearing at the line 388 is reflected at the terminal 321c and is inverted by the inverter 371 to appear in an opposite sense at the terminal 321d, these two terminals will be respectively low and high in potential when the flip-flop 367 is set to the "1" state by a transfer pulse. Thus even though the sign information from the magnetic system dictates that direction of movement is to be positive, the potentials appearing at the terminals 321c and 321d will be "reversed" causing the add-delete circuitry 321 to delete pulses from the master pulse train. On the other hand, when the flip-flop 365 is in the "0" state as a result of a negative information pulse received from the magnetic system, the potentials of the output terminals 321c and 321d will be respectively high and low. Accordingly, the add-delete circuit will operate to add pulses to the master clock pulse train. The sense or direction of the information will thus be "reversed" from that originally programmed. It will be understood that the sign controlling channel 133a containing contacts controlled by the stepping switch SSA is duplicated for each of the five axes of control and that contacts controlled by the stepping switches SSB–SSE are employed in respective ones of those duplicate sign-controlling channels.

The operation of the sign-controlling channel 133a whenever the manual clock 146 is operated will be described below in connection with the manual clock.

MANUAL CLOCK AND AXIS SELECTION

In many instances it will be desirable for the director attendant to manually or artificially insert distance information of either a positive or negative sense into the five axis channels of the decoder 132. This is particularly helpful when the director is first put into operation because the flip-flops in the scaling channels of the decoder may randomly assume different states. By inserting information artificially, the states of the several axis scaling channels, relative to the reference scaling channel, may be set to a "zero" condition, or may be set to represent any desired initial coordinate along a given axis of control as a starting point. Moreover, if the director is shut down part way through a complete machining operation and the power turned off, when operation is resumed, the states of decoder flip-flops may be returned to the states which they had just prior to the shutdown.

For this purpose, an artificial command pulse source or a "manual clock" 146 is employed as shown at the upper left in FIG. 22A. This manual clock includes three sources of pulses at respectively different frequencies, here shown as a multivibrator 400 operating at 2 cycles per second, a second multivibrator 401 having a frequency of 16 cycles per second, and a blocking oscillator 402 having a frequency of 1600 cycles per second. These three pulse sources lead to a common output line 404 and since one of the three sources may be selectively rendered operative, the manual clock pulses on that output line may have any one of three frequencies, permitting the command pulses to be supplied at a high rate when artificial distances to be inserted are great, and at successively slower rates as the final stopping point is approached. For the purpose of selectively rendering the three pulse sources 400, 401 and 402 operative, a supply voltage is selectively connected to each of them through a multi-position rotary switch 405 mounted on a shaft 406 connected with the manual clock control knob 92 (FIG. 4) appearing on the director panel. With the switch 405 centered, none of the three manual clock pulse sources is operative; while with the switch turned one, two or three steps in either direction from the center position, the three sources 400, 401 or 402 are selectively supplied with a 250 volt operating potential which causes them to produce output pulses on the line 404.

Manual clock pulses are selectively routed to one of the five chronizers 316–320 by selectively opening a corresponding one of five gates 405a–405e (FIG. 22A). Assuming for the moment that the gate 405a is open, then manual clock pulses will pass directly to the input of the chronizer 316 where they will appear as "artificial" command pulses and produce the same effect within the A axis channel of the decoder as if command pulses were being received from the magnetic system.

To selectively control the gates 405a–405e so that command clock pulses will be routed to the desired one of the axis decoder channels, the switches 91a–91e (appearing on the director panel, FIG. 4) may be connected in circuit with the coils of respective control relays R163–R167 as shown in FIG. 23. Preferably, interlock means (not shown) are provided to prevent the energization of more than one of the relays R163–R167 at a time. The relays R163–R167 have corresponding normally open contacts R163c–R167c, respectively connected between ground and the controlling input terminal of the gates 405a–405e. Therefore, if the switch 91c is closed, energizing the relay R165 and closing the contacts R165c, the gate 405c will open and permit command clock pulses appearing on the line 404 to pass to the input of the chronizer 318 of the C axis channel. Through the use of the routing gates 405a–405e and the axis-select switches 91a–91e controlling the relays R163–R167, a single source of artificial command pulses, i.e., a single manual clock 146 may be employed to insert artificial distance information into any one of the five decoder channels.

In order to control the sense of the artificial distance information inserted into one of the decoder channels by the manual clock 146, controls operated in response to the manual clock control appear also in the sign controlling channels 133a–133e as shown by way of example in FIG. 26 for the channel 133a. First, the switch 386 connected in the voltage supply line for the gates 368, 369 is ganged on the manual clock control shaft 406 so that whenever the control knob is turned from its central position, the relatively high resistance 387 will be interposed between the plates and the 250 volt source. This, in effect, renders the gates 368, 369 inoperative causing a substantially constant and low potential to appear on the lines 383 and 390 even though the flip-flop 367 changes states. Thus, when the manual clock 146 is being used, the conventional sign-controlling circuitry is rendered ineffectual.

Also, the shaft 406 carries a third rotatable contact 408 which in the centered position leaves both the lines 409, 410 ungrounded. However, when the control knob and the shaft 406 for the manual clock 146 are turned to the right (a positive direction) the switch wiper 408 grounds the line 409. Conversely, when the control knob for the manual switch is turned to the left and to any of its three positions, the like 410 is grounded.

Now assuming that the stepping switch SSA is in its "normal" condition, grounding of the line 409 will, through the normally closed contacts SSA3 and the normally open contacts R163a (which will be closed), create a conduction path through the diode network 389 to the output terminal 321d at a relatively high potential (0 volts) on the output terminal 321c. Conversely, since at this time no current flows through the diode network 391, the output terminal 321d will be held at a relatively low potential (−15 volts) by the resistor 411. Therefore, when the manual clock 146 is in use and its control knob turned to the right, the sign-controlling potential supplied to the add-delete circuit associated with the selected axis will be conditioned to cause the manual clock pulses to be added and, in effect, result in artificial distance information in a positive sense.

Conversely, if the manual clock control knob is turned to the left, the line 410 will be grounded, creating a conduction path from ground through the normally closed stepping switch contacts SSA6 and the contacts R163b (which will be closed) to the diode network 391, placing the output terminal 321d at a relatively high potential (0 volts). Since no conduction path from group is supplied over the line 400 to the diode matrix 389, the resistor 412 holds the output terminal 321c at a relatively low potential (−15 volts). Accordingly, the manual clock pulses will be processed in the associated add-delete circuit so that the artificial distance inserted into the decoder scaling channel will be in a negative sense.

At this point, it may be observed that the two contacts R163a, R163b shown in FIG. 26 prevent the switch 408 from having any effect on the sign-controlling circuitry unless the axis-select switch 91a for the corresponding axis channel has been closed to energize the relay R163.

Now if the stepping switch SSA has been set to its "reverse" state, then the contacts SSA3, SSA6 will be open and the contacts SSA4, SSA5 will be closed. Under these conditions, the control of the sign of manually inserted distance information is simply "reversed" from that previously described. For, under these circumstances, turning the shaft 406 to the right will result in a conduction path from ground to the diode matrix 391; and turning the shaft 408 to the left will result in a conduction path from ground to the diode matrix 389. Therefore, when the axis reversal means have been set to reverse the sign of a given axis of control, turning the manual clock control knob in a positive direction results in distance information being inserted artificially in a negative sense, and vice versa.

The manual clock 134 and the function which it and the associated control circuitry performs, is particularly advantageous in combination with visual indicators associated with the decoder. For by using the manual clock and observing the visual indicators, an attendant may know at any instant the relative states of a selected axis channel in the decoder and the reference channel. It is thus possible for him to quickly and conveniently set any of the axis scaling channel flip-flops in the decoder to a desired state or starting point.

VISUAL INDICATORS

The present system may be used advantageously with the director remotely located from machine tool or tools which the processed information is to control. This is possible by virtue of the fact that the analogue signals provided from the director are permanently recorded on means such as a magnetic tape which may be duplicated, stored, and shipped to the sites of machine tools scattered over the nation. Because a machine tool is neither in proximity to nor directly controlled from the director, it is not possible for an attendant to observe the position of the cutter at any instant during the progress of processing to determine if the original programming and operation of the data processing equipment are proper and accurate. It is, of course, possible to provide a number of automatic logical checking circuits within the director which will indicate a component failure. However, such automatic checking circuits to provide complete reliability would have to be elaborate, complex and expensive. And they would still not detect errors in programming which might appear in the punched tape.

In order to make possible visual checking of the director operation from time to time, it is here proposed to provide means to indicate numerically the position which the machine tool cutter would have if the machine tool were being directly controlled from the analogue signals as the director functions. This is most important as it reveals any errors in either programming or director operation and permits them to be corrected before a machining operation actually begins. Ruined workpieces and undue delays are thus avoided.

A final check of any complete operation is possible by programming a closed path of movement for the cutter. If the visual indicators have the same reading at the finish as at the start of the data processing, there is assurance that both the programming and the director's operation have been complete and accurate.

Fine indicator

As previously explained, each time one of the axis scaling channels, including the third decade unit 311c, as shown for the scaling channel 311 in FIG. 22B, receives 8,000 command pulses, the phase of its recurring output signal shifts 360° relative to the phase of the reference channel output signal. Since each command pulse represents .000125 inch, the phase of the axis output signal, or the instantaneous condition of an axis scaler relative to the reference scaler, is a measure of the distance processed to the nearest .000125″ up to .999875″. The 8,000th command pulse restores the axis channel to the phase which it originally had relative to the reference channel signal.

In order to provide one means for indicating the distances processed by each of the axis scaling channels, the reference scaling channel is sensed as to the instantaneous states of the several flip-flops therein at the instant that a selected one of the axis scaling channels resets to an empty state, i.e., with all of the flip-flops in the "0" state. That is, the contents of the reference scaling channel are sensed and displayed when a carry output pulse appears from the last flip-flop in the selected axis scaling chain.

Before proceeding with a more detailed description of the visual indicator circuitry, it will be helpful to observe the manner in which the decade units within all of the decoder scaling channels "count." Referring first to the decade unit 310d for the reference channel 310 (FIG. 22B), it will be seen that there are pulse feedback connections from fourth flip-flop to both the second and third flip-flops so that upon the occurrence of a carry output pulse from the fourth flip-flop, the second and third flip-flops are reset to the "1" state. The last decade unit 310d thus repeatedly counts for each ten input pulses supplied thereto as follows:

| Input pulses. | FF States |
| --- | --- |
| 0 | 0110 |
| 1 | 1110 |
| 2 | 0001 |
| 3 | 1001 |
| 4 | 0101 |
| 5 | 1101 |
| 6 | 0011 |
| 7 | 1011 |
| 8 | 0111 |
| 9 | 1111 |
| 10 | 0110 |

The other two decade units 310b and 310c in the reference scaling channel 310, count in still a different manner. As shown, these two decade scaling units have feedback connections from the third flip-flop to the first and second flip-flops, so that a carry output pulse from the third flip-flop not only switches the fourth flip-flop, but also resets the first and second flip-flops to the "1" state. The decade scaling units 310b and 310c, therefore, count in the following fashion for each 10 consecutive pulses that are supplied thereto:

| Input pulses. | FF States |
| --- | --- |
| 0 | 1100 |
| 1 | 0010 |
| 2 | 1010 |
| 3 | 0110 |
| 4 | 1110 |
| 5 | 1101 |
| 6 | 0011 |
| 7 | 1011 |
| 8 | 0111 |
| 9 | 1111 |
| 10 | 1100 |

By way of illustration, therefore, if the four flip-flops in the decade scaling unit 310c are (reading from left to right) respectively in the "1," "0," "1," and "0" states, that decade unit may be said to hold the decimal digit 2, or it may be said to be in a state indicating that it has received an integral multiple of ten input pulses plus two additional input pulses.

Referring now to FIG. 22C and FIG. 22D (which join together and to FIG. 22B), it will be seen that there are four diode matrices 420, 421, 422, and 423. The first three of these each have eight input lines which connect respectively with the eight output terminals for the four flip-flops in the respective decade scaling units 310d, 310c and 310b in the reference scaling channel of the decoder. The fourth diode matrix 423 has four input lines which connect to four of the six output terminals of the three flip-flops in the octal unit 310a of the reference scaling channel.

The organization of the diode matrices 420–423 need not be described in detail since it will be apparent from the drawings. It will suffice to note that the matrix 420, for example, has ten output lines connected through resistors 425 to a positive voltage source, and also connected by different combinations of uni-directionally conductive diodes to different ones of the eight input lines. When a given input line is at a relatively low potential (e.g. −15 volts) then current will flow from any of the ten output lines which is connected thereto by means of a diode. When this current flows, it creates a voltage drop across the associated one of the resistors 425, making the potential on that output line relatively low. However, if no current flows through the resistor 425 for a particular one of the ten output lines, then that output line will be at a relatively high potential.

It will be recalled from the previous description of exemplary flip-flop circuits in FIGS. 16 and 17 that when the output terminal at the right side thereof is at a high potential, and the output terminal at the left side at a low potential, that flip-flop is said to be in the "1" state. In the "0" state the potentials of the two output terminals are reversed. With this in mind, a moment's study will reveal that when the four flip-flops in the decade unit 310d are in a given condition to represent a decimal count or digit, according to the table given above, then the potential on nine of the output lines of the matrix 420 will be relatively low, while the potential on that particular output line which corresponds to the decimal digit held by the decade unit will be relatively high. Viewed in this sense, therefore, the matrix 420 simply converts the binary representation of the decade unit 310d into absolute decimal form.

It will be understood that the diode matrices 421 and 422 operate in substantially the same manner. As the decade units 310b and 310a change their respective states upon receiving successive ones of ten input pulses, a particular one of the ten output lines of these matrices will be left positive in potential, corresponding to the decimal representation of the decade unit state. All of the other output lines will be relatively low in potential.

The three flip-flops in the octal scaling unit 311a count conventionally in binary fashion for each eight input pulses supplied thereto. The states of these three flip-flops are as follows after each integral multiple of eight pulses plus an additional number of pulses up to eight have been received:

Input pulses:                                  FF states
   0 ---------------------------------------- 000
   1 ---------------------------------------- 100
   2 ---------------------------------------- 010
   3 ---------------------------------------- 110
   4 ---------------------------------------- 001
   5 ---------------------------------------- 101
   6 ---------------------------------------- 011
   7 ---------------------------------------- 111

With the output terminals of the three flop-flops in the octal unit 311a connected to the four input lines of the diode matrix 423 as shown in FIGS. 22B and 22C, (recalling that the left and right output terminals of a flip-flop are respectively high and low in potential when it is in the "0" state), it will be seen that the "0" output line of the matrix 423 is at a high potential only when the octal unit represents the decimal digit "zero." It will also be seen that the "5" output line of the matrix 423 is at a high potential only when the condition of the octal unit 311d stores or represents the decimal digit "4." Thus, the diode matrix 423 provides on its two output lines potentials which signify the alternate reception of multiples of four input pulses, and since four input pulses correspond to .0005 inch, they indicate the distance information received to the nearest half-thousandths of an inch.

The ten output lines of the diode matrix 420 connect to the first control grids of ten respective double-grid thyratrons 428 which have their plates connected respectively in series with ten display lamps 429, and thence through a common gate tube 430 (normally conductive) to a positive voltage source. Likewise, the ten output lines of the diode matrix 421 are connected to the first control grids of ten corresponding double-grid thyratrons 431 having their plates connected through corresponding ones of ten display lamps 432 and thence through a common gate tube 434 to a positive voltage source. Further, the ten output lines of the diode matrix 422 are connected to the first grids of ten corresponding double-grid thyratrons 435 having their plates connected through corresponding ones of ten indicator lamps 436 and thence through a common gate tube 437. Finally, the two output lines of the diode matrix 423 lead to the first control grids of two corresponding double-grid thyratrons 438 having their plates connected through corresponding ones of two display lamps 439 and thence through a common gate tube 440 to a positive voltage source.

The second grids of all of the thyratrons 428, 431, 435 and 438 are connected to a common line 441. Thus, if all of the thyratrons are initially extinguished, when a positive potential appears on the line 441, a given one in each group of thyratrons 428, 431, and 435 will fire according to which of the ten output lines of the respective matrices 420, 421 and 422 is at that instance at a relatively high potential. As a result, one out of each group of the ten indicator lamps 429, 432 and 436 will be energized indicating the decimal number which is at that time represented by the states of the respective decade units 310d, 310c, and 310b.

In order to properly time firing of thyratrons which are conditioned for conduction by each of the diode matrices so that the reference scaling channel is "sensed" at the proper instant to indicate the distance information which has been put into a selected one of the axis scaling channels 311–315, a plurality of logical "or" circuits 311e–315e are associated each with a corresponding one of the scaling channels. As shown in connection with the scaling channel 311 (FIG. 22B), each of these "or" circuits comprises a resistor connected from a positive voltage source to a corresponding one of five output lines 311f–315f. A diode is connected from the line 311f, for example, to the left output terminal of each of the last eight flip-flops in the associated scaling channels 311. If any one of the diodes in the "or" circuit receives a relatively low potential from the corresponding output terminal of the associated flip-flop, it conducts current and thus causes a voltage drop across the resistor which makes the potential on the output line relatively low. Thus, at the instant that the scaling channel 311 has received 7920 input pulses (and the last eight flip-flops are in the "1" state), all of the diodes will be rendered non-conductive and the output line 311f will rise to a relatively high potential. It will remain at this high potential until the scaling channel 311 receives a "full count" and the last eight flip-flops are switched to the "0" state. This variation in potential on the line 311f is illustrated by the graph I in FIG. 38. Because input pulses to the scaling channel 311 arrive at a rate in the order of 160 kc., the 80 pulses required to complete the full count after the potential on the output line 311f rises is on the order of 500 microseconds. In other words, when a carry pulse output appears from the last flip-flop in the scaling channel, all of the flip-flops in the channel are reset to the "0" state and this occurs some 500 microseconds after the potential on the output line 311f rises.

The five output lines 311f–315f connect to the input terminals of five corresponding gates 445–449 shown in FIG. 22D. These gates have their output terminals connected in parallel to a common line 450 and they are selectively opened by contacts R163d–R167d according to which the "axis select" relays R163–R167 (FIG. 23) is energized. By this manner, therefore, the fine visual indicator 151 is made to display the distance information received in any one of the five axis portions of the decoder 132. And, it will be apparent that since the relays R163–R167 control both the routing of command clock pulses and the connection of one of the lines 311f–315f to the line 450, the contents of the same decoder axis portion are displayed as that which receives manual clock pulses.

Assuming in the present instance that the relay contacts R163d are closed to select the A axis scaling channel 311, the gate 445 will be open and the potential variation appearing on the line 311f will pass therethrough to the output line 450. Since the gate 445 inverts the signal, the potential variation appearing on the line 450 is as shown by the graph II in FIG. 38. This potential variation is supplied to a gate generator or "pulse stretcher" 451 which thus produces, when the potential on the line 450 rises to its normal value, an extended negative pulse at its output terminal 452 which has the form shown by the graph III (FIG. 38). The terminal 452 connects to a corresponding control terminal of the gate 337 in FIG. 22A, momentarily closing that normally open gate to prevent master clock pulses from reaching the decoder. This assures that while the reference scaling channel is being sensed and different ones of the thyratrons fired according to the state thereof when a selected one of the axis scaling channels resets, no master clock pulses are arriving to cause an inaccurate indication.

The potential variation (graph II, FIG. 38) appearing on the common line 450 is also supplied to the grids of the normally conductive gate tubes 430, 434, 437, and 440. Therefore, approximately 500 microseconds before the selected axis scaling channel resets, the potential on these control grids will drop, rendering all of those gate tubes non-conductive, and thus extinguishing those of the thyratrons 428, 431, 435, and 438 which were previously conducting. Finally, the potential variation (graph II, FIG. 38) appearing on the line 450 is passed through a gate generator 453 which produces, at the instant the potential on the line 450 rises to its normal value, an extended, negative-going pulse as represented by the graph IV in FIG. 38. This is applied to the input of a buffer amplifier 454 which includes means for differentiating and clipping so that the negative-going drop in the output potential of the gate generator 453 produces no output from the buffer amplifier 454, but at the instant that the output of the gate generator rises to its normal value, the buffer amplifier produces a sharp positive-going pulse as illustrated by the graph V shown in FIG. 38. Therefore, after the originally conducting thyratrons have been extinguished by momentary cut-off of the gate tubes 430, 432, 437 and 440, and yet after those gate tubes have been again conditioned for conduction, a positive potential pulse is supplied by the buffer amplifier 454 to the line 441 and the second grids of all the thyratrons. Therefore, certain ones of the thyratrons will be fired according to the potentials received from the associated diode matrices and the states of the several flip-flops in the reference scaling channel 311. Once certain ones of the thyratrons have been fired, they will remain conducting until a negative-going signal is again applied to the gate tubes 430, 434, 437 and 440.

In summary, therefore, it will be seen that all of the thyratrons are "turned off" just before the selected axis scaling channel resets. Just after such resetting, further master pulses are prevented from reaching the decoder scaling channels. Then a positive pulse is supplied to the second grids of the thyratrons to fire those particular ones which are properly conditioned by the associated diode matrices. It will be seen that shortly after the positive pulse appears on the line 441 to "interrogate" the thyratrons, the potential output from the gate generator 452 rises to its normal value, thereby opening the gate 337 (FIG. 22A) so that command pulses are again supplied to the decoder.

From the foregoing, it will be apparent that one and only one of the ten lamps 429, one of the ten lamps 432, and one of the ten lamps 436 will be illuminated after each "interrogation" of the state of the reference scaling channel. The numerical indicia associated with the illuminated lamps will represent in tenths, hundredths, and thousandths, the amount of distance information which has at that instant been supplied to the selected one of the axis scaling channels by the command pulses arriving from the magnetic system or from the manual clock.

The two lamps 439 indicate distance to the nearest .005". Only when the reference scaling channel has received a multitple of four pulses will one of these lamps be lighted. Thus, if the "0" lamp is lighted it indicates that an even number of thousandths of inches have been read into the decoder, while the "5" lamp is lighted, it will indicated that 5/10,000 inch, in addition to the other distances, has been read into the selected axis scaling channel.

*Coarse indicators*

As mentioned above, the fine indicator 151 displays distance information only up to .9995 inch. As soon as the distance information input to the selected axis channel scaler reaches 1.0000 inch, then the fine indicator reads ".0000." In order to indicate inches as well as fractions of inches, reversible accumulators or coarse indicators are associated with each axis scaling channel in the decoder 132. Such coarse indicators are made responsive to recurring output signals from the respective axis scaling channels by the recognition here of the principle that each time the square wave output signal (nominally 20 c.p.s.) from the last flip-flop in that last decade unit of an axis scaling channel "laps" or "rolls over" 360° in phase relative to the square wave output signal (20 c.p.s.) from the last flip-flop in the reference scaling channel, there has been received distance information corresponding to one inch of movement.

For accumulating and displaying "coarse" distances which have been processed through each decoding axis channel, five mechanical dial type reversible counters are employed, together with associated circuitry responsive to signals from the decoder. All five of such coarse indicators receive carry output pulses from the reference scaling channel appearing on a terminal 460 (FIG. 22B). The five coarse indicators also receive positive-going and negative-going carry output pulses appearing on the terminals 461a and 461b, 462a and 462b, 463a and 463b, 464a and 464b, and 465a and 465b of the last flip-flops in the five respective axis scaling channels 311–315. The five dials 94a–94e for these five indicators are located on the director control panel as shown in FIG. 4.

Figure 39:
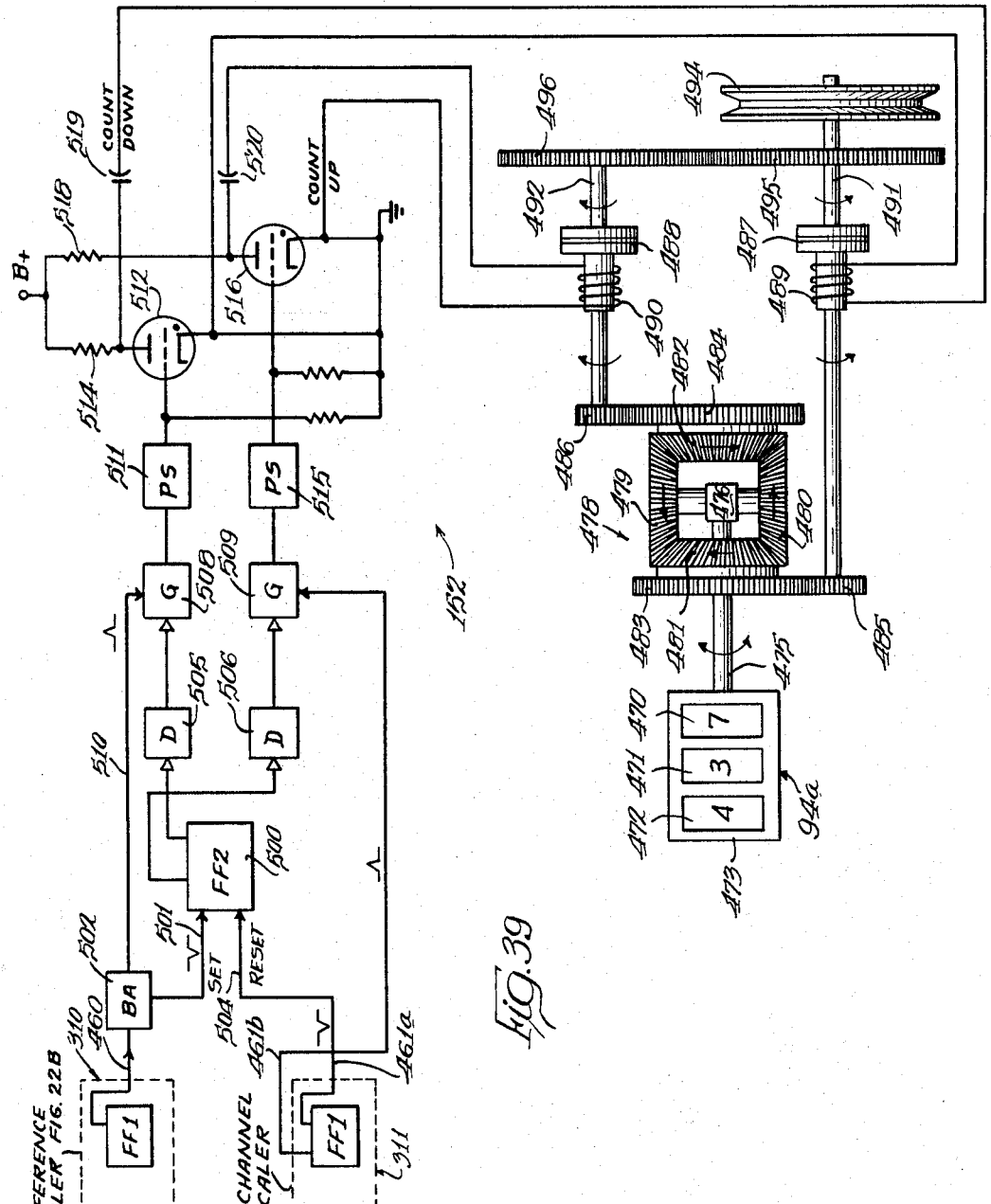
FIG. 39 is a block diagram of a coarse indicator control circuit for one axis together with a coarse indicator controlled thereby.

Because all of the coarse indicator mechanisms and circuits are alike, only the one for the A axis scaling channel is shown for illustrative purposes in FIG. 39. As schematically illustrated, the coarse indicator 152 indicates the distance on the dial 94a, which is simply a display of three rotatable wheels 470, 471, 472 carrying numerical indicia for the units, tens, and hundreds digits of a mechanical decimal counter 473. Rotation of the counter's input shaft 475 through one step in one direction or the other adds or subtracts one unit to or from the total number displayed.

To step the shaft 475 in one direction or the other, it is connected with the plant carrier 476 of a differential gear assembly 478 which comprises plant gears 479, 480 meshed with sun gears 481, 482 fixed with input gears 483, 484 respectively. The two input gears are meshed with pinions 485, 486 respectively coupled to normally disengaged "one revolution" electric clutches 487, 488 having coils 489, 490. Input shafts 491, 492 for the clutches 487, 488 are continuously driven, the first directly from a pulley 494 driven from a motor (not shown), and the second in the opposite direction to that of the first through meshing gears 495, 496.

A current pulse applied to the coil 489 will cause rotation of the pinion 485 through one revolution, turning the sun gear 481 a predetermined amount while the sun gear 482 remains stationary. Accordingly, the plant carrier 476 will be rotated one step in a first direction which causes subtraction of one unit from the total number displayed by the dial 94a. On the other hand, a current pulse applied to the clutch coil 490 will engage the clutch 488 and cause the pinion 486 to rotate through one revolution.

This will turn the sun gear 482 through one rotational step in the direction opposite to that which the sun gear 481 previously rotated. Accordingly, since the sun gear 481 is stationary at this time, the plant carrier 476 and the counter input shaft 475 will be turned through one rotational step in the opposite direction so as to add one unit to the total number displayed by the dial 94a.

In order to energize the clutch coils 489, 490 so that the dial 94a displays the algebraic sum of the distance in inches which has been processed through the A axis channel of the decoder, a flip-flop 500 has its "set" terminal 501 connected to receive negative-going carry output pulses, passed through a buffer amplifier 502, appearing on the terminal 460 of the last flip-flop in the reference scaling channel 310. The "reset" terminal 504 of the flip-flop 500 receives negative-going carry pulses from the last flip-flop in the A axis scaling channel 311 appearing on the terminal 461a. The two output terminals of the flip-flop 500 connect through delay means 505, 506 to the control input terminals of two corresponding gates 508, 509. Thus, as carry output pulses from the reference scaling channel 310 and A axis scaling channel 311 occur alternately, the flip-flop 500 will be successively set and reset, and will alternately open and close the two gates 508, 509.

The gate 508 receives positive-going reference channel carry output pulses over a line 510 which will, if the gate 508 is open, pass through a pulse shaping circuit 511 to the grid of a thyratron 512 having its plate connected through a charging resistor 514 to a positive voltage course. Moreover, the gate 509 receives from the other output terminal of the last flip-flop in the scaling chain 311 positive-going carry output pulses, coincident in time with the pulses appearing on the terminal 461a. If the gate 509 is open, these positive-going carry pulses will pass through the gate and a pulse shaping circuit 515 to the grid of a thyratron 516 having its plate connected through a charging resistor 518 to a positive voltage source. The clutch coil 489 is connected in series with a capacitor 519 directly across the thyratron 512, while the clutch coil 490 is similarly connected in series with a capacitor 520 across the thyratron 516. Thus, when the thyratrons are cut off, the capacitors 519, 520 will charge through the resistors 514, 519 to the value of the source voltage, but at a rate which will not cause the clutch coils to engage the clutches. The capacitors 519, 520 are chosen to be of the proper size to resonate with the corresponding clutch coils, so that when one of the associated thyratron fires, due to a positive pulse appearing on its grid, the capacitor will discharge through the thyratron and the clutch coil for one-half cycle of oscillation, the negative half cycle creating an inverse voltage across the thyratron which thus automatically extinguishes it. In this manner, a short pulse is supplied to one of the clutch coils 489, 490 each time that the associated thyratron is fired, but the thyratron is automatically extinguished due to the resonant oscillation arising in the clutch coil circuits.

For an understanding of the operation of the coarse indicator circuitry, assume that the flip-flop 500 is in the "0" state so that the gate 508 is closed and the gate 509 is open. A reference channel pulse then occurs, but it cannot pass through the gate 508. Appearing on the line 501, that reference channel carry pulse sets the flip-flop 500 to the "1" state, thus opening the gate 508 and closing the gate 509. Then, a carry output pulse from the scaling channel 311 occurs. It cannot pass through the gate 509, but in being applied to the line 504 it "resets" the flip-flop 500 to the "0" state and restores the gates 508, 509 to their original conditions. This operation repeats over and over as long as reference and axis scaling channel carry output pulses occur alternately. Neither of the thyratrons 512 or 516 is pulsed so that the clutch coils 489, 490 are not energized and the dial 94a remains unchanged.

However, if a 360° phase transition occurs between the output signals of the reference scaling 310 and the axis scaling channel 311, two reference carry pulses will occur in succession if the phase transition is in a negative direction, or two axis scaling channel carry pulses will occur in succession if the phase transition is in a positive direction.

In the first case, if two reference channel carry pulses occur in succession, the first sets the flip-flop 500 to the "1" state, opening the gate 508 so that the second reference channel carry pulse passes therethrough to the grid of the thyratron 512. The latter is rendered conductive, therefore, and the capacitor 519 discharges through the thyratron and the clutch coil 490 until the circuit oscillates through one-half cycle, whereupon the thyratron is automatically extinguished. This momentary energization of the clutch coil 490 causes one revolution of the pinion 486 so that, as previously explained, the number displayed by the dial 94a is increased by one unit.

In the second case, if a first carry output pulse from the axis scaling channel 311 resets the flip-flop 500 to the "0" state, the gate 509 will be opened. A second carry output pulse from the channel 311, occurring before the next reference channel carry output, will pass through the gate 509 to the grid of the thyratron 516. This will fire the thyratron, permitting the capacitor 520 to discharge through the clutch coil 490 to momentarily energize the latter. Accordingly, the clutch 488 will be engaged and the pinion 486 will be rotated through one revolution. This, as previously explained, will cause through the differential assembly 487, the reading of the dial 94a to decrease by one unit.

It will be understood that after two successive carry output pulses from the reference scaling channel 310 or the axis scaling channel 311 occur, then the reference and axis scaling channel carry output pulses will alternate with one another until the next 360° phase transition takes place. Thus, the dial 94a will at all times display the algebraic sum of distance information in inches which has been processed through the decoding A axis channel 311.

It may in some instances be desirable to provide some means for selectively energizing the clutch coils 489, 490 from an external source such as a control push button in order that the dial 94a may be set to a desired initial reading when the director is first put into operation. Because it will be apparent to those skilled in the art how such independent circuits for initial setting may be organized, they are not illustrated in the drawings.

ACCELERATION ADJUST

It will be helpful to restate here some basic principles of kinetics as applied to the motion of machine tool elements. If the distance through which a machine tool element has moved from a reference point at any given instant is represented by the symbol D, the feed rate or velocity V is the first time derivative $dD/dt$. The acceleration $a$ is the time derivative of the velocity V, or the second time derivative of the distance D, namely, $d^2D/dt^2$. To accelerate a given mass, the well known formula $F-Ma$ applies. For a given mass M and acceleration $a$, a certain force F will be required. Where the force F which is available is limited, then the acceleration $a$ which may be obtained is correspondingly limited.

All machine tool drive motors (such as 61, 64, 66, 69 and 71 in FIG. 1) and the machine elements traversed thereby necessarily have considerable inertia. And when a cutter tool is engaged with a workpiece, there may be appreciable resistance, not only to feeding motion, but to changes in feed rates. With the maximum power rating or torque of the motors generally fixed, there is necessarily a limit to the maximum acceleration which can be produced. If an undue instantaneous change in feed rate, i.e., calling for extremely high acceleration in a short time between two appreciably different velocities, is required, then feed motors may be overloaded. But beyond that, and most important, such a difference or "lag" between the desired and actual positions of a machine tool element may occur as to make the servo controls break away from proper control and produce a serious inaccuracy in the machined workpiece.

In accordance with one feature of the invention, provision is made to automatically preclude instantaneous or step changes in the feed rate of a controlled machine tool element beyond the capacity of the drive and servo control means, even though such changes may be called for by programmed numerical information. In accomplishing this, the analogue signal produced by the director (and which as previously explained has its first time derivative varying in accordance with the desired feed rate) is modified so that its first time derivative changes smoothly in such a manner as to reduce step change in feed rates. In the preferred arrangement, the rate of arrival, or the frequency, of command pulses supplied to the decoder just before and just after a programmed step change is to occur is smoothly varied; but the programmed time periods are automatically modified so that the total number of command pulses supplied to the decoder remain the same. And this is done by causing the frequency of the command clock to smoothly vary before processing of one block of information terminates and after processing of the next block of information begins.

The embodiment here illustrated provides means for "predicting" a predetermined time interval before the end of the time period for processing one block of information, and means for exponentially decreasing the frequency of the command clock during that time interval. It also includes means for exponentially increasing the command clock frequency back up to the original value after the time period for processing the next block of information begins. Because the frequency divider receives a predetermined number of command clock pulses before it produces a transfer pulse (signifying the end of processing of one block of information), the time periods for processing of the two blocks of information are extended beyond the programmed values. And because transition from one block of information to the other occurs when the command clock frequency is relatively low, the step change in the frequency of the command pulses, and the corresponding step change in the first derivative of the analogue signal is small enough to be successfully accommodated by the machine tool drive means and servo control.

While the foregoing is a generalized summary of the method and means by which acceleration adjust is accomplished, the particular organization and operation of components for bringing about such automatic acceleration adjustment will become clear from the following, more detailed description.

*Predict circuitry*

As shown in FIG. 6, a predict circuit 525 is interposed between the frequency divider 129 and acceleration adjust means 140, the latter having a control connection to the command clock 128. The purpose of the predict circuit 525 is to supply a signal to the acceleration adjust means a predetermined instant before the end of a time interval for processing a given block of information, i.e., a predetermined time interval before the appearance of a transfer pulse from the frequency divider. The predict circuit 525 does this by sensing the state or the "count" in the frequency divider 129 in a particular manner for each of the nine possible programmed time periods, supplying a "predict" pulse to the acceleration adjust means which may then initiate modification of the frequency of the command clock 128.

The predict circuit 525 is shown in block form in FIGS. 14B and 14C, and is illustrated in more detail by FIG. 28. Reference may be had to all three of these figures during the following description. For sensing the condition or "count" in the frequency divider 129, the predict circuit includes a plurality of gates 526–531 which have their control inputs connected respectively to the left or carry output terminals of the last six flip-flops in the frequency divider. Each of the gates 526–531 will, therefore, normally be closed, but will be open when the associated flip-flop is in the "1" state. A moment's reflection will reveal that regardless of the length of any time period, i.e., regardless of which of the input lines 255–263 supplies command clock pulses to the frequency divider 129, the last flip-flop 254 in the frequency divider will be switched to a "1" state when the time period is 50 percent elapsed, i.e., when the frequency divider has received half of the number of pulses which are required to produce a transfer pulse. Similarly, it will be apparent that when the last flip-flop 254 and the next to last flip-flop 253 are both in the "1" state, then the programmed time period will be 75 percent complete. Still further, when the last three flip-flops 253, 254, and 252 are all in the "1" state, then the programmed time period will be 87.5 percent complete. In like manner, when the last four flip-flops of the frequency divider are all in the "1" state, then the programmed time period will be 97.5 percent complete. Still further, when the last three flip-flops 252–254 and the third flip-flop in the thousandths decade unit 240 are in the "1" state, then the programmed time period will be 92.5 percent complete; and when the last three flip-flops as well as the second and third flip-flops in the thousandths decade unit 240 are all in the "1" state, the program time period will be 95 percent complete.

These states of the last six flip-flops in the frequency divider and the corresponding open and closed conditions of the associated gates 526–531 are utilized in order to derive a "predict" pulse from the command clock pulses at the desired time instant before the end of any programmed time period. As shown in FIGS. 14B and 14C, there are eight input lines 540–547 leading into the predict circuit 525 from the output lines of the ½ second, 1 second, 2 second, 5 second, 10 second, 20 second, and 50 second time controlling gates 281, as well as from the command clock output line 280, respectively. Thus, all of the command clock pulses which are supplied to the frequency divider during any time period pass over the line 547, while command clock pulses pass over the respective lines 540–546 when the time period controlling flip-flops 282 and gates 281 have been set to produce the seven different time periods indicated.

If a ½ second time period has been programmed, then the first command clock pulse supplied to the frequency divider will pass directly through an inverter 550 to appear on an output line 551 leading through a buffer amplifier 552 to a "predict" pulse output terminal 554. Thus, if a ½ second time period has been programmed, the predict pulse will occur at the very initiation of that time period and the predict interval will be 100 percent thereof or ½ second.

If a 1 second time period has been programmed, a command clock pulse appearing on the line 541 will pass through an inverter 555, and thence through an "or" circuit 556 (comprising a plurality of diodes for the several input terminals and a common load resistor, as shown in FIG. 28) and through the gate 526, as soon as the latter opens, to the predict output terminal 554. Since the gate 526 opens when the time period is 50 percent complete, as explained previously, the predict pulse will appear ½ second before the end of the programmed 1 second time period.

If a two second time period has been programmed, a command clock pulse appearing on the line 542 will pass through an inverter 557 to an "or" circuit 558, and thence downwardly through the gate 527, the "or" circuit 556, and the gate 526 to appear as a predict pulse on the output terminal 554. Since this can happen only when both the gates 526 and 527 are open as a result of the last two frequency divider flip-flops being in the "1" state, it will occur as soon as the programmed time period is 75 percent complete, and in this case ½ second before the end of the programmed time period.

If a 5 second time period has been programmed, a command clock pulse appearing on the line 543 will pass through an inverter 559, and thence through an "or" circuit 560 to the gate 528. As soon as the gates 526-528 are all open, a command pulse will pass through the "or" circuit 556 as well as the gate 526 to appear as a predict pulse on the terminal 554. This will happen as soon as the 5 second time period is 87.5 percent complete or .625 second before the end of the programmed time period.

It will be observed that there are four gates 561-564 which are all opened or closed according to a controlling potential appearing on a line 565. These gates have their input terminals connected to the input lines 543-546, respectively. However, in most instances these gates will be closed, and that assumption will be made for the time being. The operation and purpose of the gates will be discussed at a later point.

If a 10 second time period has been programmed, command clock pulses appearing on the line 544 will be passed through an inverter 566 and thence through an "or" circuit 568 to the input of the gate 531. Now, as soon as the gates 531, 530, 528, 527 and 526 are all open, then the first command clock pulse appearing at the input of the gate 531 will pass therethrough to an "or" circuit 469 and thence pass through the gate 530, the "or" circuit 560, the gate 528, the "or" circuit 558, the gate 527, the "or" circuit 556, and the gate 526 to arrive as a predict pulse at the output terminal 554. Since the gates will be in the condition required when the time period is 95 percent complete, the predict pulse will appear ½ second before the end of the programmed 10 second time period.

If a 20 second time period has been programmed, command clock pulses appearing on the line 545 will pass through an inverter 570 to the "or" circuit 568. As soon as the five gates 531, 530, 528, 527 and 526 are all open, a command clock pulse will pass through the path described above and appear as a predict pulse at the output terminal 544. Since the programmed time period must be 95 percent complete before this occurs, the predict pulse will appear 1 second before the end of the programmed 20 second time period.

Now for any other programmed time period above 20 seconds, i.e., 50 seconds, 100 seconds, or 200 seconds, all command clock pulses appearing on the line 547 will be supplied directly to the input of the gate 529. Therefore, as soon as the gates 526-529 are all open, a command pulse will pass through the gate 529, the "or" circuit 560, the gate 528, the "or" circuit 558, the gate 527, the "or" circuit 556, and the gate 526 to appear as a predict pulse on the output terminal 554. Since the four gates will be opened when the programmed time period is 97.5 percent complete, the predict pulse will occur 1.25 seconds, 2.5 seconds, or 5 seconds before the end of a 50 second, 100 second, or 200 second time interval, respectively. In this manner, it will be seen that a predict pulse is made to occur in advance of the termination of any of the nine available time periods and this predict pulse is used, as will be explained, to initiate acceleration adjustment.

The predict intervals which have been set forth above are sufficient to allow the proper acceleration adjustment whenever the command clock is operating at the normal frequency or below. As will be explained, the frequency of the command clock may be varied as desired to speed up or slow down a machining operation which has been programmed to take place in a certain period of time. For the present, it will be sufficient to understand only that when the command clock is set to a frequency higher than its "normal" value, then it is desirable to cause the predict pulses to occur earlier than they otherwise would. When an "early predict" is required, the line 565 will be placed at a potential to open the four gates 561, by means of which will be described below. However, if the four gates 561-564 are open then it will be seen that the command clock pulses appearing on the input line 543 will pass directly through to the "or" circuit 558 and thence through the gate 527, the "or" circuit 556, and the gate 526 to the output terminal 554. Therefore, in "early predict" operation the predict pulse will occur after a time period programmed for 5 seconds is only 75 percent complete. In a similar manner, it will be seen that when the gate 562 is open, command clock pulses appearing on the input line 544 are passed therethrough to the "or" circuit 560 and hence the first one will appear as a predict pulse on the terminal 554 when the programmed time period is only 87.5 percent complete. Still further, with the gate 563 open, if a 20 second time period has been programmed, command clock pulses appearing on the input line 545 will be passed through the gate directly to the "or" circuit 569 and hence will pass through the gate 530 to the "or" circuit 560, thence through the gate 528, the "or" circuit 558, the gate 527, the "or" circuit 556, and the gate 526 to the output terminal 554. Therefore, under these conditions, a predict pulse will appear when the programmed time period is only 92.5 percent complete. Finally, if the gate 564 is open, and a 50 second time period has been programmed, then command clock pulses will be passed through the "or" circuit 563 and cycled through the succeeding gates and "or" circuits to appear as a predict pulse at the output terminal 554 when the programmed time period is 95 percent complete.

By way of comparison, in "normal predict" operation the predict pulse for a programmed 50 second time period would occur after the time period is 97.5 percent elapsed. In "early predict" operation, a predict pulse for a programmed 50 second time period will appear after the time period is only 95 percent complete.

Command clock frequency control

The source of pulses supplied to the frequency divider 129, that is, the command pulse clock 128 is, as shown in FIG. 30, a well known form of blocking oscillator. While such a blocking oscillator may vary as to the specific circuit components, that here shown comprises a triode vacuum tube 600 having its plate connected through one winding of a feedback transformer 601 to a positive voltage source, the secondary winding of that transformer being connected in the grid circuit of the triode such that as the current through the tube progressively increases, a feedback potential is obtained which drives the tube to saturation. Due to grid current flow, a controlling capacitor 602 will be charged negatively, so that as the current through the tube ceases to increase, the grid will be placed below cut-off potential. The tube thus ceases conduction and the controlling capacitor 602 begins charging positively from a positive voltage source through a resistor 608 until the grid of the triode 600 is again raised above cut-off potential. Recurring command clock pulses appear, as a result of such intermittent conduction, on an output terminal 603 from across a cathode resistor 604 and a filtering circuit 605.

As is well known, the frequency of operation of the blocking oscillator 128 depends upon the period of time required for the controlling capacitor 602 to charge positively (to initiate conduction of the triode) after being charged negatively (by the previous pulse conduction of the triode). This time depends upon two things, viz., the time constant of the charging circuit for the capacitor and the magnitude of the voltage applied to that charging circuit.

As illustrated in FIG. 30, three charging resistors 608, 609 and 610 are arranged to be selectively connected in series with the capacitor 602 by means of a plurality of relay contacts to a charging potential appearing at the point 611. For the present it will be assumed that the relay contacts connect the charging resistor 608 in series with the capacitor 602; and the purpose of the additional charging resistors and relay contacts will be further explained at a later point. With that assumption, it will be seen that the frequency of the blocking oscillator 128 will be proportional to the magnitude of the positive potential which appears at the point 611. In order to effect variations in the frequency of operation of the command clock 128, the potential appearing at the point 611 is varied in a manner which will be described.

It is desirable that the command clock frequency be susceptible of manual adjustment. For example, if it is found that the program engineer has been overly cautious in making an original program and has allowed more time than is actually necessary, the entire program can be speeded up, i.e., the time periods decreased and the feed rates proportionally increased by causing the potential at the point 611 and the frequency of the command clock to increase beyond normal values. Conversely, if the program engineer has not allowed sufficient time for certain operations to be carried out, then the entire program may be slowed down by reducing the potential at the point 611 and thus reducing the frequency of operation of the command clock 128. Such changes are particularly helpful if a program has been made up for machining a first material permitting certain feed rates, and the same shape machined in a different material, requiring different feed rates, is desired. In other words, by varying the frequency of the command clock, the director and machining time may be made to agree with the time values programmed, but the director may operate in time periods which are proportionally greater or less than those programmed according to the adjustment of frequency of the command clock.

For effecting such variations in the potential at the point 611 and the frequency of the command clock 128, a voltage divider formed by resistors 612, 614 and 615 is connected across a voltage source as shown at the left in FIG. 30. A precision rheostat 616 is connected across the two resistors 614, 615, having a movable wiper 618 mechanically connected to a manual clock control knob 619 which may be located on the director panel (FIG. 4). The wiper 618 is electrically connected through a charging resistor 620 and normally closed relay contacts R139b, R178c to a main capacitor 621. The capacitor will charge through the resistor 620 to a potential equal to that of the wiper 618. The capacitor 621, as shown, is connected to the grid 622 of a cathode follower tube 623, having a cathode load resistance 624. Thus, variations in the voltage to which the capacitor 621 is charged will correspondingly appear at the point 611, shown as connecting to the cathode of the tube 623. Thus, as the manual clock rheostat wiper 618 is adjusted, the frequency of the blocking oscillator 128 and the command clock pulses will be correspondingly varied. For convenience, the voltage at the wiper 618 which makes the blocking oscillator frequency 16 kc. (when the resistor 608 is connected in series with the capacitor 602) is termed the "100% voltage" since at this frequency the frequency divider 129 and time-controlling circuits produce time intervals on an absolute base, i.e., equal to those numerical time intervals programmed.

If the rheostat wiper 618 is turned to the 150% position, the capacitor will charge to a higher potential and the blocking oscillator frequency will be 24 kc. A time interval programmed for, say, 10 seconds, will then be processed in the director and the corresponding programmed distance of movement carried out at the machine tool in only 6.66 seconds.

It will be seen, therefore, that the director is not limited to operation on an absolute time base. By adjusting the rheostat wiper 618, the "director time" may be made greater or less than absolute time, thus causing a given programmed operation to be processed (and carried out at the machine tool) faster or slower than initially programmed, with corresponding increases or decreases in feed rates.

It will be helpful to observe here that the size of the resistor 615 is chosen so that the potential at a point 625 is the "100% voltage," i.e., the potential which the wiper 618 will have when set to the 100% position.

*Automatic acceleration adjust means*

Besides the manual adjustment, the frequency of the command clock 128 is automatically controlled to prevent undue step changes in the first derivative of analogue output signals from the director, and corresponding step changes which would occur in the feed rate of controlled machine tool elements.

For this purpose, predict pulses which appear on the terminal 554 (FIGS. 14C and 28) are applied as shown in FIG. 29 to the first grid 571a of a double-grid predict thyratron 571. If upon the arrival of a predict pulse the second grid 571b is above cut-off potential, the thyratron will fire.

As shown also in FIG. 29, a "P-M" flip-flop 574 has its "set" terminal connected to the single P-M output terminal of the magnetic system (FIG. 12C), and has its "re-set" terminal connected to the transfer pulse output terminal 265 of the frequency divider 129 (FIG. 14C). Thus, at the end of the processing of each block of information, a transfer pulse will re-set the flip-flop 574 to the "0" state, making its output line 575 relatively low in potential (−15 volts). If the next block of information read from the punched tape contains a P or M code instead of simply + or − sign codes, then one of the P-M cores in the magnetic shifting register will be set to the "1" state. Upon dumping in the magnetic system, therefore, a pulse will be supplied from the magnetic system to the "set" terminal of the flip-flop 574, switching the latter to the "1" state and placing the output line 575 at a relatively high potential (0 volts). This output line connects, as shown, through an isolating diode to the second grid 571b of the predict thyratron 571. The latter thyratron will, therefore, be conditioned to fire upon the reception of the next predict pulse at its first grid 571a. Also, setting of the flip-flop 574 to the "1" state in response to the read-out of a P-M pulse from a magnetic system will raise the potential of the grid 576 of a "P-M" thyratron 578. The latter will, therefore, fire immediately upon read-out of a P-M signal.

When the thyratron 578 is rendered conductive, it energizes a relay R138 connected in series with its plate to a positive voltage source. The relay R138 seals in through its own contacts R138a and normally closed contacts R130a of the "transfer pulse" relay R130. As soon as the relay R138 seals in, the contacts R138a and R130a shunt the thyratron 578 so that the latter is immediately extinguished. The relay R138 will remain sealed in until the next transfer pulse occurs which will cause the contacts R130a to open.

When the thyratron 571 is fired, that is, after a P-M signal has been read-out from the magnetic system and a predict pulse is supplied from the predict circuit 525, a relay R139 connected in series with its plate to a positive voltage source will be energized. That relay will be sealed in through its normally open contacts R139a and the normally closed contacts R130b.

*P-M operation*

At the end of the period for processing one block of information which is stored in the magnetic system, a transfer pulse will re-set the flip-flop 574, if it were not already in the "0" state. Upon dumping of the next block of information from the shifting register into the storage register of the magnetic system 125, and if that block of information contains a P-M signal, a P-M read-out pulse will arrive to "set" the flip-flop 574, causing conduction of the "P-M" thyratron 578 and immediate energization of the relay R138. Also, the flip-flop 574 will condition the "predict" thyratron 571 for conduction upon the arrival of the next predict pulse.

Then as the stored block of information is being processed, i.e., the storage register is being interrogated by the frequency divider, a "predict" pulse will be generated by the predict circuitry 525 at a predetermined interval before the end of the time period, and this pulse will fire the thyratron 571, energizing and sealing in the relay R139.

As seen in FIG. 30, pick-up of the relay R139 will open the normally closed contacts R139b, disconnecting the wiper 618 from the capacitor 621. Also, the contact R139c will close so that the capacitor 621 starts to discharge through a diode 626, the contacts R139c and a discharge resistor 628 connected to a negative voltage source. However, since the contacts R139d and R138d are also closed, a line 629 will be at zero volts potential, and since that line is connected to the upper end of the resistor 628 by a diode 630, the potential appearing across the capacitor 621 cannot fall below zero volts. The diode 630 is thus a "clamp" which prevents the capacitor from discharging below zero volts. Since the capacitor initially starts to discharge toward an extremely negative voltage, e.g., −250 volts, its discharge through the resistor 628 will be exponential but in the region between the original voltage on the capacitor and the 0 volt clamp level, that exponential discharge will be fairly linear.

As the capacitor 621 discharges exponentially in response to sequential energization of the relays R138 and R139, a corresponding exponential drop in the potential at the point 611 will occur by virtue of the cathode follower 623. Accordingly, the frequency of the command clock R128 will fall off exponentially until it reaches that frequency which is produced by 0 volts on the capacitor 621. By way of example, such a low frequency may be in the order of 20% of the "normal" frequency.

Now when the next transfer pulse arrives from the frequency divider, it will not only re-set the flip-flop 574 (FIG. 29), but it will also fire the thyratron 302 and cause momentary energization of the transfer pulse relay R130 (FIG. 15), as previously described. Therefore, the normally closed contacts R130a in the sealing circuit for the relay R138 (FIG. 29) and the normally closed contacts R130b in the sealing circuit for the relay R139 will open to de-energize those two relays. Since the contacts R139b in FIG. 30 will reclose and the contacts R139c, R139d and R138d will re-open at this time, the capacitor 621 immediately begins to charge exponentially from the rheostat wiper 618 through the resistor 620 back up to the potential it originally had. Since this is a smooth exponential variation of the voltage appearing across the capacitor, and since the potential of the point 611 "follows," then the frequency of the command clock 128 will likewise smoothly and exponentially increase from the 20% value back up to the value it originally had as determined by the setting of the wiper 618.

Figure 31:
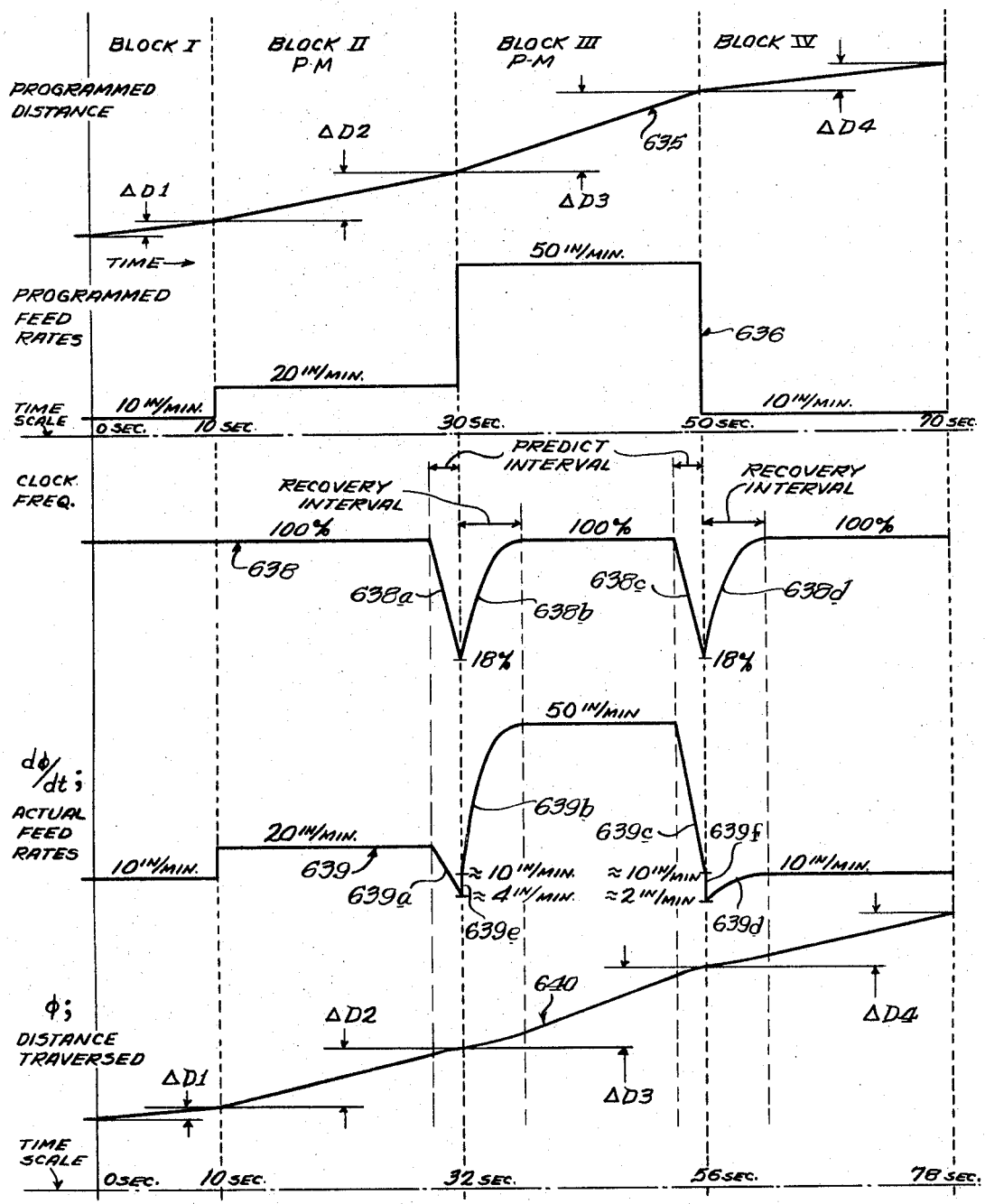
FIGS. 31, 32, 33, and 34 are graphs illustrating programmed feed rates and the modified results brought about by the controls which prevent undue acceleration and excessive feed speeds.

The results of this predicting and smooth decrease and increase in the frequency of the command clock pulses may be better understood by reference to the curves in FIG. 31. The first two curves 635 and 636 represent desired variations of distance traversed and the feed rate, respectively, versus time, for a movable machine tool element, according to four typical blocks of a program. In other words, it might be desired to go a certain distance ΔD1 within 10 seconds for the first block I, the programmed distance and time period combining to yield a desired feed rate as shown by the curve 636 of 10 inches per minute. During the programmed block II, the distance ΔD2 to be traversed and the feed rate are to be greater, as illustrated by the steeper slope for the curve 635, and as illustrated by the horizontal line representing a feed rate of 20 inches per minute in the curve 636.

Now when a transition is to occur between blocks II and III, a relatively great jump or step change in feed rate is required, from 20″/min. to 50″/min. as shown by the curves 636. Since this could not be accomplished instantaneously by the machine tool drive system and servo controls, a P or M symbol is employed in the programming in lieu of a + or − sign for the distance information of block II. Similarly, since the desired program calls for a relatively great and abrupt drop in feed rate from 50″/min. to 10″/min. between blocks III and IV as shown by the curve 636, a P or M signal is employed in lieu of a + or − signal before the distance information in block III.

Accordingly, when the program is put in serial digital form on a punched record such as the paper tape 112 previously described, and read into the director, one of the P-M cores of the shifting register will be set to the "1" state both when the block II information is received and when the block III information is received. When dumping of these blocks of information from the shifting register to the storage register occurs, a P-M signal will be read out, as previously explained, and a predict signal will occur before the ends of the processing time periods of these blocks.

Accordingly, if it is assumed that the clock control rheostat is set at its 100% position, the frequency of the command clock 128 will vary with time as shown by the curve 638 in FIG. 31. It will be seen that at a predetermined instant before the end of block II, a predict interval begins during which the frequency of the command clock smoothly decreases exponentially as shown by the curve portion 628a. The frequency of the command clock will drop to approximately 20% of its normal value before a transfer pulse occurs. After the transfer pulse, as previously explained, the capacitor 621 begins charging through the resistance 620 (FIG. 30) so that the command clock frequency rises exponentially as shown by the curve portion 638b. The recovery interval during which the command clock frequency returns to its normal or 100% value will depend upon the sizes of the resistor 620 and the capacitor 621. When the capacitor is fully charged, then the command clock frequency will be restored to its original value. Then toward the end of the processing for the block III information, another predict signal will occur and will initiate exponential decay of the command clock frequency as shown by the curve portion 638c. At the end of processing of block III information, a transfer pulse will occur and cause an exponential rise, as shown by the curve portion 638d, in the command clock frequency back to its original value.

It is important to observe at this point that because the command clock frequency is being varied, the time scale for the curves 638–640 is different from the actual programmed time scale for the curve 635 and 636. If block I is programmed to have a 10 second time interval, then that will be absolutely followed in the director. However, if block II is programmed to have a 20 second time period, this period will be "stretched" by virtue of the fact that the command clock frequency decreases during the predict interval, causing the command clock to require more time before it generates enough input pulses to the frequency divider to cause the occurrence of a transfer pulse. Therefore, while the end of block I, according to the program as shown by curve 635 and 636 might ordinarily occur at 30 seconds, it occurs as shown in the curve 636 as a later instant, say at about 32 seconds. Likewise, since the command clock frequency over the curve portion 638b and 638c is less than normal frequency, the time period actually required to process block III information is extended or "stretched" beyond the value actually programmed. Since an additional 2 seconds, for example, might be required as a result of each of the exponential changes at 638b and 638c, the beginning of processing of block IV information will not begin until the 56 second mark, as opposed to the 50 second mark according to the program.

Curve 639 in FIG. 31 illustrates the manner in which the first time derivative of the corresponding analogue signal produced by the decoder will vary as a result of the exponential changes in command clock frequency illustrated by the curve 638. It will also be remembered that the first time derivative of the analogue signal, here designated $d\phi/dt$, varies in accordance with the feed rates which will be produced for the controlled machine tool element at the machine tool.

Since a relatively small step in feed rate (curve 639) occurs between block I and II, i.e., only from 10″/min. to 20″/min., the machine tool drive and servo mechanisms will be able to accommodate that without any special acceleration adjustment. However, in order to produce the step between blocks II and III, i.e., from 20″/min. to 50″/min., the machine tool element will be slowed down exponentially as shown by the curve portion 639a before the end of control according to information from block II. It will be slowed down from 100% of the programmed value, i.e., 20″/min. to about 20% of the programmed feed rate, i.e., 4″/min. Then, when transition between blocks occurs, the feed rate will jump as shown by the curve portion 639e from the 4″/min. rate to the 10″/min. rate, the latter being 20% of the programmed 50″/min. value. This small step change can be successfully handled by the machine tool element drive and servo controls. After that step the feed rate will rise exponentially as shown at the curve portion 639b until it smoothly reaches the desired 50″/min. value. Correspondingly, before the end of control under block III information, the first time derivative of the analogue signal, which corresponds to feed rate at the machine tool, will fall off exponentially as illustrated by the curve portion 639c. It will fall from a 100% to a 20% value or from the originally programmed 50″/min. value to 10″/min. Then, when transition from control according to block III information to control according to block IV information occurs, the feed rate will jump downwardly, as shown by the curve portion 639f, to a value of about 2″/min., this being 20% of the 10″/min. feed rate programmed for block IV. After this, the feed rate will rise exponentially as shown by the curve portion 639d until it is restored smoothly to the programmed value of 10″/min.

In this manner, the first derivative of the analogue signal produced by the director decoder is prevented from having step changes so great that they would call for corresponding step changes in feed rates at the machine tool which would exceed the capacity of the machine tool element drive and servo control. In practice the step changes which can be accommodated without trouble will depend on the nature of the drive mechanism and servo controls. In one machine tool which the present invention has been used to control, step changes up to 20″/min. in feed rates may be tolerated. Beyond that, P or M codes are used in the program to provide the "acceleration adjust" operation.

Curve 640 in FIG. 31 shows the variation in the phase $\phi$ of the analogue signal supplied from the decoder with time, as the command clock frequency is varied as shown in curve 638. It will be seen that the phase is no longer uniformly varied, but it is still modulated or shifted by the same amount, so that the distance information represented thereby remains the same. It will also be understood that the curve 640 represents the resultant distance versus time traversed by a machine tool element upon control thereof in response to the analogue signal. The machine tool element traverses the same distances as those represented by the initial program of numerical information, but they are traversed in longer periods of time in order to permit gradual transistions between widely different feed rates.

To recapitulate, it will be apparent from the foregoing that the director serves as a generator of a command signal, which appears on terminal A at the right side of FIG. 22B in the form of a phase modulated recurring wave. The director is cyclically operable in the sense that it goes through successive cycles of operation in processing successive blocks of numerical command data read from the punched tape (FIG. 9). And during each cycle of operation, the frequency of the command pulses for the A axis (applied to the input terminal A at the left side of FIG. 22A) and thus the rate of change of phase of the command signal is proportional both to (a) the frequency of pulses supplied from the clock 128 to the frequency divider 129 shown in FIGS. 14A–C, and (b) the extent of the A axis displacement read from the punched tape and then held in the ping-pong register of FIGS. 12A–C. Thus, it may be said that the command signal changes at a rate proportional to the product of the values of first and second input signals supplied to the first and second inputs of the generator, the first such signal being the clock pulses from the clock 128 (and whose value is represented by their frequency, which is variable but normally fixed), and the second such signal being the potentials fed to the magnetic shifting and ping-pong registers from the program punched tape (and whose value is the A axis displacement represented thereby). Normally, therefore, the rate of change of the command signal as a result of any cycle of operation of the director has a certain value determined by the first signal, i.e., the axis displacement being processed, and that command signal will produce a corresponding certain velocity of the machine table 55 (FIG. 40) as a result of that cycle of operation of the director.

But, as described above, provision is made to modify the operation of control means associated with the director, so that the first signal (i.e., the frequency of the command clock pulses) is increased from a low value to its normally fixed value (see curve portion 638b in FIG. 31) to make the rate of change of the command signal gradually increase. This results in a gradual increase in velocity of the machine tool table 55, thereby to avoid excessive acceleration. This increase in the first signal from a low value to its normal, fixed value occurs during an initial portion of a cycle of operation of the command signal generator. Moreover, provision is made to decrease the first signal from the normally fixed value to a low value (see curve portion 638c in FIG. 31) during a final portion of a cycle of operation of the command signal generator. This causes the rate of change of the command signal to gradually decrease to produce at the machine tool a gradual decrease in velocity. In this way, excessive deceleration is avoided.

Of course, the operation here summarized takes place for the remaining axes B–D simultaneously, because the first signal, i.e., the frequency of the clock pulses from source 128, is utilized in the same way in all axis portions of the director. The director may thus be viewed as a controller operative to receive pulses from a variable frequency source of pulses (the clock 128, FIGS. 14A and 30), controlled in frequency by a control signal (the voltage at grid 622 in FIG. 30) produced by an R-C circuit 620, 621, 628. In a first, normal condition this voltage is constant and the frequency of the clock pulse is constant at a normal, fixed value. But in a second, accelerating condition while the capacitor of the circuit is being charged, the clock source emits pulses at a continuously increasing frequency over a period of time; and in a third, decelerating condition while the capacitor is discharging, the clock source emits pulses at a continuously decreasing frequency over a period of time. These latter conditions are brought into effect by information (P-M codes) in certain ones of the blocks of the punched tape.

*Early predict*

Whenever the command clock is set above 100% and an acceleration adjustment occurs, then it is necessary to cause the correcting action to begin earlier in order that the machine tool element will have sufficient time in which to make a transition from one feed rate to another. For if the original program called a time period of, say, 20 seconds, then the clock set at, say, 150% the actual time for processing in the director (and corresponding operation at the machine tool) will be 13.33 seconds. If a normal predict occurs at 95% completion, a predict interval of only .33 second will be available. However, by making the predict earlier, at 92.5% completion, a full ½ second predict interval will be obtained. In order to accommodate this difference when the command clock is set above 100%, the predict signal is caused to occur earlier than it otherwise would.

This is the purpose of the gates 561–564 (FIGS. 28 and 14B) which, as previously explained, will cause an early predict signal when they are conditioned for conduction. To make certain that these gates are open when the command clock rheostat is set above 100% and acceleration adjust or P-M operation is to take place, the control line 565 for these gates is connected, as shown in FIG. 30, through normally open contacts R138g of the "P-M relay" R138 and thence through an arcuate contact 645 and a wiper 646 to ground. The wiper is mechanically ganged to the wiper 618 so that whenever the knob for the rheostat 616 is turned above the 100% position, a ground connection will be supplied to the controlling terminals of the gates 561–564 as soon as the relay R138 is energized.

Figure 32:
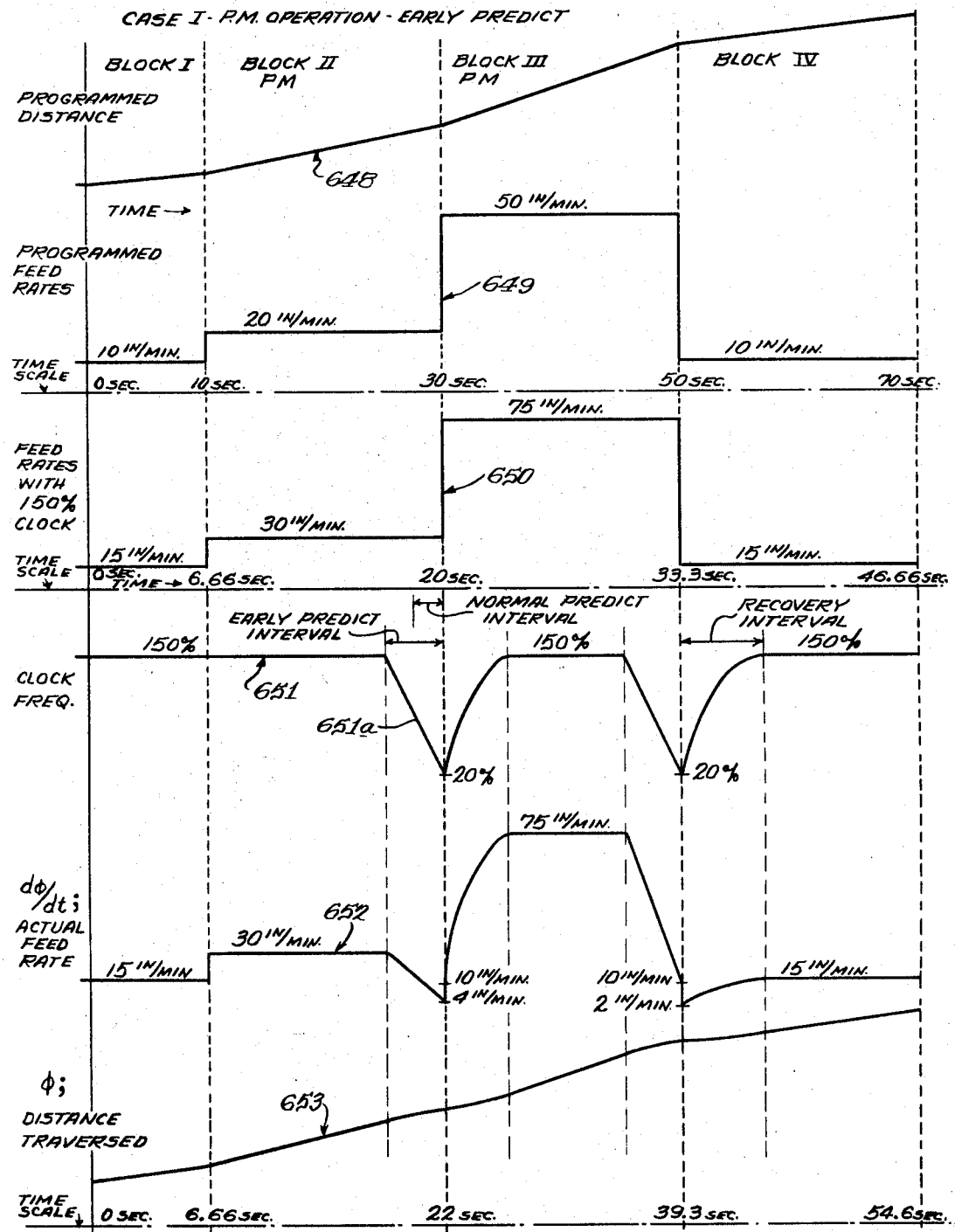

Under these conditions, the acceleration adjust operation is substantially the same as previously described except that the predict pulse will occur earlier and a sufficiently long interval will be available for the discharge of the capacitor 621 and the corresponding exponential decay in the frequency of the command clock 128. To make this operation of acceleration adjust with early predict more clear, however, reference may be had to FIG. 32. As there shown, the curves 648 and 649 represent variations in distance and feed rate with time as might be called for by four successive blocks of numerically programmed information. These curves are similar to the curves 635, 636 shown in FIG. 31. The curve 650 in FIG. 32, however, represents the feed rates which will be required if the command clock 128 is operating at the 150% value in response to positioning of the rheostat wiper 618. The curve 650 is drawn to a different time scale and the feed rates are correspondingly different. As shown, in block I, where the programmed feed rate was 10″/min. and the programmed time period 10 seconds (as shown by the curve 649), it will be processed, as shown by the curve to create a feed rate of 15″/min. in an actual time period of 6.66 seconds. Likewise, whereas block II was programmed to be at 20″/min. with a time period of 20 seconds, with the clock turned to 150%, block II will, as shown by the curve 650, be carried out at a rate of 30″/min. and in a time period of 13.33 seconds. In other words, when the clock is turned up to 150% value, feed rates are increased by 50% while time periods are decreased by 50% so that the total distances traversed will remain the same as those originally programmed.

The acceleration adjust operation will be substantially the same as previously described except that the command clock frequency will exponentially drop from 150% to about 20% upon discharge of the capacitor 621. This variation in command clock frequency is shown by the curve 651 in FIG. 32. However, the early predict interval is somewhat longer than that which would occur for normal predict operation so that there is sufficient time for the capacitor 621 (FIG. 30) to discharge to a 20% voltage before the next transfer pulse and so that upon corresponding control of a machine tool element, the latter will have time to smoothly decrease in feed rate to about 20% of the feed rate it would otherwise have.

The curves 652 and 653 show the corresponding variations in time derivative $d\phi/dt$ of the analogue signal (corresponding to feed rate at the machine tool) and phase variations $\phi$ (corresponding to distance traversed at the machine tool) for the "early predict" operation, these latter curves being generally similar to the curves 639 and 640 in FIG. 31.

AUTOMATIC LIMITATION OF FEED RATES (SEVENTH HOLE OPERATION)

Certain problems arise when provision is made to increase the command clock frequency above a "normal" or 100% value, as described above in connection with the rheostat 616 in FIG. 30. Assume for example, that by design, a given machine tool element has a maximum feed rate of 120″/min. If a machining operation is programmed in "absolute" time such that a feed rate of 100″/min. will be produced, and then if that numerical program is processed in the director with the command clock set at 150%, the analogue output signal will be so modulated as to attempt to produce a feed rate of 150″/min. at the machine tool. Such an attempt will either damage the machine tool or at the very least, result in inaccurate machining, if the machine tool is rated for a maximum of 120″/min. feed.

Moreover, the punched tape reader 120, as previously explained, reads succeeding lines in one entire block of the punched tape and the information corresponding to those lines is shifted into the magnetic system 125 before interrogation by the frequency divider 129 begins on that information. With a relatively great number of lines in one block of the punched tape, the punched tape reader 120 requires a certain time interval to read a whole block from the tape. If a preceding block of information is programmed to have a time period which is not appreciably longer than the time interval required by the tape reader, that time period will be reduced in processing if the command clock is set above 100%. This will produce a transfer pulse and dumping before the succeeding block of information has been fully read by the punched tape reader 120 and shifted into the storage register of the magnetic system 125.

In order to overcome these difficulties, it is proposed here to place on the digital record a code which will inject a special signal into the program whenever the combination of the selected time period and the distance of movement along any axis dictate a feed rate above a predetermined value, or whenever a programmed time interval is below a predetermined value. Means are provided responsive to those signals to automatically limit the feed rates called for by the director analogus signals and to prevent reduction in short programmed time periods even if the command pulse clock should be set above a 100% frequency. For this purpose, a hole in the seventh column of the punched tape (FIG. 9) is punched (either manually or automatically by logic circuits associated with the punched tape preparation apparatus) when (a) the combination of the programmed time period and the distance information along one axis dictates a feed rate greater than a predetermined value (e.g. 80″/min.); or when (b) a programmed time period is below a predetermined value, say below 5 seconds.

In response to sensing of that seventh hole in any block of the punched tape, the tape reader provides a signal which is caused to automatically, yet smoothly, reduce the command clock frequency to 100% if it should happen to be above that value by virtue of the setting of the command clock rheostat wiper 618.

A hole may appear in the seventh column of any line of a given block of the punched tape and the sensing apparatus and circuitry will, nevertheless, be operative to produce the compensating action described.

In the exemplary arrangement here illustrated, a normally open feeler switch FS7 (FIG. 29), which is momentarily closed when the feeler arm F7 shown for the reader 120 (FIG. 10) senses a hole in the seventh column of the punched tape 112, is connected in series with the coil of a relay R162 across a voltage source. Thus, when a seventh hole is sensed in the punched paper tape, the relay R162 will be energized and sealed in through its own contacts R162a and either the normally closed contacts R177a or normally closed contacts R130c in series therewith. As a result, the relay contacts R162b in circuit with a relay coil R177 will close and remain closed. Then, when the next transfer pulse occurs, energizing the "transfer pulse" relay R130 (FIG. 15), the contacts R130D will close, whereupon the relay R177 will be energized and will be sealed in through its own contacts R177c and the normally closed contacts R178b. Energization of the relay R177 will, in turn, close the contacts R177b in series with a relay R178, energizing the latter which then seals in through its own contacts R178a and the normally closed transfer pulse relay contacts R130c. However, as soon as the relay R178 is energized, its contacts R178b in the sealing circuit for the relay R177 will open, so that the latter relay will be de-energized.

The relays R162 and R178 operate to control the smooth reduction and increase of the frequency of operation of the command clock 128. First, when the relay R162 is energized and sealed in by the sensing of a seventh hole at any line in a block of the punched tape, its contacts R162c associated with the second grid 571b of the thyratron 571 will close, thereby conditioning the thyratron to fire upon the reception of the next "predict" pulse on the first grid 571a. Therefore, as soon as a seventh hole is read, the "predict" thyratron 571 is conditioned, and at a predetermined interval before the termination of the interrogation of the information for the preceding block, a predict pulse supplied from the predict circuit 525, as previously described, will cause the thyratron 571 to fire. This energizes the relay R139 which then seals in through the normally closed contacts R130b.

As a result, the contacts R139b (FIG. 30) open to disconnect the capacitor 621 from the rheostat wiper 618, while the contacts R139c close, thereby connecting the capacitor 621 in discharging relation with the discharging resistor 623 leading to the negative 250 volt source. However, the contacts R138d at the left in FIG. 30 are at this time open, so that the line 629 is at a "100%" voltage level owing to the clamping action of a diode 660 connected between that line and the point 625. It will also be seen that a second clamping diode 661 is connected between the line 629 and the rheostat wiper 618, the line 629 connecting with a resistor 662 leading from the positive volt source. These two diodes 660, 661, therefore, serve to clamp the potential on the line 629 to either a 100% voltage value or the potential of the wiper 618, whichever is lower. If the wiper should be set to a position giving less than 100% voltage, the capacitor 621 will not discharge. However, if the wiper 618 should be set above a 100% position, current flow through the resistor 662 and the diode 660 will cause the potential on the line 629 to be at the "100%" voltage, so that as soon as the relay R139 is energized and the contacts R139c closed, the capacitor 621 begins discharging from its previous potential (above a 100% value owing to the position of the wiper 618) through the resistor 628 toward the −250 volt source. However, as soon as the potential across the capacitor 621 reaches a 100% value, the diode 630 becomes conductive, thereby clamping the minimum voltage on the capacitor to a 100% value. Thus, there will be an exponential decay of the voltage on the capacitor 621 from its initial value above 100% down to the 100% value. The voltage appearing at the point 611 will, of course, similarly decrease exponentially so that the frequency of the command clock 123 will likewise smoothly decrease.

Figure 33:
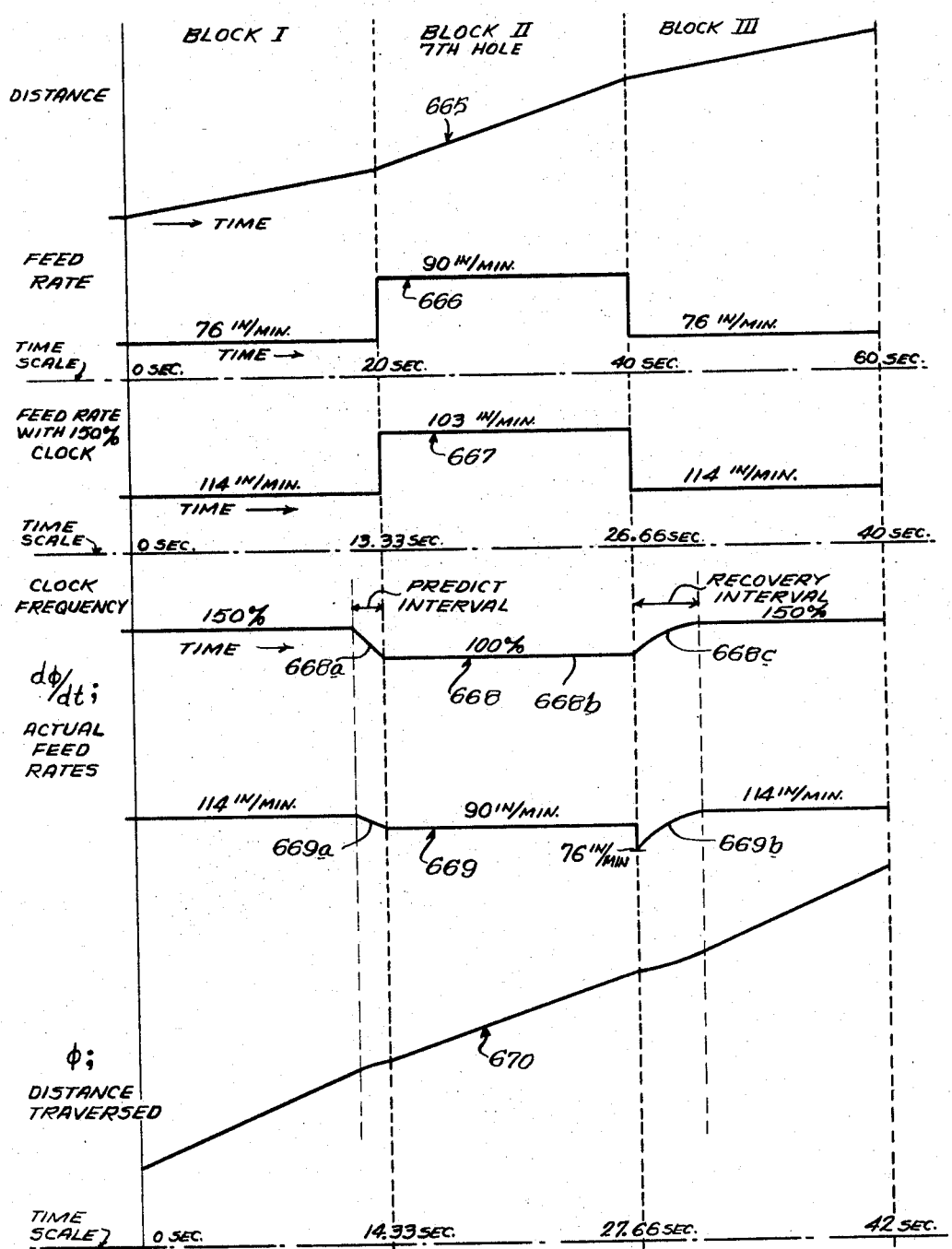

At this point, it will be helpful to refer to FIG. 33 which graphically illustrates the effects produced by the reading of a seventh hole signal if the command clock 128 is set above 100% frequency. The first curve 665, similar in nature to the curve 635 in FIG. 31, depicts the variation of distance versus time for three successive blocks of a typical numerical program. The second curve 666 depicts feed rates which would be produced by the three successive blocks if operation were in "absolute" time. The third curve 667 in FIG. 33 depicts feed rates which would, without compensation, be produced by processing the numerical program through the director and controlling the machine tool from the resulting analogue signals if the director command clock were set at 150%. It will be observed that the curve 667 is necessarily drawn to a different time scale, the first block of information being processed in two-thirds the time originally programmed and requiring a feed rate which is 150% of that dictated by the original program. This will be clear when it is observed that in the first block the original program calls for a 20 second time period and a feed rate of 76"/min., while with the clock at 150% as shown by the curve 667, the first block of information will extend over 13.33 seconds and dictate a feed rate of 114"/min.

The fourth curve in FIG. 33 depicts the variation in frequency of the command clock 128 as produced by the special controls above described. It will be seen from the curve 668 that prior to the end of processing for the first block of information, a predict pulse occurs to initiate a predict interval, and the resulting discharge of the capacitor 621 produces an exponential, but fairly linear drop in the command clock frequency as shown by the curve portion 668a. It will be seen that the command clock frequency thus smoothly decreases from the 150% value to the 100% value. And because this decrease in clock frequency requires a greater time for the frequency divider 129 to produce a transfer pulse, the change-over to processing of the next block of information will occur, not after 13.33 seconds as shown for the curve 667 but after an increased time period, say 14.33 seconds.

Now when the transfer pulse produced at the end of interrogation of information from the first block occurs, the relay R139 (FIG. 29) will be de-energized due to the fact that the transfer pulse relay contacts R130B will momentarily open. However, as previously explained, the relay R178 will be energized at this time, due to the fact that this transfer pulse also closed the contacts R130D, picking up the relay R177 which in turn energized the relay R178, the latter sealing in. That same transfer pulse, in momentarily opening the contacts R139c, causes dropout of the relay R162. Therefore, even when this transfer pulse occurs, the relay contacts R178c (in series with the relay contacts R139b, FIG. 30) will open to maintain the capacitor 621 disconnected from the rheostat wiper 618, and the contacts R178d (in parallel with the contacts R139c, FIG. 30), will be closed so that the capacitor 621 is held at the 100% voltage value to which it previously discharged.

As shown by the curve portion 668b in FIG. 33, the frequency of the command clock 128 will thus be held at the 100% value during processing of the entire second block of information. Then, when the next transfer pulse occurs at the end of processing for the second block, the relay contacts R130c (FIG. 29) will open to de-energize the relay R178, restoring the contacts R178c and R178d in FIG. 30 so that the capacitor 621c will then begin to exponentially charge through the resistor 620 to the potential of the rheostat wiper 618. Thus, the command clock frequency as shown by the curve portion 668c in FIG. 33 will exponentially increase from the 100% value back to the 150% value.

The curve 669 in FIG. 33 depicts the resulting first derivative of the analogue signal produced by the decoder when the command clock frequency varies smoothly as shown by the curve 668. It will be seen that during the time corresponding to the first block of information, the feed rate is 150% of that originally programmed, but that it decays exponentially as shown by the curve portion 669a. It will also be seen that the feed rate during control according to the second block of information is the same value as that originally programmed (see curve 666), because the clock has been returned to operation at a 100% frequency. Then, as shown by the curve 669, at the end of control according to the second block of information, the first derivative of the analogue signal (corresponding to feed rate at the machine tool) will increase exponentially, as at 669b so that it returns to a value which is 150% of that originally programmed.

The curve 670 in FIG. 33 illustrates the corresponding variation in the modulation or phase of the analogue signal produced by the director when the command clock frequency is varied as depicted by the curve 668.

Referring again to the control relays R162, R178 and R177 in FIG. 29, those relays cooperate so as to hold the command clock frequency at the 100% value over two or more successive periods of control corresponding to blocks of information which include seventh hole signals. In other words, when two blocks follow in succession which both contain seventh hole signals, the exponential rise shown at 669b in FIG. 33 does not occur between them, but the clock is simply held at 100% frequency until the end of the last block in succession which contains a seventh hole signal. Relay R162 picks up immediately upon the appearance of the seventh hole signal, and conditions the relay R177 which picks up with the next transfer pulse and energizes the relay R178, thereupon dropping out the relay R177. Thus, if while the relay R178 is energized during the processing of a first block of information containing a seventh hole signal, a second seventh hole signal is received, the relay R162 will be energized, as before, and the relay R177 will be energized with the occurrence of the next transfer pulse. Therefore, the next transfer pulse which, by opening the relay contacts R130c would normally de-energize the relay R178, drops the latter out only momentarily and it is immediately re-energized the second time as soon as the transfer pulse relay is de-energized, owing to the fact that the relay contacts R177b are at that time closed. Thus, seventh hole operation for several successive blocks will simply result in the command clock being held at a 100% frequency value for the processing of all of those blocks.

*Simultaneous operation in response to both P-M and seventh hole signals*

From what has been said above, it will now be clear that the frequency of the command clock 128 is smoothly varied to prevent excessive step-changes in the first derivative of the analogue signals produced by the director, and which would otherwise attempt to cause relatively great step changes in the feed rates of movable elements at a controlled machine tool. Moreover, the command clock is so controlled that the first derivative of the analogue signal (and corresponding feed rates at the machine tool) are held below predetermined values, notwithstanding the fact that the command clock might be manually adjusted above the 100% value which would otherwise produce those excessive feed rates.

Figure 34:
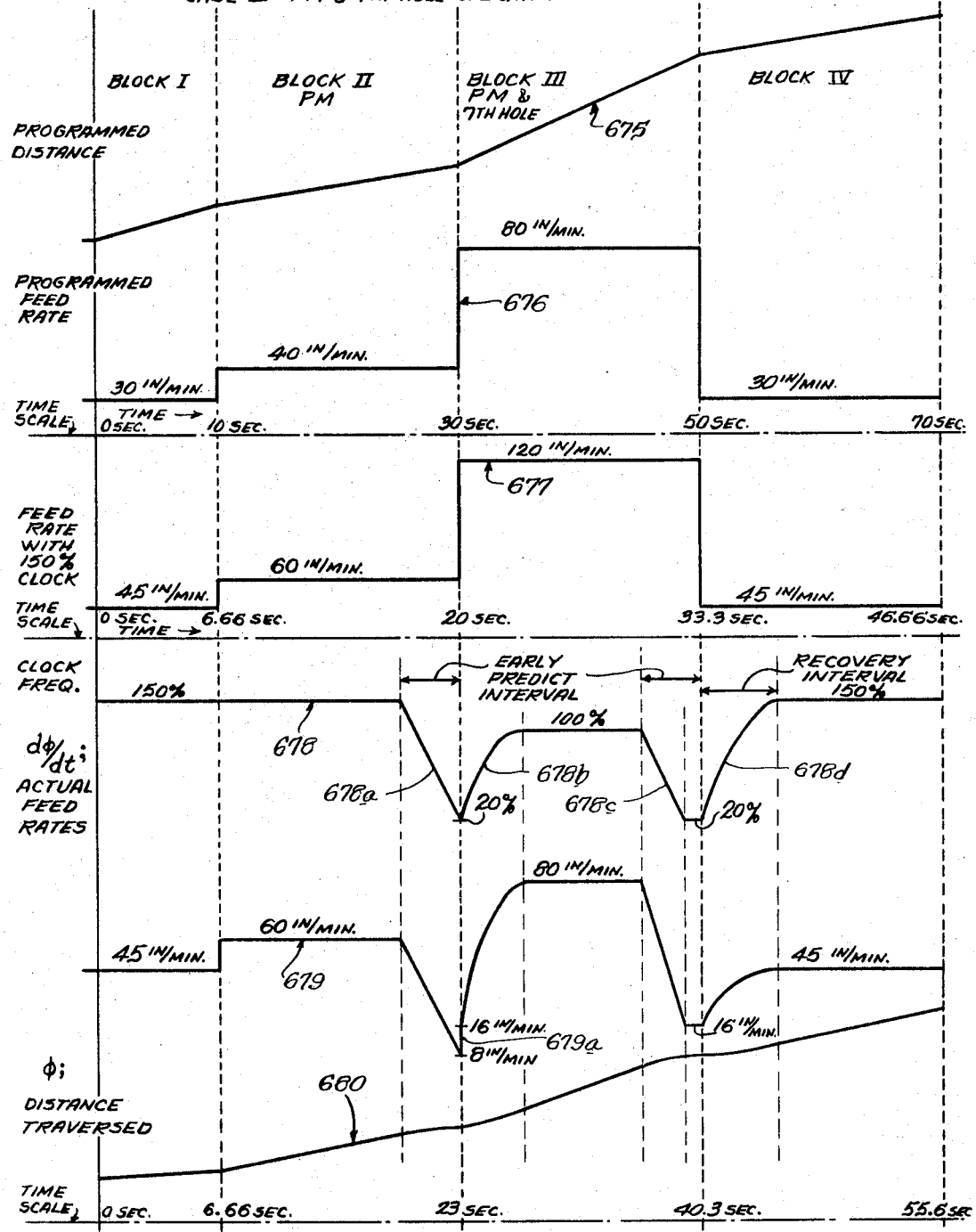

It is posisble that both such corrective actions should occur for the same block of data to be processed, i.e., if the block requires an inordinate jump to a relatively high feed rate which, if the command clock were above 100%, would exceed the rating of the machine tool drive. FIG. 34 graphically illustrates this operation and will serve to yield a better understanding of the operation of the circuitry described above. In a sense, FIG. 34 is simply a combination of what has been illustrated in FIGS. 32 and 33. The first curve 675 in FIG. 34 depicts the variation in distance traversed versus time, for four blocks of an exemplary numerical program; while the curve 676 depicts the resulting feed rates which would occur at the machine tool if that program were carried out. The curve 677 shows the feed rates which would occur at the machine tool if the program represented by the curve 675, 676 were processed through the director with the command pulse clock set to operate at 150% frequency. Now it will be observed from the curve 676 that a relatively steep jump in feed rates is programmed to occur between blocks II and III; it is here shown as a jump in feed rate of 40″/min. Similarly, there is a relatively great downward jump in feed rate, amounting to 50″/min. between blocks III and IV. Thus, in anticipation of the necessity for correcting the acceleration which would otherwise be attempted at the machine tool, blocks II and III will have P or M symbols programmed therein in lieu of plus or minus sign symbols. Also, it will be observed from curve 676 that a feed rate of 80″/min. is called for during block III. Since, as shown by the curve 677, this would produce a feed rate of 120″/min. if the data were processed in the director with the clock turned to 150%, a seventh hole will be placed in the punched tape 112 for block III.

The curve 678 depicts the resultant variation in the frequency of the command clock 128 as a result of the automatic compensation which will be produced in response to reading the P-M and seventh hole signals. As shown, an "early predict" interval will be produced at the end of the processing of the second block of information, causing the command clock frequency to decay exponentially at 678a from the 150% value to a 20% value. It will be noted that the curve 677 is drawn to a different time scale than the curve 676 owing to the effect of the clock being set above 100% frequency, while the curve 678 is drawn to a different time base than the curve 677 owing to the "time stretch" occasioned by the smooth changes in command clock frequency. After the clock frequency has been smoothly decreased as shown at 678a, and the next transfer pulse occurs, it would normally rise again to the original value. However, at this time the relay R178 (FIGS. 29 and 30) is energized so that the capacitor 621 charges only up to the 100% voltage level, and the frequency of the command clock rises exponentially only to the 100% level as shown at 678b in FIG. 34. The command clock then continues to operate at 100% frequency until another predict signal occurs, causing the capacitor 621 to discharge from the 100% voltage level to the 20% voltage level. This resulting decrease in command clock frequency is illustrated at 678c in FIG. 34. Finally, when the next transfer pulse occurs, both the relays R139 and R178 (FIGS. 29 and 30) will be de-energized, so that the capacitor 621 charges exponentially from a 20% value to the 150% voltage level, causing a corresponding increase in the command clock frequency as shown by the curve portion 678d.

The curve 679 in FIG. 34 simply illustrates the resulting variation in the first derivative $d\phi/dt$ of the analogue signal produced by the decoder when the command clock frequency varies as shown by the curve 678. The curve 679 also represents feed rates which will be produced upon control of a machine tool element by the analogue signal. It will be seen, therefore, that while the curve 677 has a feed rate of 120″/min. for block III, the compensating action limits that feed rate to 80″/min. in actuality, as shown by curve 679. Moreover, while both the curves 676 and 677 show that relatively great step changes are called for in the feed rate, curve 679 illustrate that the compensating action here produced results in smooth reductions of feed rates followed by relatively short step changes such as at 679a which the machine tool drives and servo controls can accommodate.

The curve 680 in FIG. 34 simply depicts the corresponding variation of distance traversed versus time (corresponding to the modulation of the analogue signals produced by the director) at the machine tool, showing that, while feed rates are smoothly changed, time periods for traversing the distances programmed in each block are correspondingly modified so that the distances traversed remain the same as those originally represented by the numerical program.

SPECIAL CONTROL FUNCTIONS

There has been described thus far improved methods and apparatus for creating analogue control signals from programmed, numerical sign, time and distance information placed in digital form on a record, such as punched tape. Those analogue signals may be used to modulate or control the motion of movable machine tool elements, as will be specifically described below. However, in addition to processing information for motion control, the present invention makes possible the selection of certain of the director's modes of operation and, also, the control of auxiliary components or power devices at the machine tool at selected points in an over-all machining operation. This is most important for its achieves the ultimate objective of permitting substantially complete control of the director from the digital record, and substantially complete control of all the power devices at the machine tool by signals produced in the director. Thus, a program engineer in making up a tabulated manuscript of numerical data such as shown in FIG. 8 may so insert special numbers or codes which will largely eliminate any need for close attention by an attendant at the director, or subsequently by an operator of the machine tool.

In accordance with the invention, special codes are placed on the digital record, corresponding to certain conditions desired in the director and certain operations desired at the machine tool at different points during a complete machining program. These special code signals, reproduced by the tape reader, are fed into different parts of the director than the sign, time, and distance information signals; and they are utilized in a different way to bring about special control functions.

As here illustrated by way of example, a special code is designated by an "$x$" followed by two decimal digits in the program. The three digit combinations "$x05$," "$x04$," and "$x00$" appearing in FIG. 8, for example, are typical special codes, the first two of these appearing in coded digital form at the upper end of the punched tape 112 (FIG. 9), as a result of being typed into the punched tape preparation apparatus. It may be observed here that special codes may be inserted into the manuscript between any horizontal line (FIG. 8) corresponding to one block of information; the special codes may thus appear as four transverse rows of holes at any region of the punched tape 112 (FIG. 9) as long as they are not mixed in with the serially spaced lines of one block of information. Therefore, at substantially any point in time within an over-all program, a special function may be caused to take place. Such special codes, in addition to three digits such as "$x05$," may be said to include a fourth digit "CR." Each special code is placed on a separate line of the tabulated data as shown in FIG. 8, and a "carriage return" is typed after the three special code digits before typing the next line of information into the tape preparation apparatus. Thus, as shown by the four top transverse rows of holes in the punched tape 112 (FIG. 9), the first special code may be said to read "$x05$CR."

To make clear the following detailed description, it will be helpful to tabulate here the particular special codes assigned to respective functions in the present instance. These are:

DIRECTOR FUNCTIONS (A) Axis selection (1) 5 out of 5 axis operation $x05$ (2) 3 out of 5 axis operation $x35$ or $x53$—ABD axes
$x45$ or $x54$—ACD axes
$x36$ or $x63$—ABD axes
$x46$ or $x64$—ACE axes (B) Director speed selection $x01$—1:1 time ratio
$x02$—2:1 time ratio
$x04$—4:1 time ratio (C) Stop $x00$

MACHINE TOOL FUNCTIONS $x00, x07, x08, x09,$
$x10, x12, x17, x18, x19,$
$x20, x21, x22, x27, x28, x29,$
$x70, x71, x72, x77, x78, x79$
} For ON–OFF control of auxiliary power devices.

The use of and response to these special codes will become clear as the following description proceeds.

*Response to an "$x$" in the director*

When an "$x$" code line is read by the punched tape reader 120, the "$x$" relay R157 in the decoding matrix 121 (FIG. 10) will be de-energized, and its contacts R157a will close. The coil of the relay R157 is thus shunted and sealed out by a ground path through the contacts R157a, over a line 700, and through contacts R160b (usually closed) and R109a. Thus, even though the tape reader 120 subsequently reads successive lines in the punched tape, the "$x$" relay R157 will remain de-energized until a "CR" code is read, and the contacts R160b open.

Drop-out of the relay R157 has several effects:

(1) As shown in FIG. 15, the contacts R157f open so that the relay R106 drops out and the tape reader clutch coil 160 (in parallel therewith) is de-energized. The punched tape reader 120 (FIG. 10) thus stops immediately upon reading an "$x$" code line.

(2) The contacts R157g (FIG. 11) open so that even with the closure of the cam switch CS3 and different ones of the relay contacts associated with the matrix 122, no conduction path to ground can occur. Accordingly, information cannot be applied into the magnetic system for as long as the relay R157 is de-energized. The storage register cores all contain binary "1's" owing to the "advance" pulses.

(3) The contacts R157i (FIG. 20) open, so that the gate in the "dump" circuit opens and prevents any dumping in the magnetic system when the next transfer pulse is supplied from the frequency divider 129. Thus, after a clear pulse at the end of the interrogation of the preceding block of information, the storage register cores all contain binary "0's".

(4) The contacts R157g (upper left, FIG. 14A) close, so that the rest cycle gate 294 opens. Thus, when the next transfer pulse appears (at the end of interrogation of the block of information preceding the "$x$" code line on the punched tape), it first re-sets all of the time period controlling flip-flops 281 and then after a delay occasioned by the delay circuit 293, passes through the gate 294 to "set" the 1 second time period flip-flop and open the 1 second gate 281. Accordingly, the frequency divider 129 receives command clock pulses and begins operation for a 1 second "rest cycle." The interrogate output pulses from the frequency divider 129 during this "rest cycle" period cause no command output pulses from the magnetic system since the storage register contains all binary "0's".

(5) The contacts R157h (FIG. 29) close to set the flip-flop 574, energizing the "P–M" relay R138 and conditioning the "predict" thyratron 571. The next predict pulse (preceding the first transfer pulse after an "$x$" code is read) results in energization of the "predict" relay R139. Thus, "acceleration adjust" operation takes place, the frequency of the command clock 128 decreasing exponentially to a 20% value as previously explained. This prevents undue deceleration at the machine tool when the machine tool elements are brought to a stand-still during the "rest cycle." However, the contacts R157e and R157i (in the sealing circuits for the relays R138 and R139) are at this time closed so that when the first transfer pulse occurs, the relays R138 and R139 are not de-energized. As a result, the frequency of the command pulse clock 128 is maintained at its low value, e.g., about 20%, through the entire 1 second rest cycle. Because the command clock frequency is held at about 20% during the 1 second rest cycle, that rest cycle will in actual time consume about 5 seconds. Then, after the relay R157 is again energized, the following transfer pulse (occurring at the end of the rest cycle), will momentarily open the contacts R130a and R130b, de-energizing the relays R138 and R139 so that an exponential rise in the command pulse clock frequency will take place. This prevents an undue step acceleration of the movable elements upon corresponding control at the machine tool.

The transfer pulse which first occurs after an "$x$" code is read will momentarily energize the transfer pulse relay R130 (FIG. 15) as previously explained. This closes the contacts R130e (FIG. 15) so that the relay R106 is energized and the clutch coil 160 (FIG. 10) in parallel therewith is likewise energized. The tape reader 120 thus resumes operation and reads the succeeding lines on the punched tape until the next "$x$" code line is sensed, or until the next "CR" code line following a "tab" code line is sensed.

First, the reader 120 will read the two following digits in the "$x$" code, and these will not create any responses in the coding matrix 122 (FIG. 11) because the contacts R157g are open. The reader 120 then reads a "CR" code, and this will open the contacts R160b (FIG. 10) so that the "$x$" relay R157 is again energized. Therefore, the contacts R157g (FIG. 11) will close and signals corresponding to subsequent lines of time, sign and distance information on the punched tape will then flow into the shifting register of the magnetic system. This reading of the two digits in the "$x$" code and the subsequent read-in of the following block of numerical information occurs during the "rest cycle" which, due to the fact that the command clock has been reduced to a 20% frequency, will require about 5 seconds.

With the above explanation of the sequence of events which occur in response to an "$x$" code line on the punched tape 112, reference will now be made to the organization and operation of the means which respond to and process the special code signals.

*Machine tool auxiliary functions*

At various points in an over-all machining operation, it will be necessary to energize or de-energize certain auxiliary power devices at the machine tool. For example, to plunge or retract the head 52, it will be necessary to energize or de-energize a solenoid valve controlling the pneumatic ram 76 (FIG. 1), thus lowering or raising the cutter 54 into or out of engagement with a workpiece. By way of further example, it is desirable to be able to stop the operation of the magnetic tape playback equipment 98 at certain times during the over-all operation so that cutting tools may be inspected or changed. Still further, certain motors for lubricant pumps, coolant pumps, spindles or the like will have to be turned on or off at predetermined times in an over-all operation. Also, it may be desired to operate or release power clamps which positively hold movable machine tool elements in certain positions until movement thereof is desired. Numerous other auxiliary power devices which need to be turned on or off will occur to those skilled in the art.

The present invention permits such control of auxiliary power devices at the machine tool at the proper points in an over-all machining operation as a result of programmed special signals placed on a digital record such as the punched tape 112 (FIG. 9). Special codes are used on the digital record at the selected points in the program, and these codes are processed, when read into the director, in a manner such that output signals are created which are subsequently utilized to control the operation of the power devices at the machine tool.

In the present instance, a large number of such auxiliary codes are available for assignment to effect operation of different auxiliary power devices. Each of these special codes for controls at the machine tool begins with an "$x$" and has either a decimal 0, 1, 2, or 7 as its second digit. Thus, each of these codes in the first two places reads "$x0$," "$x1$," "$x2$," or "$x7$." The third digit place in such special codes may have any decimal number (except 3, 4, 5 or 6, if the first two digits are $x1$, $x2$, or $x7$), for example, the codes "$x20$," "$x21$," "$x27$," "$x28$," and "$x29$," are available for controlling different auxiliary power devices, or for effecting different operations of the same power device at the machine tool. Reference may be had to the table in col. 65, supra, for a complete list of the available codes.

Thus, in between any two blocks of numerical sign, time, and distance information, the desired special code for effecting the desired operation of an auxiliary power device at a machine tool may be placed on the digital record or punched tape 112. By way of specific example in the following description, operations at the machine tool will be assigned the following codes:

$x00$—Stop magnetic playback at end of program.
$x09$—Stop magnetic tape drive to permit inspection, changing of cutter, or the like.
$x10$—Start lubricant pump motor.
$x11$—Start coolant pump motor.
$x10$ and $x11$—Start spindle motor.
$x12$—Stop lubricant pump motor, coolant pump motor and spindle motor.

Referring now to FIGS. 10 and 35, it will be seen in the latter figure that five auxiliary relays R120–R125 are employed in the auxiliary on-off control circuitry. For convenience, the relay R120 is assigned the secondary designation "$xx$," the relay R120 the designation "$x0$," the relay R123 the designation "$x1$," the relay R124 the designation "$x2$," and the relay 125 the designation "$x7$." Suppose now that as the punched tape reader operates, it reads an "$x$" code line. The relay R157 will therefore be de-energized (FIG. 10), and be permanently sealed out over the line 700 and through the contacts R160b until the next carriage return code CR is read from the punched tape. As soon as the "$x$" code line is read, the punched tape reader 120 stops and the director goes through a "rest cycle" as previously explained. De-energization of the "$x$" relay R157 results in closure of the contacts R157f (FIG. 35) which connects an auxiliary bus 701 to ground through the normally closed transfer pulse relay contacts R130g.

Then when the tape reader begins operation again it will first read a code line for the decimal digit 0, 1, 2 or 7. As a result, one of the relays R143, R144, R145, or R150 (FIG. 10) will be de-energized and it will be momentarily sealed out to ground through the respective normally closed contacts R121a, R123a, R124a, or R125a, and the normally closed contacts R120a leading to the cam switch CS2.

Now momentary de-energization of one of the relays R143, R144, R145 or R150 will result in closure of one corresponding set of the contacts R143e, R144f, R145e, R150f shown in FIG. 35. Therefore, a corresponding one of the relays R121, R123, R124 or R125 will be energized through a conduction path leading to ground. For example, if the first two code lines of a special code are "$x1$," the relay R123 will be energized upon closure of the contacts R144f by current flow from a positive voltage source through its coil, the contacts R144f, the contacts R121d, the contacts R124e, the contacts R125e, a diode 725, the contacts R157f, and the contacts R130g, to ground. Upon energization of the relay R123, its contacts R123b will close to create a sealing circuit in parallel with the contacts R144f and R121d. Therefore, even though the relay R144 is subsequently re-energized, the relay R123 will remain sealed in until the contacts 157f open.

As soon as one of the relays R121–R125 is energized and sealed in, a corresponding set of the normally closed contacts R122a, R123a, R124a or R125a (FIG. 10) will open, thereby breaking the seal-out circuit for that particular one of the 0, 1, 2 or 7 relays (R143, R144, R145 or R150) which was de-energized. Pursuing the above example, if the code "x1" has been read and the x1 relay R123 energized and sealed in, then the contacts R123a in FIG. 10 will immediately open so that the "1" relay R144 will be re-energized.

As soon as this sequence of events occurs, a conduction path will be completed to energize the "xx" relay R120 (FIG. 35). With one of the relays R121–R125 (x0, x1, x2, or x7) energized, a corresponding one of the normally open contacts R121c, R123a, R124c or R125c will be closed, and upon the re-energization of the 0, 1, 2 or 7 relay which was previously de-energized, another series-connected set of relay contacts R143e, R144e, and R145e or R150e will close. Pursuing the above example, if the code "x1" has been read, the "x1" relay R123 will be energized and the contacts R123c in circuit with the relay R120 will be closed. Then upon re-energization of the relay R144, the contacts R144e will close and complete an energization path for the relay R120 through the normally closed contacts R121e, the diode 725, the "x" relay contacts R157f, and the contacts R130g to ground. As soon as the "xx" relay R120 picks up, it seals in through its own contacts R120d to the bus 701, and thus will remain energized until either the "x" relay contacts R157f or the contacts R130g open.

With the energization and seal in of the "xx" relay R120, the relay contacts R120a (FIG. 10), open while the relay contacts R120b and R120c close. Therefore, the normal seal out path through the cam switch CS2 for the various relays R143–R145, and R150–R152 through the contacts R120 is broken and an alternate seal out path through the contacts R120b or R120c and thence through the contacts R160b (CR) is established. Upon reading of another decimal digit from the punched tape, therefore, the corresponding one of the relays for the decimal digits 0, 1, 2, 7, 8 or 9 will lead through either the contacts R120b or the contacts R120c and thence through the relay contacts R160b to ground. This "stretches" the time during which the relays are de-energized, holding them de-energized until the next carriage return code line is read from the punched tape and which, as explained, causes de-energization of the relay R160 and opening of the contacts R160b. It may also be observed that whenever and "x" code line is read, the contacts R157b open to break the normal seal out path for the 3, 4, 5, and 6 relays (R146–R149) through the cam switch CS2, while the contacts R157c close to establish an alternate "time stretch" seal out circuit through the relay contacts R160b, thus holding the relays R146–R149 de-energized until the next carriage return code is read.

With the relay contacts in FIG. 10 conditioned as explained, and with the reading of a second decimal digit code line from the punched tape, one of the relays R143–R145 and R150–R152 corresponding to that decimal code line will be de-energized by the matrix 162 as previously explained. When this occurs, the particular one of these relays which is de-energized will be sealed out through the now closed contacts R120b or R120c until the next carriage return code line is read. Accordingly, normally closed contacts of the particular one of these relays R143–R145 and R150–R152 which is de-energized will close and remain closed until the next carriage return code line is read. For example, if the complete auxiliary function code "x12" is read, the relay R145 will be de-energized, and its contacts R145g, R145h, R145i, and R145j appearing in the lower portion of FIG. 35 will all be closed.

It will be appropriate to note that even though the "x" relay is at this time de-energized, a second one of the "x0," "x1," "x2," and "x7" relays R131–R125 will not be energized upon reading of the second decimal digit code in a three-digit special code because of interlocking contacts. As shown in FIG. 35, if the relay R121 has been previously energized, the relay R123 cannot be energized because the contacts R120d will be open; and the relays R124 and R125 cannot be energized because the contacts R121e will be open. If the relay R123 has been previously energized, the relay R121 cannot be energized because contacts R123e will be open; and the relays R124 and R125 cannot be energized because the contacts R123 will be open. If the relay R124 has been previously energized, the relay R125 cannot be energized because the contacts R124d will be open; and the relays R121 and R123 cannot be energized because the contacts R124e will be open. If the relay R125 has been previously energized, the relay R124 cannot be energized because the contacts R125d will be open; and the relays R121 and R123 cannot be energized because the contacts R125e will be open. Thus the second decimal digit in a three-digit special code has no effect on the relays R120, R121, R123, and R125 in FIG. 35.

Summarizing then, if a code such as "x12" is read, the "x1" relay R123 will be energized and sealed in; and the "2" relay R145 will then be momentarily de-energized. Similarly, if a code such as "x79" has been read from the punched paper tape, the "x7" relay R125 will be energized and the "9" relay R152 (FIG. 10) will then be momentarily de-energized.

This energization and de-energization of the relays in a particular pattern according to any one of the several possible auxiliary function special codes is used to apply a signal to the proper one of a plurality of terminal points which correspond respectively with the several available special auxiliary function codes. This is accomplished in the present instance by a relay contact matrix illustrated in the lower portion of FIG. 35. The contacts R120e (closed when a special code beginning with "x0," "x1," "x2," or "x7" has been read) connect the auxiliary ground bus 701 to a second auxiliary ground bus 726. Now if the special code which has been read begins with "x0," "x1," "x2," or "x7," then a corresponding one of the contacts R121f, R123f, R124f, or R125f will be closed, placing one of the four lines 727, 728, 729, or 730 at ground potential. This will occur as soon as the first two digits in a special code have been read. Then upon reading the third digit of a special code, and de-energization of the corresponding one of decimal code relays R143–R145, R147, or R150–R152 in FIG. 10, a set of relay contacts will close to place a particular one of the several terminals at the bottom of FIG. 35 at ground potential, that terminal corresponding to the three-digit special code which has been read. Pursuing the above example, if the code "x12" has been read, the relay contacts R123f will be closed to ground the line 728, and then the contacts R145h will momentarily close to ground the output terminal "x12" corresponding to the code which has been read. To take another example, if a code "x79" has been read, then the contacts R125f will be closed, and the contacts R152j (corresponding to the 9 decimal code relay R152) will momentarily close to ground the terminal "x79" corresponding to the particular special code which has been read.

In summary, any one of a large number of special codes containing three digits beginning with the symbol "x" may be read from the digital record such as the punched tape 112 and this will cause a particular terminal corresponding to the particular code which has been read to receive a momentary signal, in this instance to be placed at ground potential.

Of course, when the next carriage return code line is read from the punched paper tape, the contacts R160b (FIG. 10) will open, thereby destroying the seal out circuit for the "x" relay R157 and the other relays in FIG. 10.

With that, the contacts R157f in FIG. 35 will open, dropping out those ones of the relays R120–R125 which have been previously energized and restoring the entire circuit to its original condition. It is then read to read another special code whenever it might occur.

The manner in which momentary grounding of one of the special code output lines in FIG. 35 is utilized may now be explained. The special code output terminals shown at the bottom of FIG. 35 connect with or are identical to the same terminals shown at the bottom of FIG. 37. These terminals are part of a patchboard 740 and may be selectively connected by plug-in leads to the lower ends of any of a plurality (here 28, not all shown) of diodes 741. The upper ends of the diodes 741 may be selectively connected by plug-in leads to any of a plurality of relay terminals to effect energization and de-energization of relays, as will be explained. As shown, the patchboard 740 includes some fourteen relays R1, R1' through R7, R7', although for simplicity, the relays R4, R4' through R6, R6' have not been illustrated.

Each of these delays is connected as shown, in a manner similar to the relay R1. The latter has its coil connected to a positive voltage source through a resistor 742, the relay presenting an energization terminal R1E and a de-energization terminal R1D. Thus, a conduction path to ground from the terminal R1E will result in energization of the relay R1, while a conduction path to ground from the terminal R1D will result in a voltage drop across the resistor 742 which will shunt and de-energize the relay coil R1. The relay R1 also has associated normally open contacts R1a leading through a selector switch R1S either to a ground line 744 to an auxiliary ground bus 746 which is connected to ground through normally closed transfer pulse relay contacts R130i. Thus, it will be apparent that if the relay R1 is energized and the switch R1S set to connect to the ground bus 744, the relay will remain sealed in until a conduction path to ground is provided from the terminal R1D. Alternatively, if the selector switch R1S is set to connect with the auxiliary ground bus 746, energization of the relay R1 will result in its being sealed in until the contacts R130i open, and this will occur when the next transfer pulse is provided from the frequency divider. Since if a special code has been read which results in the energization of the relay R1, the frequency divider is put through a 1 second rest cycle period but with the command clock frequency reduced to 20% as previously explained, the next transfer pulse occurring after energization of the relay R1 will appear some 4 or 5 seconds later and this will cause opening of the contacts R130i. Therefore, if the switch R1S is set, as shown, to connect with the auxiliary ground bus 746, energization of the relay R1 will result in its being sealed in for about 4 or 5 seconds, after which it will be automatically de-energized.

Now whenever one of the relays R1, R1' through R7, R7' is energized, a signal is created which can be used at the machine tool to control an auxiliary power device. To bring this about, the relays R1, R1' through R7, R7' each have a normally open contact connected into a recording signal control circuit as shown by FIG. 37a. Each of the relays R1–R7 has contacts which connect from a bus 747 (supplied continuously with a 200 c.p.s. signal) through a resistor to an associated one of the output terminals 750a–750g. Likewise, each of the relays R1' through R7" have normally open contacts which connect from a bus 748 (supplied continuously with a 400 c.p.s. signal) through a resistor to corresponding ones of the seven output terminals 750a–750g.

The 200 and 4000 cycle signals applied to the buses 747, 748 may conveniently be obtained by connection to the terminals 751, 752 in FIG. 22B which receive 200 or 4000 c.p.s. signals, respectively, from the reference scaling channel 310 of the decoder. It will be clear that with master pulses applied to the scaling channel 310 at 160 kc., then an output from the second flip-flop in the first decade 310b will have a 4000 c.p.s. frequency, and an output from the last flip-flop in the decade unit 310c will have a 200 c.p.s. This derivation of 200 and 4000 cycle signals from the reference scaling channel of the decoder is particularly advantageous since it will result in 200 and 400 cycle signals upon playback of a magnetically recorded tape at the machine tool even through the master clock frequency is something other than 160 kc. under certain modes of director speed operation. This will be apparent from the further description given below.

If the relay R1, for example, is energized, then a 200 c.p.s. signal will appear on the terminal 750a, and if the relay R1' is energized, a 4000 c.p.s. signal will appear on the terminal 750a. Thus, each of the terminals 750a–750g may be controlled by the relays in FIG. 37 so that it has either no signal thereon, a 200 c.p.s. signal, a 4000 c.p.s. signal, or both a 200 or 4000 c.p.s. signal. These alternating signals of relatively high frequency are particularly suitable for recording on a medium such as the magnetic tape.

The terminals 750a–750g connect to corresponding terminals in FIG. 24 which, in turn, lead to seven corresponding magnetic recording heads 755a–755g disposed opposite seven auxiliary tracks on the magnetic tape 95. Thus, as the director is in operation and the recording of analogue signals produced thereby as a result of processing numerical information from the punched tape is taking place, at predetermined points when special function codes are read from that tape, the auxiliary recording head 755a–755g will serve to impress auxiliary control signals on the seven auxiliary tracks of the magnetic tape 95. These signals may be reproduced and utilized at the machine tool to effect the operation of various auxiliary power devices at the programmed instants as a complete machining operation progresses.

The patchwork 740 shown by FIG. 37 has been illustrated with plug-in lead connections to illustrate exemplary assignment of special function codes for certain purposes at the machine tool. In the present instance, the terminal R1E of the relay R1 is shown connected by leads 759 through one of the diodes 741 to the "x00" code terminal so that whenever this code is read, the relay R1 will be energized, and by virtue of the setting of the switch R1S, held energized for a short period on the order of 4 seconds. The code "x00" is assigned to represent not only "stop" in the director, but it may be assigned the function of stopping the magnetic playback equipment at the machine tool, as will be explained.

The code "x09" is assigned the function of stopping the operation of magnetic playback equipment at the machine tool whenever that code appears in the punched paper tape 112. By programming this code, the operation of the machine will be terminated automatically to permit the machine operator to change the cutter tool, make various inspections, or the like. As will be explained presently, the operator can then cause resumption of the operation at the machine tool by depressing a "start" switch. The assignment of this "x09" code to the function of stopping magnetic playback and operation at the machine tool is made by a plug-in leads 760 (FIG. 37) from the "x09" terminal, through one of the diodes, to the R1'E terminal of the relay R1'. When the "x09" code is read in the director, therefore, the relay R1' will be energized for a short interval of time in the order of 4 seconds, by virtue of the setting of the switch R1'.

The code "x10" has been assigned the function of starting a lubrication pump motor at the machine tool. As shown in FIG. 37 there is a connection by leads 761 from the "x10" terminal to the R2E terminal of the relay R2. The code "x11" has been assigned the function of starting the coolant pump motor at the machine tool. As shown, there is a connection by leads 762 from the "x11" terminal to the R2'E terminal of the relay R2'. Accordingly, whenever the "x10" and "x11" codes appear, the relays R2 and R2' will be energized and permanently sealed in by virtue of the setting of their switches R2S and R2'S. The code "x12" has been assigned the function of stopping a lubricant pump motor and a coolant pump motor at the machine tool as shown by the leads 763 connecting the "x12" terminal in FIG. 37 to both the R2D and R2′D terminals. Thus, when the code "x12" is read, both the relays R2 and R2′ will be de-energized.

With the above exemplary connections, it will be apparent that the magnetic recording head 755a will receive a 200 cycle signal for impression on the magnetic tape whenever the relay R1 is energized, and will receive a 4,000 c.p.s. signal for recording on the same channel of the magnetic take whenever the relay R1′ is energized. Correspondingly, the magnetic recording head 755b will receive both a 200 c.p.s. and a 4,000 c.p.s. signal for recording on the same track of the magnetic tape whenever the relays R2 and R2′ are energized. The manner in which these recorded signals are utilized at the machine tool to carry out the functions assigned by way of example to the specific codes noted will be made clear in connection with a description of controls for magnetic playbacks and operation of the machine tool.

*Special functions in director*

(a) *Director speed selection.*—Certain components in the data input system for the director, such as the punched tape reader 120 (FIG. 10), may have a limited operating speed so that information cannot be abstracted from the punched digital record as fast as director information processing circuits can accept it. In the present case, for example, the punched paper tape reader has a maximum reading speed of about 30 lines per second. Since to control motion along five axes each block of information must include five groups of digits each containing seven decimal numerical digits and one sign digit, as well as three digits to represent the programmed time period, all approximately spaced by tab and carriage return code lines, each block of information on the paper tape will contain a total of approximately 49 transverse rows of holes in the specific arrangement here described. If the time period programmed for a given block to be processed is very short, say 1 second, then the tape reader will not be able to supply all the information in the next block into the shifting register in the time interval during which the preceding block of information is being interrogated. In other words, a transfer pulse might occur before the tape reader 120 had completely sensed all of the information in a succeeding block.

As a solution to this difficulty, it has been proposed to make it possible to "slow down" the director's operation so that a given programmed time period for one block of information will require more director time and thus permit an adequate time interval for read-in of all information from the punched paper tape. However, the present proposal is one which includes provision for controlling the director in a manner that analogue signals recorded on the magnetic tape will, upon playback at the machine tool, control the latter just as if the director had been operated at a normal rate or speed. In other words, and by way of example, if a given block of information is programmed to require a 2 second time period, the director may be made to process this at a slower rate, in say 4 seconds, while upon playback at the machine tool the control under that block of information will require the original value programmed, namely 2 seconds.

To accomplish the foregoing, means within the director are made responsive to special codes which may be placed in the digital record or punched tape and which will reduce the director's time, or the director's speed by predetermined ratios. In other words, means are provided to make the director work on a 1:1 time ratio, 2:1 time ratio, or 4:1 time ratio, depending upon the particular director speed selection code which is placed on the punched tape. Of course this selection code may be placed at any point in an over-all program to change a previously selected time ratio.

As shown in FIGS. 35 and 36, the code output lines for the auxiliary function relay contact matrix which correspond to the codes "x01," "x02," and "x04" connect to corresponding input terminals in the relay circuit of FIG. 36. The latter circuit is utilized to control the time ratio mode of operation for the entire director, the code "x01" representing a 1:1 time ratio, the code "x02" representing a 2:1 time ratio, and the code "x04" representing a 4:1 time ratio.

Referring to FIG. 36, it will be apparent that a momentary ground signal appearing on the code line "x01" will energize the relay R132 which will then seal in through its own contacts R132a. Also, a ground signal applied to the "x01" terminal will create a conduction path through a voltage-dropping resistor 777 and a diode 775 to de-energize the relay R133 if it was previously energized. In a corresponding manner, if the "x02" terminal in FIG. 36 is momentarily grounded, a conduction path to energize the relay R133 will be created (that relay sealing in through its contacts R133a), and a conduction path through a voltage-dropping resistor 778 and a diode 776 will be created to cause de-energization of the relay R132. If a ground potential is applied to the "x04" terminal in FIG. 36, then both the relays R132 and R133 will be energized and sealed in.

Summarizing, the relays are conditioned as shown below in response to the different speed select codes:

| Time Ratio | Code | R132 | R133 |
|---|---|---|---|
| 1:1 | x01 | Energized | De-energized |
| 2:1 | x02 | De-energized | Energized |
| 4:1 | x04 | Energized | Energized |

It will be apparent that once the relays R132 and R133 have been set in a given energization pattern, they will remain in that pattern until a different speed select code signal appears, whereupon they will be switched to agree with that code signal.

Contacts controlled by the director speed selection relays R132, R133 are employed at various locations to bring about a change of the time ratio in the director. As shown in FIG. 30, these relays operate to selectively connect one of the three resistors 608, 609 or 610 into operative relation with the command pulse clock 128. If an "x01" code has been received calling for a 1:1 time ratio, the relay contacts R132h and R133h will connect the resistor 608 in circuit with the capacitor 602, leaving the other two resistors 609, 610 disconnected. Alternatively, if an "x02" code has been received, calling for a director time ratio of 2:1, the relay contacts R132i and R133i will connect the resistor 609 in circuit with the capacitor 602, and the other two resistors 609, 610 will be isolated. Finally, if an "x04" code has been received, calling for a time ratio 4:1 in the director, the relay contacts R132j and R133j will both be closed to connect the resistor 610 in circuit with the capacitor 602. The relay contacts R132i and R133h will at this time be open, thus isolating the resistors 608, 609.

As shown in FIG. 30, the resistors 608, 609 and 610 have ohmic values of 250k ohms, 500k ohms, and 1 megohm so that if the resistor 608 produces a normal frequency of 16 kc. from the blocking oscillator, the resistor 609 will produce a frequency of 8 kc., and the resistor 610 produces a frequency of 4 kc. This comes about owing to the fact that a change in the resistance value of the R-C circuit controlling the blocking oscillator will change the time constant of that circuit and correspondingly change the frequency of operation of the blocking oscillator. Therefore, the command pulse clock 128 may be made to selectively operate at frequencies related in the ratios of 1:1, and 1:2 and 1:4 to the usual frequency of 16 kc. In this instance, the frequencies are 16 kc., 8 kc., and 4 kc., each of which may be considered as the "100% frequency" when the director is operating at 1:1, 2:1, and 4:1 time ratios, respectively.

Since the frequency of the command clock pulses in part determines the time period required for the frequency divider 129 to receive enough pulses to create a transfer pulse, this charge in the frequency of the command pulse clock 128 will modify programmed time periods by a corresponding ratio. In other words, when a given block of information is programmed to take place in 20 seconds, if the command clock is operating at 16 kc., processing will take 20 seconds. However, if the command pulse clock 128 is operating at 8 kc., processing of that block of information will require 40 seconds; and if the command pulse clock 128 is operating at 4 kc., processing of that block of information will require 80 seconds. In this manner, the director time is modified by a desired ratio depending upon which of the three director speed codes "x01," "x02," or "x04" has been programmed and represented by a special code on the punched tape 112.

Secondly, the director speed select relays R132, R133, have contacts controlling the gates 331, 334 and 336 in the master pulse clock 134 as shown in FIG. 22A. It will be observed that if the 1:1 director speed code "x01" has been programmed, the relay contacts R132d and R133d will both be closed, opening the gate 331 so that the master clock output pulses have a frequency of 160 kc. On the other hand, if the code "x02" calling for 2:1 director speed has been received, the contacts R133c and R132c will both be closed, opening the gate 334 so that the master clock 134 will supply master pulses at a frequency of 80 kc. Finally, if an "x04" code has been programmed, calling for director speed of 4:1, the contacts R132b and R133b will both be closed, opening the gate 336 so that master clock pulses will have a frequency of 40 kc. In this manner, the relation between command pulse frequency and master pulse frequency is maintained as the director is set to different time ratios. If in the 1:1 time ratio the master pulses have 160 kc. frequency, and the pulses appearing on the output line 340 of the reference channel have a frequency of 200 c.p.s., then in operation at 2:1 or 4:1 time ratios, output pulses appearing on the line 340 of the reference channel 310 in the decoder will have corresponding lower frequencies, i.e., 100 c.p.s. or 50 c.p.s. All other frequencies in the entire decoder will be reduced by a ratio of two or four whenever operation is in the 2:1 or 4:1 modes, respectively.

For a third controlling operation of the director speed-select relays R132, R133, they have contacts connected to control the energization of the multi-speed motor 365 for traversing the magnetic tape 24 in the magnetic recording apparatus 96, as shown in FIG. 24. The motor 365 has three alternate voltage input lines which will make the motor operate at full speed, one-half speed, or one-quarter speed. The relay contacts R133f and R132f will cause operation of the motor 365 at half speed when the director time ratio is 2:1 and the relay contacts R133e will cause operation of the motor 365 at full speed when the director operation is in the 1:1 time ratio. Normally open relay contacts R133g and R132g are connected in series with the one-quarter speed line so that the motor will operate at a fourth of its full speed when the two relays are energized, signifying a director time ratio of 4:1.

Thus, when a 2:1 or 4:1 time ratio has been programmed in the director, all programmed time intervals will be correspondingly increased by virtue of the fact that the command pulse clock frequency is correspondingly decreased. Also, however, normal frequency of analogue signals from the decoder will be decreased by the same ratio, while the speed at which the magnetic tape is traversed during recording will be correspondingly reduced. Therefore, upon playback of the recorded magnetic tape at full speed at the machine tool, the frequency of the playback signals will be the same as if the director had operated in the 1:1 ratio mode. Moreover, a given block of distance information recorded on the magnetic tape for a longer period but with the tape moving at a correspondingly reduced speed, will when the tape is played back at full speed at the machine tool consume the same amount of time as that originally programmed or as that which would have been produced had the director been operating in a 1:1 time ratio mode. Thus, the total effect of the director speed selection means is to "stretch" time in the director to allow certain of the components, such as the punched tape reader 120, ample time in which to carry out their functions; but upon playback at the machine tool, the magnetic tape recorded at the director produces exactly the same operation that would have been produced had the director been operating in a 1:1 time ratio. The machine tool does not know the difference.

One other change is made by the relays R132 and R133 whenever different director speeds are selected according to the programming of an "x01," "x02" or "x04" code. Referring to FIG. 30, it will be seen that two capacitors 800, 801 are arranged to be selectively connected in parallel with the acceleration adjust capacitor 621 according to the condition of the relay contacts R133k and R132k. If a 2:1 director time ratio has been programmed, the contacts R133k will be closed, connecting the capacitor 800 in parallel with the capacitor 621. This will, in effect, provide twice as much capacitance as before, so that the time constant for charging and discharging will be doubled. Accordingly, exponential decreases and increases in the frequency of the command pulse blocking oscillator 128 will take twice as long as if the capacitor 621 alone were in the circuit. This "stretches" the acceleration adjust operation, but upon playback of the recorded magnetic tape at full speed at the machine tool, the acceleration adjust operation occurs at the same rate that it would have had the director been in a 1:1 time ratio. It will also be seen that in a 4:1 time ratio operation, both the relay contacts R133k and R132k will be closed, connecting both the capacitors 800, 801 in parallel with the main capacitor 621. This will increase the time constant for charging and discharging to four times the value provided by the capacitor 621 alone. Accordingly, the exponential decreases and increases in the frequency of the command pulse clock 128 will take four times as long, but upon playback at the machine tool with the magnetic tape traversed at full speed, the effect will be the same as if the director had been operating in a 1:1 time ratio mode.

(b) *Stopping the director.*—The special code "x00" is employed in the director to terminate its operation. This special code is provided on the punched paper tape 112 at the end of a complete program and it serves to terminate the director's operation in a manner which will avoid abrupt deceleration of moving machine tool elements upon playback of the recorded analogue signals.

When the "x00" code is read, the sequence of operations previously described occur in response to the reading of the "x." That is, the director is put into a 1 second rest cycle period which causes acceleration adjust operation in the control of the command pulse clock, so that the frequency of the latter is smoothly decreased to about 20% of its normal operating frequency. Thus, the 1 second rest cycle actually requires about four or five seconds. As a result, a predict pulse occurs before the termination of processing for the preceding block of information and the modification of the output signals of the director will thus produce a smooth slowing down of the moving machine tool elements at the machine tool.

Then, when the second digits "00" in the "x00" code are read, the "x00" terminal in FIG. 35 is momentarily grounded in a manner previously described. This "x00" terminal in FIG. 35 connects to a corresponding point in FIG. 15 so that momentary grounding will result in energization of the "stop" relay R109. This opens the contacts R109c and R109d, FIG. 15) so that the "start" relay R105 will be de-energized and the relay R106 will be prevented from being energized when the relay contacts R130e momentarily close in response to the last transfer pulse occurring at the end of the rest cycle. Moreover, de-energization of the "start" relay R105 opens the contacts R105c in the sealing circuit of the relay R106. Therefore, as soon as the "stop" code "x00" is read, the relay R106 will be de-energized, and the clutch coil 160 (FIG. 10) for the punched tape reader 120 will be correspondingly de-energized. And when the next transfer pulse occurs, the relay R106 cannot be re-energized and the entire director ceases operation.

The last transfer pulse occurring at the end of the rest cycle will be supplied over the line 286 (FIG. 14A) to reset all of the time period controlling flip-flops 282 so that all of the time period controlling gates 280 are closed. Since no time information is subsequently dumped from the magnetic system to open one of the time period controlling gates, command clock pulses are permanently cut off from the frequency divider until the director is again put into operation in a manner previously described. Appropriate means (not shown) may, of course, be provided to automatically start and stop the magnetic recording drive motor 365 (FIG. 24) whenever the director is started and stopped.

It will also be recalled that whenever the "x00" or "stop" code is read the relay R1' (FIG. 37) will be energized during the following rest cycle.

(c) *Axis selection.*—The director here illustrated is intended to process information for the simultaneous control of motions along a relatively great number of axes, in this instance, five. That might be termed the normal or "full capacity" operation and it may be achieved through calling, in the program, for 5 out of 5 axis operation by means of the "x05" code placed on the punched tape as shown in FIG. 9. Often, however, motion along a lesser number of axes needs to be controlled; for relatively simple workpieces, for example, only 3 out of 5 axes may actually be needed during many machining operations. It will be recalled that information placed on the digital record such as the punched tape 112 is in serial form, that is, the successive coded binary digits representing the sign and distance information for a component of motion along one axis are serially spaced on the punched tape 112 to form one group, while a plurality of such groups are serially spaced (forming one block) to represent motion along a plurality of axes for one incremental cut. By making it possible to render the director operative in only 3 out of 5 axes, then two groups of digits may be eliminated from each block of the punched paper tape, and each block in the tape may therefore be read through the tape reader 120 in a shorter interval of time. This makes the digital record for a complete machining operation about a third shorter in 3 out of 5 axis operation than if zero code lines were placed therein for the two unused axes of control. When that digital record is prepared, the operator simply "tabs through" the columns for the unused axes, and only a tab code line appears at the point in the digital record which would otherwise have eight digit groups for those unused axes. Not only is the tape preparation faster and its length shorter, but on reading of that tape to check or reproduce it, much less time is required.

The present invention not only affords selective operation of the director in 5 out of 5 or 3 out of 5 axes, but also permits the selection of which 3 out of the available 5 axes are to be controlled. In the present case, the A axis (corresponding to motion of the machine tool table) is always used; but it is possible in 3 out of 5 axis operation to use various combinations of two of the remaining four axes. Thus, another function of the axis selection means here provided is to so condition the director that it will operate in the 3 particular axes which have been programmed according to a special "x" code placed on the punched tape.

Referring now to FIG. 35 where the axis select controls 141 are illustrated in more detail, it will be recalled that whenever an "x" code line of a 3 digit special code is read, the contacts R157f of the "x" relay will close and connect an auxiliary ground bus 701 to ground through the normally closed contacts R130g of the "transfer pulse" relay. Then, if the succeeding two code lines read from the punched tape are "05" the "0" relay 143 (FIG. 10) will be momentarily de-energized so that its contacts R143e (FIG. 35) momentarily close to energize the "x0" relay R121 through the contacts R123d, R124e, R125e, R175f, and R130g. The relay R121 will seal-in through its own contacts R121b, and it will cause closure of its contacts R121h in circuit with the coil of a relay R128 (termed the "05" relay). When the next line of the punched tape is read, the "5" relay R148 (FIG. 10) will be momentarily de-energized, so that the contacts R148f will close to complete an energization path for the relay R128. The latter relay will seal-in to ground through its own contacts R128u.

If either of the relays R126, R127 was previously de-energized, the energization of the relay R128 will also energize the latter relays through diodes 702, 704, the latter relays sealing in through their own normally closed contacts R126a and R127a. Thus, in response to the reading of an "x05" special code, the relays R126, R127 and R128 will all be energized.

The effect of this is as follows: All of the contacts of the relay R128 appearing in the axis-select network 124 (FIG. 11) will be in an actuated condition so that output signals from the coding matrix 122 will pass directly to the 5 out of 5 axis data inputs of the magnetic system. The 3 out of 5 data inputs, conversely, will be disconnected by open relay contacts, and the contacts R128i will be open to break the path through the resistors and diodes leading to the 5 out of 5 data input terminals. Moreover, the relay contacts R128j–m interposed between the D and C sections of the four places for the magnetic shifting register (FIG. 12B) will be closed so that the shifting register is complete from end to end to receive data input information required for control of five axes.

Now if, on the other hand, a 3 out of 5 axis code (such as "x35" or "x45") is read from the punched tape, the "x" relay contacts R157f will close. If the succeeding code line corresponds to the decimal digit "3," then the relay R146 (FIG. 10) will be momentarily de-energized, closing the contacts R146e (FIG. 35) which will complete an energization path for the relay R126 through normally closed contacts R121g of the "x0" relay. On the other hand, if the first digit following an "x" on the punched tape is a "4" code line, the relay R147 in FIG. 10 will be momentarily de-energized, closing the contacts R147h in FIG. 35 and thus causing current flow through a voltage-dropping resistor which will de-energize the relay R126 if it was previously sealed in.

In a similar manner, momentary closure of the contacts R148e, in response to the reading of a "5" code line and momentary de-energization of the "5" relay R148 (FIG. 10), will result in energization of the relay R127. And if the numerical digit in an "x" code is a "6," the momentary de-energization of the relay R149 will result in closure of the contacts R149h in FIG. 35, so that the relay R127 will be shunted and dropped out due to a potential drop across a series resistance.

In summary, therefore, if a 3 out of 5 axis-select code contains a "3," relay R126 will be energized, and if it contains a "4," the relay R126 will be de-energized. Similarly, if a 3 out of 5 axis-select code contains a "5" the relay R127 will be energized, and if it contains a "6," the relay R127 will be de-energized.

When these two relays are energized, they will seal-in through their own contacts R126a and R127a, respectively. They will thus remain energized until reading of a "4" or "5," respectively, occurs which will result in shunting of their respective coils.

If after the relays R126 and R127 have been conditioned according to an axis selection code such as "x35," they will not be affected if a subsequent reading of the decimal digit codes for 3, 4, 5 or 6 (de-energization of one of the relays R146–R149) in the third digit place of a code beginning with "x0." For under these circumstances the "x0" relay R121 will have been previously energized, and the contacts R121g will be open.

The line 710 connecting to the junction between a series resistor 711 and the coil of the relay R128 leads through four diodes 712. Closure of any one of the contacts R146e, R147h, R149h, or R148e will result in a current conduction path over the line 710 which will shunt the relay coil R128 and result in drop-out of the latter. In this manner, whenever a 3 out of 5 axis code is read, the relay R128 is made to assume the de-energized condition.

In 3 out of 5 axis operation, with the relay R126 de-energized, the contacts in the axis-select network (FIG. 11) will be so conditioned that output signals from the coding matrix 122 will appear on the 3 out of 5 axis data inputs to the magnetic system in FIG. 12A. And because the relay contacts R128i will be closed, ground potential will be supplied, each time the cam switch CS3 closes, to all four of the 5 out of 5 axis data input terminals. Moreover, as seen in FIG. 12B, the relay contacts R128j–m will all be open so that the shifting register is shortened to include only the A, B and C sections, input data from the coding matrix 122 being supplied over the 3 out of 5 data input terminals directly to the C section of the shifting register. Since the 5 out of 5 data input terminals are grounded each time the cam switch CS3 closes, binary "0"'s will be read into the E and D sections of the magnetic shifting register as sign, time, and distance information is read into the remaining three sections. Therefore, upon dumping, the E and D sections of the storage register will contain binary "0"'s and upon interrogation by the frequency divider will not supply any command pulse outputs to the decoder.

In this fashion, only three-fifths of the magnetic system is rendered effective to store sign, time and distance information and because that information is supplied to a middle portion of the shifting register, it is all shifted into the proper location.

The reason for supplying 3 out of 5 axis data to a midpoint of the shifting register is so that time information which comes at the beginning of each block will be properly shifted to the end of the register where it will be received in the time storage cores and properly read-out to the time period controlling flip-flops on dumping. If 3 out of 5 axis data were supplied at the left of the shifting register, it would be shifted inwardly only to the extent of the E, D and C sections, so that the time storage cores would not receive the time information and would not provide proper read-outs upon dumping.

(c1) *Information routing.*—From the foregoing description of what happens in the magnetic storage system when operation is in 3 out of 5 axes, it will be apparent that the last three vertical A, B and C sections of the magnetic system will contain all of the sign and distance information for three axes to be controlled. If, for example, the three axes A, C and E are to be controlled, the information intended for the C axis of the machine will actually be stored in the B section of the magnetic system, and the information intended for the E axis of the machine will actually be stored in the C portion of the magnetic system. Unless provision is otherwise made therefore, on read-out from the magnetic system, sign and distance information intended for the C channel of the decoder 132 and the magnetic recording head associated therewith would go to the D axis decoder and recording head; similarly, the time and distance information for the E axis of the machine would go to the C channel of the decoder and corresponding recording head.

To obviate this difficulty, provision is made for automatically routing information from the magnetic system to the proper one of the five decoder channels in response to any of the special codes for 3 out of 5 axis operation. Such routing is accomplished by means of gates which are in turn controlled by the relays R126, R127, and R128, which, as explained, are picked up in a predetermined pattern according to each of the possible axis-selection codes.

Referring first to FIG. 22A, the distance information routing means 131 there shown comprises five gates 715–719, the first being connected between the B section command pulse output terminal of the magnetic system and the B axis channel of the decoder 132. The second gate 716 is connected between the B section command output line of the magnetic system and the C channel of the decoder. The third gate 717 is connected between the C section command pulse output terminal of the magnetic system and the C axis channel of the decoder, while the last two gates 718 and 719 are connected between the C section command pulse output terminal of the magnetic system and the D and E axis channels of the decoder, respectively.

By opening and closing these gates in different combinations, command pulse outputs from the B and C sections of the magnetic system may be routed to different ones of the B, C, D and E axis channels of the decoder.

The controlling terminal of the gate 715 is connected through normally open contacts R126c to ground, so that the gate will be open whenever the relay R126 is energized. Correspondingly, the gate 716 is controlled by normally closed contacts R126e, so that it will be closed whenever the relay R126 is energized. The gate 717 is controlled by normally open contacts R128p, which cause that gate to be open when the relay R128 is energized, i.e., when operation is in 5 out of 5 axes. Finally, the gates 718 and 719 are controlled by normally open and normally closed contacts R127d, R127e, respectively, in combination with normally closed contacts R128r. The gate 718 will, therefore, be open whenever the relay R128 is de-energized and the relay R127 energized, while the gate 719 will be open whenever both the relays R128 and R127 are de-energized.

Taking an example, if 3 out of 5 axis section for the axes A, B and D has been programmed by the code "x35," the two relays R126, R127 will be energized, while the relay R128 will be de-energized, as previously explained. Therefore, the gate 715 will be open and the gate 716 closed so that information contained in the B section of the magnetic system and which is to be used to control motion along the B axis at the machine tool will be routed from the B section command pulse output terminal through the gate 715 to the B axis channel of the decoder, and it will be blocked from entering the C axis channel of the decoder. Also, the gate 717 will be closed and the gate 718 open so that information contained in the C section of the magnetic system which is intended to control motion along the D axis of the machine tool, will be blocked by the Gate 717 from entering the C axis channel of the decoder, but will be passed through the gate 718 to the D axis channel of the decoder, Finally, the gate 719 will be cosed so that command pulses appearing on the C command pulse output terminal of the magnetic system cannot enter the E axis section of the decoder.

For an understanding of how the gates 715–719 are properly controlled by the relays R126–R128 to properly route distance information from the last three sections in the magnetic system to the proper channel in the decoder, reference may be had to the following table:

| Axes Desired | Code | Relays | | | Gates | | | | |
|---|---|---|---|---|---|---|---|---|---|
| | | R126 | R127 | R128 | 715 | 716 | 717 | 718 | 719 |
| ABD | x35 or x53 | E | E | D | O | C | C | O | C |
| ACD | x45 or x54 | D | E | D | C | O | C | O | C |
| ABE | x36 or x63 | E | D | D | O | C | C | C | O |
| ACE | x46 or x64 | D | D | D | C | O | C | C | O |
| ABCDE | x05 | E | E | E | O | C | O | C | C |

E=Energized. D=De-energized. O=Open. C=Closed.

Besides the necessity for routing distance information from the last three sections of the magnetic system into the proper channels of the decoder in 3 out of 5 axis operation it is also necessary to route, in a similar manner, sign information from the last three sections of the magnetic system into the proper ones of the five sign-controlling channels R138A–R138E shown in FIG. 25. For this purpose, sign-routing circuitry 131a is shown in association with the sign-controlling channels in FIG. 25, and comprises five gates 715a–719a controlled by contacts of the relays R126, R127 and R128. The gates 715a–719a and the relay contacts are arranged in precisely the same manner as that previously described in connection with the distance routing circuitry 131 in FIG. 22A. Therefore, it is not believed necessary to describe the arrangement and operation of the sign routing circuitry 131a in detail, since it operates in exactly the same manner as the distance routing information. It is sufficient here to note only that whenever operation in 3 out of 5 axes is set up in the director by means of an appropriate special code, the relays R126–R128 will be energized in a particular combination and their contacts R126b, R126d, R128o, R128g, R127c and R127e will so control the gates 715a–719a that sign information read-out of the A, B, and C sections of the magnetic system will be routed to the proper ones sign-controlling channels 133A–133E.

It will be understood that in 5 out of 5 axis operation, the relays R126–R128 will all be energized so that information appearing on the five command pulse output terminals of the magnetic system will pass directly into the corresponding axis sign-controlling and decoder channels.

UTILIZATION OF RECORDED SIGNALS AT THE MACHINE TOOL

Control of movable machine tool elements

Once the magnetic tape 95 has been recorded by operation of the director as described above, analogue control signals being impressed on six tracks of the tape and auxiliary control signals impressed on seven other tracks of the tape, it is possible to store, duplicate and ship that magnetic tape, as may be desired. It is only necessary to put the magnetic tape through magnetic playback apparatus such as exemplified at 98 in FIG. 40 in order to reproduce the recorded signals. This reproduction may take place at the site of a machine tool however remotely located from the director itself, and the reproduced signals may be used not only to accurately control the sign, time, distance and feed rate of successive increments of motion for several different machine tool elements movable along different axes, but may also be used to appropriately control different auxiliary power devices.

Referring now to FIG. 40, the recorded magnetic tape 95 is played back on the equipment 98 which comprises, as shown in diagrammatic form, supply and take-up reels 825, 826 between which a suitable drive motor 827, operating on capstans 828, traverses the tape. The drive motor 827 is one which moves the magnetic tape 95 at the same speed with which it was traversed in the recording apparatus of FIG. 24 when the motor 365 was operating at full speed.

Disposed opposite the six tracks of the tape which carry information from the reference channel and five axis channels of the decoder are six magnetic playback heads 830r and 830a–e. These heads reproduce the reference and phase modulated signals previously recorded.

Since the control of motion along all five axes at the machine tool is effected simultaneously by substantially identical control channels, it will suffice in the present instance to describe only the reference control channel at the machine tool which utilizes the reference signals produced by the head 830r, and the organization and operation of an A axis control channel which utilizes the signals reproduced by the playback head 830a. As here shown, the magnetic playback head 830r is connected to supply its reproduced signals through an amplifier 832 and thence to a flip-flop 833. Since the reference channel signal recorded on the magnetic tape 95 was in square wave form, and since the playback head 830r produces a time differentiation, the playback signal appears, as shown, in the form of alternate positive and negative pulses. The flip-flop 833, triggered by these pulses, thus accurately produces a square wave output signal which corresponds to that originally recorded on the magnetic tape, and this square wave output signal is differentiated by a differentiating circuit 834 so that a series of alternative positive and negative pulses are produced and supplied to synchronize a sine-wave oscillator 835. The latter thus produces a sinusoidal A.C. signal (with its phase matched to that of the playback signal) which is supplied directly, and through a 90° phase shift circuit 837, to a Scott-connected transformer 836. The transformer 836 thus receives a two-phase sinusoidal input and serves to convert it into a three-phase sinusoidal output which appears on the lines 838. This, then, is a three-phase signal which has a definite relation to the reference signal reproduced in the playback head 830r.

This three-phase reference signal is supplied, as indicated at the right in FIG. 40 to the control channels for the A, B, C, D and E axes of motion at the machine tool, only the A axis control channel being illustrated. As here shown, the three-phase reference signal is transferred through a manually adjustable phase-shift circuit 839 and thence to the three-phase stator 840 of the synchro-device 62. By manually setting a knob 839a for the phase-shift device 839, the phase of the excitation of the state 840 may be set to any value desired. This permits, as will become apparent, manual adjustments in the position of the controlled machine tool element. The synchro device 62, sometimes called a "Selsyn" transmitter, has a rotor winding 841 in which is induced a single phase alternating voltage of a phase, relative to the excitation applied to the stator 840, which depends upon the angular position of the rotor. As the rotor 841 turns through the one complete revolution, the phase of the alternating voltage induced in the winding 841 will smoothly and correspondingly shift through 360°.

As shown schematically by the dashed line 842, the rotor 841 is mechanically connected by virtue of a pinion 843 and transmission means such as a gear 844 to be rotated as the controlled machine tool element, here the machine tool table 55, moves. The pinion 843 is meshed with a rack 845 on the table and the gearing is preferably arranged such that the rotor 841 makes one complete revolution as the table moves through a distance of $\frac{1}{10}$ inch. Thus, the phase of the signal induced in the synchro winding 841 accurately represents the distance through which the table 855 has been moved, although it will understood that the phase of the signal lags 360° for each tenth of an inch of table movement. The signal induced in the synchro rotor 841 is supplied to a phase discriminator 848 which receives, as its other input, a square wave produced by a flip-flop 849 triggered through an amplifier 850 from signals reproduced in the playback head 830a. It will be understood that because the playback head 830a produces a time differentiation, the amplifier 850 receives alternate positive and negative pulses which are related in phase to the alternate and positive negative pulses produced by the reference playback head 830r according to the phase-shift modulation produced in the director.

The phase discriminator 848 thus receives two alternating input signals and in a manner well known to those skilled in the art provides a D.C. output signal on its output line 851 which is proportional in magnitude to the amount of phase difference between the two input signals and which is of a polarity corresponding to the sense of the phase difference. Thus, if the phase of the two input signals exactly agrees, there will be no voltage appearing on the line 851.

The error voltage appearing on the line 851 is supplied through a suitable amplifier 852 to the reversible drive motor 61 for traversing the table 55. As here shown, the motor 61 drives a pinion 854 which meshes with the rack 845 and thus causes the machine table 55 to move back and forth along what has here been termed the A axis of the machine tool. The motor 61 is preferably a variable speed D.C. motor which runs in one direction or the other according to the polarity of the error signal appearing on the line 851 and which runs at a speed proportional to the magnitude of that error signal. In this manner, as the phase of the reproduced A axis channel signal supplied to the phase discriminator progressively shifts relative to the phase of the reference signal supplied to the stator 840 of the synchro device 62, the phase discriminator will provide an error voltage which properly energizes the motor 61 to cause the table to execute the motions previously represented by numerical information put onto the punched tape 112. As an error signal appears, and the motor 61 moves the table 55, the rotor 841 of the synchro devices is correspondingly rotated to reduce the error signal to zero. In this manner, accurate tarcking or servo control of the position of the machine tool according to the phase of the reproduced A axis analogue signal is accomplished. The table will move in the directions which have been programmed for each increment of motion, for distances which have been programmed in those corresponding increments and for periods of time which have been programmed, the table also moving at a rate which is dependent upon the combination of programmed distance and time. Thus, the table 55, at the machine tool is made to execute the motions which were originally represented by numerical data put in binary form on the punched tape 112.

It will be understood that additional control channels similar to the A axis channel here illustrated are provided for each of the other movable machine tool elements which have motion along the B, C, D and E axes of the machine tool (see FIG. 1). In this manner, the motion along several axes is properly coordinated and by making each component of movement small and synchronized, any complex workpiece may be machined precisely from numerical data.

Since the phase discriminator can detect a maximum error of 180° between the voltage produced by the stator 841 and the signal produced by the flip-flop 849, if the table 55 should lag behind programmed distances by more than 1/20 inch, then the synchro device 62 would simply "slip one revolution" and the remainder of the controlled operation would be off by 1/10 inch. It is for this reason that the "acceleration adjust" means and operation previously described are so necessary and useful because, as previously explained, they provide for smoothing out step changes in rates of movement of the table 55 and substantially preclude the possibility of the servo controls becoming inaccurate.

*Auxiliary controls at the machine tool*

As explained above, any of a wide variety and great number of auxiliary power devices may be controlled at the machine tool by signals recorded on the magnetic tape at the director in response to the reading of special codes interposed between successive blocks of numerical information on the punched tape. Only a few of the many possible auxiliary control functions have been here illustrated by way of example.

For reproducing the recorded auxiliary signals, magnetic playback heads 855a–855g are disposed opposite the seven respective auxiliary tracks on the magnetic tape 95. To carry forward the examples previously given in connection with FIG. 37, two auxiliary control channels have been shown in FIG. 40. The first channel is responsive to signals recorded on the magnetic tape as the result of energization of the relays R1 in R1' in FIG. 37.

As here shown, the magnetic playback head 855a reproduces signals which were previously recorded at the director in response to energization of the relays R1 and R1' (FIG. 37). These signals are passed through a suitable amplifier 356 and thence through a rectifier and smoothing filter 857 to a relay R196. Thus, whenever the track of the magnetic tape opposite the head 855a has either a 200 or 4,000 c.p.s. signal thereon, the relay R196 will be energized.

For controlling the energization of the magnetic playback drive motor 827, it is connected to a suitable voltage source through normally open relay contacts R195b and R195c, as well as normally closed contacts R196a, R196b. To start the magnetic playback equipment in operation, the attendant depresses a start switch 860 which energizes a control relay 195 connected in series therewith across the voltage supply lines. Energization of the relay R195 causes it to seal-in through its own contacts R195a, and to close the contacts R195b and R195c, so that movement of and playback from the magnetic tape 95 begins. The attendant may, at any time, stop the playback operation by depressing a normally closed stop switch 861 in series with the relay coil R195.

Now if during playback of the recorded signals at the machine tool, a point is reached where it is desirable for the machine tool attendant to change a cutter tool or otherwise make some adjustment with the machine tool stopped, and if a "programmed stop" has been recorded on the magnetic tape at that point by the appearance of an "x90" code at a corresponding point in the punched tape 112, then a 4,000 cycle signal will be momentarily induced in the playback head 855a. Accordingly, the relay R196 will be momentarily energized so that the contacts R196A and R196B momentarily open and de-energize the motor 827. This also de-energizes the relay R195, opening the contacts R195B and R195C so that even if the relay R196 is de-energized an instant later, the motor 827 will not restart. When the tape 95 halts, all of the movable machine tool elements will stop. As soon as the machine tool operator has changed the cutter tool, or performed whatever duty is required of him, he may restart operation under automatic control simply by momentarily depressing the start switch 860.

Likewise, it will be seen that at the end of an entire maching operation, the last signal that will appear is a 200 cycle signal induced in the playback head 855a as a result of the recorded signal produced by pick-up of the relay R1 (FIG. 37) in response to the special "x00" stop code. When that 200 cycle signal is induced in the playback head 855A, the relay R196 will be energized, and the magnetic tape drive motor 827 automatically stopped.

Also shown here by way of example is a lubricant pump motor 865, a coolant pump motor 866, and a spindle motor 867 for the machine tool. It will be recalled from the example previously given that the lubricant pump motor is to be turned on in response to the special code "x10," and the coolant pump motor 866 to be started in response to the special code "x11." Thus, when the time arrives in the machining operation for the lubricant pump motor to be energized, a 200 cycle signal will be induced in the magnetic playback head 855b and will be passed through a suitable amplifier 870, through a low pass filter 871 and thence through a rectifier and smoothing filter 872. This will in turn energize a relay 201, causing closure of contacts 201a and energization of the lubrication pump motor 865. When the point in the over-all machining operation is reached which requires the energization of the coolant pump motor 866, a 4,000 cycle signal will also be induced in the magnetic playback head 855b. This higher frequency signal will pass through the amplifier 870, through a high pass filter 874, through a rectifier and smoothing filter 875, and thus will energize a relay R200. This, in turn, results in closure of the contacts 200a which will supply power from a suitable voltage source to the coolant pump motor 866.

Now the operation of the machine tool may be such that it is desired to start the spindle motor 867 at a certain point but only if both the lubricant pump motor 865 and the coolant pump motor 866 have been previously energized. To bring this about, relay contacts R201b and R200b may be connected in series with voltage supply lines leading to the spindle motor 867. Thus, as long as both of the relays R200 and R201 are energized, resulting in energization of the motors 865, 866, then the spindle motor 867 will also be energized.

If at a later point in the complete machining operation it is desired to de-energize these three motors, the special code "x12" will have appeared in the punched paper tape 112 and it will have caused de-energization of the relays R2 and R2′ in the director (FIG. 37). Accordingly, both the 200 and 4,000 c.p.s. signals will terminate on the magnetic tape at this instant and no signal will be induced in the playback head 855B. With this, both the relays R200 and R201 will be de-energized, opening all of the controlling contacts for the motors 865–867 and de-energizing them at the desired point in the machining operation.

The foregoing is simply a typical example of the many auxiliary power devices which may be appropriately controlled at the machine tool from special codes which are placed on the punched paper tape when the initial numerical program was made up.

We claim as our invention:

1. Apparatus for controlling a machine in accordance with a predetermined program comprising, a director connected for operation to actuate an analogue servo-mechanism controlling the operation of said machine, input means for sequentially applying to said director a predetermined program comprising a series of individual commands, each of said commands containing information encoded in a 1–1–2–5 binary-decimal code, register means to store the information contained in one of said commands, means to produce in a predetermined time interval a train of pulses consisting of a decimal number of pulses determined by the information in said stored command, means to produce first and second output signals of the same frequency, means to apply said train of pulses to phase modulate one of said output signals to a degree proportional to the number of pulses in said train, means to apply said first and second output signals to said servo-mechanism, said analogue servo-mechanism being responsive to the phase difference between said first and second output signals to actuate said machine to an extent determined by the information in said input program.

2. Apparatus for automatically controlling a machine tool comprising, an analogue servo-system adapted to be connected to mechanically actuate one element of said machine tool in response to phase modulated electrical signals applied to said servo-system, a director connected to provide a phase modulated electrical signal to said servo-system, reading means for reading a stored digitally coded input program into said director, said reading means being connected to apply to said director electrical input signals representing the information contained in said stored program, said program comprising a sequence of individual commands, each of said commands resulting in electrical signals containing information represented in a 1–1–2–5 binary-decimal code, means to stop the operation of said reading means after one command has been read, means normally connected to restart the operation of said reading means after said one command has been executed, and means to render said last named restart means inoperative so as to stop the operation of said director, said director including means to provide an output signal of fixed phase value to said servo-system when the operation of said director is so stopped.

3. In a system for controlling relative motions of movable members along a plurality of axes, the combination comprising means for generating successive sets of sequential electric signals digitally and numerically representing a plurality of axis distance components of successive distance increments of motion, first storage means and means for sequentially transferring the electrical signals of successive sets into such first storage means, second storage means and means for transferring each set of electrical signals from said first to said second storage means, means for causing one set of signals to be transferred into said first storage means while the preceding set is held in said second storage means, means responsive to signals held in said second storage means for deriving a plurality of strings of pulses each containing a number of pulses proportional to a corresponding one of the axis distance components represented by the signals held in said second storage means, said deriving means including means for causing all of said pulse strings to occur in a given time interval with the pulses in each string substantially equally spaced apart within such time interval, means responsive to respective ones of said pulse strings for converting the latter into a plurality of corresponding phase modulated signals with the extent and rate of phase angle change of each signal during each time interval corresponding to the number of frequency of the corresponding pulse string, power means for each axis connected to translate respective ones of said movable members, said power means including means responsive to respective ones of said phase modulated signals for translating respective ones of said movable members through distance components and at velocities corresponding to the extents and rates of phase angle change of said phase modulated signals, and means for preventing excessive step changes in the rate of phase angle change of said modulated signals, said preventing means including means associated with said deriving means to equally modify the recurrence rates of the pulses in said pulse strings.

4. In a system having a servo drive responsive to phase-modulated recurring control signals for controlling the motion of a movable element the combination comprising means for producing successive blocks of input signals numerically representing successive commands, each block of input signals comprising sequentially appearing groups of multi-bit signals representing sequential characters in binary coded decimal notation, first storage means, means responsive to a block of said input signals for setting said first storage means to represent the characters of the multi-bit signals in one block, a storage register connected to receive information dumped in parallel from said first storage means, means for generating a train of time-spaced signals, means for receiving said train of signals and responsive to said storage register for deriving therefrom a string of pulses numerically related in absolute number according to a predetermined function of the number stored in the storage register, means for generating two identical streams of pulses, means for adding or deleting a predetermined number of pulses to or from one of said streams for each pulse in said string, means for equally time-dividing said two pulse streams to create two cyclically recurring signals one of which is phase modulated with respect to the other a predetermined amount for each pulse in said string, and means for causing dumping the contents of said first storage means into said storage register and the supplying of the next block of input signals to said setting means in response to each complete operation of said deriving means.

5. In a system having a servo drive responsive to phase-modulated recurring control signals for controlling the motions of a movable element the combination comprising means for producing successive blocks of input signals numerically representing successive commands, each block of input signals comprising sequentially appearing groups of multi-bit signals representing sequential characters in binary coded decimal notation, first storage means, means responsive to a block of said input signals for setting said first storage means to represent the characters of the multi-bit signals in one block, a storage register connected to receive information dumped in parallel from said first storage means, an electrical pulse train source, means connected to said source and controlled by said storage register for deriving from said pulse train a string of pulses numerically related in a predetermined fashion to the information in said storage register, a source supplying two identical cyclically recurring signals, and means connected to receive said string of pulses and to shift the phase of one of said recurring signals relative to the other a predetermined amount for each pulse in said string.

6. In a system having plural servo drives responsive to phase-modulated recurring control signals for controlling the movement of a plurality of machine tool elements along different axes in accordance with sequentially spaced groups of coded binary digital signals representing numerically the components to be moved along respective axes for each increment of movement, the combination comprising a first storage means connected to receive said coded binary digital signals, a storage register having a plurality of sections, means for dumping in parallel to said storage register the coded binary digital signals received in the first storage means with each group of signals being routed to a corresponding one of the sections, means for generating a train of pulses extending over a finite period of time, means responsive to the condition of said storage register and to said pulse train for deriving a plurality of pulses strings each containing pulses numerically related to the components numerically stored in a corresponding section of said storage register, a source providing a plurality of cyclically recurring signals of the same frequency and fixed phase relationship, one of said signals being a reference signal and the remaining ones being control signals corresponding to the respective axes of control, and means for shifting the phase of each of said control signals by a predetermined amount for each pulse appearing in a corresponding one of said pulse strings to obtain phase-modulated recurring control signals.

7. In a system having plural servo drives responsive to phase-modulated recurring control signals for simultaneously controlling the movement of a plurality of machine tool elements along different axes comprising, in combination, means for creating four-place coded binary digital signals serially spaced in time within groups which are serially spaced in time within successive blocks, each group of signals numerically representing a distance component along one of said axes for an incremental distance of relative movement, first storage means for receiving the signals in each block, said first storage means having a plurality of sections receiving the signals for different respective ones of the axis groups, a storage register divided into a plurality of sections, means for dumping in parallel information from the sections of said first storage means into the corresponding sections of the storage register, means for generating a pulse train extending over a finite period of time, means connected to said generating means and to said storage register for deriving from said pulse train a plurality of pulse strings which respectively contain pulses numerically related according to a predetermined function of the distance component stored in a respective section of said storage register, a pulse stream source, a reference scaler and a plurality of control scalers corresponding respectively to the axes of control and all connected in parallel to said source to receive the pulse stream therefrom, means for adding or deleting a predetermined number of pulses supplied to the inputs of the respective control scalers for each pulse appearing in the corresponding one of said pulse strings, so that the output signals of said control scalers are phase-modulated relative to the output signal of said reference scaler.

8. In a system having a servo drive responsive to two relatively phase-modulated recurring signals for controlling the motion of a movable element according to successive plural-digit sets of numerical information, the combination comprising a first storage device, means for supplying sequentially input signals representing in binary coded decimal notation the digits of one set of numerical information into said first device, a second storage device, means for simultaneously transferring a set of information from said first device into said second device, means responsive to said second device for deriving a string of substantially equally time-spaced pulses related in absolute number to the numerical information in said second device, means for generating two recurring signals normally equal in frequency and fixed in relative phase, and means for shifting the phase of one of said recurring signals a predetermined amount for each pulse in said string.

9. The combination set forth in claim 8, further characterized by means for causing said supplying means to supply a second set of numerical information into said first device after a first set of numerical information has been transferred into said second device and during the interval that said pulse string deriving means are responsive to the first set of information in said second device.

10. In a system for simultaneously controlling a plurality of servomechanisms which are responsive to analogue control signals in accordance with successive sets of plural-digit numerical information, the combination comprising means for generating in sequential successive groups of time spaced electrical signals, each group representing one digit in a set of numerical information, a first register connected to have a set of numerical information represented by said electrical signals inserted into it, a second register, means for transferring a set of numerical information in parallel from said first register to said second register, means responsive to said second register for creating a plurality of analogue control signals corresponding to the numerical information stored therein, and means for initiating operation of said generating means following the operation of said transferring means, so that a second set of numerical information is inserted into said first register while said control signal-creating means are operating in response to a first set of numerical information held in said second register.

11. In a system for simultaneously controlling a plurality of servo drives each responsive to a phase modulated control signal in accordance with successive sets of plural-digit numerical information representing desired components distances, the combination comprising means for generating sequentially groups of electrical signals, each group representing in binary coded decimal notation one digit in a set of numerical information, a first register and means for sequentially inserting the groups of one of said sets of electrical signals into the same, a second register, means for dumping a set of numerical information in parallel from said first register to said second register, means responsive to said second register for creating a plurality of time spaced pulse strings corresponding in their absolute numbers to the respective components distances of the set of numerical information held in said second register, means for creating a recurring reference signal and a plurality of recurring signals normally of the same frequency and fixed in phase, relative to the reference signal, means for shifting the phase of a respective one of plurality of said recurring signals, relative to said recurring reference signal, a predetermined amount for each pulse in corresponding ones of said pulse strings, and means responsive to the completion of said pulse strings for initiating operation of said dumping means and operation of said generating means, so that a second set of numerical information is inserted into said first register while said pulse string creating means is responding to a first set of information held in said second register.

12. In a system for controlling the distance of successive increments of motion imparted to a movable member according to successive sets of sequentially-occurring digital signals numerically representing distance information, said movable element being connected to a servo drive responsive to phase-modulated recurring control signals, the combination comprising a first storage device, means for sequentially supplying one set of digital signals to said first storage device for storage therein, a second storage device, means for simultaneously transferring a set of digital signals from said first storage device to said second storage device, means for generating a train of time-spaced signals, means connected with said second storage device and receiving said train of signals for deriving therefrom a string of pulses substantially equally spaced in time and numerically related in absolute number according to a predetermined function of the number represented by the set of digital signals stored in said second storage device, means for generating two identical pulse streams, two scalers connected respectively to receive as inputs said two pulse streams and equally time-dividing the same to create two cyclically recurring signals, and means responsive to each pulse in said string for modifying by a predetermined number the effective pulses in the input pulse stream for one of said scalers, so that the said two recurring signals are relatively phase modulated a predetermined amount for each pulse in said string.

13. The combination set forth in claim 12, further characterized in that each set of digital signals includes a numerical representation of velocity-designating information, and means responsive to such information in said second storage device for determining the equal time spacing of pulses in said string, thereby to control the rate of said phase modulation.

14. The combination set forth in claim 12 further characterized by means for actuating said transferring means when said absolute number of pulses in said string have occurred, and means for actuating said supplying means when said transferring means has completed its operation.

15. In a system having power means responsive to an analogue control signal for controlling the motion of a movable element according to decimal numbers representing successive incremental distance of movement, the combination comprising, means for storing each order digit of a decimal number in plural-place coded binary form, each order digit of the decimal number being represented by the presence or absence of a binary "1" in each of the plural places having assigned values, means for generating a train of pulses, a frequency divider including a plurality of decade stages connected in tandem and receiving said train of pulses, means in each decade stage for deriving from each count of ten a chain of time-spaced pulses for each place in the binary code and which contains a number of pulses proportional to the assigned value of the corresponding binary code place, means for deriving a string of pulses proportional in number to the sum of the pulses in all those pulse chains which correspond to digit places containing a "1" in said storing means, and a decoder for modulating an analogue signal according to the pulses in said string.

16. In a system having power means responsive to a variable analogue signal for controlling the motion of a movable element, the combination comprising means for converting plural digit decimal numerical values representing successive increments of movement into sequential groups of electric signals with each group representing one decimal digit in 5211 binary code notations, a four-place input register adapted to sequentially receive the groups of electric signals corresponding to one increment of movement, a four-place storage register and means for transferring in parallel information into the latter from said input register, means including a command pulse clock for generating a train of pulses, a frequency divider connected to receive said pulse train and including a plurality of tandemly connected decade scaling units assigned to different order decimal digits, each of said decade units having four output lines and also having means for producing pulse chains containing 5, 2, 1 and 1 pulses on respective ones of said lines for each ten input pulses supplied to that unit, means for deriving from said pulse chains a pulse string having a number of pulses equal to the aggregate of those particular chains of pulses corresponding to the significant binary values in said storage register, and thus proportional in number to the original decimal numerical value, and means for converting said pulse string into a correspondingly varying analogue signal.

17. Apparatus for producing a string of pulses which contains a number of pulses proportional to a decimal numerical value and spaced substantially uniformly over a finite time period, comprising, in combination, means for storing in four-place binary code notation each decimal order digit in said decimal value, means for generating a train of substantially constant frequency pulses, means for frequency dividing said train of pulses by a total ratio which is proportional to the finite time period, said last-named means including a plurality of decade frequency dividing stages connected in tandem and corresponding respectively to the stored decimal orders, each of said stages including means for producing during a dividing cycle thereof four chains of time spaced pulses which are proportional in number, respectively, to the values assigned to the four places of said binary code notation, and means for collecting on a common output line those of said pulse chains which correspond in order and place to each stored binary digit having a predetermined one of the two binary values.

18. Apparatus for converting a decimal number into a string of pulses proportional in absolute number to the value of said decimal number and substantially uniformly spaced over a finite time period, said appartus comprising, in combination, a plurality of groups of bi-state devices with each group corresponding to one decimal order and with each group including four bi-state devices assigned different values according to a four-place binary code notation, means for storing the different order digits of said decimal number in corresponding ones of said groups by setting the bi-state devices of each group to a binary "1" or "0" according to said code notation, means for generating a train of pulses having a substantially constant frequency, means for frequency dividing said pulse train by a ratio proportional to the finite time period and for cutting off the train of pulses after an integral number of cycles of division, said frequency dividing means including a plurality of decade frequency dividing stages connected in tandem and corresponding respectively to said groups, each of said stages including four bi-state devices connected to produce in response to each ten input pulses four chains of time spaced pulses respectively containing a number of pulses proportional to the respective assigned values of the four places of said binary code notation, and means for producing on a single output line a string of pulses which contains one pulse for each pulse in those particular chains which correspond in decimal order and binary code place to those of said bi-state devices in said groups which are in the "1" state.

19. The combination set forth in claim 18, further characterized in that said binary code notation is 5211 code, and each of said decade stages has means to cause the bi-state devices therein to count according to a 1, 2, 4, 8 binary code so that the four non-carry output pulse chains from said bi-state devices respectively contain 5, 2, 1 and 1 pulses for each ten input pulses to that decade stage.

20. Apparatus for producing a string of substantially uniformly spaced pulses proportional in total number to a decimal number, said apparatus comprising, in combination, means for storing each order digit of said decimal number in four-place binary code notation, a source of recurring pulses, means for frequency dividing said recurring pulses including a plurality of tandemly connected decade divider stages each of which corresponds to one order digit in the decimal number, means associated with each of said decade divider stages for producing, in response to each dividing cycle of that stage, four chains of non-coincident pulses respectively containing a number of pulses proportional to the value assigned to one of the four places of the binary code, and means controlled by said storing means for collecting in a common string those chains of pulses which correspond in decimal order and binary digit place to significant stored binary symbols.

21. Apparatus for producing a string of pulses proportional in number to a numerical value, said apparatus comprising, in combination, means for storing each order digit of said numerical value, a source of recurring pulses, means for frequency dividing said recurring pulses including a plurality of decade scalers connected in tandem and respectively corresponding to the orders of the stored digits, each of said decade scalers including means for producing during each scaling cycle thereof four chains of non-coincident pulses respectively containing numbers of pulses according to a binary code notation, and means responsive to said storing means for collecting in a common channel those particular chains of pulses from each decade divider which aggregate in number the value of the corresponding order stored decimal digit.

22. The combination set forth in claim 21, further characterized in that said binary code notation is a 5211 notation, and the said four chains of non-coincident pulses respectively contain 5, 2, 1 and 1 pulses for each scaling cycle of the decade scaler which produces them.

23. For use in deriving a string of pulses proportional in quantity to a plural decimal number, the combination comprising a coded binary storage register and means for placing said number therein, said register having an order portion for each order digit in said number and each portion having plural places corresponding to the plural places of a predetermined binary code, a frequency divider and means for supplying a train of input pulses thereto, said frequency divider having a decade scaling unit for each order portion in said register and each decade scaling unit having means to produce a chain of output pulses for each binary code place and proportional in number to the value assigned to that place, and means for collecting all of the pulses in those chains which correspond in order and place to those places in said storage register holding a significant binary character.

24. The combination of means for storing each successively higher order digit of a decimal number in a selected multiple place coded binary notation, with a frequency divider which includes tandemly-connected decade scaling units corresponding to the respective orders of the stored decimal digits, and in which each decade scaling unit includes means for scaling to produce four chains of non-coincident output pulses proportioned in number according to the values assigned to the four places of the selected binary code.

25. In a system having a servomechanism responsive in distance and velocity to the change and time derivative of an analogue control signal for translating a machine tool element according to successive numerically defined distance increments and corresponding assigned time periods which establish the feed rate for each increment, the combination of a storage device for successively storing numerical data representing the successive distance increments, a pulse train source, a frequency divider including a plurality of tandemly connected bi-state devices and having a plurality of inputs to permit selection of the effective division ratio, means for routing said pulse train to a selected one of said inputs according to the assigned time period, means responsive to said storage device and said frequency divider for deriving from said pulse train a string of pulses proportional in number to the stored data and spaced in time over the corresponding assigned time period, means for converting said pulse train into an analogue control signal having a magnitude instantaneously proportional to the number of pulses received and having a first time derivative proportional to the frequency of said pulse string, means for smoothly varying the first derivative of said analogue signal between the values corresponding to two successive distance increments, and a predicting device responsive to the condition of predetermined ones of the bi-state devices in said frequency divider and to said routing means for actuating said varying means a predetermined interval before the end of the time period for the first of said two successive distance increments.

26. In a system having a servomechanism responsive to an analogue control signal for controlling the motion of a movable machine tool element according to successive numerically defined distance increments and corresponding assigned time periods which establish the feed rate during each increment, the combination comprising a storage register including a plurality of bi-state elements for storing in binary form numbers representing a distance increment and time period, a source of substantially constant frequency pulses, a frequency divider including a plurality of bi-state devices tandemly connected to form a scaling chain, a plurality of input lines leading to different ones of said bi-state devices to effectively connect different numbers of said devices in the scaling chain and thus vary the effective over-all dividing ratio of the chain, means controlled by the state of the said bi-state elements storing time period numbers for routing pulses from said source to different ones of said input lines to measure off different periods in time between the commencement of the pulses and the appearance of a transfer pulse from the last bi-state device in said frequency divider, means for deriving from said frequency divider and said storage register a string of pulses proportional in their absolute number to the stored distance number and spaced over said time period, means for converting said string of pulses into an analogue control signal varying with time, a plurality of gates connected to sense the states of the last few bi-state devices in said frequency divider chain, each gate being opened when the device it senses is in a predetermined one of its two possible states, and connections from each one of said input lines through different combinations of said gates to a common predict pulse output terminal, means responsive to a pulse appearing on said output terminal for smoothly reducing the frequency of pulses supplied by said source, and means responsive to a transfer pulse from the last bi-state device for smoothly increasing the frequency of pulses supplied by said source to its original value.

27. In a system having a servo power drive responsive to an analogue control signal for controlling the motion of a movable machine tool element according to successive numerically defined distance increments and corresponding assigned time periods, the combination comprising a storage register including a plurality of bi-state elements for storing in binary form the numerical values of distance and time, a source of substantially constant frequency pulses, a frequency divider including a plurality of bi-state devices connected in tandem and a plurality of input lines leading to different ones of several bi-state devices at the head end of said frequency divider, means controlled by the bi-state elements storing time values for selectively routing said pulses over different ones of said input lines to measure off different time periods from the commencement of said pulses until a transfer pulse is produced by the last bi-state device in the frequency divider, means for deriving from said frequency divider a string of pulses proportional in number to the stored distance value, means for converting said string of pulses into an analogue control signal, means for sensing the states of different combinations of the last few bi-state devices in said frequency divider, means for creating a predict signal in response to all of those bi-state devices being in a predetermined one of two states, and means responsive to a predict signal for gradually reducing the frequency of pulses from said source.

28. In a system having a servomechanism drive responsive in displacement and velocity to the magnitude and rate of change, respectively, of a variable control signal for controlling the motion of a movable machine tool element through successive increments according to successive blocks of numerical data defining the extent and feed rate for each increment, the combination of means for electrically representing in digital form said numerical data for one block and converting them into a control signal which normally varies with a substantially uniform rate of change corresponding to the defined feed rate and which varies in magnitude by an amount corresponding to said defined extent, means for producing a predict signal prior to the instant at which said control signal varies by said amount, and means responsive to said predict signal for gradually reducing the rate of change of said control signal from the value it would otherwise have.

29. In a system having a servo drive for moving a movable element through successive distances and at respective velocities in response to a variable control signal which changes during successive time intervals by amounts and at rates of change corresponding to the desired distances and velocities, the combination comprising means for successively electrically representing in digital form numbers which define the desired distances and velocities of successive increments of motion, means for converting each successive electrical representation into a control signal which normally varies during successive time intervals at a substantially uniform rate of change corresponding to the defined velocity and by an amount corresponding to the defined distance, means for producing a predict signal in advance of said control signal changing by said amount, and means responsive to said predict signal for gradually reducing the rate of change of said control signal from the value which that rate of change would otherwise have.

30. In a system for producing successive increments of motion between two parts relatively movable along a plurality of axes, the combination comprising a source of recurring pulses, means for deriving from said recurring pulses a plurality of successive pulse strings with each pulse string during successive time intervals containing a selected number of pulses which occur at a selected fraction of the recurrence rate of said source, means for signalling when a predetermined percentage of the selected numbers of pulses in said pulse trains for one time interval have occurred, and means responsive to signalling by said last-named means for smoothly and gradually reducing the frequency of said pulse source, thereby to correspondingly reduce the recurrence rates of said pulse trains.

31. The combination set forth in claim 30 further characterized in that said source of recurring pulses includes means responsive to the magnitude of a control voltage for varying the frequency of said recurring pulses, and said frequency-reducing means includes means for smoothly and gradually reducing the magnitude of said control voltage.

32. In combination, a source of substantially constant frequency signals, counting apparatus, means for conditioning said apparatus to count different numbers of said signals to measure off different time periods, a plurality of normally incomplete signal transfer paths leading to a common output terminal, means for sensing the state of said counting apparatus and completing different ones of said transfer paths when the counting means is at different percentages of a full count, means for supplying said signals to different ones of said transfer paths according to the number of pulses to be counted so that one of said signals will reach said output terminal before the end of a measured time period, and means responsive to a signal on said output terminal for reducing the frequency of signals from said source, so that a longer time period elapses before the counting apparatus receives a full count.

33. The combination set forth in claim 32 further characterized by means responsive to said counting apparatus reaching a full count for again increasing the frequency of signals from said source.

34. In a system having a servo drive for moving a movable element through successive selected distances and at respective selected velocities in response to a variable control signal which changes during successive time intervals by selected amounts and at selected rates corresponding to desired distances and velocities of motion, the combination comprising a source of pulses normally having a predetermined frequency, means including a frequency divider receiving said source pulses for producing during successive dividing cycles strings of pulses proportional in number to said successive desired distances and having repetition rates proportional to said selected velocities, means for decoding said strings of pulses into a corresponding control signal which changes according to the number of pulses received and at a rate proportional to the repetition rate of such pulses, means connected to said frequency divider for signalling when a cycle is within a predetermined percentage of being complete, and means responsive to said signalling means for gradually reducing the frequency of said pulse source.

35. In a system having servo power means responsive to an analogue control signal for controlling the motion of a movable machine tool element according to successive blocks of numerical data defining the extents of successive distances and velocities at which they are to be executed during successive time periods, the combination of a storage device adapted to store and signal during successive time periods the blocks of numerical data, means for sensing the contents of said storage device and generating therefrom an analogue signal which is modulated in accordance with the instantaneous distance to be traversed and which has a first time derivative proportional to the velocity for that time period, and means for smoothly changing the first time derivative of said analogue signal between the two values which it normally would have during execution of two successive distances while correspondingly altering the time periods so that the total change in said analogue signal in each time period remains the same.

36. In a system for moving a movable element according to a program of successive selected distances at corresponding successive selected velocities, the combination comprising a storage device adapted to successively receive and store successive sets of digital information representing successive selected distances and velocities, means for sensing the contents of said storage device while each set of information is stored therein and generating therefrom an analogue signal which is modulated to vary by an amount corresponding to the selected distance and to vary at a rate corresponding to the selected velocity, said rate of said analogue signal having step changes therein at the transitions between generations based upon successive sets of digital information, a servo drive mechanism receiving said analogue signal and connected to said movable element to drive the latter through distances and at velocities corresponding respectively to the amounts and rates of variation in said analogue signal, and means for smoothly changing the rate of variation of said analogue signal to reduce the magnitude of the step changes therein while preserving the selected amounts of variation of said analogue signal.

37. In a system for coordinating the relative motion of a movable element driven along a plurality of axes by a plurality of drive mechanisms at velocities proportional to the rates of change of respective analogue signals supplied to such drive mechanisms, the combination comprising storage means adapted to successively receive and store successive sets of digital information indicative of successive selected distances along the respective axes and selected velocities along such axes, means for sensing the contents of said storage device during successive periods while each set of information is stored therein and generating therefrom a plurality of analogue signals each modulated by an amount corresponding to a selected axis distance and each varying at a substantially uniform rate corresponding to the selected axis velocity, said rates of said analogue signals normally having step changes therein at the transitions between successive periods, and means for smoothly changing by the same percentage the rates of all of said analogue signals to limit the magnitude of such step changes while nevertheless maintaining the ratio of each analogue signal rate to the other analogue signal rates.

38. In a system for moving a member through successive increments of selected distances and at a selected velocity during each increment, the combination comprising a controllable source of pulses normally having a predetermined frequency, means receiving said source pulses for deriving therefrom an analogue control signal which varies during successive time intervals by amounts proportional to the successive selected distances and which varies at rates proportional both to the successive selected velocities and the frequency of said source pulses, means receiving said analogue signal for driving said member through distances proportional to amounts of variation of said analogue signal and at velocities proportional to the rate of variation of said analogue signal, said successive selected velocities normally causing at least some substantially instantaneous step changes in the rate of said analogue signal beyond the capacity of said driving means to accurately respond, and means for automatically controlling said source to smoothly vary the frequency of said source pulses and limit the magnitude of said step changes to within the accurate response capacity of said driving means.

39. In a system for coordinating the relative movement of a movable element along a plurality of axes by a corresponding plurality of drive mechanisms which produce increments of displacement and velocity along the respective axes in accordance with the extents of change and rates of change of analogue control signals supplied to such drive mechanisms, the combination comprising means for producing a train of repetitive pulses normally having a selected constant frequency, means for deriving from said train of pulses a plurality of analogue control signals which vary during successive periods at rates proportional to successive selected fractions of the selected frequency of said pulse train, said analogue signals normally having substantially instantaneous step in their rates of change at the transitions between two successive time periods, means for automatically varying the frequency of said pulse train to limit the magnitude of said steps which would otherwise occur, said last-named means including means for smoothly and gradually changing the frequency of said pulse train between two values, whereby the rates of change of said analogue signals are all identically modified.

40. In a system having servo power means responsive to an analogue control signal for controlling the motion of a movable machine tool element according to programmed successive numerically defined distance increments and corresponding assigned time periods which fix the feed rate over each increment, the combination of a storage device for successively holding numerical data representative of the distance and time period for each successive increment, an adjustable frequency pulse train source, means including a frequency divider receiving said pulse train and responsive to the condition of said storage device for creating from the pulse train a string of pulses proportional in number to the distance of each increment and uniformly spaced in time over the assigned period for that increment, means for decoding said string of pulses into an analogue control signal which varies from instant to instant with the number of pulses received and which has a first derivative proportional to the frequency of said string of pulses, and means connected to and actuated by said frequency divider for smoothly reducing the frequency of said pulse train source prior to the transition from one increment to the next so that the frequency of said pulse string and the first derivative of said analogue signal are correspondingly smoothly reduced.

41. In a system having power means responsive to an analogue control signal for driving a movable element through successive increments of desired distances at corresponding desired velocities, the combination comprising means for storing successive sets of digital information defining numerically the desired distances and velocities of successive increments, a pulse train source, means responsive to said pulse train source and to said storing means for producing successive strings of pulses corresponding to successive sets of stored information with each string containing a number of pulses proportional to the defined distance and having a frequency proportional to the defined velocity, means receiving said strings of pulses for decoding the same into an analogue control signal which varies from instant to instant with the number of pulses received and which varies at a rate of change proportional to the frequency of the received pulses, and means connected to and actuated by said producing means for smoothly reducing the frequency of a pulse string prior to the completion of the said number of pulses therefor.

42. Apparatus for changing the speed of a drive mechanism through a range which exceeds the inherent capability of the mechanism to effect in substantially zero time, comprising in combination means for generating a clock signal of substantially fixed periodicity, means for deriving from said clock signal an analogue signal having any one of a plurality of rates of change during immediately successive time periods depending upon a desired program of control, means for controlling the speed of the drive mechanism in accordance with the rate of change of said analogue signal, means for signalling just before the occurrence of an excessive downward step in the rate of change of said analogue signal, and means responsive to signalling by said last-named means for smoothly increasing the periodicity of said clock signal.

43. In a system for controlling a servomechanism drive responsive to an analogue control signal and connected to translate a movable machine tool element according to successive blocks of numerical data which define distance increments and the feed rate of the machine tool element, the combination comprising means for storing and signalling during immediately successive time periods the data of successive blocks, means for generating an analogue control signal during each said time period which is modulated to have a substantially constant first time derivative proportional to the numerically defined feed rate defined by the data in said storing means, means for effecting a smooth reduction in the value of the first time derivative of said signal from the value it would otherwise have at the terminal and initial portions of two successive time periods while correspondingly altering the time periods which would otherwise elapse so that the total change in said signal remains the same.

44. Apparatus for preventing the loss of control by a drive mechanism energized with an analogue control signal which normally varies during substantially immediately sucessive time periods according to a program at different rates for different successive incremental changes therein, with substantially instantaneous excessive step decreases in the rate of variation of said control signal at the end of at least certain ones of the incremental changes, comprising, in combination, means for gradually reducing the rate of change of said control signal to a predetermined percentage relative to the programmed rate prior to the ends of said certain ones of said incremental changes, and means for then increasing the rate of change of said control signal to restore it to the programmed rate subsequent to the ends of said certain ones of said incremental changes.

45. Apparatus for preventing the loss of control by a plurality of drive mechanisms connected to impart successive sets of relative motions along a plurality of axes between two relatively movable parts, said drive mechanisms being energized with corresponding ones of a plurality of analogue control signals which normally vary during immediately successive time intervals according to a program at different successive rates and over different successive incremental changes therein, there being substantially instantaneous excessive step decreases in the programmed rate of variation of some of said signals at the end of at least certain ones of the incremental changes, said apparatus comprising, in combination, means for gradually and equally reducing the rates of change of all of said control signals to an identical, predetermined percentage relative to the programmed rate prior to the ends of said certain ones of said incremental changes, and means for then increasing the rates of change of all of said control signals to restore them to the programmed rates subsequent to the ends of said certain ones of said incremental changes.

46. In a system having a servo drive responsive to an analogue signal and connected to translate a movable element through a motion program of successive selected distances at corresponding selected velocities, the combination comprising a controllable source of pulses normally having a predetermined frequency, means receiving said source pulses for deriving therefrom an analogue control signal which varies during immediately successive time intervals by amounts proportional to the successive selected distances and which varies at rates proportional both to the successive selected velocities and the frequency of said source pulses, said control signal normally having at the ends of certain ones of said time intervals step decreases in the rate thereof which in magnitude are beyond the capacity of said servo drive to accurately follow, means for gradually and smoothly decreasing the frequency of said pulse source prior to the ends of said certain ones of said time intervals, and means for then increasing the frequency of said pulse source back to said predetermined frequency at the end of such time intervals.

47. The combination set forth in claim 46 further characterized in that said pulse source includes means for controlling the frequency of said pulse sources according to the magnitude of a control voltage applied thereto, means for normally applying a control voltage of a predetermined value to said last-named means to make said source pulses have said predetermined frequency, said frequency-decreasing means including means for gradually decreasing the value of said control voltage, and said frequency-increasing means including means for restoring said control voltage to said predetermined value.

48. Apparatus for preventing the loss of control by a drive mechanism energized with an analogue control signal which normally varies according to a program at different rates for different sucessive incremental changes therein, with substantially instantaneous changes in the rate of variation of said control signal at the end of at least certain ones of the incremental changes, comprising, in combination, means for gradually reducing the rate of change of said control signal through a predetermined percentage relative to the programmed rate prior to the ends of said certain ones of said incremental changes, and means for gradually increasing the rate of change of said control signal through said predetermined percentage to restore it to the programmed rate subsequent to the ends of said certain ones of said incremental changes.

49. Apparatus for preventing the loss of control by a drive mechanism energized with an analogue control signal which normally varies according to a program at different selected rates for different selected incremental changes therein, with substantially instantaneous changes in the rate of variation of said control signal at the end of at least certain ones of the incremental changes, said apparatus comprising, in combination, means for reducing the rate of change of said control signal through a predetermined percentage relative to the programmed rate prior to the ends of said certain ones of incremental changes, means for increasing the rate of change of said control signal to restore it to the programmed rate subsequent to the ends of said certain ones of said incremental changes, at least one of said two means including means for smoothly and gradually changing the rate of change of said analogue signal.

50. In a system for moving a member through successive increments of selected distances and at a selected velocity during each increment, the combination comprising a controllable source of pulses normally having a predetermined frequency, means receiving said source pulses for deriving therefrom an analogue control signal which varies during successive time intervals by amounts proportional to the successive selected distances and which varies at rates proportional both to (a) the successive selected velocities and (b) the frequency of said source pulses, means receiving said analogue signal for driving said member through distances proportional to the amounts of variation of said analogue signal and at velocities proportional to the rate of variation of said analogue signal, said successive selected velocities normally causing at least some substantially instantaneous step changes in the rate of said analogue signal beyond the capacity of said driving means to accurately respond, means for reducing the magnitude of such step changes including means for reducing the pulse source frequency from said predetermined frequency, and means for then increasing the pulse source frequency back to said predetermined frequency, at least one of said two last-named means including means for gradually and smoothly changing the pulse source frequency.

51. In a system having a drive mechanism responsive to an analogue control quantity with step changes therein for moving an element at velocities proportional to the control quantity, apparatus for preventing loss of control by said drive mechanism due to an excessive step change in said control quantity beyond the capacity of the drive mechanism to accommodate, said apparatus comprising, in combination, means for signalling in advance of its occurrence an excessive step change in said control quantity, means responsive to such signalling for smoothly reducing said control quantity by a predetermined percentage of the value it would otherwise have, and means for smoothly increasing said control quantity by said predetermined percentage following the next step change therein.

52. Apparatus for controlling a drive mechanism to move succesive distances at predetermined speeds but without exceeding the inherent capacity of the drive mechanism to accomplish step changes in speed, said apparatus comprising, in combination, means for generating a train of clock pulses of substantially constant frequency, means for including a counter for deriving from said clock pulses during immediately successive time periods successive strings of substantially uniformly spaced pulses proportional in number of the successive distance to be moved and having frequencies proportional to the speed of movement to be obtained during that period, means for converting said strings of pulses into an analogue control signal and for applying the latter to correspondingly control the drive mechanism, means for smoothly reducing the frequency of said clock pulses in response to a predetermined percentage of the number of pulses in a string having occurred, and means for gradually increasing to its original value the frequency of said clock pulses in response to the complete number of pulses in a string having occurred.

53. In a system having servo power means responsive to an analogue control signal for controlling the motion of a movable machine tool element according to successive blocks of numerical data designating successive distance increments and corresponding feed rates for each increment, the combination comprising a storage register and means to successively place therein during immediately successive periods the numercial data representing the distance and feed rate for successive increments, an oscillator for producing a pulse train having a frequency related to a control potential supplied thereto, a frequency divider connected to receive pulses from said oscillator, means responsive to the condition of said storage register and to said frequency divider for deriving from said pulse train during successive time periods a string of pulses proportional in number to the stored distance and proportional in frequency to the stored feed rate, means for decoding said string of pulses into an analogue control signal having a first derivative varying proportionally with the frequency of said string of pulses, a charged capacitance circuit for supplying a control potential to said oscillator, means to cause exponential discharging and charging of said capacitance prior to the end of one time period and subsequent to the beginning of the next time period to thereby smoothly reduce and increase the frequency of said pulse train and string so that the first derivative of said analogue signal smoothly decreases from the value called for during the one time period and then smoothly increases to the value called for during the next time period.

54. The combination set forth in claim 53 further characterized by means responsive to the condition of said frequency divider for initiating the discharge of said capacitor at a predetermined time interval before the end of a time period.

55. In combination, a source of substantially constant frequency signals, means for counting different numbers of said signals to measure off different time periods, a plurality of normally incomplete signal transfer paths leading to a common output terminal, means for sensing the state of said counting means and completing different ones of said transfer paths when the counting means is at different percentages of a full count, and means for supplying said signals to different ones of said transfer paths as the counting means are conditioned to count correspondingly different numbers of signals, whereby one of said signals will reach said output terminal a predetermined interval before the end of a measured time period.

56. In combination, a source of substantially constant frequency signals, a frequency divider having a plurality of bistate devices connected in tandem relation, means for selectively routing said signals to any one of the first several bistate devices in said frequency divider so that different selected time periods elapse between the commencement of the signals and the instant that the last bistate device is restored to its normal state, means for sensing the states of the last several bistate devices in said divider, a plurality of normally incomplete conduction paths leading to a common output terminal, means controlled by said sensing means for completing different ones of said conduction paths as the said last several devices are in different combinations of their two states, means for selectively routing said signals to different ones of said conduction paths as they are supplied to different ones of said first several bistate devices, so that one of said signals reaches said output terminal a predetermined interval before the end of a selected time period.

57. In combination, a frequency divider comprising a plurality of bistate devices tandemly connected to form a scaling chain, a plurality of input lines leading to different ones of said bistate devices to effectively connect different numbers of said devices in the scaling chain and thus vary the effective over-all dividing ratio of the chain, means for supplying a train of substantially constant frequency pulses selectively to different ones of said input lines to measure off different time periods between the commencement of the pulse train and the appearance of a transfer pulse from the last bistate device in said frequency divider, a plurality of gates connected to sense the states of different ones of the last few bistate devices in said chain, each gate being opened when the devices it senses are in a predetermined one of their two possible states, and connections from each one of said input lines through different combinations of said gates to a common predict pulse output terminal, so that for each time period selected by applying said pulse train to a different one of said input lines, a pulse is passed to said output terminal when a predetermined percentage of the time period has elapsed.

58. Apparatus for signalling that any one of several different time periods is within a predetermined and substantially equal interval of completion, comprising in combination a source of substantially constant frequency pulses, a frequency divider having a plurality of input lines which determine the over-all division ratio of the divider, means for selectively connecting said pulses to any one of said input lines, a plurality of normally incomplete pulse transfer paths having inputs connected to said input lines and leading to a common output terminal comprising means for sensing the condition of the frequency divider and in response thereto completing different ones of said transfer paths whenever the frequency divider contains different percentages of a "full count," so that a pulse appearing on a selected one of the input lines is routed to said output terminal a predetermined interval before re-setting of the frequency divider and the end of the time period measured off by selection of that particular input line.

59. In combination, a frequency divider comprising a plurality of bistate devices connected in tandem, a plurality of input lines leading to different ones of several bistate devices at the head end of said frequency divider, means for supplying a train of substantially constant frequency pulses selectively to different ones of said input lines to measure off different time periods from the commencement of the pulse train until a transfer pulse is produced by the last bistate device in the frequency divider, means for sensing the states of different combinations of the last few bistate devices, and means for creating a predict signal in response to all of those bistate devices being in a predetermined one of two states, the predict signal thus occurring a predetermined time interval in advance of the transfer pulse.

60. In combination, a source of repetitive pulses, means for receiving said pulses and frequency dividing the same, means for selectively changing the effective dividing ratio of said frequency dividing means so as to determine different numbers of said source pulses necessary to produce one cycle of operation by said frequency dividing means, and means for sensing said frequency dividing means to produce a predict signal when said dividing means completes a predetermined percentage of a cycle of operation.

61. In combination, a source of repetitive pulses, means receiving said source pulses for measuring off successive strings of pulses with each string containing a selected number of pulses occurring at a frequency lower than the repetition rate of said source pulses, and means connected with and responsive to said measuring-off means for generating a predict signal when a predetermined percentage of a selected number of the pulses in any string have occurred.

62. In a system for controlling a machine tool having a movable element driven by power means responsive to an analogue signal and also having a plurality of auxiliary power devices, the combination comprising means for generating according to a predetermined program successive blocks of digital signals with a special code signal interposed between certain ones of said blocks, each block of digital signals numerically defining the distance of one increment of motion and an assigned time period in which it is to be executed, first means responsive to each block of digital signals for measuring off an elapsed time period corresponding to that defined, second means responsive to each block of digital signals for deriving therefrom a string of pulses proportional in total number to the distance defined by that block and occurring with a substantially uniform frequency during the elapsed time interval which is measured off by said first means, means responsive to a special code signal interposed between two blocks of signals for causing said pulse string resulting from the preceding block to gradually reduce in frequency prior to its completion and for causing said first means to extend the elapsed time interval, means also responsive to a special code signal for preventing during a rest period the commencement of the string of pulses corresponding to the succeeding block of signals, means also responsive to a special code signal for producing an auxiliary signal on one of a plurality of terminals which corresponds to that particular special code, means also responsive to a special control signal for causing the string of pulses derived by said first means from the succeeding set of digital signals to commence at a reduced frequency and gradually increase to the said uniform frequency and for also causing said first means to extend the elapsed time interval, and means for creating an analogue signal which varies in extent and at a rate corresponding respectively to the number and frequency of pulses in said strings, whereby said auxiliary signal appearing on different ones of said terminals may be caused to operate different ones of said auxiliary power devices at the desired points in the motion program represented by said analogue signal.

63. In a system having a servo drive responsive to a control signal for controlling a machine tool having a movable element and a plurality of auxiliary power devices, said system utilizing a digital record to generate a plurality of serially spaced blocks of serially spaced coded binary signals, each block representing numerically successive distance increments and corresponding assigned time periods, and to generate special code groups of serially spaced coded binary signals interposed between certain of said blocks, the combination comprising a storage register, means for transferring the information represented by one block of said signals into said storage register, means for converting such information into a control signal which is smoothly modulated by amounts corresponding to the distance increments over time intervals proportional to the assigned time periods, means responsive to a first signal in a special code group to prevent transfer of subsequent signals in the special code group into the shifting register, and means responsive to the signals in a special code group for creating a momentary signal on that one of a plurality of terminals which corresponds to the particular special code, whereby said momentary signal may be utilized to operate an assigned one of the auxiliary power devices at desired points in a program of control of the movable element in accordance with variations in said control signal.

64. In a system for controlling a machine tool having a movable element traversable by a drive mechanism responsive to an analogue control signal and also having auxiliary power devices, the system accepting a digital record to generate serially spaced blocks of serially spaced coded binary signals, each block representing numerically an incremental distance and an assigned time period therefor, and to generate special code groups of serially spaced coded binary signals interposed between selected ones of said blocks to denote the operation of different ones of said auxiliary power devices, the combination comprising means for serially successively receiving the signals in each of said blocks and deriving therefrom an analogue control signal which varies by an amount proportional to the distance increment during an elapsed time period proportional to the assigned time period for that increment, means for receiving and responsive to a special code group of signals to prevent variation of said control signal for a rest interval and for creating an auxiliary control signal on one of a plurality of terminals corresponding to the particular special code, whereby one of the auxiliary devices may be actuated by said auxiliary signal at selected points in the program of motion represented by said analogue control signal.

65. For use in controlling a machine tool having a movable element and auxiliary power devices, the movable element being controllable by an analogue signal and the power devices being controllable by on-off signals, the combination comprising means for generating successive blocks of digital input signals serially spaced in time and with special code signals interposed between certain ones of said blocks, said input signals of signals each numerically representing the distance and time for one increment of motion, means for receiving said blocks of input signals and deriving therefrom an analogue signal which varies during successive time periods corresponding to the represented times by amounts corresponding to the represented distances, means for receiving said special code signals and converting the latter into on-off signals, whereby the analogue signal and on-off signals may be used to respectively control the motion of the movable element and the actuation of the auxiliary power devices.

66. For use with a machine tool having a movable element and auxiliary power devices respectively controllable by an analogue signal and on-off signals, the combination comprising means for generating from pre-calculated data digital input signals successively spaced in time and representing successive increments of motion together with special digital code signals interposed between certain ones of said input signals, means for receiving and converting said digital input signals into a corresponding analogue signal, means for receiving and converting said special code signals into on-off signals which occur at desired instants in the program represented by the analogue signal variations, and means for causing said on-off signals to control the operations of different ones of the auxiliary power devices.

67. For use with a machine tool having a movable element and auxiliary power devices respectively controllable by an analogue signal and on-off signals, the combination comprising means for generating from pre-calculated data digital input signals spaced successively in time, said input signals including first groups representing successive distances and rates of motion of said movable element, said input signals including auxiliary code signals designating operation of different ones of said power devices, means for successively storing said first groups of input signals, means for converting each group of signals stored in said storing means into an analogue signal which varies by an amount corresponding to the represented distance and at a rate corresponding to the represented rate, means for receiving said auxiliary code signals and converting them into corresponding unique on-off signals, means responsive to said analogue signal for controlling the motion of said movable element, and means responsive to said unique on-off signals for controlling respective ones of said power devices, whereby various auxiliary functions are automatically effected at the machine tool at the desired instants during the execution of a motion program by said movable element.

68. For use with a machine tool having elements relatively movable by servo drives along a plurality of axes and also having a plurality of auxiliary power devices, the combination comprising means for generating from a pre-calculated program of data digital input signals successively spaced in time and representing successive sets of simultaneous components and velocities of motion along respective ones of said axes together with special digital code signals interposed between certain ones of said input signals, means for receiving and converting said digital input signals into corresponding analogue signals, means for applying said analogue signals to said servo drives to produce a corresponding program of movement of said machine tool elements, means for receiving said special digital code signals and converting each into a unique electrical signal corresponding to the particular code, and means responsive to said electrical signals for causing said electrical signals to control the operation of different ones of said auxiliary power devices at the corresponding instants during the program of movement.

69. For use in controlling a machine tool having a movable element driven by a servomechanism responsive to an analogue signal, said machine tool also having a plurality of auxiliary power devices actuatable in response to on-off signals, the combination comprising means for generating successive sets of digital input signals representing a program of successive increments of movement, means for generating special code signals interposed between selected ones of said input signals, means responsive to and for converting said successive sets of signals into a varying analogue signal, means responsive to each special code signal for creating an on-off signal corresponding uniquely to the special code, whereby said analogue signal may be used to control the program of motion of said movable element and said on-off signals used to actuate selected ones of said auxiliary devices at the desired points in the program of element movement.

70. In a system for controlling the motion of a movable machine tool element according to numerical information representing successive motions, the combination comprising a digital record device having indicia thereon representing the signs and extents of successive increments of motion, means for reading said record device and converting the indicia thereon into an analogue signal which varies in a positive or negative sense when the represented sign indicia is respectively positive or negative and by amounts proportional to the represented extents, a two-position switch manually settable to either a normal or a reverse position, and means responsive to said switch being in the reverse position for modifying said converting means to make said analogue signal vary in a negative or positive sense when the represented sign indicia on said record device is respectively positive or negative.

71. In a system for controlling the relative movement of members along a plurality of axes according to successive sets of numerical information representing successive increments of motion, the combination comprising a digital record device having successive blocks of indicia thereon representing the signs and extents of motion components along said plurality of axes for successive increments of relative movement, means for reading said record device and successively converting the indicia of successive blocks thereon into a plurality of analogue signals each corresponding to one axis, said converting means including sign control means for making said analogue signals vary in a positive or negative sense when the sign indicia for the corresponding axis components is positive or negative, respectively, said converting means including means for making said analogue signals vary by amounts proportional to the represented extents of the corresponding axis components, a plurality of two-position selector switches corresponding to respective ones of said axes and manually settable in normal or reverse states, and means responsive to respective ones of said switches being in reverse states for modifying respective ones of said sign control means to make desired ones of said plurality of analogue signals vary in a negative or positive sense when the represented sign indicia for the corresponding axis is positive or negative, respectively.

72. In a system having a servo drive responsive in distance, direction and velocity, respectively, to variation, sense of variation, and rate of variation of an analogue control signal for controlling the motion of a movable machine tool element according to numerically defined time, sign and distance information, the combination comprising a digital record device having indicia thereon digitally representing time, sign, and distance characters, means for reading said record device and converting said time and distance indicia into a control signal which varies by an amount proportional to the represented distance over an elapsed time interval proportional to the represented time, means for creating one or the other of two potential values according to whether said sign-representing indicia on said record device is positive or negative, means for causing said control signal variation to be in one sense or the other when said potential has one or the other of its two respective values, selectively operable, manually settable switch means for making said potential have the said other or the said one of its two values when said sign information is positive or negative, respectively, so that said control signal varies in the reverse sense to that directed by the sign information.

73. In a system having a servomechanism responsive in its direction of movement to the sense of variation of an analogue control signal for controlling the motion of a movable machine tool element according to digital input signals representing numerically defined time, sign and distance information, the combination comprising means for receiving and converting said time and distance representing signals into a control signal which varies by an amount proportional to the represented distance over an elapsed time interval proportional to the represented time, a bi-state device and means for setting it to one state or the other according to whether said sign information represented by said input signals is positive or negative, first and second dual-input gates connected in parallel, connecting means for conditioning one input of the first gate for conduction when said bi-state device is in said one state and for conditioning the one input of the second gate for conduction when said bi-state device is in said other state, bi-state reversal selection means having "normal" and "reverse" states, connecting means for conditioning the second input of said first gate for conduction when said reversal means are in the "normal" state and for conditioning the second input of the second gate or conduction when said reversal means are in the "reverse" state, means for causing said control signal variation to be (a) in one sense or (b) in the other sense when (a) at least one of said gates is conductive or (b) when neither of said gates is conductive.

74. In a system having means including a drive motor responsive to an analogue signal for controlling the motion of a movable machine tool element according to successive numbers defining distance increments and corresponding assigned time periods which together define the feed rates for each increment of motion, the combination comprising a storage device for successively storing the numbers defining each successive increment, a command clock pulse oscillator having means for adjusting the frequency thereof up to a first percentage above and down to a second percentage below a predetermined normal value, a frequency divider having plural input terminals for effecting different overall dividing ratios, means for supplying the output pulses from said oscillator to a given one of said input terminals according to the number held in said storage device which defines the assigned time period, means responsive to said frequency divider and said storage device for deriving from the command clock pulses a string of pulses proportional in total number to the distance-defining number held in said storage device and spaced over the assigned time period, means for decoding said pulse string into an analogue signal, said element having a maximum permissible feed rate, and means for reducing the frequency of said command clock oscillator to its normal value whenever the distance-defining number and the corresponding time period-defining number held in said storage device establish a feed rate which is increased by said first percentage would exceed the said maximum permissible feed rate.

75. In a system having means including a drive mechanism responsive to a control signal for controlling the displacement and velocity of a movable element according to a numerically defined successive distance increments and corresponding assigned time periods which establish the velocity for each increment, said drive mechanism for moving said element having a limitation as to maximum velocity which it can safely produce, the combination comprising a director having means of electrically processing the numerical time and distance information and creating a control signal modulated over successive time periods by amounts proportional to successive distance increments and at rates corresponding to the velocities for those increments, said director also having means for adjusting the time base of its operation so that the processing time periods are lengthened or shortened and the rates of change in said control signal decreased or increased proportionally relative to the assigned time periods and established velocities, and means for automatically restoring the time base of the director's operation up to normal time upon processing of an incremental distance and assigned time period information which would with the time base shortened result in a rate of change in said control signal that would attempt to cause greater than the safe velocity of said element.

76. In a system having means including a drive mechanism responsive to a control signal for controlling the movement of a movable element according to successive sets of numerical information which define the distances and velocities of successive increments of movement, said drive mechanism having a limitation as to the maximum velocity which it can impart to said element, the combination comprising a director having means for electrically processing successive sets of numerical information and creating a control signal modulated at rates and by amounts proportional to the velocities and distances defined by such information, said director also having a pulse source normally operating at a predetermined frequency and means to cause the rate of modulation of said control signal to be proportional to the frequency of said source, means for adjusting the operating frequency of said source by a selected percentage above said predetermined frequency to correspondingly increase the rates of modulation of said control signal and so that an amount of modulation corresponding to each defined distance is accomplished in less time than otherwise would be required, and means responsive to each set of numerical information for automatically reducing said source to said predetermined frequency in the event that it has been adjusted to a higher frequency when the velocity defined by said numerical information, if increased by said selected percentage, would tend to exceed said maximum velocity.

77. In a system having means to drive a movable element at velocities substantially proportional to the frequency of recurring command pulses and through distances proportional to the total number of received command pulses, said drive means having a limitation as to the maximum velocity at which it can drive said element, the combination comprising a pulse source normally operating at predetermined frequency, means receiving said source pulses for deriving successive strings of command pulses which are (1) proportional in total number of pulses to respective successive preselected distance increments and (2) proportional in frequency both (a) to preselected velocities for such increments and (b) to the frequency of said source pulses, means for manually adjusting the frequency of said pulse source above said predetermined frequency, and means responsive to said adjusting means for restoring said pulse source to said predetermined frequency if the selected velocity when increased by the higher source frequency would exceed said maximum velocity.

78. In a machine tool control system wherein numerical command information is converted into a string of command pulses proportional in number to a distance to be traversed by a machine tool element, the combination comprising a decoder having a reference scaling channel and an axis scaling channel, means for generating two identical streams of master pulses, means for supplying one of said streams to said reference channel, and means for adding or deleting a predetermined number of master pulses to or from the other of said streams for each command pulse and supplying that modified stream to the axis scaling channel; a source of recurring pulses, and means for selectively supplying said recurring pulses to said decoder as artificial command pulses so that the states of said reference and axis scaling channels may be set in a desired relation independently of said numerical command information and the command pulses derived therefrom.

79. In a system for controlling the movement of a plurality of machine tool elements movable along different axes according to numerical command information which is converted into a string of command pulses for each axis of control, the combination with a decoder which includes a reference scaling channel and a plurality of axis scaling channels, means for supplying streams of master pulses to all of said scaling channels, means for adding or deleting a predetermined number of master pulses to or from the stream supplied to each of said scaling channels for each pulse in the corresponding command pulse string; of a manually controlled source of recurring pulses, and means for causing the latter pulses to act as artificial command pulses to modify the pulse stream fed to any selected one of the several axis scaling channels.

80. In a system for controlling a movable element in accordance with a program of successive sets of digital input signals numerically representing successive distance increments, the combination comprising first means for receiving and converting each set of digital input signals into a chain of pulses proportional in quantity to the represented distance increment, second means for receiving said chain of pulses and converting the same into an analogue signal which varies in accordance therewith, a source of pulses and manually controlled means for supplying pulses from said source to said second means to create desired variations in said analogue signal independently of the digital input signals.

81. In a system having a servo power drive responsive to phase-varying control waves for controlling the motion of a movable machine tool element over successive increments according to successive distance increments numerically defined and represented by digital input signals supplied to the system, the combination of means for receiving and storing the digital input signals for a numerical distance increment, means for deriving from each stored numerical distance a string of time-spaced command pulses proportional in number thereto, a decoder having a reference scaling channel and a control scaling channel, means for generating two identical streams of master pulses, means for supplying one of said streams to said reference channel, means for adding or deleting a predetermined number of master pulses to or from said other of said streams for each command pulse and supplying that modified stream to the control scaling channel so that the output waves from said channels are relatively changed in phase, a source of recurring pulses, and means for selectively supplying said recurring pulses to said decoder as artificial command pulses so that the states of said reference and control scaling channels and the phase of their output waves may be set in a desired relation independently of the digital input signals which numerically define distance increments.

82. In a system having power means responsive to an analogue signal for controlling a movable element at a location remote from a data processor which accepts digital input signals numerically defining successive distances of movement, the combination comprising first means for receiving the digital input signals and deriving therefrom a chain of time-spaced pulses proportional in number to the defined distance, second means for converting said chain of pulses into an analogue signal which varies in accordance with the number of pulses received, a source of pulses, manually controlled means for supplying pulses from said source to said second means, and means connected with said second means for indicating in numerical form the distances represented by accomplished variations in said analogue signal, thereby to indicate the distance equivalent of pulses passed from said source to said second means.

83. In a system having a plurality of servo drives responsive to respective phase modulated waves for controlling the motion of a plurality of machine tool elements movable along a corresponding plurality of axes according to distance components and a corresponding assigned time period numerically defined and represented by digital input signals supplied to the system, the combination of means for deriving from the digital input signals a string of command pulses for each axis proportional in number to each represented distance component and spaced substantially uniformly over the represented assigned time period, a decoder comprising a reference scaling channel and a plurality of axis scaling channels, means for supplying a stream of master pulses to said reference channel, an add-delete circuit for each axis scaling channel which receives said string of command pulses for that axis and the stream of master pulses, said add-delete circuits having means for adding to or deleting from the master stream a predetermined number of pulses for each pulse in the respective command pulse string and supplying the resultant pulses to the associated axis scaling channel so that the output waves of said axis channels are phase modulated relative to the output wave of said reference channel, a single fine indicator selectively connectable to sense the relative states of said reference scaling channel and any one of said axis scaling channels so as to display numerically the distance represented by the command pulses for that axis of control, a source of artificial command pulses and means for selectively routing them to any one of the add-delete circuits, and selecting means for routing the artificial command pulses into the add-delete circuit for the axis scaling channel which is operatively associated with said fine indicator.

84. In a system having power means responsive to an analogue signal for controlling the extents and velocities of successive increments of motion imparted to a movable member, the combination comprising a digital record and means for reading the same to create successive sets of electric signals digitally and numerically representing successive extents and velocities of motion, means receiving said electric signals for producing an analogue signal which successively varies by amounts and at rates corresponding to the successively represented extents and velocities of motion, manually controlled means for producing other electric signals representing extents of motion, said producing means including means responsive to said other electric signals for causing said analogue signal to vary by an amount corresponding to the extents represented by said other signals, a numerical display device, and means for causing said display device to indicate numerically the algebraic sum of the extents of motion represented both by said electric signals and said other signals received by said producing means.

85. In a system for controlling the motion of a movable machine tool element, the combination of means for accepting numerical digit command information representing distance from a digital record, means for converting such information into a control signal which varies with time by an amount proportional to the distance information, means for recording said control signal and subsequently reproducing it at the site of a machine tool to control the movable element, and means associated with said converting means to visually indicate the extent of motion represented by the variation of said control signal.

86. In a system for controlling the relative motion of two movable elements along a plurality of axes, the combination comprising means for generating successive sets of digital input signals numerically defining successive sets of motion components along said axes for successive increments of relative motion, data processing means receiving said successive sets of input signals for producing an analogue signal for each axis which varies during successive time intervals by an amount corresponding to the defined motion component along that axis, means for recording said analogue signals, means for reproducing said recorded analogue signals, means for controlling the relative motion of said movable elements along said axes according to variations in said reproduced analogue signals, and means associated with said data processing means for visually indicating by a numerical display the algebraic sum of the motion components any given axis represented by the input signals received by said data processing means.

87. In a system for controlling the successive distances of movement by a movable element according to a motion program, the combination comprising data processing means for receiving digital input signals defining the successive distances and velocities to be produced according to a motion program and for converting said input signals into a correspondingly modulated control signal, power means responsive to said modulated control signal and adapted to be drivingly connected to a movable element to impart motions to the latter in accordance with variations in the control signal, and means connected with said data processing means for numerically indicating the net distances represented by changes in said control signal, thereby to afford verification of the correct operation of said data processing means even though said power means may receive said control signal at a remote place or time relative to the location or operation of said data processing means.

88. In a system for controlling the motions of a movable element according to digital, numerical information defining successive distances and velocities to be imparted to the element, the combination comprising data processing means for receiving digital, numerical information and converting the same into an analogue signal modulated by amounts and at rates corresponding to the successive distances and velocities represented by the numerical information, a movable element, servo drive means connected to said movable element and responsive to said analogue signal for moving the element through distances and at velocities corresponding to the amounts and rates of modulation of the analogue signal, and means connected wtih said data processing means and independent of said servo drive means for numerically indicating the total distance represented by the net amount of modulation of said control signal.

89. In a system for controlling the relative motions of two members along a plurality of axes, the combination comprising means for generating successive sets of digital signals with each set numerically defining the signs and extents of simultaneous axis components of motion required to produce a successive increment of relative motion, the combination comprising data processing means for receiving said successive sets of digital signals and converting the same into a plurality of analogue signals each corresponding to one axis, said converting means including means for causing each analogue signal to vary during successive time intervals in the sense and by an amount corresponding to the sign and extent of the numerically defined axis component of motion for successive increments of motion, a drive mechanism for each axis responsive to a corresponding one of said analogue signals to impart relative motion of said two members along that axis, and means connected to said data processing means for indicating the algebraic sum of the distance components along each axis represented by the successive sets of input signals received and processed by said data processing means.

90. In a system for controlling the motions of a movable element according to successive sets of digital, numerical information defining distances, signs and velocities of successive motion increments to be imparted to the element; the combination comprising data processing means for receiving successive sets of digital, numerical information and converting the same into an analogue signal modulated during successive time intervals by amounts, in the sense, and at rates corresponding to the successive distances, signs and velocities represented by the sets of numerical information; a movable element, servo drive means connected to said movable element and responsive to said analogue signal for moving the element through distances, in directions, and at velocities corresponding to the amounts, sense, and rates of modulation of the analogue signal, and means connected with said data processing means and independent of said servo drive means for numerically indicating the algebraic sum of the successive distances represented by the received input signals, thereby to indicate the position of said movable element.

91. In a system for controlling the successive distances of movement by a movable element according to a motion program of successive numerically defined successive distance increments each of which is positive or negative in sense, the combination comprising data processing means for receiving digital input signals defining the successive signs, distances and velocities of successive increments according to a motion program and for converting said input signals into a correspondingly modulated control signal, power means responsive to said modulated control signal and adapted to be drivingly connected to a movable element to impart motions to the latter in accordance with variations in the control signal, and means connected with said data processing means for numerically and digitally indicating the algebraic sum of the successive increments represented by the received digital input signals, thereby to afford verification of the correct operation of said data processing means and to indicate the position of said movable element.

92. In a system for controlling the motion of a movable machine tool element over successive distance increments according to numerical values representing successive increments and assigned time periods on a digital record, the combination of means for deriving from each numerical value a string of pulses proportional in number thereto and substantially uniformly spaced over the corresponding assigned time period, a decoder comprising a reference scaling channel and an axis scaling channel each receiving master pulses of the same frequency and phase together with means for changing by a predetermined number the quantity of master pulses scaled by the axis scaling channel for each pulse in said string, an accumulating coarse indicator responsive to output signals from said scaling channel to display the algebraic sum of distances to a nearest coarse unit represented by decoder output signals, and a fine indicator which senses the relative states of said scaling channels and displays the distance represented by decoder output signals up to one of said coarse units, whereby the distance which would be traversed if the machine tool element were being controlled directly by decoder output signals may be observed.

93. In a system having a servo power drive responsive to phase-varying control signals for controlling the motion of a movable machine tool element over successive increments according to successive distance increments and assigned time periods numerically defined and represented by digital input signals supplied to the system, the combination of means for receiving and storing said digital input signals, means for deriving from each stored numerical distance representation a string of pulses proportional in number thereto and substantially uniformly spaced over a time period proportional to the corresponding stored numerical time value, a decoder including a reference scaling channel and a control scaling channel each receiving master pulses of the same frequency and phase together with means for changing by one the number of master pulses supplied to the control scaling channel for each pulse in said string so that the output wave from the control channel is phase modulated relative to the output wave from the reference channel to form phase-varying control signals, an accumulating coarse indicator responsive to the output waves of said axis and reference channels for displaying the algebraic sum of distances to a nearest coarse unit as represented by the total phase shift between said two output waves, and a fine indicator including means for sensing the relative states of said scaling channels for displaying the distance represented by the phase shift between said two output waves up to one of said coarse units.

94. In combination, two scaling channels of identical scaling ratios, means for causing said scaling channels to respond to different numbers of pulses in a master pulse train supplied thereto so that the output waves of said channels are relatively phase shifted, means for sensing and numerically displaying the state of one of said channels at the instant the other channel completes one scaling cycle, thereby to indicate the relative phase displacement of said two output waves over a range from 0 to 360 degrees, an accumulating numerical display device, means for changing by a predetermined quantity the number displayed by said device each time that two carry output pulses are produced in succession by one of said channels without a carry output phase from the other channel interposed therebetween, thereby to indicate the multiples of 360° phase shifts of said output waves.

95. In a system having a servo drive responsive to the relative phase modulation of two recurring waves for controlling the motion of a movable machine tool element over successive increments according to digital input signals representing numerical values of successive distance increments and assigned time periods, the combination of means for receiving and storing the digital input signals and the numerical values represented thereby, means for deriving from each stored numerical distance value a string of command pulses proportional in number thereto and substantially uniformly spaced over a time period proportional to the corresponding stored numerical time value, a decoder which includes a reference scaling channel and an axis scaling channel, means for supplying a master pulse stream to said reference channel, means receiving said command pulse string and master pulse stream for supplying the master pulses to the axis scaling channel increased or decreased by one for each command pulse so that the receiving output waves of the reference and axis channels are relatively phase modulated, a coarse indicator for displaying multiples of distance represented by a 360° phase shift between said output waves, said indicator including means for sensing the carry output pulses of said channels, an accumulating display device, and means for increasing or decreasing by one unit the number displayed by said device each time that two carry output pulses from one of said channels occur in succession without a carry output pulse from the other channel interposed therebetween.

96. In a system having a servo drive responsive to phase-modulated waves for controlling the motion of a movable machine tool element over successive increments according to digital input signals representing numerical values of successive distance increments and assigned time periods, the combination of means for receiving and storing the digital input signals and the numerical values represented thereby, means for deriving from each stored numerical distance value a string of command pulses proportional in number thereto and substantially uniformly spaced over a time period proportional to the corresponding stored numerical time value, a decoder which includes a reference scaling channel and an axis scaling channel, means for supplying a master pulse stream to said reference channel, means receiving said command pulse string and master pulse stream for supplying the master pulses to the axis scaling channel increased or decreased by one for each command pulse so that the output waves of the reference and axis channels are relatively phase modulated, a gate and means for opening the same after a delay interval in response to carry output pulse from one of said decoder channels, means for closing said gate after a delay interval in response to a carry output pulse from the other of said channels, means for supplying carry output pulses from said one channel to the input of said gate, and means for accumulating and numerically displaying the sum of pulses transmitted by said gate, one pulse being passed by said gate each time that two carry output pulses from said one scaling channel occur in succession without an intervening carry output pulse from the other scaling channel.

97. In a system having a servo drive responsive to the relative phase modulation of two recurring waves for controlling the motion of a movable element, the combination comprising means responsive to successive sets of digital input signals defining the signs and extents of successive distance increments for producing two recurring waves which relatively shift in phase during successive time intervals in a sense and by an amount proportional to the defined signs and extents of the successive distance increments, an accumulating numerical indicator, means for sensing said recurring waves, and means for increasing or decreasing the number displayed by said indicator each time that one of said wave laps 360° relative to the other wave in a lagging or leading direction, whereby said indicator displays the algebraic sum of extents represented by the phase modulation of said two waves.

98. In a system having a servo drive responsive to phase-modulated waves for controlling the motion of a movable machine tool element over successive increments according to digital input signals representing numerical values of successive distance increments and assigned time periods, the combination of means for receiving and storing the digital input signals and the numerical values represented thereby, means for deriving from each stored numerical distance value a string of command pulses proportional in number thereto and substantially uniformly spaced over a time period proportional to the corresponding stored numerical time value, a decoder which includes a reference scaling channel and an axis scaling channel, means for supplying a master pulse stream to said reference channel, means receiving said command pulse string and master pulse stream for supplying a master pulses to the axis scaling channel increased or decreased by one for each command pulse so that the output waves of the reference and axis channels are relatively phase modulated, first and second gates connected respectively to receive carry output pulses from said reference channel and axis channel, respectively, means for closing said first gate and opening said second gate after a short delay in response to a carry output pulse from said axis scaling channel, means for closing said second gate and opening said first gate after a short delay in response to a carry output pulse from said reference channel, an algebraic accumulator and display device, means for increasing the contents of said accumulator each time a pulse is passed by said second gate, and means for decreasing the contents of said accumulator each time a pulse is passed by said first gate.

99. In a machine tool control system wherein distance information is converted into a string of command pulses proportional in number to a distance to be traversed, the combination of a decoder which includes a reference scaling channel and an axis scaling channel, means for supplying a master pulse stream to said reference channel, means receiving said command pulse string and master pulse stream for supplying the master pulses to the axis scaling channel increased or decreased by one for each command pulse, means for indicating the relative states of the reference and axis scaling channels so as to display the distance represented by the command pulses which have been received, said last means comprising a plurality of decimal digit indicator lamps, means for de-energizing all of said lamps prior to re-setting of one of said scaling channels, and means for energizing a particular combination of those lamps depending upon the numerical value represented by the condition of the other scaling channel at the time that the one scaling channel re-sets.

100. In a system having a servo power drive responsive to phase-modulated control waves for controlling the motion of a movable machine tool element over successive increments according to digital input signals representing numerical values of successive distance increments and assigned time periods, the combination of means for receiving and storing the digital input signals and the numerical values represented thereby, means for deriving from each stored numerical distance value a string of command pulses proportional in number thereto and substantially uniformly spaced over a time period proportional to the corresponding stored numerical time value, a decoder which includes a reference scaling channel and an axis scaling channel, means for supplying a master pulse stream to said reference channel, means receiving said command pulse string and master pulse stream for supplying the master pulses to the axis scaling channel increased or decreased by one for each command pulse so that the output waves of the reference and axis channels are relatively phase modulated, means for indicating the relative states of the reference and axis scaling channels so as to display the distance represented by the command pulses which have been received, said last means comprising a plurality of decimal digit indicator lamps, means for de-energizing all of said lamps prior to re-setting of one of said scaling channels, and means for energizing a particular combination of those lamps depending upon the numerical value represented by the condition of the other scaling channel at the time that the one scaling channel re-sets.

101. The combination set forth in claim 100, further characterized in that said reference and axis scaling channels are made up of tandemly connected flip-flops arranged in decade units; and further including diode matrices connected to sense respective ones of the decade units for one of said channels, each said matrix having ten output lines which individually receive a signal thereon whenever the associated decade unit is in one of its ten possible states, ten double grid thyratrons having a first grids connected to the ten respective output lines for each matrix so that one of the thyratrons will be conditioned for conduction for each state of the associated decade unit, an indicator lamp in series with each thyratron, means connected with the second grids of all said thyratrons to fire those particular thyratrons which are conditioned for conducton at the time that the other of said scaling channel re-sets, and means for extinguishing all of said thyratrons a short time interval before said other scaling channel re-sets, so that the combination of indicator lamps which are energized display the numerical value represented by the condition of the one scaling channel.

102. In a system having a servo drive responsive to phase modulated control waves for controlling the motion of a movable element through successive numerically defined distance increments, the combination comprising means for generating successive sets of digital input signals defining the sign and extent of successive increments, means responsive to said input signals for generating during successive time intervals successive strings of pulses with each string containing a number of pulses proportional to the defined extent of one increment, a decoder which includes a reference scaling channel and an axis scaling channel of the same scaling ratio, means for supplying a master pulse stream to both of said scaling channels so that the outputs thereof are normally fixed in relative phase, means for increasing or decreasing the counting by said axis channel of said master pulses in response to each pulse in said string depending upon whether the sign defined by said input signals is positive or negative to make the output signal from said axis channel shift in phase relative to the output of said reference channel, means for sensing the state of one of said channels at the instant that the other of said channels re-sets after a scaling cycle, and means connected to said sensing means for displaying the distance represented by the sensed state of said one channel.

103. In combination with a decoder having two scaling channels which receive input pulses differing by a number proporitonal to distance information, a coarse indicator which comprises means for sensing the carry output pulses of said channels, an accumulating display device, and means for increasing or decreasing by one unit the number displayed each time that two carry output pulses from one of said channels occur in succession without a carry output pulse from the other channel interposed therebetween.

104. In combination with a phase shift decoder having a reference scaling channel and an axis scaling channel which respectively receive input pulses differing in number in proportion to command pulses representing distance information, a gate and means for opening the same after a delay interval in response to a carry output pulse from one of said channels, means for closing said gate after a delay interval in response to a carry output pulse from the other of said channels, means for supplying carry output pulses from said one channel to the input of said gate, and means for accumulating and numerically displaying the sum of pulses transmitted by said gate, one pulse being passed by said gate each time that two carry output pulses from said one scaling channel occur in succession without an intervening carry output pulse from the other scaling channel.

105. In combination with a decoder which includes a reference scaling channel and an axis scaling channel together with means for supplying a stream of master pulses to said reference channel and a stream of pulses having one more or one less pulse than said master stream for each unit of distance to be represented by the variation in phase between the output signals of the two channels, first and second gates connected respectively to receive carry output pulses from said reference channel and axis channel, respectively, means for closing said first gate and opening said second gate after a short delay in response to a carry output pulse from said axis scaling channel, means for closing said second gate and opening said first gate after a short delay in response to a carry output pulse from said reference channel, an algebraic accumulator and display device, means for increasing the contents of said accumulator each time a pulse is passed by said second gate, and means for decreasing the contents of said accumulator each time a pulse is passed by said first gate.

106. In combination, a decoder comprising a reference scaling channel made up of tandemly connected flip-flops arranged in decade units, an axis scaling channel made up of tandemly connected flip-flops arranged in decade units, diode matrices connected to sense respective ones of the decade units for one of said channels, each said matrix having ten output lines which individually receive a signal thereon whenever the associated decade unit is in one of its ten possible states, ten double grid thyratrons having first grids connected to the ten respective output lines for each matrix so that one of the thyratrons will be conditioned for conduction for each state of the associated decade unit, an indicator lamp in series with each thyratron, means connected with the second grids of all said thyratrons to fire those particular thyratrons which are conditioned for conduction at the time that the other of said scaling channels re-sets, and means for extinguishing all of said thyratrons a short time interval before said other scaling channel re-sets, so that the combination of indicator lamps which are energized displays the numerical value represented by the condition of the one scaling channel.

107. In combination, a phase shift decoder comprising a reference scaling channel and a control scaling channel having identical scaling ratios and normally counting identical recurring master pulses supplied thereto, means for changing the counting response of said control channel in response to each pulse in a command pulse string thereby to shift the phase of the control channel output wave relative to the reference channel output wave, means for sensing the state of one of said channels at the instant the other channel completes a scaling cycle, and means connected to said sensing means for indicating the sensed state of said one channel as a number proportional to quantity of received command pulses.

108. In combination, two scaling channels of identical scaling ratios, means for supplying recurring master pulses to both of said scaling channels and for causing the scaling response by one channel to differ from the scaling response in the other channel so that the output waves of said channels are relatively shifted in phase, means for sensing the state of one of said channels at the instant the other channel completes one scaling cycle, and means responsive to said sensing means for displaying a number indicative of the difference in the scaling responses of the two channels and indicative of the relative phase displacement of said two output waves.

109. In a system having drive means responsive to an analogue signal for controlling the motion of a movable machine tool element according to successive blocks of serially spaced digital signals, each block of signals numerically representing a successive distance increment and corresponding assigned time period which establish the feed rate for that increment, means for receiving one block of said signals at a time and storing the information represented thereby, means for generating a pulse stream having a predetermined frequency, a frequency divider and means for establishing the dividing ratio thereof according to the stored time period information, means responsive to the frequency divider and the stored distance information for deriving from said pulse stream a string of pulses proportional in number to the stored distance information and spaced in time over the assigned time period, means for causing said storing means to receive the next block of signals when said frequency divider has received a number of pulses equal to the dividing ratio thereof, decoding means for converting said pulse string into an analogue signal, a record tape and means for driving the same normally at a predetermined speed, means for recording said analogue signal on said record tape, means selectively operable to change the frequency of said pulse stream and the speed of said tape drive means by the same proportion, and means for playing back said record tape at said predetermined speed, whereby the preparation of the tape may be made to require different time than playback of the tape to give said reading means adequate time to read each block on said record device.

110. In a system for controlling the motion of a movable machine tool element in conformity with time-spaced blocks of serially spaced digital signals, each block numerically defining one of a plurality of successive distance increments and a corresponding feed rate for that increment, the combination comprising means for receiving and storing said signals, means for deriving from said stored signals a string of pulses proportional in number to the stored distance increment and having a frequency proportional to the corresponding defined feed rate, means for decoding said pulse string into an analogue signal, means for recording said analogue signal on a moving record, and means responsive to special code signals interposed between said blocks to (a) change the frequency of said pulse string by a predetermined ratio relative to that which is proportional to the feed rate represented by said signals, and (b) change the speed of the moving record by the same ratio relative to its normal speed.

111. In a system having power means responsive to an analogue signal for controlling the motion of a movable machine tool element in accordance with a program of successive sets of input signals digitally representing numerical values of successive distances of incremental movements and corresponding time periods during which such movements are to be accomplished, the combination comprising means for successively receiving the sets of input signals and producing therefrom a first analogue signal which varies by an amount proportional to the represented value of distance during an elapsed time period which is different by a predetermined proportion than the value of the represented time period, a recording medium and means for moving the same at a predetermined speed, means for recording said first analogue signal on said recording medium while it is so being driven, means for moving said recording medium at a speed which is different relative to said predetermined speed by said predetermined proportion, and means for producing a second analogue signal from said recording medium while it is driven by said last-named means, whereby the said second analogue signal may be applied to said power means to cause the machine tool element to move a given distances of component movements and the velocities at originally produce the corresponding variation in the first analogue signal.

112. The combination set forth in claim 111 wherein means are provided to change said predetermined proportion.

113. In a system for controlling the motion of a machine tool element according to numerical information digitally representing distance increments and corresponding assigned time periods, the combination of a director having means to accept said numerical information and to convert the digitally represented time periods into elapsed time intervals while creating a control signal modulated at substantially uniform rates by an amount corresponding to the distance increments during those time intervals, a recording medium, means to move the medium at a predetermined speed, means for recording said control signal on said record medium, and means for selectively changing the ratio of digitally represented time periods to the corresponding elapsed time intervals in the director while correspondingly altering the speed of said recording medium by the same ratio relative to said predetermined speed.

114. In a system for controlling the simultaneous motions of machine tool elements according to successive sets of digital numerical information which establish the distance of component movements and the velocities at which those movements are to be carried out, the combination comprising a director having means to accept said digital numerical information and to convert it into analogue control signals modulated by amounts corresponding to the established distances and at rates which bear a first proportion to the established velocities, a recording medium, means to move said recording medium at a first speed while recording said control signals thereon, playback means for reproducing said recorded control signals and including means for moving said recording medium at a second speed, whereby said played-back signals are modulated by amounts corresponding to the established distances but at rates bearing a second proportion to the established velocities.

115. In a system for effecting the programmed movement of an element, a servo system for moving said element, cyclically operable command signal generator means having first and second control signal inputs and arranged to produce a command signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, and means for modifying the operation of said control means to increase said first signal from a low value to said fixed value during an initial portion of a cycle of operation of said generator means.

116. In a system for effecting the programmed movement of an element, a servo system for moving said element, cyclically operable command signal generator means having first and second control signal inputs and arranged to produce a command signal which changes at a rate proportional to the product of the values of signals applied to said inputs means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, and means for modifying the operation of said control means to decrease said first signal from said fixed value to a low value during a final portion of a cycle of operation of said generator means.

117. In a system for effecting the programmed movement of an element, a servo system for moving said element, cyclically operable command signal generator means having first and second control signal inputs and arranged to produce a command signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, and means for modifying the operation of said control means to increase said first signal from a low value to said fixed value during an initial portion of a cycle of operation and to decrease said first signal from said fixed value to a low value during a final portion of a cycle of operation of said generator means.

118. In a system for effecting the programmed movement of an element, a servo system for moving said element, cyclically operable command signal generator means having first and second control signal inputs and arranged to produce a command signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, means operable during a final portion of a cycle of operation of said generator means to develop a gradually changing signal, and means responsive to said gradually changing signal for controlling said control means to reduce said first signal.

119. In a system for effecting the programmed movement of an element, a servo system for moving said element, cyclically operable command signal generator means having first and second control signal inputs and arranged to produce a comand signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, means for developing a gradually changing signal, and means responsive to said gradually changing signal for controlling said control means to gradually reduce said first signal.

120. In a system for effecting the programmed movement of an element, a servo system for moving said element, cyclically operable command signal generator means having first and second control signal inputs and arranged to produce a command signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, means for developing a gradually changing signal, means responsive to said gradually changing signal for controlling said control means to reduce said first signal, and means for discontinuing operation of said generator means when said first signal is reduced to a certain value.

121. In a system for effecting the programmed movement of a plurality of elements, servo systems for moving said elements, cyclically operable command signal generator means having a first input and having a plurality of additional inputs corresponding to said elements and arranged to produce command signals which change at rates proportional to the products of the values of signals applied to said first input and the value of signals applied to said additional inputs, means for coupling said command signals to respective ones of said servo systems to cause the latter to move said elements at velocities proportional to the rates of change of the respective command signals, control means for normally applying a first signal of fixed value to said first input, program means for applying control signals to said additional inputs to normally produce certain velocities of movements of said elements as a result of each cycle of operation of said generator means, and means for modifying the operation of said control means to increase said first signal from a low value to said fixed value during an initial portion of a cycle of operation of said generator means and to decrease said first signal from said fixed value to a low value during a final portion of a cycle of operation of said generator means.

122. In a system for effecting the programmed movement of an element, a servo system for moving said element, cyclically operable command signal generating means having first and second control signal inputs and arranged to produce a command signal which changes at a rate proportional to the product of the values of signals applied to said inputs, means for coupling said command signal to said servo system to cause the latter to move said element at a velocity proportional to the rate of change of such signal, control means for normally applying a first signal of fixed value to said first input, program means for applying a second signal to said second input to normally produce a certain velocity of movement of said element as a result of each cycle of operation of said generator, resistance-capacitance circuit means for developing a gradually changing signal, a bi-state device for controlling operation of said resistance-capacitance circuit means, means for setting said bi-state device to one state at a predetermined point in said cycle of operation of said generator means to initiate operation of said resistance-capacitance means, means responsive to said gradually changing signal for controlling said control means to reduce said first signal, and means for resetting said bi-state device to its other state at the end of a cycle of operation of said generator means.

123. In a numerical position control system having a record input, means for generating electrical representations of numerical information contained on a record, a variable frequency source of electrical pulses, a controller operative to receive pulses from the source and electrical representations from the record and operative to generate a plurality of trains of electrical pulses for use by digital servomechanisms, the improvement which comprises the provision of circuitry operative to supply a frequency control signal to said variable frequency source of electrical pulses, said circuitry having a first, normal, condition wherein the pulse source is caused to emit pulses of a constant frequency, a second, accelerating, condition wherein said pulse source is caused to emit pulses at a continuously increasing frequency over a period of time, and a third, decelerating, condition wherein said pulse source is caused to emit pulses of a continuously decreasing frequency over a period of time, the condition of said circuitry being controlled by information contained on the record.

124. The structure of claim 123 wherein said circuitry comprises a resistor, a capacitor, a voltage source for charging said capacitor through said resistor, first switching means for disconnecting said capacitor from said voltage source in order to provide a decelerating condition, and second switching means for discharging said capacitor in order to provide an accelerating condition.

125. A numerical control system, comprising, in combination: a record containing numerical information; means for accepting said record and creating electrical representations of various segments of information contained on said record; a source of electrical pulses controllable as to frequency; a controller operative to receive pulses from said source and information from said record and to simultaneously generate a plurality of pulse trains of varying frequencies; and a control circuit connected to said pulse generator having a first, normal, state wherein it causes said pulse generator to emit pulses of a constant frequency, a second, decelerating, state wherein it causes said pulse generator to emit pulses of a continuously increasing frequency, and a third, decelerating, state wherein it causes said pulse generator to emit pulses of a continuously increasing frequency; and means, responsive to information contained on said record for switching said control circuitry into its second or third states from its normal state.

126. A system in accordance with claim 125 wherein said variable frequency pulse source is voltage controlled and said control circuitry for said pulse source includes a capacitor, a resistor, a voltage source operative to charge asid capacitor through said resistor, first switching means responsive to information contained on the record for disconnecting said capacitor from said voltage source, and second means controlled by information on the record for momentarily discharging said capacitor.

127. In a numerical control system for controlling a movable member to execute in substantially immediate succession successive commanded changes in position at commanded velocities, the combination comprising cyclically operable means responsive to successive sets of digital input signals for producing during immediately successive cycles a command signal which changes from instant to instant at a rate corresponding to the commanded velocity and by an aggregate amount corresponding to the commanded change in position, means associated with said generating means for smoothly and gradually varying the rate of change of said command signal over at least a part of the span between the two values of the rate of change which correspond to the commanded velocities for two successive cycles without modifying the aggregate amount of change in the command signal during any cycle, and means for utilizing said command signal to drive the movable member at a velocity corresponding to the rate of change of said command signal and through a distance corresponding to the aggregate change of the command signal.

128. The combination set forth in claim 127 further characterized in that said means for varying the rate of change includes means for gradually increasing the rate of change of the command signal during a cycle of said generating means which involves a commanded velocity substantially greater than that for the preceding cycle.

129. The combination set forth in claim 127 further characterized in that said means for varying the rate of change includes means for gradually decreasing the rate of change of the command signal during a cycle of said generating means which involves a commanded velocity substantially greater than that for the next succeeding cycle.

130. In a numerical control system for controlling relative motions of members movable along a plurality of axes, the combination comprising means for producing successive sets of electrical digital input signals collectively representing the extents and velocities of simultaneous axis motions for producing successive resultant motions, cyclically operable means for generating from each set of digital input signals a plurality of analogue control signals respectively corresponding to said axes and which normally change during each cycle of operation by amounts and at rates corresponding to the represented extents and velocities for the respective axes, means for supplying the next set of digital input signals to said generating means to initiate the next operation cycle thereof substantially immediately after the control signals produced thereby have changed by the extents commanded by a given set of input signals, power means adapted to receive said control signals and responsive thereto for causing motions of said members along the respective axes through distances and at velocities corresponding to extents of change and rates of change of the respective control signals, and means for preventing excessive step changes in said control signals beyond the acceleration capabilities of said power means, said last-named means including means for modifying the operation of said generating means to gradually and equally convert the rates of change of all of said analogue control signals over at least a part of their transitions between the two rates normally produced as a result of two successive sets of digital input signals.

131. In a system for controlling relative motions of members movable along a plurality of axes, the combination comprising means for producing successive blocks of digital signals each representing numerically the extents of component distances to be moved simultaneously along a plurality of axes and collectively indicating the velocity of the resultant motion to be produced, first storage means adapted to receive and hold one block of digital signals at a time, second storage means, means responsive to a transfer signal for transferring a block of digital signals from said first to said second storage means and causing said producing means to insert the next block of digital signals into said first storage means, means responsive to the digital signals held in said second storage means for generating an analogue control signal for each axis and which changes by an amount and at a rate corresponding respectively to the extent of movement and the component velocity for that axis which corresponds to the indicated resultant velocity, power means for each axis adapted to receive the control signal for that axis and responsive thereto for moving a member along such axis through distances and at velocities corresponding respectively to the change and rate of change of such control signal, means for creating the said transfer signal at the completion of each cycle of operation of said generating means when all of the control signals have changed by the numerically represented extents, and means for preventing excessive step changes in said analogue control signals beyond the acceleration capability of said power means, said preventing means including means associated with said generating means for equally and gradually modifying the rates of change of all of said analogue control signals prior to or after the occurrences of certain ones of said transfer signals so that all of the axis velocities and the resultant velocity are changed gradually over at least a part of the transition between the two values designated therefor by two successive blocks of digital signals.

132. In a numerical control system for controlling the motion of a movable element, the combination comprising cyclically operable generator means for responding to successive sets of digital electrical signals by producing, during each cycle in response to one set of digital signals, a control signal which varies by an amount and at a rate of change corresponding respectively to an extent of motion and a velocity which are represented by that one set of digital signals; means for supplying a new set of digital electrical signals to said generator means to begin a new cycle of operation substantially immediately after the completion of the preceding cycle; power means responsive to said control signal for driving said element through distances and at velocities corresponding respectively to the amounts and rates of change of such control signal; said control signal normally having a step in its rate of change at the transition between at least some successive cycles of said generating means; and means for preventing steps of excessive magnitude in the rate of change of said control signal which are beyond the acceleration capability of said power means to follow, said last-named means including means for modifying the operation of said generating means to smoothly and gradually convert the rate of change of said control signal over at least a part of the transition between the value of the rate of change normally produced during one cycle and the value of the rate of change normally producedd uring a succeeding cycle of change normally produced during a succeeding cycle of the generating means, said modifying means otherwise not affecting the amount of change of the control signal during any cycle of the generating means.

133. In a numerical control system for effecting successive commanded movements of a movable member, the combination comprising cyclically operable means for generating during each cycle thereof a control signal which varies by an amount proportional to the value of a first digital input signal and with a rate of change proportional to the product of the values of said first input signal and a second input signal, means for supplying to said generating means during immediately successive cycles thereof first and second input signals of predetermined values, power means adapted to receive said control signal and responsive thereto for driving said member through distances and at velocities respectively proportional to the total change and rate of change of said control signal, and means for preventing steps of excessive magnitude in the rate of change of the control signal which are beyond the capacity of said power means, said last named means including means for gradually changing the value of said first input signal during a predetermined portion of a cycle of said generating means.

134. The combination set forth in claim 133 further characterized in that said means for gradually changing includes means for gradually increasing the value of said first input signal during an initial portion of a cycle of said generating means.

135. The combination set forth in claim 133 further characterized in that said means for gradually changing includes means for gradually decreasing the value of said first input signal during a final portion of a cycle of said generating means.

136. The combination set forth in claim 133 in which the said first input signal is a train of recurring pulses whose value is represented by its frequency, and said means for changing the value of said first signal includes means for gradually changing the frequency of said pulse train.

137. In a numerical control system for effecting substantially immediately successive motions of a movable element with each motion being carried out at a commanded velocity which may have different preselected values for different motions, the combination comprising means for producing successive sets of digital information with each set denoting the commanded velocity for one motion, a cyclically operable generator connected to receive and responsive to successive sets of input signals during immediately successive cycles of operation, said generator having means to produce a command signal which normally varies during each cycle at a rate corresponding to the velocity denoted by the active set of input signals, means effective on said generator for gradually reducing the rate of change of said command signal during a given cycle of operation in which the velocity denoted by the active set of input signals is substantially greater than that designated by the next succeeding set of input signals, and means for utilizing said command signal to drive said element at a velocity proportional to the rate of change of the command signal.

138. In a numerical control system for controlling a movable member to execute in substantially immediate succession successive commanded changes in position and at commanded velocities, the combination comprising a cyclically operable generator for producing in response to a set of digital input signals supplied thereto a command signal which normally varies from instant to instant at a rate corresponding to the command velocity represented by the input signals and which varies during a cycle of operation by an aggregate amount corresponding to the commanded change in position designated by the input signals, means for supplying the next succeeding set of digital input signals to said generator and initiating the next cycle thereof substantially immediately after the completion of one cycle, power means coupled to receive and controlled by said command signal for driving the member at a velocity proportional to the rate of variation of said command signal and through a change of position corresponding to the aggregate amount of variation of said command signal, means for signaling the fact that the commanded velocity designated by a given set of input signals supplied to said generator during a given cycle of said generator is substantially greater than the commanded velocity to be effected immediately after such cycle, and means responsive to such signaling means for modifying the operation of said generator during such given cycle to gradually reduce the rate of change of the command signal during such given cycle.

139. The combination set forth in claim 138 further characterized by means for sensing the condition of said generator to produce a predict signal in the latter portion of but prior to the end of any said given cycle, and means responsive to said predict signal for initiating the operation of said means for modifying.

140. In a numerical control system for controlling the successive motions of a movable element according to successive sets of digital input signals, each set numerically defining a programmed extent and velocity for one increment of motion, the combination comprising cyclically operable means responsive to each set of said digital input signals for generating an analogue control signal which normally varies by an amount and at a rate corresponding respectively to the defined extent and velocity, said generating means beginning the next cycle of operation responsive to the next set of input signals substantially immediately after the completion of the preceding cycle in response to the preceding set of input signals, power means adapted to receive and responsive to said control signal for driving said element through distances and at velocities corresponding respectively to the amount and rate of change of the control signal, and means for modifying the operation of said generating means automatically during preselected ones of its cycles to cause the rate of change of the control signal to gradually and smoothly decrease from its normal value for that cycle without modifying the total amount of change of the control signal from the normal change for that cycle.

141. The combination set forth in claim 140 further characterized in that said preselected ones of said cycles are determined by special code signals included in the sets of digital input signals corresponding to such preselected cycles.

142. In a numerical control system for relatively moving an element simultaneously along a plurality of axes through successive increments of motion in response to successive sets of digital data denoting commanded simultaneous displacements and velocities along the respective axes, the combination comprising means for producing successive sets of digital input signals corresponding to the successive sets of digital data, command signal generator means operative through substantially immediately successive cycles in response to successive sets of said digital input signals, said generator means including means to produce during each cycle a plurality of command signals respectively corresponding to the plurality of axes and with each command signal varying by an amount and at a rate respectively corresponding to the commanded displacement and velocity for that axis as denoted by the active set of input signals, a power means for each axis responsive to the corresponding one of said command signals for driving the element through a distance and at a velocity corresponding respectively to the amount and rate of variation in such command signal, and means effective during certain cycles of said generator means for modifying the operation of the latter to make the rate of change of all of said command signals gradually decrease by equal percentages.

143. In a numerical contouring control system for a machine tool having a plurality of elements movable along respective axes to effect relative motion between a cutter and a workpiece, said machine tool also having auxiliary power devices, which can be turned on or off, the combination comprising a record device having digital indicia serially spaced therealong with such indicia representing (a) successive groups of command data each numerically designating one of a succession of programmed resultant relative motions between the cutter and the workpiece and (b) groups of special code data interspersed with the command data at preselected lengthwise locations along the record device to designate different ones of a plurality of special codes, means for reading said record device serially and converting each group of command data thereon into a group of digital electrical command signals and converting each group of special code data thereon into a group of coded electrical signals, means for halting said reading means after each of said command data groups has been read, means for processing each group of command signals to cause the cutter and the workpiece to execute the resultant relative motion designated thereby, means to restart said reading means after the processing of a group of command signals has been completed, means responsive to each group of said coded electrical signals for creating a momentary signal on one of a plurality of output terminals, said one terminal corresponding to the particular special code read from the record device to create that particular group of coded electrical signals, and means responsive to a momentary signal on each of said output terminals for turning on or off a different one of the auxiliary power devices.

144. In a numerical control system for a machine tool having a movable element and a plurality of auxiliary power devices, the combination comprising a record device having digital indicia serially spaced therealong and representing (a) successive motion commands to be executed by the element according to a desired program of numerically defined sequential motions and (b) special codes disposed at preselected locations along the record device relative to the motion commands and designating different auxiliary functions to be executed at different times during the program of sequential motions, a reader adapted to sense the indicia on the record device serially to produce command signals corresponding to the motion commands and to produce special code signals corresponding to the special codes, means for converting the command signals resulting from the reading of each motion command into an analogue signal which varies over a finite time interval according to the extent and velocity of the motion represented by that command, means for converting the special code signals resulting from the reading of each special code into one of a plurality of unique momentary signals which corresponds to the auxiliary function designated by that particular code, means for halting said reader after each motion command has been read and restarting the reader when the next set of command signals is required to control substantially continuously the variation of said analogue signal, servo power means adapted to receive said analogue signal and responsive thereto for translating the movable element in accordance with the variations in such signal, and control means responsive to respective ones of said plurality of momentary signals for controlling different ones of said power devices to execute the auxiliary functions which correspond to the respective ones of the momentary signals, whereby different desired auxiliary functions are accomplished at different desired times during the execution of the desired program of motion by the movable element, such functions and times being determined by the identities and locations of the special codes along the record device in relation to the motion commands represented thereon.

145. In a numerical contouring control system for a machine tool having a cutter movable along plural axes relative to a workpiece and having a plurality of auxiliary power devices, the combination comprising program means for producing in a predetermined sequence successive sets of digital input signals with each set numerically representing one commanded increment of relative motion to be executed by the cutter relative to the workpiece, said program means also including means for producing groups of digital input signals interleaved in predetermined sequence with said sets and with each group representing one of a plurality of special codes corresponding to one of a plurality of auxiliary functions, means responsive to each said set of input signals for creating analogue signals which vary over a finite time period in a sense and through extents which correspond to the commanded increment of relative motion, means for controlling said program means to interrupt the production of input signals after each set and until said creating means has completed its operation for a set of input signals, and means responsive to each said group of input signals when it appears for creating a momentary signal on that one of a plurality of output terminals which corresponds to the particular one of the special codes represented by that group, different preselected momentary signals thereby appearing at desired times during complete program of variation in said analogue signals, said analogue signals being usable to control power means for causing the cutter and workpiece to execute successive commanded increments of relative motion and said momentary signals being usable to selectively control the auxiliary power devices.

146. For use in a numerical contouring system for a machine tool having relatively movable members and auxiliary power devices, the combination comprising a record device having indicia serially disposed thereon representing numerically successive motion commands and auxiliary function commands interspersed in predetermined sequence relative to the motion commands, means for reading said record device serially and converting the indicia thereon into digital input signals, means connected to receive said input signals and responsive only to those input signals resulting from motion commands for converting the latter into control signals which vary substantially continuously and which are adapted to control power means for moving machine tool members to execute the commanded motions, and means connected to receive said input signals and responsive only to those input signals resulting from auxiliary function commands for converting the latter into unique momentary signals which are adapted to control the operation of different auxiliary power devices.

References Cited

UNITED STATES PATENTS

| 3,069,608 | 12/1962 | Forrester et al. | 318—162 |
| 3,079,522 | 2/1963 | McGarrell | 318—163 |
| 3,109,974 | 11/1963 | Hallmark | 318—162 |
| 3,204,132 | 8/1965 | Benaglio et al. | 318—162 X |
| 3,258,667 | 6/1966 | McDonough et al. | 318—162 |

ORIS L. RADER, *Primary Examiner.*

T. E. LYNCH, *Examiner.*

UNITED STATES PATENT OFFICE
CERTIFICATE OF CORRECTION

Patent No. 3,390,315                                           June 25, 1968

James O. McDonough et al.

It is certified that error appears in the above identified patent and that said Letters Patent are hereby corrected as shown below:

Column 5, line 24, "slef" should read -- self --. Column 10, line 1, "a" should read -- an --. Column 14, line 33, "R153" should read -- R143 --. Column 16, line 40, "16" should read -- 161 --. Column 20, line 53, "N" should read -- M --. Column 22, line 5, "elected" should read -- selected --. Column 23, line 44, "assuming" should read -- assuring --. Column 28, line 51, "divided" should read -- divider --; line 65, "256" should read -- 258 --; line 69, after "will" insert -- be --. Column 33, line 31, "is" should read -- it --. Column 37, line 1, after "be" insert -- in --. Column 40, line 22, "383" should read -- 388 --; line 38, "the output terminal 321d at" should read -- -15 volt source, creating --. Column 48, line 60, "F-Ma" should read -- F=Ma --. Column 49, line 70, "may then" should read -- then may --. Column 56, line 32, "628a" should read -- 638a --. Column 60, line 47, "analogus" should read -- analogue --. Column 68, line 40, "125" should read -- R125 --. Column 71, line 21, "delays" should read -- relays --; line 66 and column 72, line 6, "400", each occurrence, should read -- 4000 --; line 35, "patchwork" should read -- patchboard --. Column 73, line 12, "take" should read -- tape --. Column 76, line 71, "FIG. 15)" should read -- (FIG. 15) --. Column 79, line 15, "R126" should read -- R128 --. Column 80, line 55, "Gate" should read -- gate --. Column 82, line 32, "state" should read -- stator --; line 45, after "gear" insert -- box --; line 54, after "will" insert -- be --. Column 83, line 23, "tarking" should read -- tracking --. Column 84, line 29, '"x90"' should read -- "x09" --; line 44, "maching" should read -- machining --. Column 85, line 22, "exemple" should read -- example --. Column 87, line 26, "pulses", first occurrence, should read -- pulse --. Column 88, line 17, before "a" insert -- input signals representing --; line 45, "components" should read -- component --; line 56, "components" should read -- component --. Column 91, line 28, after "plural" insert -- digit --. Column 95, line 46, "step" should read -- steps --. Column 97, line 10, after "said" insert -- control --. Column 98, line 59, "distance" should read -- distances --. Column 102, line 12, "blocks" should read -- input signals --; same line 12, "input signals" should read -- blocks --. Column 115, line 28, cancel "distance of component movements and the velocities at" and insert instead -- distance in a different time period than that required to --. Column 118, line 45, "increasing" should read -- decreasing --; same line 45, "decelerating" should read -- accelerating --. Column 120, line 37, "producedd uring" should read -- produced during --; lines 46 and 48, "first", each occurrence, should read -- second --; line 49, "second" should read -- first --.

Signed and sealed this 25th day of November 1969.

(SEAL)
Attest:

EDWARD M.FLETCHER,JR.
Attesting Officer

WILLIAM E. SCHUYLER, JR
Commissioner of Patents